US012632442B2

(12) United States Patent
Padmanabhan et al.

(10) Patent No.: US 12,632,442 B2
(45) Date of Patent: May 19, 2026

(54) ARTIFICIAL INTELLIGENCE AGENT CREATION IN A DATABASE SYSTEM

(71) Applicant: Salesforce, Inc., San Francisco, CA (US)

(72) Inventors: Prithvi Krishnan Padmanabhan, San Ramon, CA (US); Robert Van Osten, Chandler, AZ (US); Sky Chen, Los Gatos, CA (US); Nelson Wong, Belmont, CA (US); Bharat Suri, Santa Clara, CA (US); Atul Chandrakant Kshirsagar, San Ramon, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/037,324

(22) Filed: Jan. 27, 2025

(65) Prior Publication Data

US 2026/0079914 A1 Mar. 19, 2026

Related U.S. Application Data

(60) Provisional application No. 63/694,650, filed on Sep. 13, 2024.

(51) Int. Cl.
*G06F 16/00* (2019.01)
*G06F 16/23* (2019.01)
(Continued)

(52) U.S. Cl.
CPC ........ *G06F 16/2379* (2019.01); *G06F 16/243* (2019.01); *G06F 40/103* (2020.01); *G06F 3/0482* (2013.01); *G06F 40/40* (2020.01)

(58) Field of Classification Search
CPC ............................ G06F 16/2379; G06F 16/243
See application file for complete search history.

(56) References Cited

U.S. PATENT DOCUMENTS 9,197,513 B2 11/2015 Vasudev
9,215,096 B2 12/2015 Vasudev
(Continued)

FOREIGN PATENT DOCUMENTS

AU 2019345039 A1 4/2021
AU 2019345040 A1 4/2021
(Continued)

OTHER PUBLICATIONS

International Application Serial No. PCT/US24/34339, Search Report and written Opinion mailed Sep. 24, 2024, 15 pgs.
(Continued)

*Primary Examiner* — Noosha Arjomandi
(74) *Attorney, Agent, or Firm* — Polygon IP, LLP

(57) ABSTRACT

A computing services environment may include application servers providing computing services including access to a database system, a unified metadata framework including autonomous agent definitions referencing action definitions defining a plurality of actions capable of being performed within the computing services environment, an agent service configured to instantiate an autonomous agent instance based on an autonomous agent definition, and an orchestration layer configured to determine an orchestration plan based on novel planning text generated by a generative language model. The orchestration plan may include a subset of the plurality of actions identified in the novel planning text. The computing services environment may execute the subset of the plurality of actions within the computing services environment.

19 Claims, 67 Drawing Sheets

(51) Int. Cl.
    *G06F 16/242*     (2019.01)
    *G06F 40/103*     (2020.01)
    *G06F 3/0482*     (2013.01)
    *G06F 40/40*     (2020.01)

(56)               References Cited

U.S. PATENT DOCUMENTS

| | | | |
|---|---|---|---|
| 9,235,846 B2 | 1/2016 | Petschulat | |
| 9,240,016 B2 | 1/2016 | Cronin | |
| 9,247,051 B2 | 1/2016 | Li | |
| 9,336,533 B2 | 5/2016 | Cronin | |
| 9,342,836 B2 | 5/2016 | Cronin | |
| 9,349,132 B2 | 5/2016 | Cronin | |
| 9,367,853 B2 | 6/2016 | Cronin | |
| 9,390,428 B2 | 7/2016 | Rehman | |
| 9,454,767 B2 | 9/2016 | Cronin | |
| 9,535,573 B2 | 1/2017 | Ramsey | |
| 9,690,815 B2 | 6/2017 | Cronin | |
| 9,753,962 B2 | 9/2017 | Petschulat | |
| 9,762,520 B2 | 9/2017 | Wang | |
| 9,883,033 B2 | 1/2018 | Li | |
| 9,898,743 B2 | 2/2018 | Bessler | |
| 10,044,660 B2 | 8/2018 | Vasudev | |
| 10,164,928 B2 | 12/2018 | Wang | |
| 10,296,289 B2 | 5/2019 | Chen | |
| 10,402,174 B2 | 9/2019 | Varadarajan | |
| 10,496,657 B2 | 12/2019 | Van Osten | |
| 10,509,633 B2 | 12/2019 | Varadarajan | |
| 10,514,896 B2 | 12/2019 | Varadarajan | |
| 10,514,935 B2 | 12/2019 | Chen | |
| 10,540,149 B2 | 1/2020 | Varadarajan | |
| 10,552,464 B2 | 2/2020 | Roustant | |
| 10,572,882 B2 | 2/2020 | Li | |
| 10,585,564 B2 | 3/2020 | Vasudev | |
| 10,585,657 B2 | 3/2020 | Padmanabhan | |
| 10,585,906 B2 | 3/2020 | Van Osten | |
| 10,607,165 B2 | 3/2020 | Punera | |
| 10,671,283 B2 | 6/2020 | Vasudev | |
| 10,701,054 B2 | 6/2020 | Padmanabhan | |
| 10,776,083 B2 | 9/2020 | Olsson | |
| 10,817,652 B2 | 10/2020 | Dmytrenko | |
| 10,826,852 B2 | 11/2020 | Jin | |
| 10,846,068 B2 | 11/2020 | Varadarajan | |
| 10,860,557 B2 | 12/2020 | Eberl | |
| 10,880,251 B2 | 12/2020 | Wang | |
| 10,915,827 B2 | 2/2021 | Muramoto | |
| 10,963,541 B2 | 3/2021 | Cronin | |
| 10,970,486 B2 | 4/2021 | Machado | |
| 10,977,155 B1 * | 4/2021 | Muras | G06F 11/3608 |
| 11,003,317 B2 | 5/2021 | Jacobson | |
| 11,038,771 B2 | 6/2021 | Padmanabhan | |
| 11,082,226 B2 | 8/2021 | Hildebrand | |
| 11,113,459 B1 | 9/2021 | Olsson | |
| 11,128,465 B2 | 9/2021 | Hildebrand | |
| 11,144,335 B2 | 10/2021 | Padmanabhan | |
| 11,157,484 B2 | 10/2021 | Padmanabhan | |
| 11,194,957 B2 | 12/2021 | Vasudev | |
| 11,227,261 B2 | 1/2022 | Wang | |
| 11,244,313 B2 | 2/2022 | Padmanabhan | |
| 11,280,509 B2 * | 3/2022 | Sinha | F24F 11/46 |
| 11,288,280 B2 | 3/2022 | Padmanabhan | |
| 11,301,766 B2 | 4/2022 | Muramoto | |
| 11,308,067 B2 | 4/2022 | Nielsen | |
| 11,314,790 B2 | 4/2022 | Chang | |
| 11,366,821 B2 | 6/2022 | Salomon | |
| 11,372,635 B2 | 6/2022 | Padmanabhan | |
| 11,379,671 B2 | 7/2022 | Alexander | |
| 11,392,828 B2 | 7/2022 | Velasco | |
| 11,425,084 B2 | 8/2022 | Zhang | |
| 11,431,486 B2 | 8/2022 | Padmanabhan | |
| 11,431,663 B2 | 8/2022 | Zhang | |
| 11,431,693 B2 | 8/2022 | Padmanabhan | |
| 11,431,696 B2 | 8/2022 | Padmanabhan | |
| 11,451,530 B2 | 9/2022 | Padmanabhan | |
| 11,468,406 B2 | 10/2022 | Padmanabhan | |
| 11,469,886 B2 | 10/2022 | Padmanabhan | |
| 11,475,207 B2 | 10/2022 | Xie | |
| 11,481,636 B2 | 10/2022 | Ramachandran | |
| 11,488,176 B2 | 11/2022 | Padmanabhan | |
| 11,509,608 B2 | 11/2022 | Greenberg | |
| 11,537,283 B2 | 12/2022 | Gonzalez | |
| 11,537,899 B2 | 12/2022 | Ramachandran | |
| 11,544,762 B2 | 1/2023 | Mao | |
| 11,556,595 B2 | 1/2023 | Burke | |
| 11,568,437 B2 | 1/2023 | Padmanabhan | |
| 11,580,179 B2 | 2/2023 | Xiu | |
| 11,588,803 B2 | 2/2023 | Padmanabhan | |
| 11,611,560 B2 | 3/2023 | Padmanabhan | |
| 11,636,098 B2 | 4/2023 | Padmanabhan | |
| 11,727,937 B2 | 8/2023 | Dai | |
| 11,770,445 B2 * | 9/2023 | Padmanabhan | H04L 9/3213 |
| | | | 709/203 |
| 11,783,024 B2 | 10/2023 | Padmanabhan | |
| 11,803,537 B2 | 10/2023 | Padmanabhan | |
| 11,810,031 B2 | 11/2023 | Dhaliwal | |
| 11,836,450 B2 | 12/2023 | Kale | |
| 11,874,635 B2 * | 1/2024 | Sridharan | G05B 15/02 |
| 11,893,002 B2 | 2/2024 | Padmanabhan | |
| 11,928,426 B1 * | 3/2024 | Gutzeit | G06F 40/20 |
| D1,023,041 S | 4/2024 | Dhaliwal | |
| D1,024,089 S | 4/2024 | Dhaliwal | |
| 11,954,183 B2 | 4/2024 | Padmanabhan | |
| 12,001,801 B2 | 6/2024 | Wang | |
| 12,051,008 B2 | 7/2024 | Hu | |
| 12,111,827 B2 | 10/2024 | Kshirsagar | |
| 12,143,345 B2 | 11/2024 | Greenberg | |
| 12,197,317 B2 * | 1/2025 | Pentyala | G06F 11/3684 |
| 12,321,343 B1 * | 6/2025 | Mehta | G06F 16/243 |
| 12,346,713 B1 * | 7/2025 | Vlasceanu | G06F 16/3346 |
| 12,430,227 B1 * | 9/2025 | Badam | G06F 9/547 |
| 12,437,113 B1 * | 10/2025 | Dahme | G06N 20/00 |
| 2011/0184886 A1 * | 7/2011 | Shoham | G06Q 30/0283 |
| | | | 705/400 |
| 2013/0031144 A1 | 1/2013 | Elango | |
| 2013/0055147 A1 | 2/2013 | Vasudev | |
| 2014/0068512 A1 | 3/2014 | Wong | |
| 2014/0082517 A1 | 3/2014 | Vasudev | |
| 2014/0280065 A1 | 9/2014 | Cronin | |
| 2015/0278718 A1 | 10/2015 | Evans | |
| 2016/0291808 A1 | 10/2016 | Wang | |
| 2016/0294757 A1 | 10/2016 | Wang | |
| 2018/0253319 A1 | 9/2018 | Evans | |
| 2018/0253654 A1 | 9/2018 | Van Osten | |
| 2018/0314740 A1 | 11/2018 | Van Osten | |
| 2019/0057100 A1 | 2/2019 | Burghoffer | |
| 2019/0205403 A1 | 7/2019 | Hussain | |
| 2019/0222540 A1 | 7/2019 | Relangi | |
| 2019/0236559 A1 | 8/2019 | Padmanabhan | |
| 2019/0236562 A1 | 8/2019 | Padmanabhan | |
| 2019/0236598 A1 | 8/2019 | Padmanabhan | |
| 2019/0236606 A1 | 8/2019 | Padmanabhan | |
| 2019/0238316 A1 | 8/2019 | Padmanabhan | |
| 2019/0303445 A1 | 10/2019 | Padmanabhan | |
| 2019/0362016 A1 | 11/2019 | Xie | |
| 2019/0362017 A1 | 11/2019 | Salomon | |
| 2019/0362018 A1 | 11/2019 | Salomon | |
| 2019/0377806 A1 | 12/2019 | Padmanabhan | |
| 2020/0042939 A1 | 2/2020 | Padmanabhan | |
| 2020/0089672 A1 | 3/2020 | Velisetti | |
| 2020/0090033 A1 | 3/2020 | Ramachandran | |
| 2020/0090034 A1 | 3/2020 | Ramachandran | |
| 2020/0097141 A1 | 3/2020 | Jacobson | |
| 2020/0097544 A1 | 3/2020 | Alexander | |
| 2020/0097577 A1 | 3/2020 | Nielsen | |
| 2020/0104408 A1 | 4/2020 | Salomon | |
| 2020/0117481 A1 | 4/2020 | Chen | |
| 2020/0134656 A1 | 4/2020 | Padmanabhan | |
| 2020/0167051 A1 | 5/2020 | Vasudev | |
| 2020/0250174 A1 | 8/2020 | Padmanabhan | |
| 2020/0250176 A1 | 8/2020 | Padmanabhan | |
| 2020/0250177 A1 | 8/2020 | Padmanabhan | |
| 2020/0250295 A1 | 8/2020 | Padmanabhan | |
| 2020/0250683 A1 | 8/2020 | Padmanabhan | |
| 2020/0250747 A1 | 8/2020 | Padmanabhan | |

(56)  References Cited

U.S. PATENT DOCUMENTS

| | | | |
|---|---|---|---|
| 2020/0252205 A1 | 8/2020 | Padmanabhan | |
| 2020/0252404 A1 | 8/2020 | Padmanabhan | |
| 2020/0252406 A1 | 8/2020 | Padmanabhan | |
| 2020/0341970 A1* | 10/2020 | Rodrigues | G06F 16/2379 |
| 2020/0349142 A1 | 11/2020 | Padmanabhan | |
| 2020/0349564 A1 | 11/2020 | Padmanabhan | |
| 2020/0371995 A1 | 11/2020 | Padmanabhan | |
| 2020/0382450 A1* | 12/2020 | Vaughn | H04L 51/02 |
| 2021/0067471 A1 | 3/2021 | Taylor | |
| 2021/0149921 A1 | 5/2021 | Alexander | |
| 2021/0149949 A1 | 5/2021 | Alexander | |
| 2021/0150340 A1 | 5/2021 | Liu | |
| 2021/0150365 A1 | 5/2021 | Ramachandran | |
| 2021/0152536 A1 | 5/2021 | Padmanabhan | |
| 2021/0182423 A1 | 6/2021 | Padmanabhan | |
| 2021/0182773 A1 | 6/2021 | Padmanabhan | |
| 2021/0191938 A1* | 6/2021 | Galitsky | G06N 20/00 |
| 2021/0208856 A1 | 7/2021 | Olsson | |
| 2021/0209305 A1 | 7/2021 | Machado | |
| 2021/0226774 A1 | 7/2021 | Padmanabhan | |
| 2021/0240498 A1 | 8/2021 | Padmanabhan | |
| 2021/0243193 A1 | 8/2021 | Padmanabhan | |
| 2021/0287246 A1 | 9/2021 | Zhang | |
| 2021/0342329 A1 | 11/2021 | Padmanabhan | |
| 2021/0373878 A1 | 12/2021 | Padmanabhan | |
| 2021/0374759 A1 | 12/2021 | Padmanabhan | |
| 2021/0382909 A1 | 12/2021 | Addala | |
| 2021/0397604 A1 | 12/2021 | Padmanabhan | |
| 2022/0006705 A1 | 1/2022 | Padmanabhan | |
| 2022/0027356 A1 | 1/2022 | Padmanabhan | |
| 2022/0114238 A1 | 4/2022 | Padmanabhan | |
| 2022/0207407 A1 | 6/2022 | Zhang | |
| 2022/0244988 A1 | 8/2022 | Zhang | |
| 2022/0245349 A1 | 8/2022 | Pentyala | |
| 2022/0245560 A1 | 8/2022 | Dhaliwal | |
| 2022/0248165 A1 | 8/2022 | Dhaliwal | |
| 2022/0293094 A1 | 9/2022 | Mao | |
| 2022/0318669 A1 | 10/2022 | Alexander | |
| 2022/0335043 A1 | 10/2022 | Zheng | |
| 2022/0358462 A1 | 11/2022 | Oldfield | |
| 2023/0004860 A1 | 1/2023 | Hu | |
| 2023/0021529 A1 | 1/2023 | Bhattacherjee | |
| 2023/0038714 A1 | 2/2023 | Padmanabhan | |
| 2023/0080808 A1 | 3/2023 | Padmanabhan | |
| 2023/0080927 A1 | 3/2023 | Padmanabhan | |
| 2023/0085481 A1 | 3/2023 | Padmanabhan | |
| 2023/0086302 A1 | 3/2023 | Bhagavath | |
| 2023/0089596 A1 | 3/2023 | Huffman | |
| 2023/0103896 A1 | 4/2023 | Addala | |
| 2023/0161607 A1 | 5/2023 | Chen | |
| 2023/0237190 A1 | 7/2023 | Krishnan | |
| 2023/0237499 A1 | 7/2023 | Padmanabhan | |
| 2023/0245038 A1* | 8/2023 | Padmanabhan | G06Q 10/083 705/333 |
| 2023/0247019 A1 | 8/2023 | Kshirsagar | |
| 2023/0333901 A1 | 10/2023 | Kale | |
| 2023/0342734 A1 | 10/2023 | Padmanabhan | |
| 2023/0367766 A1 | 11/2023 | Padmanabhan | |
| 2023/0367776 A1 | 11/2023 | Padmanabhan | |
| 2023/0368185 A1 | 11/2023 | Padmanabhan | |
| 2023/0368191 A1 | 11/2023 | Padmanabhan | |
| 2023/0368291 A1 | 11/2023 | Padmanabhan | |
| 2023/0394481 A1 | 12/2023 | Padmanabhan | |
| 2023/0396445 A1 | 12/2023 | Padmanabhan | |
| 2024/0037503 A1 | 2/2024 | Padmanabhan | |
| 2024/0046115 A1 | 2/2024 | Hu | |
| 2024/0062010 A1 | 2/2024 | Kale | |
| 2024/0095220 A1 | 3/2024 | Isaacs | |
| 2024/0095240 A1 | 3/2024 | Kshirsagar | |
| 2024/0143629 A1 | 5/2024 | Kesarwani | |
| 2024/0143945 A1 | 5/2024 | Mehrotra | |
| 2024/0144328 A1 | 5/2024 | Zhang | |
| 2024/0177143 A1 | 5/2024 | Brandeleer | |
| 2024/0193167 A1* | 6/2024 | Alexander | G06F 16/24573 |
| 2024/0220466 A1 | 7/2024 | Barak | |
| 2024/0242022 A1 | 7/2024 | Yee | |
| 2024/0256581 A1 | 8/2024 | Jiang | |
| 2024/0257168 A1 | 8/2024 | Zhang | |
| 2024/0296443 A1 | 9/2024 | Padmanabhan | |
| 2024/0303443 A1 | 9/2024 | Cheng | |
| 2024/0303473 A1 | 9/2024 | Cheng | |
| 2024/0346036 A1 | 10/2024 | Brown | |
| 2024/0411991 A1 | 12/2024 | Pentyala | |
| 2024/0411992 A1 | 12/2024 | Pentyala | |
| 2024/0412059 A1* | 12/2024 | Radhakrishnan | G06N 3/045 |
| 2024/0427764 A1 | 12/2024 | Kshirsagar | |
| 2025/0005299 A1* | 1/2025 | Padmanabhan | G06F 16/335 |
| 2025/0061279 A1* | 2/2025 | deLevie | G06F 40/131 |
| 2025/0068668 A1 | 2/2025 | Grbic | |
| 2025/0077916 A1 | 3/2025 | Ali | |
| 2025/0086309 A1 | 3/2025 | Harinath | |
| 2025/0086467 A1 | 3/2025 | Yee | |
| 2025/0110948 A1* | 4/2025 | Nguyen | G06F 16/283 |
| 2025/0117417 A1* | 4/2025 | Aghajanyan | G06F 16/3344 |
| 2025/0147987 A1* | 5/2025 | Jiang | G06F 16/3347 |
| 2025/0200082 A1* | 6/2025 | Qadrud-Din | G06F 16/3329 |
| 2025/0209064 A1* | 6/2025 | Sharma | H04L 51/02 |
| 2025/0238299 A1* | 7/2025 | Balaka | G06F 11/0793 |
| 2025/0259032 A1* | 8/2025 | Crabtree | G06N 3/042 |
| 2025/0259041 A1* | 8/2025 | Crabtree | G06N 3/042 |
| 2025/0272305 A1* | 8/2025 | Kshirsagar | G06F 16/24575 |
| 2025/0272500 A1* | 8/2025 | Kshirsagar | G06F 40/35 |
| 2025/0278287 A1* | 9/2025 | Salomons | G06F 9/451 |
| 2025/0284688 A1* | 9/2025 | Yakovlev | G06F 16/243 |
| 2025/0358240 A1* | 11/2025 | Bhat | H04L 67/1097 |
| 2025/0370730 A1* | 12/2025 | Agarwal | G06F 16/33295 |
| 2025/0370731 A1* | 12/2025 | Agarwal | G06F 8/447 |
| 2025/0371449 A1* | 12/2025 | Thompson, III | G06Q 10/0633 |
| 2025/0373451 A1* | 12/2025 | Jungerman | H04L 9/3247 |
| 2025/0373673 A1* | 12/2025 | Sheppard | H04L 65/1096 |

FOREIGN PATENT DOCUMENTS

| | | |
|---|---|---|
| AU | 2023214371 A1 | 8/2023 |
| AU | 2023216803 A1 | 9/2023 |
| CA | 2904526 | 9/2014 |
| CN | 105229633 | 1/2016 |
| CN | 110309119 | 10/2019 |
| CN | 111919417 A | 11/2020 |
| CN | 112703502 | 4/2021 |
| CN | 113039568 A | 6/2021 |
| CN | 113056760 A | 6/2021 |
| CN | 113168622 B | 3/2022 |
| CN | 114175037 A | 3/2022 |
| CN | 114365133 A | 4/2022 |
| CN | 114817284 A | 7/2022 |
| CN | 116226344 | 6/2023 |
| EP | 2973004 | 1/2016 |
| EP | 3304456 | 4/2018 |
| EP | 3747153 A1 | 12/2020 |
| EP | 3776255 A1 | 2/2021 |
| EP | 3814977 | 5/2021 |
| EP | 3853792 A1 | 7/2021 |
| EP | 3853793 A1 | 7/2021 |
| EP | 3853794 A1 | 7/2021 |
| EP | 3853994 | 7/2021 |
| EP | 3973431 A1 | 3/2022 |
| EP | 4007985 A1 | 6/2022 |
| JP | 6412550 | 10/2018 |
| JP | 6608500 | 11/2019 |
| JP | 2021512416 A | 5/2021 |
| JP | 7069401 | 5/2022 |
| JP | 7147054 B2 | 10/2022 |
| JP | 2023029895 A | 3/2023 |
| JP | 7268140 B2 | 5/2023 |
| JP | 7341225 B2 | 9/2023 |
| JP | 7434557 B2 | 2/2024 |
| JP | 7451565 B2 | 3/2024 |
| WO | 2014143208 | 9/2014 |
| WO | 2016190943 | 12/2016 |
| WO | 2019152750 A1 | 8/2019 |
| WO | 2020060770 | 3/2020 |
| WO | 2023040109 | 3/2023 |

(56) References Cited

FOREIGN PATENT DOCUMENTS

| WO | 2024254197 | 12/2024 |
| WO | 2025006247 | 1/2025 |
| WO | 2025058993 | 3/2025 |

OTHER PUBLICATIONS

Office Action dated Mar. 20, 2025 for U.S. Appl. No. 18/750,490 (pp. 1-38).

Wu Tongshuang et al: 11AI Chains: Transparent and Controllable Human-AI Interaction by Chaining Large Language Model Prompts 11, 2021, 21 pages.

\* cited by examiner

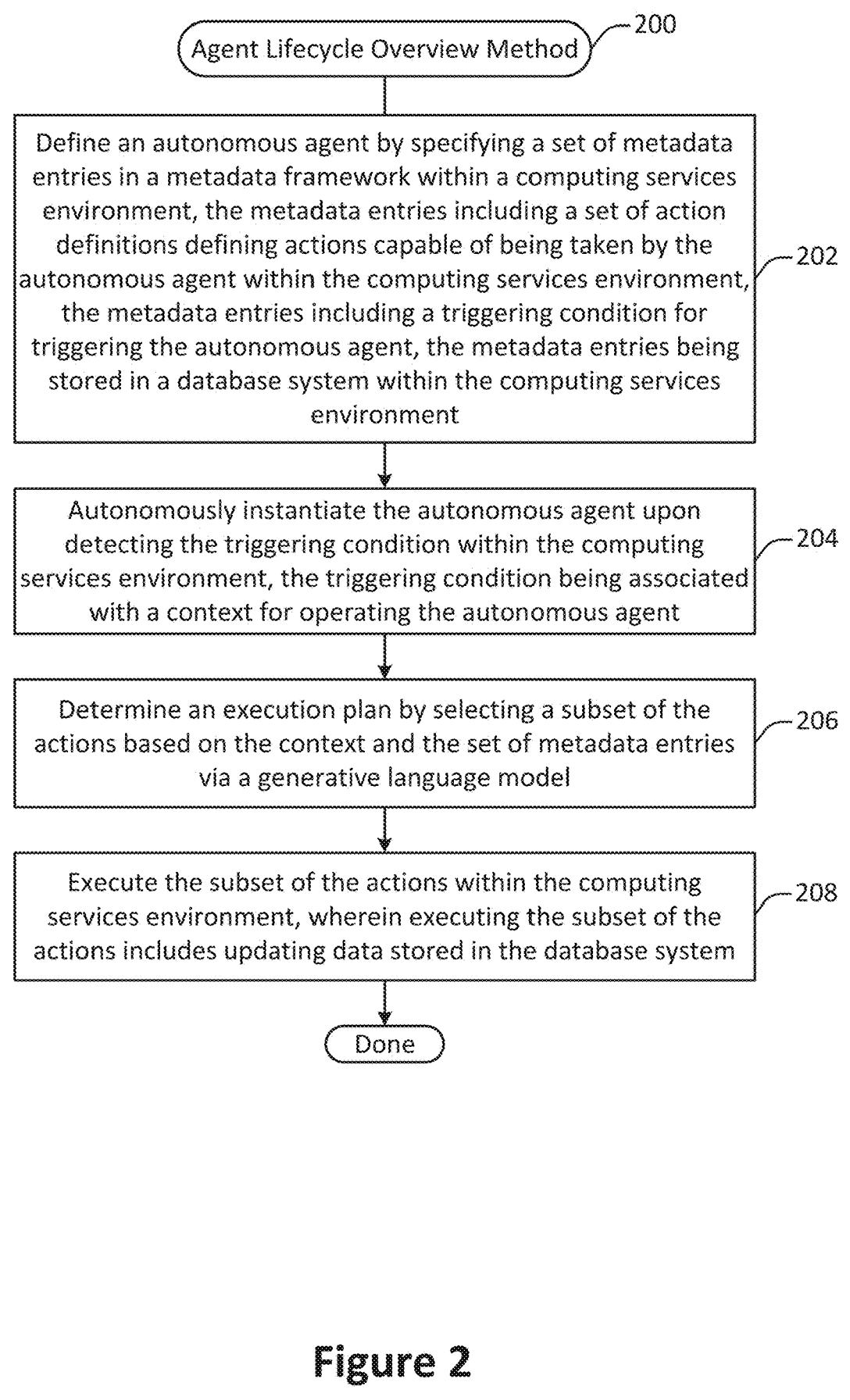

Agent Lifecycle Overview Method — 200

Define an autonomous agent by specifying a set of metadata entries in a metadata framework within a computing services environment, the metadata entries including a set of action definitions defining actions capable of being taken by the autonomous agent within the computing services environment, the metadata entries including a triggering condition for triggering the autonomous agent, the metadata entries being stored in a database system within the computing services environment — 202

Autonomously instantiate the autonomous agent upon detecting the triggering condition within the computing services environment, the triggering condition being associated with a context for operating the autonomous agent — 204

Determine an execution plan by selecting a subset of the actions based on the context and the set of metadata entries via a generative language model — 206

Execute the subset of the actions within the computing services environment, wherein executing the subset of the actions includes updating data stored in the database system — 208

Done

Figure 2

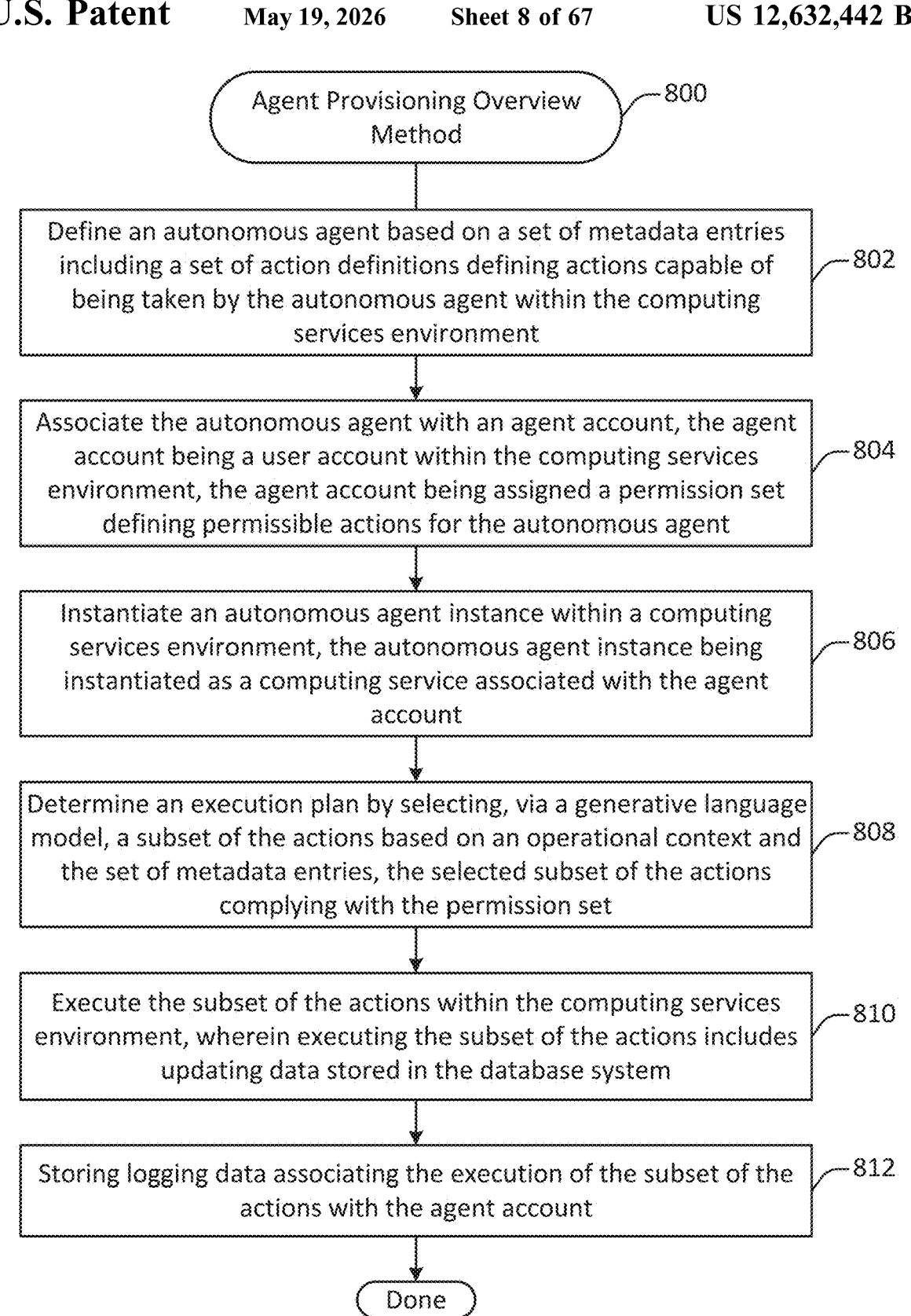

Agent Provisioning Overview Method — 800

Define an autonomous agent based on a set of metadata entries including a set of action definitions defining actions capable of being taken by the autonomous agent within the computing services environment — 802

Associate the autonomous agent with an agent account, the agent account being a user account within the computing services environment, the agent account being assigned a permission set defining permissible actions for the autonomous agent — 804

Instantiate an autonomous agent instance within a computing services environment, the autonomous agent instance being instantiated as a computing service associated with the agent account — 806

Determine an execution plan by selecting, via a generative language model, a subset of the actions based on an operational context and the set of metadata entries, the selected subset of the actions complying with the permission set — 808

Execute the subset of the actions within the computing services environment, wherein executing the subset of the actions includes updating data stored in the database system — 810

Storing logging data associating the execution of the subset of the actions with the agent account — 812

Done

Figure 8

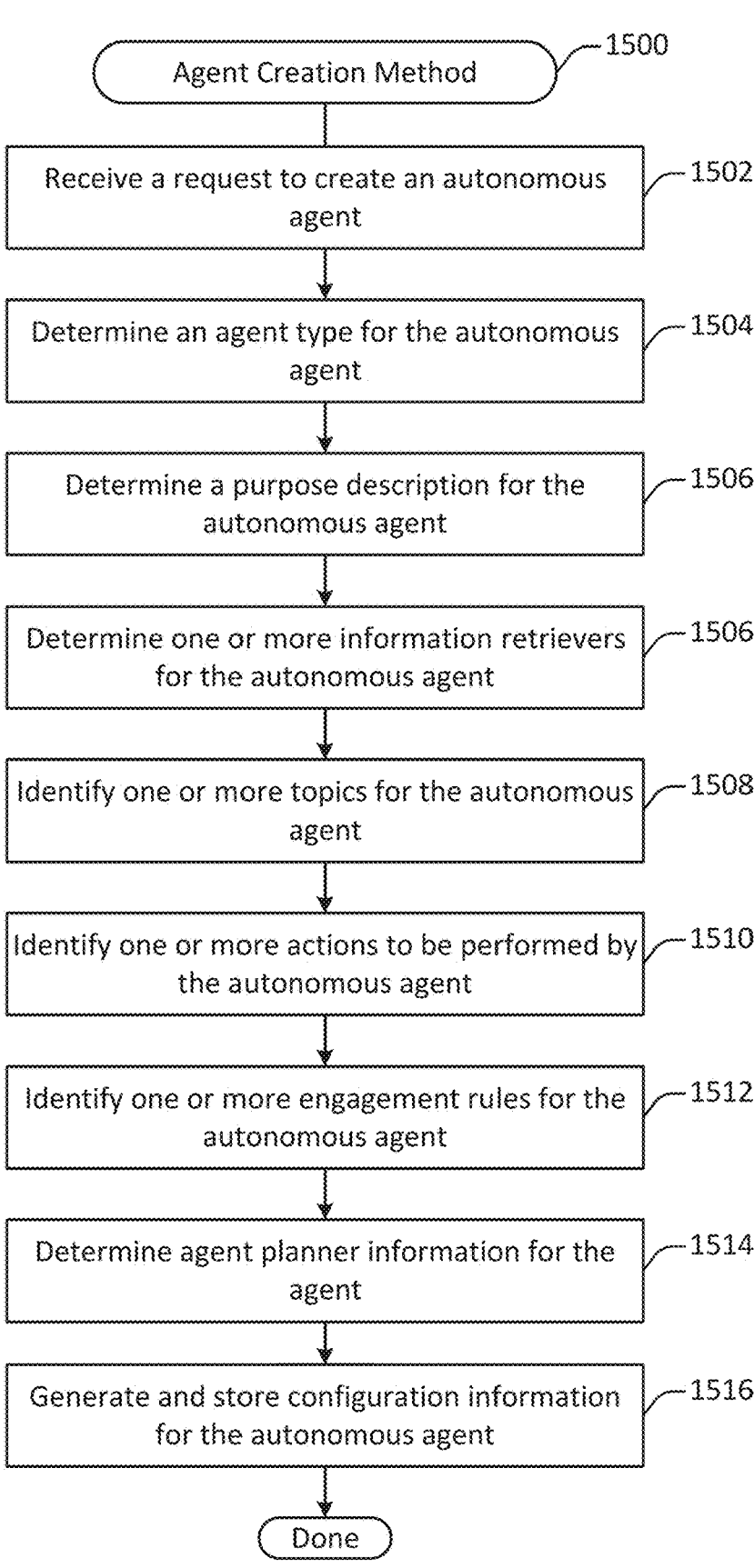

Agent Creation Method ──1500

Receive a request to create an autonomous agent ──1502

Determine an agent type for the autonomous agent ──1504

Determine a purpose description for the autonomous agent ──1506

Determine one or more information retrievers for the autonomous agent ──1506

Identify one or more topics for the autonomous agent ──1508

Identify one or more actions to be performed by the autonomous agent ──1510

Identify one or more engagement rules for the autonomous agent ──1512

Determine agent planner information for the agent ──1514

Generate and store configuration information for the autonomous agent ──1516

Done

Figure 15

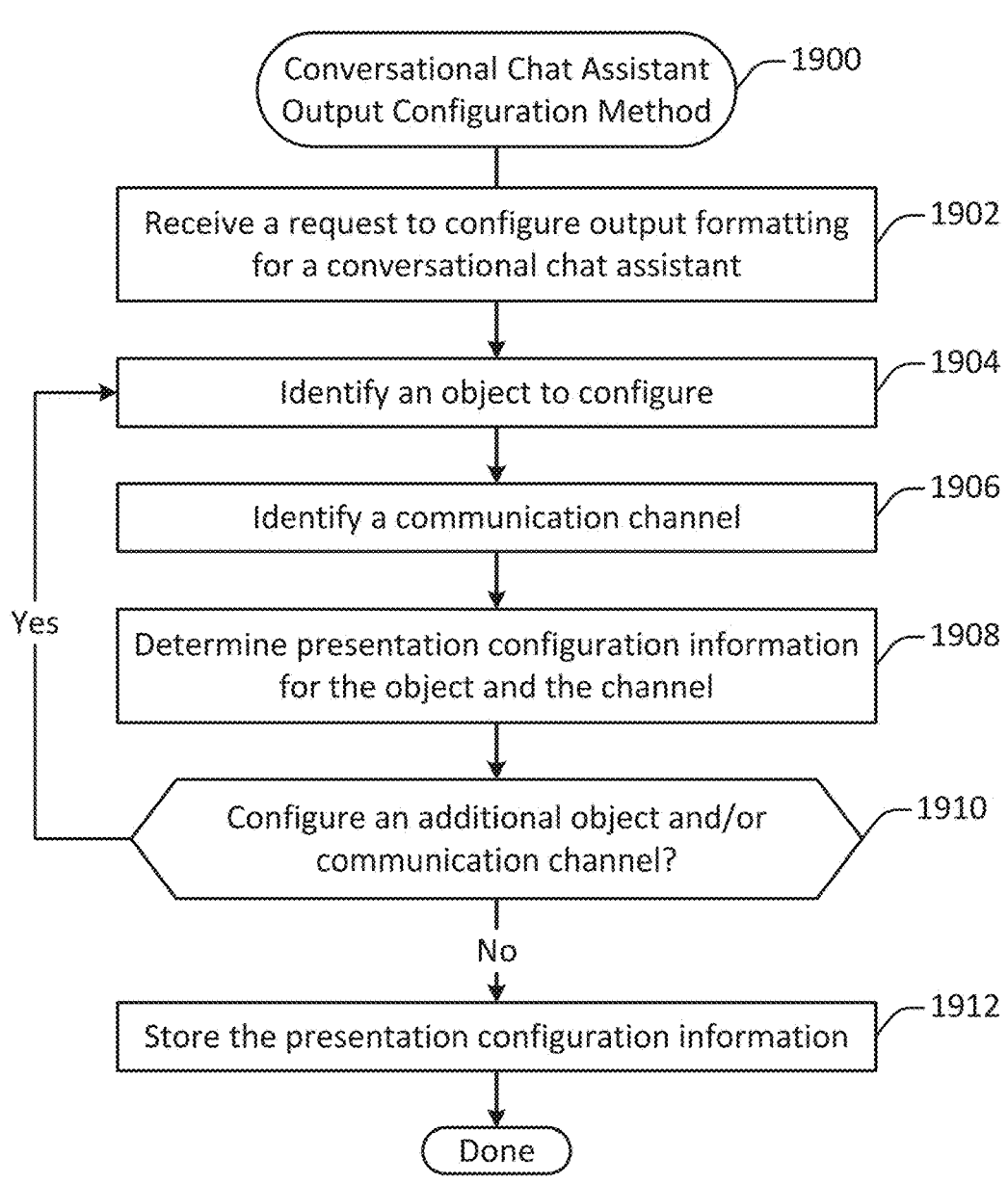

Conversational Chat Assistant
Output Configuration Method ⟩—1900

Receive a request to configure output formatting
for a conversational chat assistant ⟩—1902

Identify an object to configure ⟩—1904

Identify a communication channel ⟩—1906

Determine presentation configuration information
for the object and the channel ⟩—1908

Configure an additional object and/or
communication channel? ⟩—1910

Yes

No

Store the presentation configuration information ⟩—1912

Done

Figure 19

Figure 24:
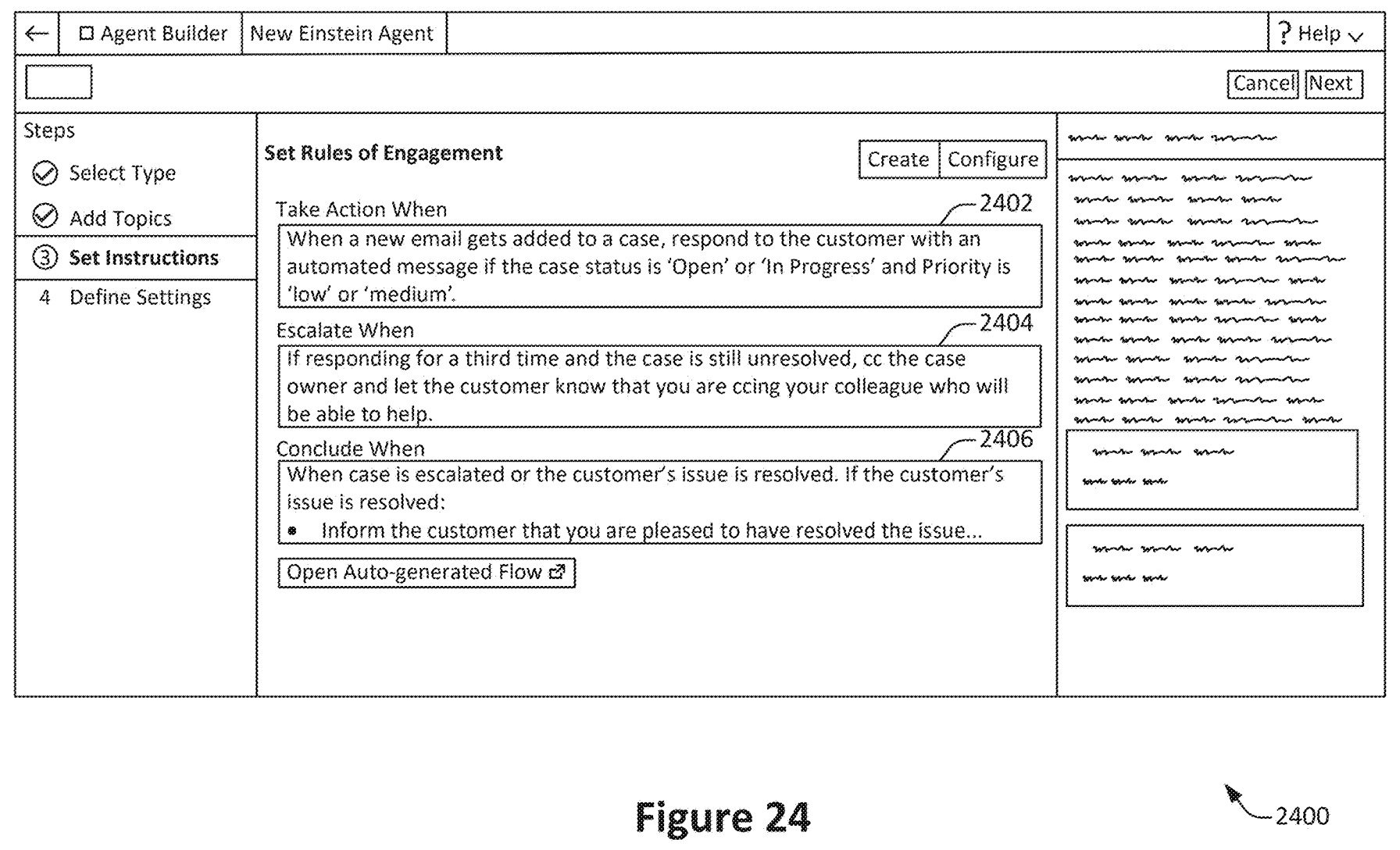

Agent Builder | New Einstein Agent

? Help ∨

Cancel | Next

Steps

① Select Type

② Add Topics

③ Set Instructions

4　Define Settings

Set Rules of Engagement

Create | Configure

Take Action When

When a new email gets added to a case, respond to the customer with an automated message if the case status is 'Open' or 'In Progress' and Priority is 'low' or 'medium'. — 2402

Escalate When

If responding for a third time and the case is still unresolved, cc the case owner and let the customer know that you are ccing your colleague who will be able to help. — 2404

Conclude When

When case is escalated or the customer's issue is resolved. If the customer's issue is resolved:
● Inform the customer that you are pleased to have resolved the issue... — 2406

Open Auto-generated Flow ⤢

Figure 36:
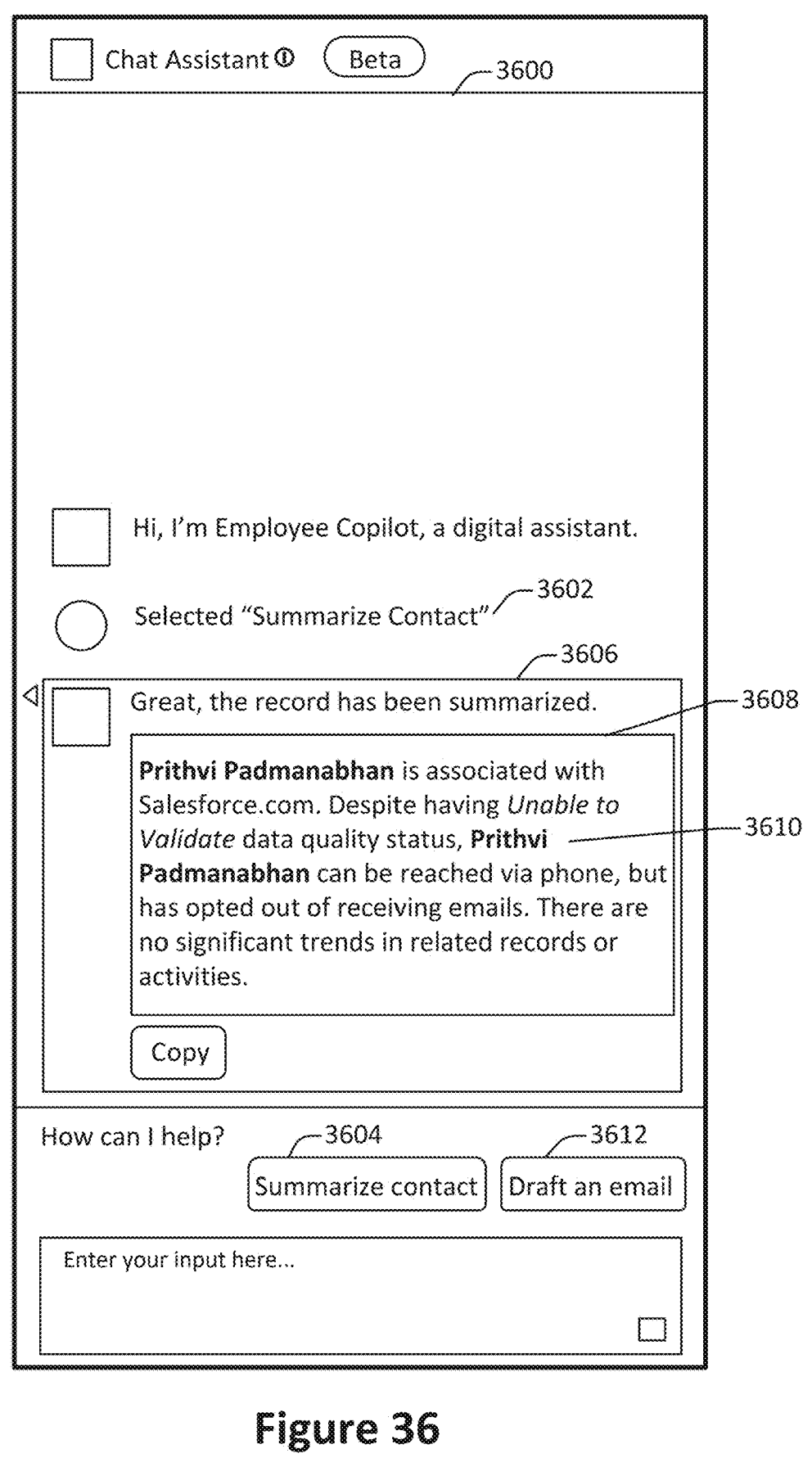

☐ Chat Assistant ⓘ  ( Beta )  —3600

☐ Hi, I'm Employee Copilot, a digital assistant.

◯ Selected "Summarize Contact" —3602

—3606

◁ ☐ Great, the record has been summarized. —3608

Prithvi Padmanabhan is associated with Salesforce.com. Despite having *Unable to Validate* data quality status, Prithvi Padmanabhan can be reached via phone, but has opted out of receiving emails. There are no significant trends in related records or activities.  —3610

[ Copy ]

How can I help?  —3604    —3612

[ Summarize contact ]  [ Draft an email ]

Enter your input here...
☐

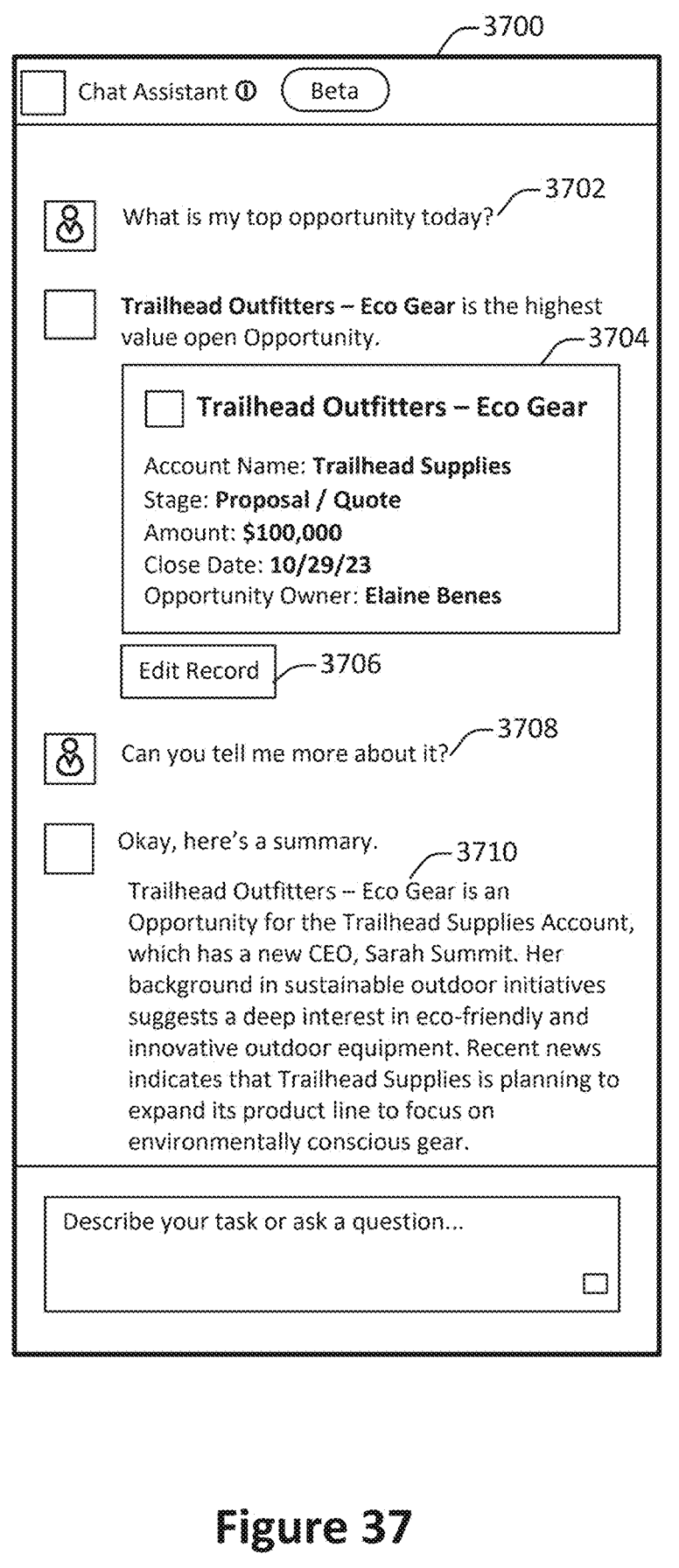

☐ Chat Assistant ⓘ ( Beta )

3702

8   What is my top opportunity today?

☐   Trailhead Outfitters – Eco Gear is the highest value open Opportunity.

3704

☐ Trailhead Outfitters – Eco Gear

Account Name: Trailhead Supplies
Stage: Proposal / Quote
Amount: $100,000
Close Date: 10/29/23
Opportunity Owner: Elaine Benes

[ Edit Record ] 3706

3708

8   Can you tell me more about it?

☐   Okay, here's a summary.

3710

Trailhead Outfitters – Eco Gear is an Opportunity for the Trailhead Supplies Account, which has a new CEO, Sarah Summit. Her background in sustainable outdoor initiatives suggests a deep interest in eco-friendly and innovative outdoor equipment. Recent news indicates that Trailhead Supplies is planning to expand its product line to focus on environmentally conscious gear.

Describe your task or ask a question...      ☐

Figure 37

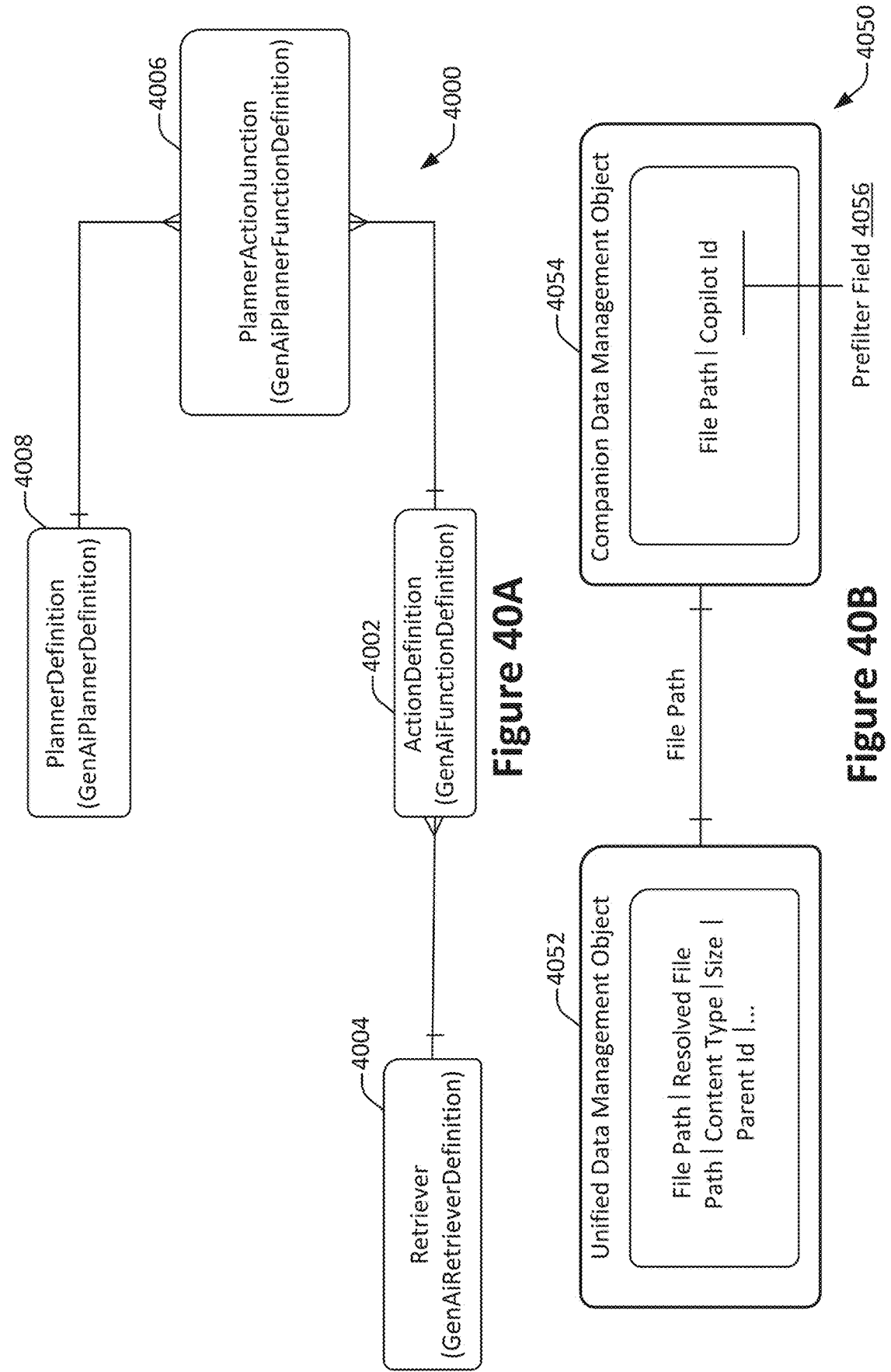

PlannerDefinition
(GenAiPlannerDefinition)

4008

4006

PlannerActionJunction
(GenAiPlannerFunctionDefinition)

4000

4002

ActionDefinition
(GenAiFunctionDefinition)

4004

Retriever
(GenAiRetrieverDefinition)

Companion Data Management Object

4054

File Path | Copilot Id

Prefilter Field 4056

File Path

4052

Unified Data Management Object

File Path | Resolved File
Path | Content Type | Size |
Parent Id | ...

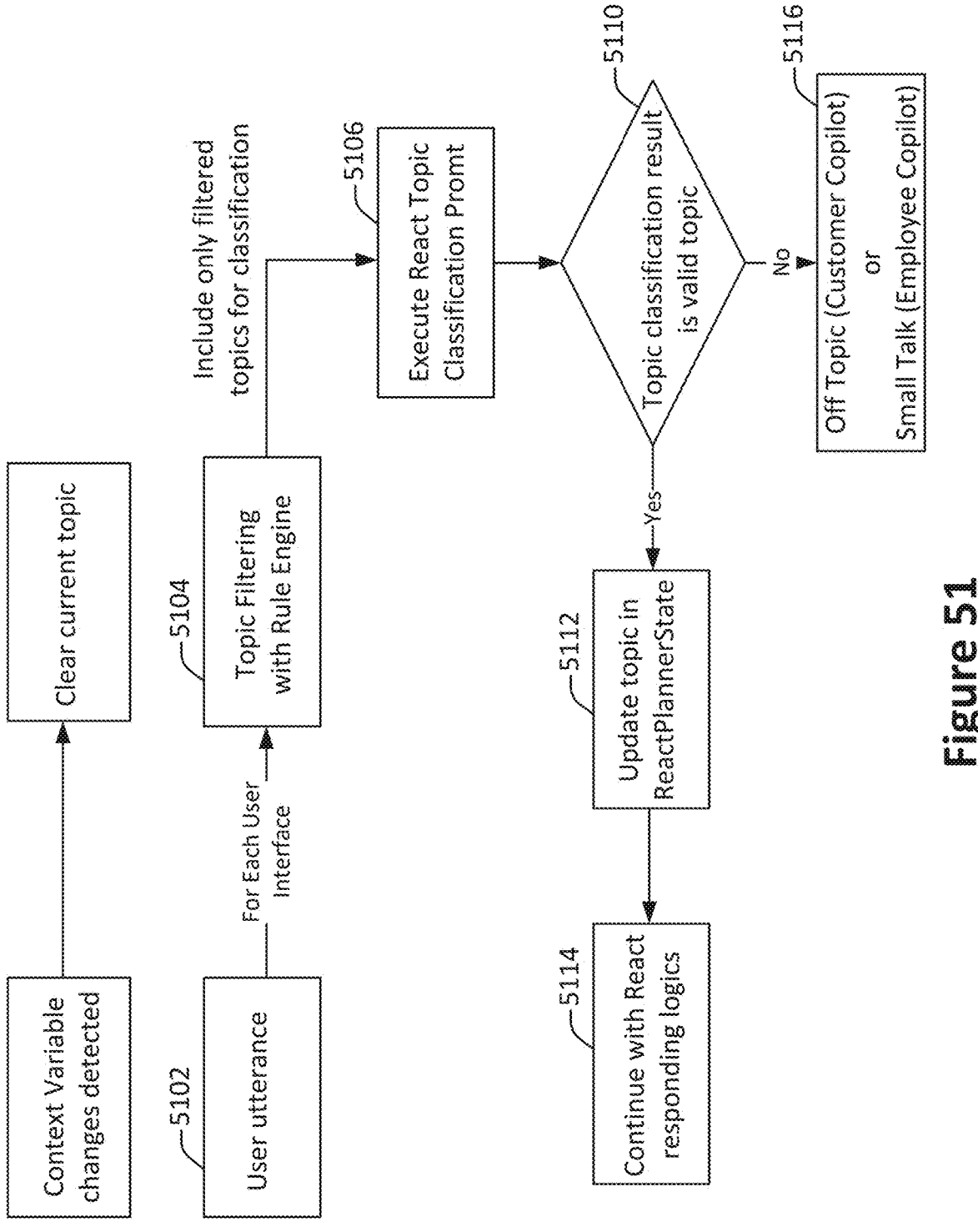

Context Variable changes detected

Clear current topic

5102 — User utterance

For Each User Interface

5104 — Topic Filtering with Rule Engine

Include only filtered topics for classification

5106 — Execute React Topic Classification Promt

5110 — Topic classification result is valid topic

No

5116 — Off Topic (Customer Copilot) or Small Talk (Employee Copilot)

Yes

5112 — Update topic in ReactPlannerState

5114 — Continue with React responding logics

Figure 51

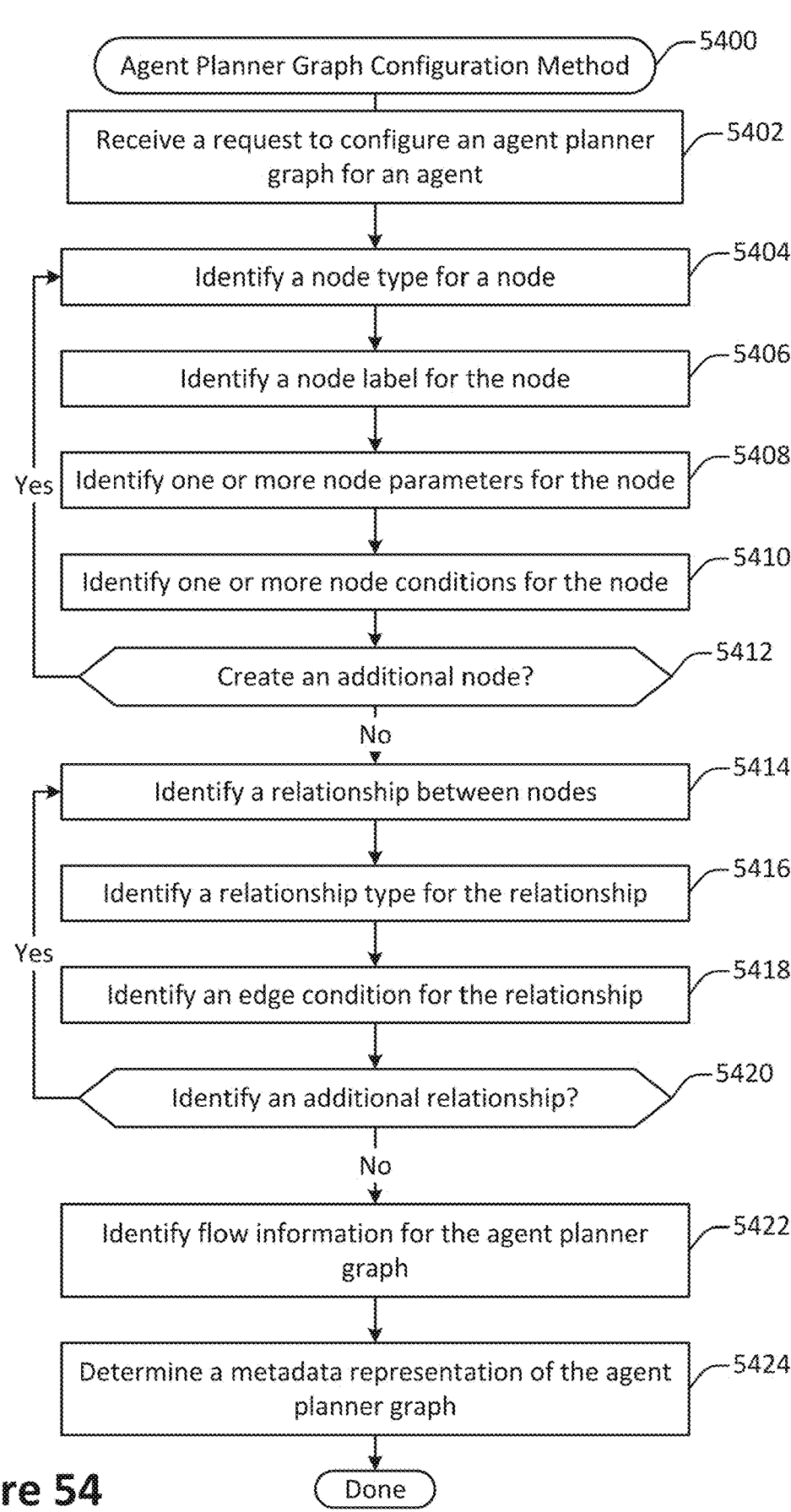

Agent Planner Graph Configuration Method — 5400

Receive a request to configure an agent planner graph for an agent — 5402

Identify a node type for a node — 5404

Identify a node label for the node — 5406

Identify one or more node parameters for the node — 5408

Identify one or more node conditions for the node — 5410

Create an additional node? — 5412

Yes

No

Identify a relationship between nodes — 5414

Identify a relationship type for the relationship — 5416

Identify an edge condition for the relationship — 5418

Identify an additional relationship? — 5420

Yes

No

Identify flow information for the agent planner graph — 5422

Determine a metadata representation of the agent planner graph — 5424

Done

Figure 54

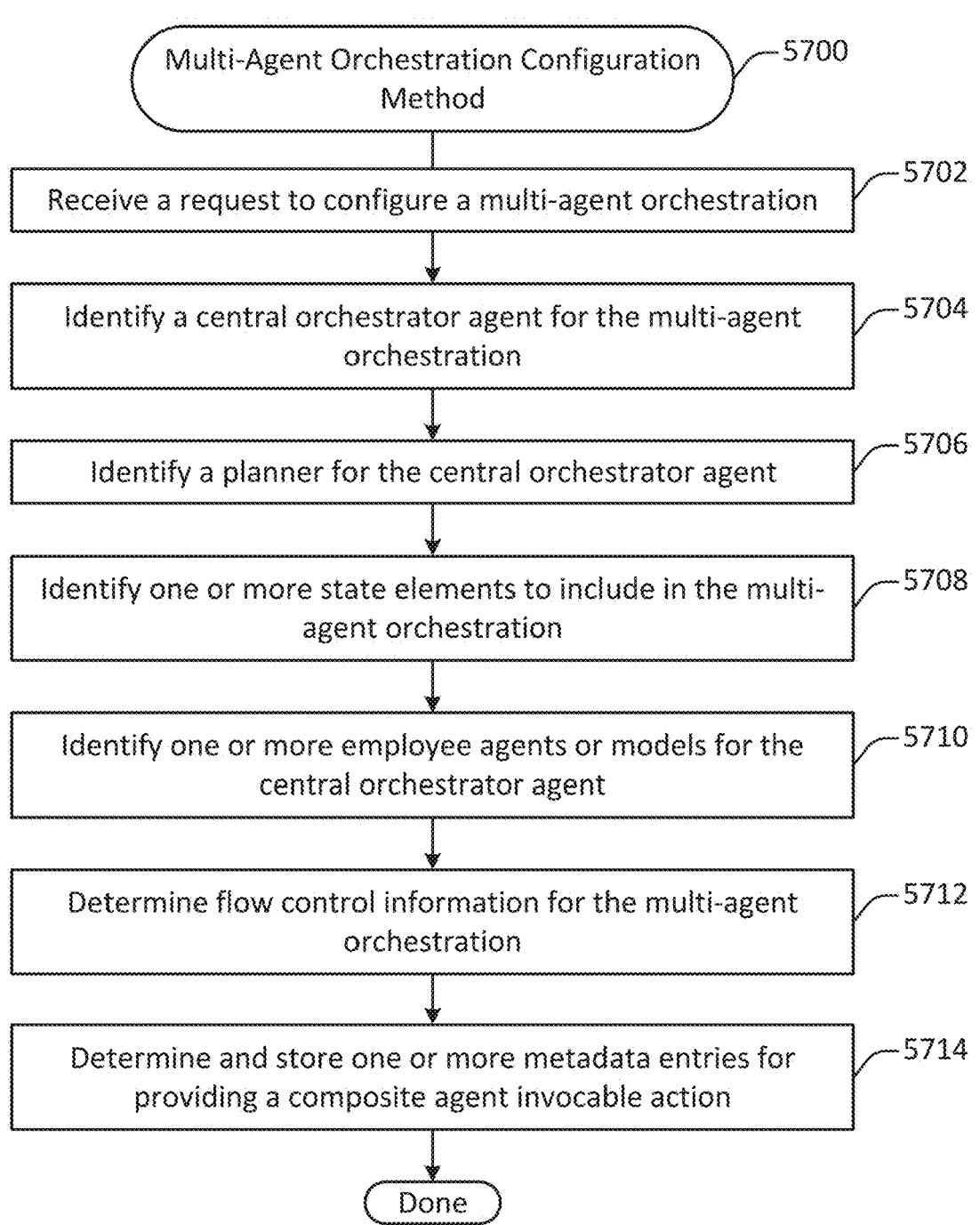

Multi-Agent Orchestration Configuration Method — 5700

Receive a request to configure a multi-agent orchestration — 5702

Identify a central orchestrator agent for the multi-agent orchestration — 5704

Identify a planner for the central orchestrator agent — 5706

Identify one or more state elements to include in the multi-agent orchestration — 5708

Identify one or more employee agents or models for the central orchestrator agent — 5710

Determine flow control information for the multi-agent orchestration — 5712

Determine and store one or more metadata entries for providing a composite agent invocable action — 5714

Done

Figure 57

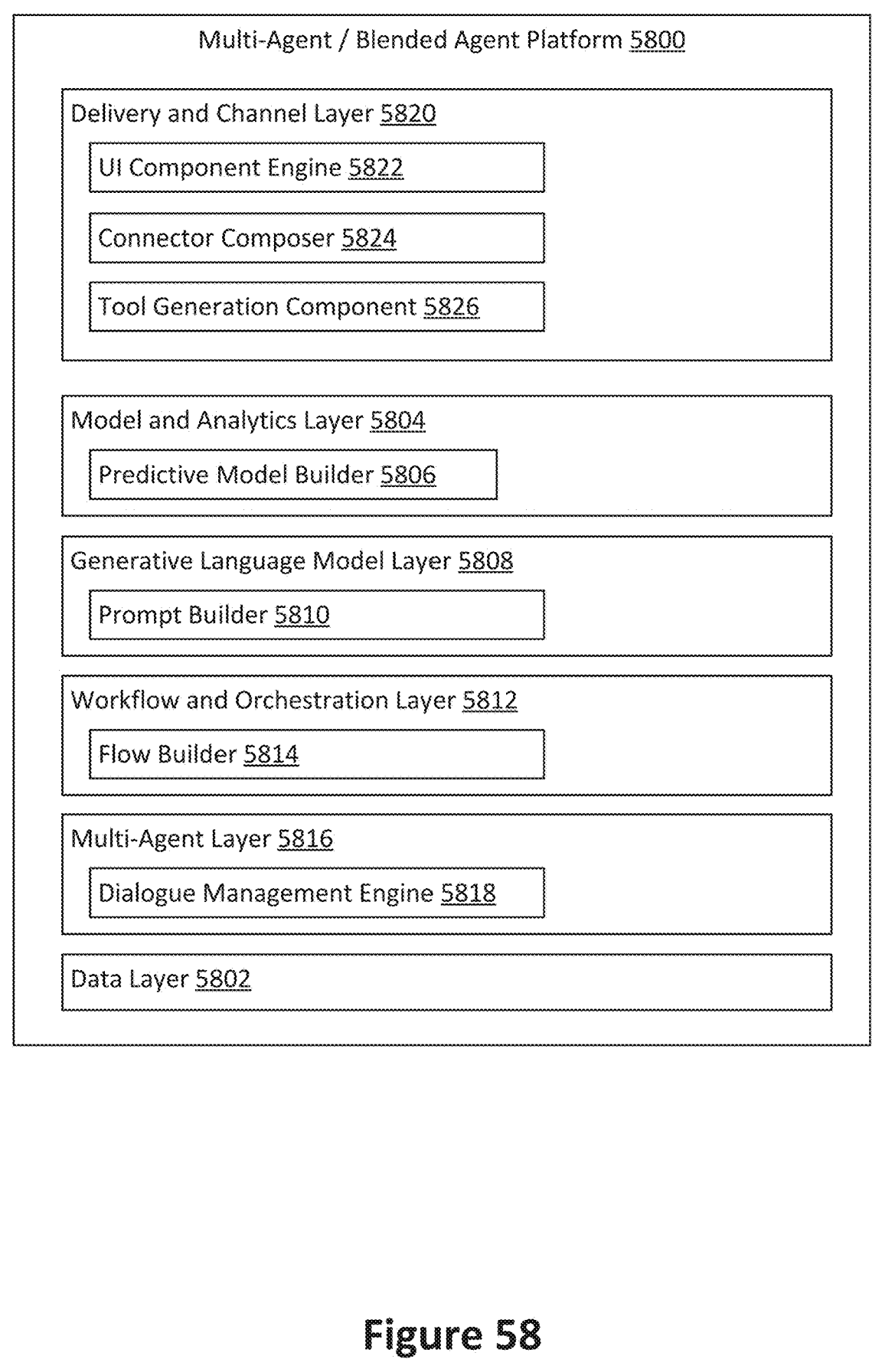

Multi-Agent / Blended Agent Platform 5800

Delivery and Channel Layer 5820

UI Component Engine 5822

Connector Composer 5824

Tool Generation Component 5826

Model and Analytics Layer 5804

Predictive Model Builder 5806

Generative Language Model Layer 5808

Prompt Builder 5810

Workflow and Orchestration Layer 5812

Flow Builder 5814

Multi-Agent Layer 5816

Dialogue Management Engine 5818

Data Layer 5802

Figure 58

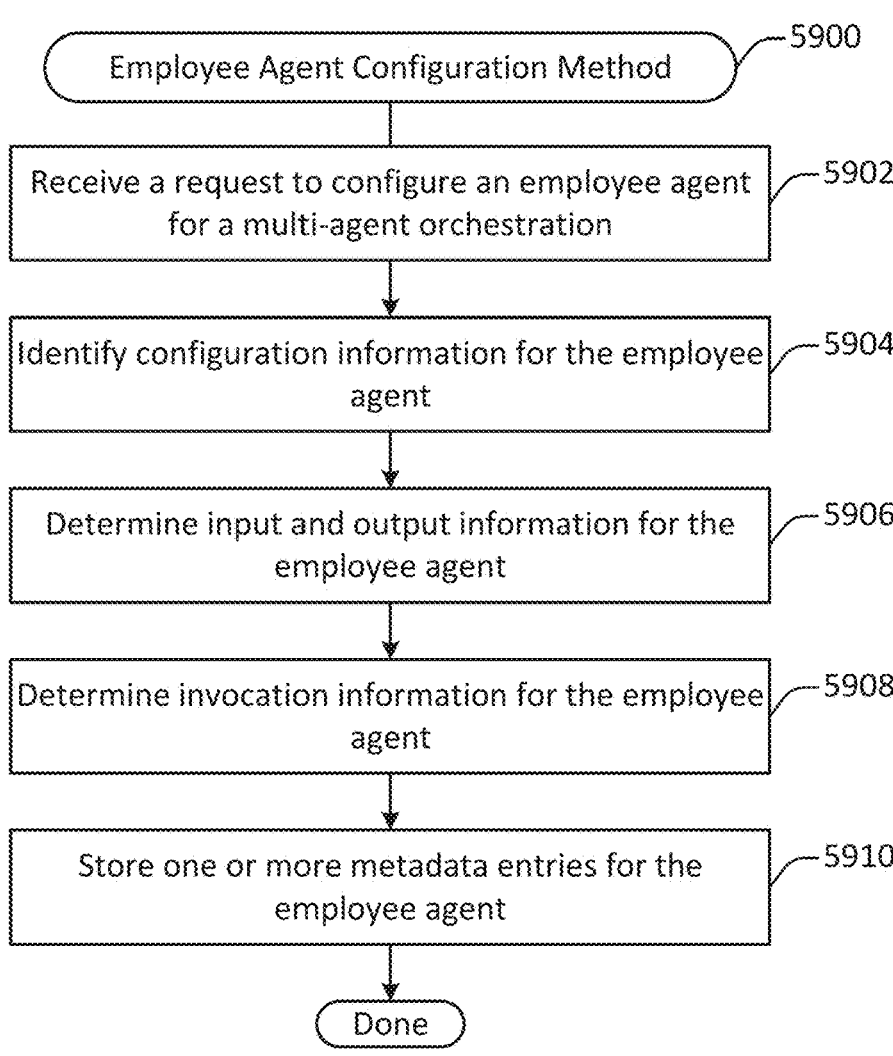

Employee Agent Configuration Method ⎯5900

Receive a request to configure an employee agent for a multi-agent orchestration ⎯5902

Identify configuration information for the employee agent ⎯5904

Determine input and output information for the employee agent ⎯5906

Determine invocation information for the employee agent ⎯5908

Store one or more metadata entries for the employee agent ⎯5910

Done

Figure 59

Figure 60:
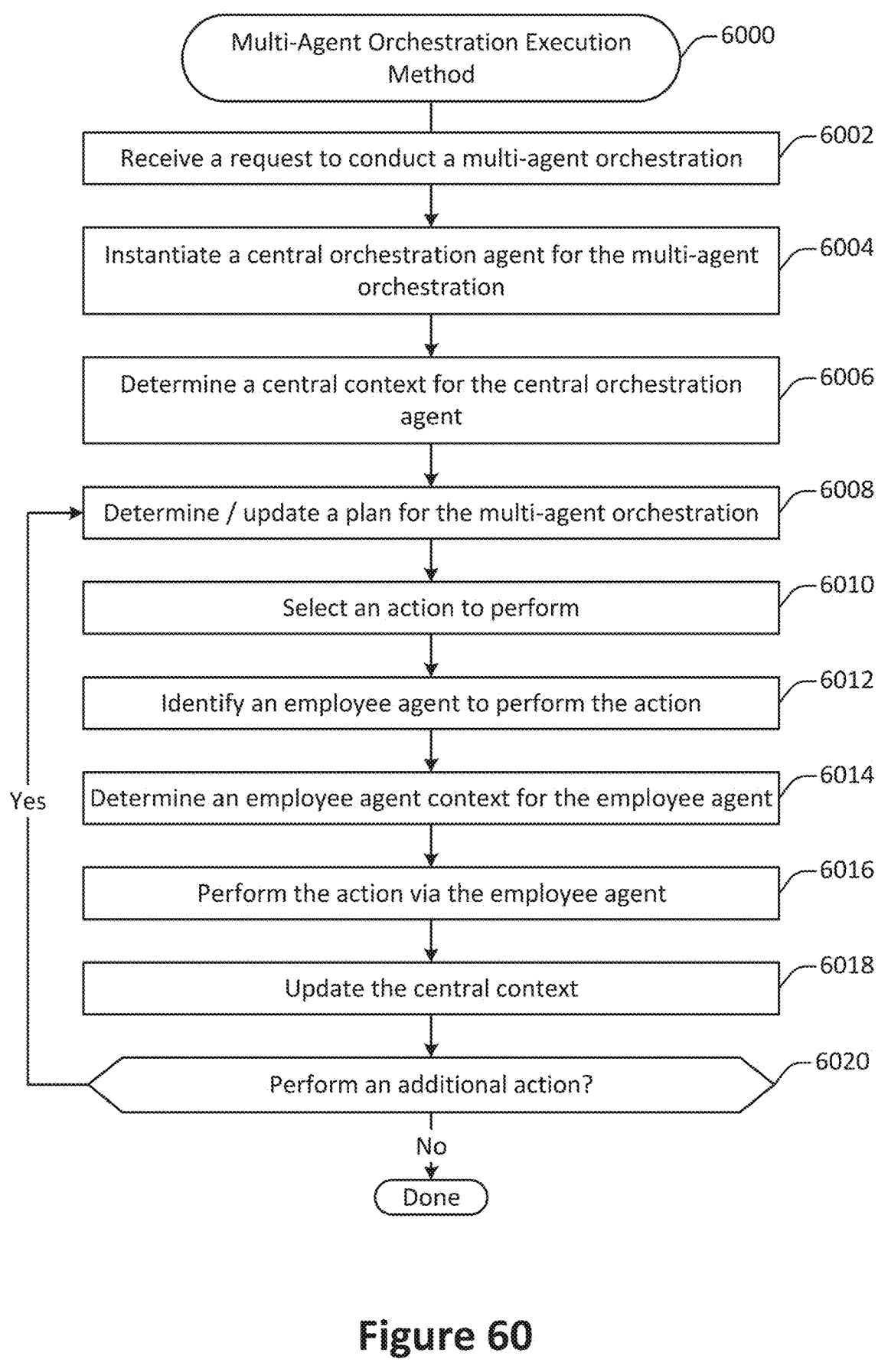

Multi-Agent Orchestration Execution Method ⎯ 6000

Receive a request to conduct a multi-agent orchestration ⎯ 6002

Instantiate a central orchestration agent for the multi-agent orchestration ⎯ 6004

Determine a central context for the central orchestration agent ⎯ 6006

Determine / update a plan for the multi-agent orchestration ⎯ 6008

Select an action to perform ⎯ 6010

Identify an employee agent to perform the action ⎯ 6012

Determine an employee agent context for the employee agent ⎯ 6014

Perform the action via the employee agent ⎯ 6016

Update the central context ⎯ 6018

Perform an additional action? ⎯ 6020

Yes

No

Done

Copilot Playground    Chat Assistant Copilot for Employees     Edit Details | Manage Access | Help Preview As: Kelsey Nocilis | Home | ⟋6704     Version 1 – Last Saved 10/10/2023 [Activate][Save As][Save] ↻

Plan Tracer ⟋6706     [Save Plan]     Test Conversation ⟋6716

Copilot's Actions Action Library

The following actions are available for use in this Copilot

[ Search actions... ]

9 items -- Sorted by XXXX --
Filtered by XXX --

| Action Name | |
|---|---|
| ☐ Apex Send Email (New) | |
| ☐ Apex Inventory Check (New) | ☒ |
| ☐ AF Product Recommendati... | ☒ |
| ☐ Identify Record | ☒ |
| ☐ Create CRM Records | ☒ |
| ☐ Read CRM Records | ☒ |
| ☐ Update Record | ☒ |
| ☐ Summarize Object | ☒ |
| ☐ Summarize Account | ☒ |
| ☐ Summarize Lead | ☒ |
| ☐ Summarize Opportunity | ☒ |
| ☐ Summarize Contact | ☐ |

Apex Inventory Check
☐ Calls an external system tracking program to see inventory levels at different warehouses.

Input
List: Product Recommendations
Parameters: Anytown, USA
Context Variables: Account ID ⟋6708

Output
InventoryCheckResults

Apex Send Email
☐ Send a pre-created Email template to a customer with data integrated from Salesforce CRM and Data Cloud.

Input
List: Product Recommendations
Template: Member Product Rec...
Context Variables: Account ID

Output
Generated Email

☐ Here is a draft message. If it meets your expectations, please add it to the Email Composer to send to your customer. ⟋6718

Cool Shoes Based on You!

Thank you for being an amazing customer Lauren! We noticed you were looking into purchasing new shoes and would love to help you with your selection. Here are some options we think would be perfect for you:

Shoe 1 ⟋6720
    Shoe 2
    Shoe 3

Thanks again and have a great day!
Adidas

[ Refine | Add to Email Composer ]

[ Describe your task or ask a question... ]

⟋6702

ARTIFICIAL INTELLIGENCE AGENT CREATION IN A DATABASE SYSTEM

CROSS-REFERENCE TO RELATED APPLICATIONS

This application claims the benefit under 35 U.S.C. § 119(e) of U.S. Provisional Patent Application 63/694,650 by Padmanabhan and Kshirsagar, titled: "Artificial Intelligence Agent Creation in a Database System", filed on Sep. 13, 2024, which is incorporated herein by reference in its entirety for all purposes.

FIELD OF TECHNOLOGY

This patent application relates generally to database systems, and more specifically to database systems configured to provide access to artificial intelligence agents.

BACKGROUND

"Cloud computing" services provide shared resources, applications, and information to computers and other devices upon request. In cloud computing environments, services can be provided via a computing services environment by one or more servers accessible over the Internet rather than installing software locally on in-house computer systems. Users can interact with cloud computing services to undertake a wide range of tasks.

More recently, generative language models have been developed that allow the generation of novel text. However, systems for managing interactions between cloud computing environments and generative language models are limited. Accordingly, improved systems and methods are needed in order to incorporate generative language models into the cloud-based infrastructure commonly employed for accessing computing services.

BRIEF DESCRIPTION OF THE DRAWINGS

The included drawings are for illustrative purposes and serve only to provide examples of possible structures and operations for the disclosed inventive systems, apparatus, methods, and computer program products for database systems configured to provide access to artificial intelligence agents. These drawings in no way limit any changes in form and detail that may be made by one skilled in the art without departing from the spirit and scope of the disclosed implementations.

FIG. 2 illustrates a method providing an overview of the lifecycle of an autonomous agent, performed in accordance with one or more embodiments.

FIG. 8 illustrates a method providing an overview of agent provisioning, performed in accordance with one or more embodiments.

FIG. 15 illustrates a method for creating an agent, performed in accordance with one or more embodiments.

FIG. 19 illustrates a method for configuring a conversational chat interface for an agent operating as a conversational chat assistant, performed in accordance with one or more embodiments.

FIGS. 20-25 illustrate user interfaces generated in accordance with one or more embodiments.

FIG. 36 illustrates a conversational chat interface provided in the context of a communication session with an autonomous agent, generated in accordance with one or more embodiments.

FIG. 37 illustrates a conversational chat interface provided in the context of a communication session with an autonomous agent, generated in accordance with one or more embodiments.

FIG. 40A illustrates a portion of an autonomous agent data retriever data model, configured in accordance with one or more embodiments.

FIG. 40B illustrates a data model diagram for providing access to unstructured data, configured in accordance with one or more embodiments.

FIG. 51 illustrates an example flow for dynamically filtering topic options, performed in accordance with one or more embodiments.

FIG. 54 illustrates a method for defining an agent planner graph, performed in accordance with one or more embodiments.

FIG. 57 illustrates a method for configuring a multi-agent and/or blended AI orchestration, performed in accordance with one or more embodiments.

FIG. 58 illustrates a multi-agent/blended agent platform, configured in accordance with one or more embodiments.

FIG. 59 illustrates a method for configuring an employee agent in a multi-agent orchestration, performed in accordance with one or more embodiments.

FIG. 60 illustrates a method of executing a multi-agent and/or blended AI orchestration, performed in accordance with one or more embodiments.

FIG. 66 and FIG. 67 illustrate examples of user interfaces and for configuring and testing various elements of an autonomous agent, generated in accordance with one or more embodiments.

DETAILED DESCRIPTION

Introduction

Figure 1:
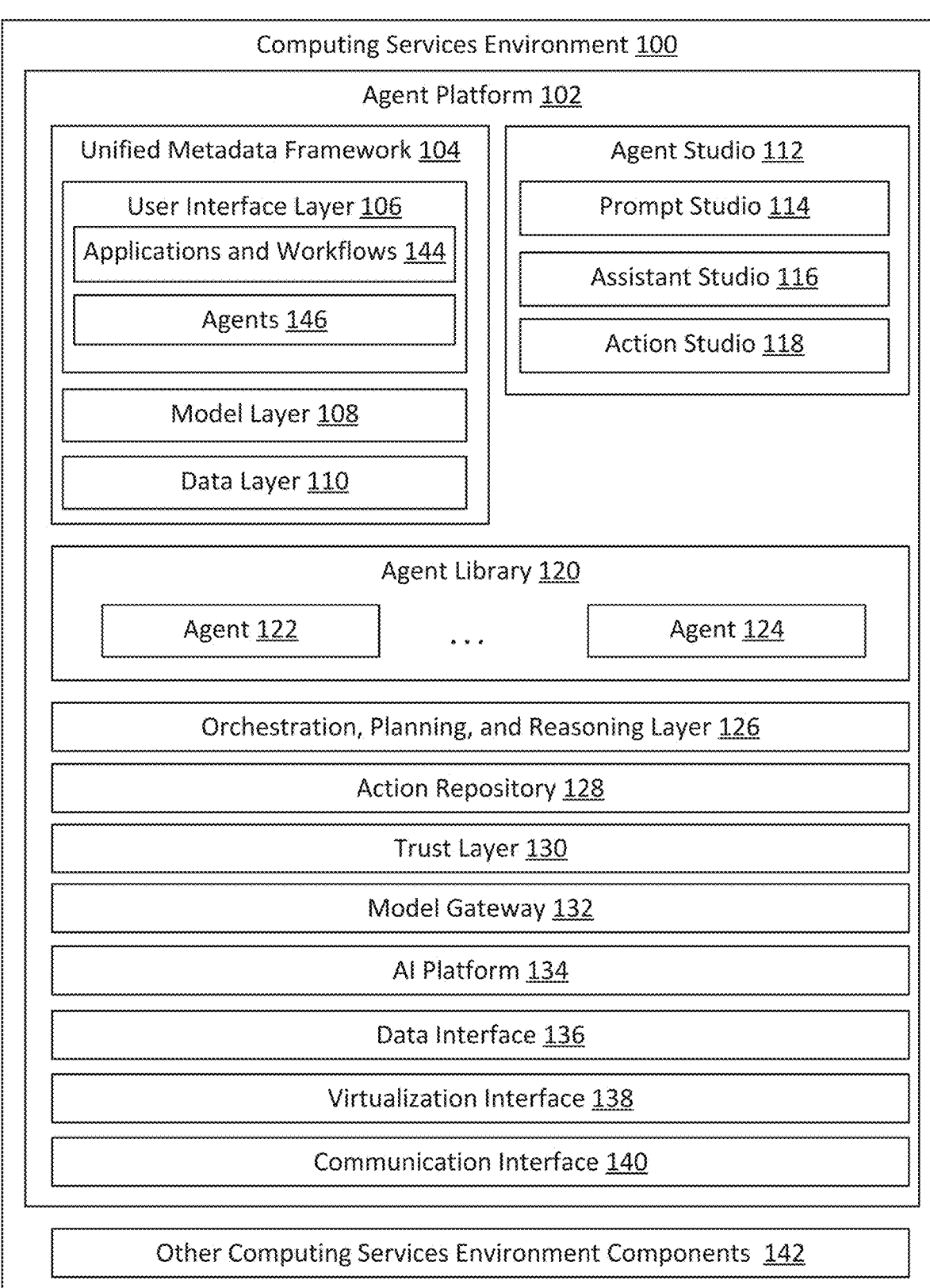
FIG. 1 illustrates a computing services environment, configured in accordance with one or more embodiments.

Techniques and mechanisms described herein provide for a computing services environment equipped with an autonomous agent platform. According to various embodiments, an autonomous agent platform may provide for the creation and execution of customized autonomous agents. An autonomous agent may autonomously perform any of a variety of operations within the computing services environment. Examples of such operations include, but are not limited to: processing natural language user input; processing other types of user input; formulating a plan for accomplishing a goal; retrieving data from one or more sources inside and/or outside the computing services environment; generating novel text; updating the database system to add, remove, or change database records; creating new autonomous agents; coordinating with other internal and/or external systems; and/or coordinating with other autonomous agents.

According to various embodiments, an autonomous agent may be used in the context of workflows for business tasks such as sales, service, marketing, and commerce to complete tasks using intelligent actions. An autonomous agent may be configured to perform operations such as receiving text-based user input, retrieving information from a database system, storing information to a database system, defining and executing workflows and actions within a computing services environment, interacting with one or more generative language models, determining text-based output, and facilitating communication with a client machine via any of various communication channels.

In some embodiments, a computer services environment may provide access to web applications and/or applications integrated into other user interfaces such as those associated with a communication channel, browser plugin, native mobile application, or other interface. In some configurations, the autonomous agent may be integrated natively into existing applications provided via the computing services environment. Such applications may be used to access web applications such as customer relations management applications. In this way, a customer organization (also referred to herein as a tenant organization) may access an autonomous agent configured via the autonomous agent platform through any of a variety of channels. Additionally, both agents and customers of the customer organization may be provided with a unified platform for accessing the autonomous agent.

In some embodiments, an autonomous agent may be customized in any of various ways. The autonomous agent may be customized with actions that employ user-specified and/or standardized flows, code, prompts, and/or application procedure interfaces. Moreover, the autonomous agent platform may support a common onboarding process that supports a set of common best practices when configuring a new (e.g., organization-specific) autonomous agent.

According to various embodiments, an autonomous agent may be equipped with a built-in trust layer to determine and execute actions and generate natural language text grounded in data, such as customer relations management data, data external to a computing services environment, and/or other types of data.

In some embodiments, users may interact with an autonomous agent using natural language provided via a user interface. Alternatively, or additionally, the autonomous agent may dynamically generate action buttons for performing complex actions with a click. As still another example, autonomous agents may be activated in the absence of user interactions, such as when a triggering event within the database system is detected.

In some embodiments, the autonomous agent platform may provide multi-channel communication functionality for an autonomous agent, for instance providing access to communication via tools such as Facebook Messenger, WhatsApp, SMS, mobile, web, WeChat, Slack, Microsoft Teams, custom communication channels, and/or other communication channels.

In some embodiments, techniques and mechanisms described herein support a multi-agent, multi-planner framework. Agents and planner frameworks may be associated with metadata entries. The metadata entries may include descriptions of the agents and planner frameworks that may be provided to a generative language model. The generative language model may then evaluate a request to generate a plan to execute a user's intent in light of the metadata descriptions. The generative language model may select an agent and planner framework for executing the plan, and indicate the selection by generating novel text that includes an identifier that uniquely identifies the agent and planner framework.

In some embodiments, techniques and mechanisms described herein support the generation of a human-readable description of a plan to be executed by an autonomous agent. For example, consider a situation in which a human agent generates a request to send a customer an email about an offer. The orchestration service may determine a plan that includes operations such as: (1) a check to determine if the request is within a valid period for the offer, (2) a check to determine whether the customer is eligible for the offer, (3) a database query to determine as to whether the customer merits an additional promotional discount, and (4) a prompt to draft the email. Such actions may each be associated with metadata used to describe the actions and facilitate selection of the actions by the generative language model. The generative language model may use this same metadata to generate a natural language description of the plan by describing the actions that have been selected for inclusion in the plan based on the metadata.

In some embodiments, a human-readable plan may be reviewed by a human. The human may elect to provide additional user input, which the system may use to revise the plan. For instance, keeping with the example above, the human may provide input such as "Forgo the check regarding the additional promotional discount." The computing services environment may then send an updated plan determination prompt to the generative language model to update the plan based on the user's input. In this way, a human may revise the plan, potentially with multiple iterations of feedback.

In some embodiments, techniques and mechanisms described herein support human-interactive disambiguation and enrichment. In some cases, a human may provide input that references information that turns out to be ambiguous. For example, the human may provide input that could refer to more than one database record, database record type, or real-world information (e.g., the U.S. state "Georgia" or the country "Georgia"). The system may recognize such ambiguity and generate natural language text asking the human user to clarify the user's intent. User input provided in response to the request may then cause the system to retrieve additional information and/or update a plan to reflect the clarification. In this way, a human may aid the system in resolving ambiguities, potentially with multiple iterations of feedback.

Agentic AI Overview

Various embodiments described herein relate generally to artificial intelligence techniques. Generative AI models can be applied in a computing services environment in any of various ways. One way in which generative AI models may be applied involves integrating such models into existing applications. Such models are typically task-specific offering enhancements to core functionalities. For instance, generative AI models may be used to generate emails, service replies, work summaries, and the like. Such models are often tightly integrated into existing, task-specific applications. They often have limited autonomous and interactions driven by user interfaces.

According to various embodiments, as AI models became more sophisticated, they became integrated into autonomous agents. Such autonomous agents act as intelligent assistants, capable of understanding and responding to user queries in natural language. Autonomous agents can perform a range of tasks, from providing information to completing complex actions. Autonomous agents are often oriented around a conversational interface and employ an AI agent as the central intelligence. They provide for increased user autonomy and have expanded capabilities beyond task-specific functions.

Various embodiments described herein now provide for a platform that supports multiple agents. Agents may facilitate retrieval augmented generation, topic filtering, headless interfaces, and other complex features. Such agents can operate independently without a user interface, proactively identifying and executing tasks based on predefined goals or real-time data. They can integrate seamlessly with various systems and applications to optimize processes and achieve desired outcomes. Agents can support features such as proactive task initiation and execution, integration with multiple systems, continuous learning and improvement, and automation of complex workflows.

According to various embodiments, different agents may possess different capabilities and knowledge, collectively contributing to the system's overall intelligence. For example, one agent may specialize in data analysis, while another focuses on natural language processing.

In some embodiments, communication by agents can be powered by generative language models. Generative language models can facilitate seamless communication and collaboration among agents, allowing them to share information, coordinate actions, and/or make collective decisions.

In some embodiments, different agents may employ a shared context, which provides a common understanding of the environment, goals, and constraints involved in performing a task. The shared context helps to ensure that different agents can coordinate work towards a unified objective.

In some embodiments, different levels of AI models may be supported in the system. At the lowest level, embedded AI models may perform specific, predefined functions such as generating emails, service replies, work summaries, predicting outcomes based on structured data, classifying input, and the like. At the highest level, an agent can operate independently and autonomously, making decisions and taking actions based on its knowledge and the shared context. This autonomy allows the system to adapt to changing conditions and handle complex tasks. An autonomous agent can move beyond reactive responses and can proactively identify opportunities, anticipate user needs, and initiate actions without explicit prompts. Non-autonomous agents can provide a bridge between embedded AI applications and autonomous agents, facilitating the expansion of their capabilities. By understanding user interactions and preferences, non-autonomous agents can gather valuable data to refine AI models and algorithms, paving the way for greater autonomy.

As one example of an autonomous agent, consider the challenge that conventional sales pipelines are bogged down by time-consuming, inaccurate, and inefficient processes. Sellers spend excessive hours prospecting to generate leads, often employing a scattershot approach that yields low conversion rates. Techniques and mechanisms described herein provide for an autonomous agent configured as a sales development representative that works tirelessly to boost pipeline velocity. The autonomous agent rapidly prioritizes leads, grows pipelines, and reduces manual workload, providing a unified approach to sales orchestration across direct, indirect, and self-service channels.

As another example of an autonomous agent, consider the challenge that sales teams and representatives would like to improve performance and achieve sales targets. Techniques and mechanisms provide for a sales manager coach that offers real-time, data-driven performance analytics, coaching tools, recommendations, and performance metrics for both sales representatives and managers.

As another example, consider the challenges faced by many manufacturing companies, where procurement is in a silo, isolated from manufacturing and also completely disconnected from a customer relationship management system. Accordingly, many procurement organizations manually acquire parts, products, and supplies. Procurement departments are therefore often working with dated information, and are not processing real-time requests from CRM and Manufacturing. To address these problems, an autonomous agent may be configured. Consider the example of a requirement to acquire four specially built tires. Procurement sends an autonomous agent to search for the four tires and autonomously sources them if it finds them. If the autonomous agent can't find them, then it autonomously schedules a production run for the 4 tires, and reaches out to sales to notify the customer about lead time. Data connectors can gather the data sources and provide the data required to identify the available sources, capacity of the production line, and demand. Procurement can either source the part itself or source by the bill of materials. The autonomous agent in the sales dept could also communicate with procurement to procure the required materials and products. Other data sources may include information such as weather, anticipated demand for products, and/or anticipated product failures due to customer neglect (e.g., failure to perform maintenance). Thus, an autonomous agent may combine generative language models with other types of AI models, such as prediction models, a configuration referred to as "blended AI."

More generally, according to various implementations, the models and/or modules described herein may include classification, predictive, generative, conversational, or another form of artificial intelligence (AI) technology, such as AI model(s), agents, etc., implementing one or more forms of machine learning, a neural network, statistical modeling, deep learning, automation, natural language processing, or other similar technology. The AI technology may be included as part of a network or system comprising a hardware- or software-based framework for training, processing, fine-tuning, or performing any other implementation steps. Furthermore, the AI technology may include a hardware- or software-based framework that performs one or more functions, such as retrieving, generating, accessing, transmitting, etc. The AI technology may be implemented by a computer including a register coupled with a processor or a central processing unit (CPU).

Moreover, the AI technology may be trained or fine-tuned using supervised, unsupervised, or other AI training techniques. In various implementations, the AI technology may be trained or fine-tuned using a set of general datasets or a set of datasets directed to a particular field or task. Additionally or alternatively, the AI technology may be intermittently updated at a set interval or in real time based on resulting output or additional data to further train the AI technology. The AI technology may offer a variety of capabilities including text, audio, image, and other content generation, translation, summarization, classification, prediction, recommendation, time-series forecasting, searching, matching, pairing, and more. These capabilities may be provided in the form of output produced by the AI technology in response to a particular prompt or other input. Furthermore, the AI technology may implement Retrieval-Augmented Generation (RAG) or other techniques after training or fine-tuning by accessing a set of documents or knowledge base directed to a particular field or website other than the training or fine-tuning data to influence the AI technology's output with the set of documents or knowledge base.

To further guide and train output of the AI technology, a plurality of input prompts may be provided to the AI technology for the purpose of eliciting particular responses. In various implementations, the plurality of input prompts may correspond to the particular field or task to which the AI technology is trained. Additionally, the AI technology may be implemented along with a plurality of additional AI technologies. For example, a first AI model may produce a first output, which is used as input for a second AI model to produce a second output. These AI technologies may be used in succession of one another, in parallel with another, or a combination of both. Furthermore, the AI technologies may be merged in a variety of implementations, for example, by bagging, boosting, stacking, etc. the AI technologies.

According to various embodiments, techniques and mechanisms described herein address a variety of technical challenges, such as adapting generative language models to integrate with computing services environments. Computing services environment provide various types of computing services from a service provider to various client organizations. Examples of such services include, but are not limited to, those directed to customer relations management, sales relations management, supplier relations management, and database management applications. Autonomous agents may help to connect the power and flexibility of generative language models with the power and flexibility of computing services environments. However, existing approaches to autonomous agent configuration and implementation involve manually configuring autonomous agents to perform particular tasks. Such an approach suffers from various drawbacks, such as lack of testability, lack of extensibility, significant development delay, and more. In contrast, techniques and mechanisms described herein provide a set of architectures, frameworks, and methodologies facilitating autonomous agent development and implementation that in various embodiments are extensible, automatable, automated, flexible, and integrated with various computing services environment and generative language model platforms.

According to various embodiments, a computing services environment includes a wide variety of computing services arranged across a wide variety of computing devices in communication with one another. Likewise, a generative language model includes many neurons (e.g., millions, billions, or more) arranged in complex neural networks configured to perform sophisticated generative tasks. Coordinating between such systems involves a host of operations, including those related to processing, communication, architecture, coordination, monitoring, feedback, auditing, logging, and more. Any method performed by a system operating at the intersection of a computing services environment and a generative language model is, therefore, necessarily incapable of being performed in the human mind. In such a context, even a seemingly simple operation involves such a wide range of computing resources that a human mind would be incapable of performing the operation to within a method implemented as described herein. For example, although a human mind is capable of generating text, the human mind is incapable of executing a generative language model to generate text to complete a prompt specified in accordance with one or more embodiments.

General Overview

In some embodiments, the techniques described herein relate to a computing services environment, including: a database system storing a plurality of metadata entries in accordance with a metadata framework, the metadata entries including a plurality of action definitions defining actions capable of being taken within the computing services environment; a configuration layer operable to create an autonomous agent definition based on input received from a client machine, the autonomous agent definition referencing a subset of the plurality of action definitions; an agent platform configured to instantiate an autonomous agent instance in accordance with the autonomous agent definition, the autonomous agent instance being associated with a runtime context including information accessible to the autonomous agent instance; an orchestration engine configured to autonomously determine an execution plan for the autonomous agent instance by selecting one or more of the subset of the plurality of action definitions based on the runtime context and the plurality of metadata entries via a generative language model; and one or more application servers configured to autonomously execute a plurality of actions corresponding to the one or more action definitions, the plurality of actions including a designated action updating one or more database records stored in the database system.

In some embodiments, the techniques described herein relate to a computing services environment, wherein the autonomous agent definition is created based on a predetermined workflow within the computing services environment, the predetermined workflow defining a set of operations to be performed in the runtime context of providing computing services via the one or more application servers, the subset of action definitions corresponding at least in part to the set of operations.

In some embodiments, the techniques described herein relate to a computing services environment, wherein creating the autonomous agent definition includes autonomously creating some or all of the subset of action definitions based on the predetermined workflow.

In some embodiments, the techniques described herein relate to a computing services environment, wherein the configuration layer includes a configuration studio providing a graphical user interface for presentation at the client machine, the input being received via the graphical user interface.

In some embodiments, the techniques described herein relate to a computing services environment, the autonomous agent definition including a purpose description characterizing in natural language one or more functions of autonomous agent instances created based on the autonomous agent definition.

In some embodiments, the techniques described herein relate to a computing services environment, the autonomous agent definition referencing a data retriever metadata entry specifying an action to retrieve data at runtime for use by the autonomous agent instance in determining and executing the one or more action definitions.

In some embodiments, the techniques described herein relate to a computing services environment, the autonomous agent definition referencing a plurality of topics, a topic of the plurality of topics including the subset of the plurality of action definitions, the topic being associated with a topic description characterizing the topic in natural language, wherein selecting the one or more action definitions including selecting the topic from the plurality of topics based on user input received at runtime.

In some embodiments, the techniques described herein relate to a computing services environment, wherein the autonomous agent definition including one or more engagement rules identifying one or more trigger conditions for instantiating or terminating autonomous agent instances based on the autonomous agent definition, wherein the autonomous agent instance is instantiated upon detection of an instantiation trigger condition of the one or more trigger conditions by the computing services environment.

In some embodiments, the techniques described herein relate to a computing services environment, wherein the autonomous agent instance is terminated upon detection by the computing services environment of a termination trigger condition of the one or more trigger conditions.

In some embodiments, the techniques described herein relate to a computing services environment, wherein further execution of the autonomous agent instance is halted and a message is sent to a human supervisor upon detection by the computing services environment of an escalation trigger condition of the one or more trigger conditions.

In some embodiments, the techniques described herein relate to a computing services environment, further including: a conversation platform facilitating communication between the computing services environment and a plurality of client machines via a plurality of communication channels, the one or more actions including a communication action, executing the communication action including transmitting novel communication text determined via the generative language model to a designated client machine of the plurality of client machines, the novel communication text being transmitted via a communication channel of the plurality of communication channels, wherein the autonomous agent instance is configured as a conversational chat assistant, the conversational chat assistant being configured to generate the novel communication text in response to natural language input received from the client machine via the communication channel.

In some embodiments, the techniques described herein relate to a computing services environment, wherein the autonomous agent definition includes configuration information for communicating via the communication channel.

In some embodiments, the techniques described herein relate to a computing services environment, wherein the configuration information includes object-specific formatting information specifying how to present data associated with data objects retrieved from the database system within the communication channel.

In some embodiments, the techniques described herein relate to a method implemented in a computing services environment, the method including: storing a plurality of metadata entries in a database system in accordance with a metadata framework, the metadata entries including a plurality of action definitions defining actions capable of being taken within the computing services environment; creating an autonomous agent definition via configuration layer based on input received from a client machine, the autonomous agent definition referencing a subset of the plurality of action definitions; instantiating an autonomous agent instance in an agent platform in accordance with the autonomous agent definition, the autonomous agent instance being associated with a runtime context including information accessible to the autonomous agent instance; autonomously determining an execution plan for the autonomous agent instance in an orchestration engine by selecting one or more of the subset of the plurality of action definitions based on the runtime context and the plurality of metadata entries via a generative language model; and autonomously executing a plurality of actions corresponding to the one or more action definitions via one or more application servers, the plurality of actions including a designated action updating one or more database records stored in the database system.

In some embodiments, the techniques described herein relate to a method, wherein the autonomous agent definition is created based on a predetermined workflow within the computing services environment, the predetermined workflow defining a set of operations to be performed in the runtime context of providing computing services via the one or more application servers, the subset of action definitions corresponding at least in part to the set of operations, wherein creating the autonomous agent definition includes autonomously creating some or all of the subset of action definitions based on the predetermined workflow.

In some embodiments, the techniques described herein relate to a method, wherein the configuration layer includes a configuration studio providing a graphical user interface for presentation at the client machine, the input being received via the graphical user interface.

In some embodiments, the techniques described herein relate to a method, wherein the autonomous agent definition includes a purpose description characterizing in natural language one or more functions of autonomous agent instances created based on the autonomous agent definition.

In some embodiments, the techniques described herein relate to a method, wherein the autonomous agent definition includes one or more engagement rules identifying one or more trigger conditions for instantiating or terminating autonomous agent instances based on the autonomous agent definition, wherein the autonomous agent instance is instantiated upon detection of an instantiation trigger condition of the one or more trigger conditions by the computing services environment.

In some embodiments, the techniques described herein relate to a method, further including: a conversation platform facilitating communication between the computing services environment and a plurality of client machines via a plurality of communication channels, the one or more actions including a communication action, executing the communication action including transmitting novel communication text determined via the generative language model to a client machine of the plurality of client machines, the novel communication text being transmitted via a communication channel of the plurality of communication channels, wherein the autonomous agent instance is configured as a conversational chat assistant, the conversational chat assistant being configured to generate the novel communication text in response to natural language input received from the client machine via the communication channel, wherein the autonomous agent definition includes configuration information for communicating via the communication channel, wherein the configuration information includes object-specific formatting information specifying how to present data associated with data objects retrieved from the database system within the communication channel.

In some embodiments, the techniques described herein relate to a method implemented in a computing services environment, the method including: storing a plurality of metadata entries in a database system in accordance with a metadata framework, the metadata entries including a plurality of action definitions defining actions capable of being taken within the computing services environment; creating an autonomous agent definition via configuration layer based on input received from a client machine, the autonomous agent definition referencing a subset of the plurality of action definitions; instantiating an autonomous agent instance in an agent platform in accordance with the autonomous agent definition, the autonomous agent instance being associated with a runtime context including information accessible to the autonomous agent instance; autonomously determining an execution plan for the autonomous agent instance in an orchestration engine by selecting one or more of the subset of the plurality of action definitions based on the runtime context and the plurality of metadata entries via a generative language model; and autonomously executing a plurality of actions corresponding to the one or more action definitions via one or more application servers, the plurality of actions including a designated action updating one or more database records stored in the database system.

Agent Platform Overview

FIG. 1 illustrates a computing services environment 100, configured in accordance with one or more embodiments. The computing services environment 100 includes an agent platform 102 and other computing services environment components 142. The agent platform 102 includes a unified metadata framework 104, an agent studio 112, an agent library 120, an orchestration, planning, and reasoning layer 126, an action repository 128, a trust layer 130, a model gateway 132, an AI platform 134, a data interface 136, a virtualization interface 138, and a communication interface 140. The agent library 120 includes the agents 122 through 124. The unified metadata framework 104 includes a user interface layer 106, a model layer 108, and a data layer 110. The agent studio 112 includes a prompt studio 114, an assistant studio 116, and an action studio 118.

According to various embodiments, the unified metadata framework 104 may facilitate the configuration of agents as well as interactions between various elements of the computing services environment 100 and the autonomous agent platform 102. For instance, various operations, data objects, and other resources within the computing services environment 100 may be defined as metadata entries within the unified metadata framework 104. Agents may then be constructed using those metadata entries as building blocks.

In some embodiments, the user interface layer 102 facilitates the specification of various applications and workflows 144. Such applications and workflows may include operations performed within and/or outside of the computing services environment 100. For example, applications and workflows may be specific to types of services provided via the computing services environment 100, such as sales, service, marketing, commerce, data analysis, and the like. As another example, applications and workflows may include domain-specific operations, such as those specific to healthcare, finance, or other industries.

In some embodiments, the user interface layer 102 facilitates the specification of agents 146 such as conversational chat assistants. For example, the computing service environment 100 may provide one or more standard conversational chat assistants that may be accessed through user interfaces provided via the computing services environment 100 or via other communication channels such as email, SMS, or external chat services. As another example, an autonomous agent may be customized by, for instance, an organization accessing computing services via the computing services environment 100.

In some embodiments, the agents 146 may be configured to perform various tasks within the system. Examples of agents may include, but are not limited to, customized agents, coaching agents, sales development agents, and customer service agents. Agents may be represented in the unified metadata framework 104 in the user interface layer 106 and may be stored in the agent library 120.

According to various embodiments, one or more of the agents may be autonomous AI agents. Autonomous AI agents (also referred to herein as autonomous agents) may be capable of autonomous or semi-autonomous activation and/or operation. However, not all AI agents are necessarily entirely autonomous. For instance, some AI agents may operate under human control and instruction, for instance eliciting human confirmation before performing some types of actions.

According to various embodiments, an agent may perform operations such as receiving user input, executing one or more applications, workflows, actions, or operations within the computing services environment 100, and/or interacting with a database system, generative language model, other artificial intelligence models, and/or other system accessible via the computing services environment 100.

According to various embodiments, the model layer 104 provides for secure interaction with one or more artificial intelligence models. For instance, the model layer may define access information for performing actions such as retrieving data and accessing AI models via the trust layer 130, the model gateway 132, the AI platform 134, and the data interface 136.

According to various embodiments, the trust layer 130 is configured to perform operations such as masking personally identifying information, securely retrieving data, detecting toxic language generated by a generative language model, and defending prompt completions against injection attacks and other attacks. Thus, the trust layer may provide additional protections for various actions performed in the context of various applications, workflows, and autonomous agents. Additional details related to the trust layer are discussed throughout the application, for instance with respect to FIG. 3.

In some implementations, the data layer 106 defines data retrievers providing access to data sources, which may be located inside or outside of the computing services environment 100. Examples of such data sources may include, but are not limited to: structured data sources, unstructured data sources, data lakes, vector databases, relational databases, unified user profiles, data-based actions, data warehouses, and data lakehouses.

In some embodiments, an agent may be used to perform one or more tasks within the computing services environment 100. For example, an autonomous agent may interactively converse with a user in natural language. As another example, an agent may interact with one or more artificial intelligence models, including one or more generative language models, one or more predictive models, one or more classification models, and/or one or more other types of models. As yet another example, an autonomous agent may retrieve information from a database system, store information to a database system, transmit one or more messages, and/or take other actions within the computing services environment 100.

In some embodiments, the agent studio 112 allows for the construction and customization of various aspects of the agent platform 100 and/or agents accessible via the agent platform 100. The agent studio 112 may include elements such as a user interface, metadata information, monitoring, governance, and/or search tools for building agents. For example, the agent studio 112 may provide support for constructing one or more prompts, actions, applications, workflows, or the like.

The agent studio 112 includes a prompt studio 114, an assistant studio 116, and an action studio 118. According to various embodiments, the agent studio 112 provides functionality for the configuration of assistants, actions, and prompts to support agent platform customized for a customer organization. For example, a user may build, test, and integrate prompts, actions, and/or autonomous agents into one or more applications provided by or interoperating with the computing services environment 100 to support the performance of various tasks for an organization.

Agents 122 through 124 may be stored in the agent library 104. One or more agents may be configured in a standardized format and/or template for use by various organizations and individuals accessing computing services via the computing services environment 100. Additionally, one or more agents may be customized for particular industries, organizations, individuals, applications, and/or other contexts.

At 126, an orchestration, planning, and reasoning layer provides for the execution of an agent to interpret, decompose, and implement actions based on user inputs. For example, a user instruction such as "draft an email summarizing this record" may be analyzed to identify an overall intent. The user instruction may also be decomposed into actions such as "summarize a record" and "draft an email using the summary". The decomposition and overall intent may be used to orchestrate and execute a plan, which may involve identifying the focal record, determining and completing one or more prompts to determine the summary, and determining and completing one or more prompts to draft an email using the summary. Additional details regarding the formulation and execution of such a plan are discussed throughout the application.

According to various embodiments, the action repository 128 may include one or more actions that are preconfigured to perform tasks within the computing services environment 100. For instance, an action repository may include actions such as "summarize a record" or "draft an email." An autonomous agent may identify and execute such actions in order to implement a user's intent or accomplish other objectives assigned to the autonomous agent.

In some embodiments, one or more of the actions may be specific to a particular domain. For instance, one or more actions in the health or finance domains may include particular constraints, such as instructions provided to a generative language model, to provide for compliance with relevant laws and regulations.

In some embodiments, one or more of the actions may be configurable and/or user-defined. For instance, a user associated with an organization accessing computing services via the computing services environment 100 may provide code and/or other action definition information specifying an action to be performed. The defined action may then be incorporated into an orchestration or workflow.

The model gateway 132 provides access to one or more generative language models or other artificial intelligence models. In some embodiments, agents may be supported by a range of different generative language models. For example, a customer organization may be able to use standardized models provided by model providers such as Open AI, Microsoft Azure, Gemini, or the like. As another example, the model gateway 132 may also support customized models, for instance models customized and/or hosted by a customer organization. As yet another example, the model gateway 132 may provide access to models hosted within the computing service environment 100.

In some embodiments, an AI agent may be configured to employ different models for different aspects of the agent. For example, one model (e.g., Gemini) may be used for a function such as "summarize record", while another model (e.g., Open AI) may be used for a function such as "draft email". In this way, an AI agent may be flexibly adapted to execute a variety of different operations.

In some embodiments, the model gateway 132 may provide a feedback framework for receiving user feedback. The user feedback may be stored in the database and may be used for a variety of purposes, such as finetuning an autonomous agent and/or one or more of the underlying generative language models.

The AI platform 134 may provide support for generative language models and other types of AI models hosted by the service provider of the computing services environment 100 and/or one or more partner or customer organizations. For example, the customer organization may provide their own generative language model, such as a hosted generative language model. As another example, the customer may employ a customer-tuned version of a standard model, such as the customer's version of a model provided by Azure or Gemini. As still another example, an agent may employ a standard generative language model hosted by the service provider of the computing services environment 100.

The data interface 136 provides access to one or more of a variety of data sources. According to various embodiments, an agent may access one or more data sources to support the autonomous agent operations. For example, an agent may access third party data sources such as Google Cloud, Google BigQuery, Amazon S3, or Microsoft Azure. As another example, an agent may access one or more data sources from inside the computing services environment, such as customer relations management data. As still another example, an agent may access data from other sources, such as legacy systems, external apps, mobile sources, web sources, software development kids, and/or application procedure interfaces. Examples of data interfaces may include, but are not limited to: data lakehouses, real-time data services, zero-ETL data services, united profiles, data actions, data connectors, relational database systems, and any other interfaces for accessing structured, unstructured, or semi-structured data sources.

At 138, a virtualization platform provides for the ability to deploy one or more aspects of the platform provided via the computing services environment in one or more virtual environments. For example, data residency requirements may be enforced, ensuring that data resides in a particular location. As another example, communications may be encrypted end-to-end. As still another example, one or more regulatory requirements may be enforced. The virtualization platform 138 may allow all or a portion of the computing services environment 100 to be deployed in a different location, such as within a hosted environment (e.g., Google Compute, Amazon AWS, etc.).

The communication interface 140 facilitates communication with one or more client machines via any of various communication channels. For example, depending on the system configuration, a client machine may communicate with an autonomous agent via a web interface, a messaging application (e.g., Slack), email, voice, SMS messages, and/or any other suitable communication channel. Some such channels may be embedded into other applications, such as web applications accessible via the computing services environment 100 or native applications accessed via a client machine.

According to various embodiments, as shown in the other computing services environment components 142, the computing services environment 100 may include various elements and components other than those shown in FIG. 1. Examples of such elements are discussed throughout the application, for instance with respect to FIG. 3 through FIG. 8.

FIG. 2 illustrates a method 200 providing an overview of the lifecycle of an autonomous agent, performed in accordance with one or more embodiments. According to various embodiments, the method 200 may be performed at a computing services environment such as the computing services environment 100 shown in FIG. 1.

At 202, an autonomous agent is defined by specifying a set of metadata entries in a metadata framework within the computing services environment. The metadata entries may be stored in a database system within the computing services environment. The metadata entries may include a set of action definitions defining actions capable of being taken by the autonomous agent within the computing services environment. The metadata entries may also include a triggering condition for triggering the autonomous agent.

In some embodiments, the agent and/or one or more of the actions may be defined by the service provider of the computing services environment. Alternatively, or additionally, the agent and/or one or more of the actions may be customized by a client accessing computing services via the computing services environment. In such a configuration, the customized autonomous agent may be specific to the client and may be unavailable to other clients accessing computing services within the computing services environment.

In some embodiments, an autonomous agent may be configured for operation within a portion of the computing services environment. For instance, the autonomous agent may be configured to operate within one or more on-demand computing applications, computing clouds, chat interfaces, operational contexts, data sets, data object types, or the like.

In some embodiments, the triggering condition may include an explicit request by a user to instantiate the autonomous agent. For instance, the autonomous agent may be instantiated based on one or more natural language user instructions received via a communication channel. Alternatively, or additionally, the triggering condition may specify one or more conditions under which the autonomous agent is autonomously instantiated. For example, the autonomous agent may be instantiated automatically when a database record is created or updated with a database field value that meets one or more defined characteristics. As another example, the autonomous agent may be instantiated automatically by a workflow within the computing services environment 100. As yet another example, the autonomous agent may be instantiated upon request as part of the execution of a different autonomous agent.

The autonomous agent is autonomously instantiated at 204 upon the detection of the triggering condition within the computing services environment. The triggering condition and hence the instantiation of the autonomous agent may be associated with a context for operating the autonomous agent. The context may specify one or more elements of an initial state of the autonomous agent. For instance, the context may identify information such as a client organization, a user account, natural language input received via a communication channel.

An execution plan is determined at 206 by selecting a subset of the actions based on the context. The execution plan may be determined by formulating a prompt for completion by a generative language model. The prompt may include information such as a set of action descriptions and action identifiers, as well as information associated with the context such as natural language user input. The prompt may include instructions to generate text including identifiers for actions that are selected by the generative language model based on the context, the instructions, and the action descriptions.

In some embodiments, determining the execution plan may involve multiple operations, executed in sequence or in parallel. For example, a particular planner and/or agent of a set of available planners and/or agents may first be selected. As another example, a topic or topics may be selected from a set of available topics, and the actions available for selection may be first filtered to the topic or topics. Such an approach may reduce the number of action descriptions that need to be included in the plan determination prompt that is completed by the generative language model to determine the plan.

The subset of actions are executed within the computing services environment 100 at 208. Executing the actions may involve performing any of a variety of operations. In particular, one or more data records stored within the database system within the computing services environment may be updated. Other examples of the types of operations that may be performed may include, but are not limited to: retrieving data from inside and/or outside the computing services environment, determining novel text, updating computing services environment logging data, executing one or more artificial intelligence and/or machine learning models inside and/or outside the computing services environment, transmitting messages to communicate with client machines and/or other devices, and the like. As discussed herein, an action may potentially include any operation or operations capable of being performed within the computing services environment.

The method 200 provides a general overview of the operations that may be performed in the lifecycle of an autonomous agent. Additional details regarding these operations, such as the creation of an autonomous agent, the instantiation of an autonomous agent, the determination of an execution plan, and the execution of the actions within an execution plan, are discussed throughout the application.

Figure 3:
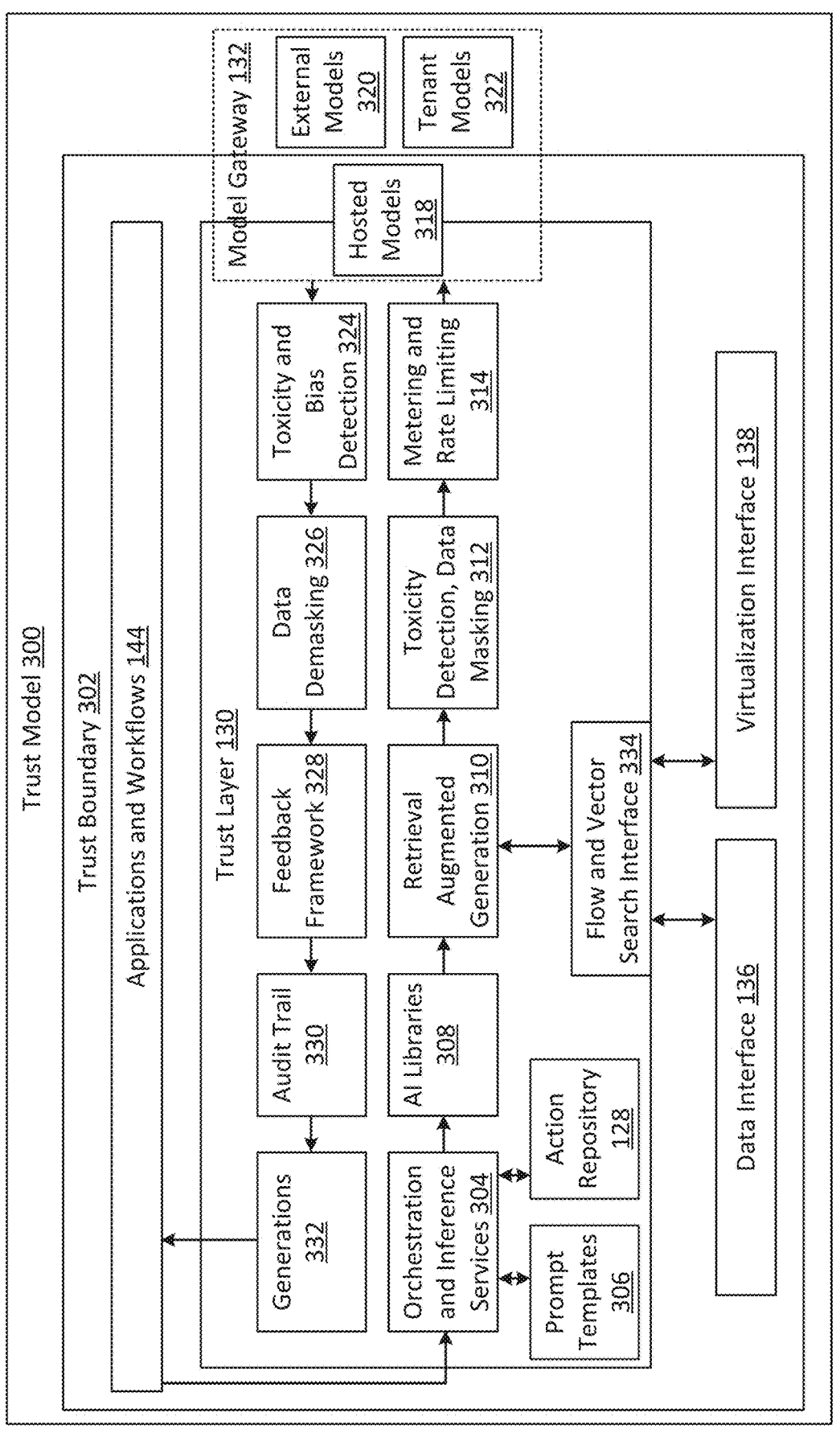
FIG. 3 illustrates a trust model for the autonomous agent platform, configured in accordance with one or more embodiments.

FIG. 3 illustrates a trust model 300 for the autonomous agent platform, configured in accordance with one or more embodiments. The trust model 300 includes a trust boundary 302. Inside the trust boundary 302 are the applications and workflows 144, the trust layer 130, the data interface 136, and the virtualization interface 138.

In some embodiments, the trust boundary 302 may separate internal from external services. Inside the trust boundary, at 206, a trust layer may provide for the execution of various trust related operations. Outside the trust boundary, one or more external services or models may operate in an untrusted zone or a zone of shared trust.

The trust layer 130 includes one or more orchestration and inference services 304, one or more artificial intelligence libraries 308, one or more retrieval augmented generation services 310, one or more inbound toxicity detection and/or data masking services 312, one or more metering and rate limiting services 314, one or more outbound toxicity and bias detection services 324, one or more data demasking services 326, a feedback framework 328, an audit trail service 330, generations 332, prompt templates 306, and a one or more flow and/or vector search services 334.

For the purpose of illustration, the trust model 300 is shown with arrows illustrating a simple flow that may employ various components. In practice, however, the trust layer 130 may be used to perform various types of complex operations that may operate outside the linear flow illustrated in the trust model 300. However, the simple flow shown in FIG. 3 may be used to understand the operation and interaction of the various elements included in the trust layer 130.

For the purpose of illustration, consider a request generated by one or more applications and workflows 144. For instance, the request may be natural language text input provided by a user, an operation instruction triggered by an action performed in the context of an application, or some other type of request. Such a request may be sent to the orchestration and inference services 304.

According to various embodiments, the orchestration and inference services 304 may analyze the request to determine an intent, execute one or more actions, generate novel text, interact with the database system, receive and/or transmit one or more messages, and/or perform other types of operations. In service of performing these operations, the orchestration and inference services 304 may access one or more prompt templates 306, one or more actions stored in the action repository 128, and/or other preconfigured definitions or templates.

According to various embodiments, the orchestration and inference services 304 may transmit information to one or more artificial intelligence libraries 308, which may trigger the retrieval of information via the one or more retrieval augmented generation services 310. The one or more retrieval augmented generation services 310 may retrieve information from inside and/or outside of the computing services environment via the data interface 136 and/or the virtualization interface 138 through the flow and/or vector search interface 334. Retrieved information may be added to a prompt template or used to perform an action.

In some embodiments, prompts and other requests to artificial intelligence models may be processed via one or more toxicity detection and/or data masking services 312. Toxicity detection services, bias detection services, and/or other such evaluators may seek to determine whether a request is likely to generate text or other output deemed biased, offensive, or otherwise unacceptable or impermissible. Data masking may replace some information, such as personally identifying information, with blanks, unique identifiers, or other such values.

In some implementations, requests may be further processed via one or more metering and/or rate limiting services 314. Metering and/or rate limiting services 314 may help to ensure that requests to models do not exceed a designated rate. For instance, one or more requests may be queued to ensure that a request rate for a designated model, user, organization, or other context does not exceed a designated threshold.

In some implementations, requests to models may be sent via the model gateway 132. According to various embodiments, the model gateway 132 may be used to access one or more hosted models 318 hosted by the computing services environment 100, one or more tenant models 322 hosted by a customer organization, and/or one or more external models 320 hosted by a third-party service provider. Depending on the configuration, different models may reside inside of the trust layer, outside of the trust layer, and/or in an intermediate zone such as a shared trust environment.

In some embodiments, responses from models, such as prompt completions generated by a generative language model, may be evaluated for toxicity and bias by one or more toxicity and/or bias detection services at 324. Such evaluation may help to ensure that the system does not perform operations or return text that includes impermissible, objectionable, offensive content.

According to various embodiments, data demasking may be performed at 326. For instance, personally identifying information in an input prompt to a generative language model may be replaced with randomly generated unique identifiers by one or more data masking services 312. Then, when the generative language model returns a prompt completion that includes one or more of the randomly generated unique identifiers, the identifiers may be replaced with the personally identifying information. In this way, the system may generate text and/or take other actions that include or reflect personally identifying information, while at the same time not exposing such information to services outside the trust model such as externally hosted generative language models.

In some embodiments, feedback regarding actions, text generated by large language models, and/or other such operations may be determined and stored via the feedback framework 328. Such information may be used to train models, guide subsequent actions, and/or otherwise refine the operations of an autonomous agent.

In some implementations, the audit trail service 330 may aggregate and store information used to provide a record of actions taken by the system in the course of executing operations associated with an autonomous agent. Such information may be stored in a database system accessible via the computing services environment 100.

In some embodiments, text and other output generated as part of the processing of requests from the requests and workflows 108 may be returned to the applications and workflows 108 as generations at 332. Generations 332 may include, but are not limited to: text to be presented in a chat interface, instructions regarding actions to be performed in the context of providing an application or workflow, or other such information.

In some implementations, generations may be extracted from novel text generated by a generative language model. For instance, a generative language model may be provided with a prompt that includes information such as: (1) one or more natural language instructions to be executed by the generative language model, (2) input data to be used by the generative language model as needed in the course of executing the one or more natural language instructions, (3) one or more parameters governing the execution of the one or more natural language instructions, (4) any other information. The input data may include text data, structured data, unstructured data, or any other type of data. The generative language model may then execute the one or more natural language instructions to generate novel text.

In some embodiments, the novel text may include natural language, such as natural language to include in a message to a user, a field in a database record, a computing services environment log, or the like. Alternatively, or additionally, the novel text may include data, such as numerical data to use in updating a database record, data indicating a selection of one or more computing resources and elements within the computing services environment. For example, computing resources and elements such as topics, actions, computing devices, clients, users, and more may be associated with corresponding unique identifiers. The generative language model may generate novel text that includes such unique identifiers. The unique identifiers may then be extracted from the novel text by the computing services environment and used to trigger and/or inform the performance of operations within the computing services environment.

Figure 4:
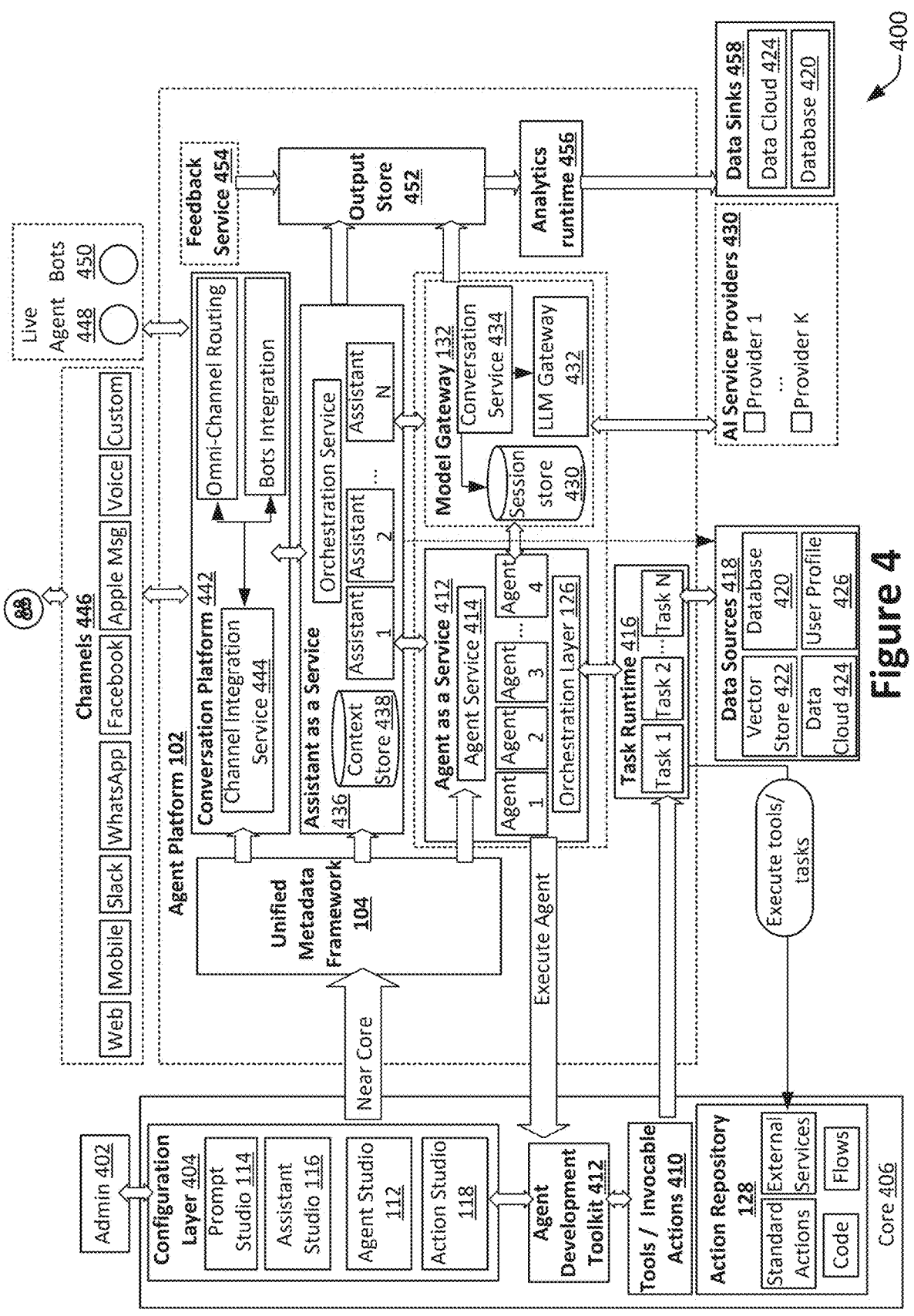
FIG. 4 illustrates an architecture diagram of elements of the computing services environment, configured in accordance with one or more embodiments.

FIG. 4 illustrates an architecture diagram 400 of elements of the computing services environment 100, configured in accordance with one or more embodiments. The architecture diagram 400 is provided to illustrate additional details related to the operation of the computing services environment 100 with respect to the agent platform 102.

In the architecture diagram 400, an administrator 402 or other user interacts with an agent configuration layer 404 within the core 406 of the computing services environment. The configuration layer includes various elements, discussed in FIG. 1, for configuring agents. Collectively these tools provide access to an agent development toolkit 412 for defining and configuring tools and invocable actions 410 within the computing services environment. An agent may be composed of metadata references to such tools and invocable actions 410, as well as other metadata entries.

According to various embodiments, metadata entries may be specified within the unified metadata framework 104 within the agent platform 102. The metadata entries may be used to specify actions and operations associated with elements within the agent platform 102 used to provide the agents.

In some implementations, as a central element, the agent as a service platform 412 provides for the instantiation and execution of agents via the agent service 414. The orchestration layer 126 may be used to perform operations such as selecting agents, selecting planners, and determining plans. When an agent performs an action, the action may be implemented as a task executed by the task runtime 416.

In some embodiments, executing a task may involve retrieving data from one or more of the data sources 418. The data sources 418 may include a variety of data sources inside and/or outside of the computing services environment 100, including the database system 420, a vector store 422, a data cloud 424 providing access to, for instance, unstructured data, and user profiles 426.

In some embodiments, as another central element, the agent as a service platform 412 may coordinate with the model gateway 128 to communicate with generative language models and/or other artificial intelligence and/or machine learning models. The conversation service 434 may coordinate the generation of natural language text via the LLM gateway 432. The service platform 412 may communicate with AI service providers 430, which may be located inside or outside of the computing services environment 100.

According to various embodiments, as a particular kind of agent, conversational chat assistants may be accessed via the assistant as a service platform 436. Information pertaining to instances of conversational chat assistants may be stored in the context store 438. For instance, records of conversations as well as other supporting metadata may be used to save the state of a conversational chat assistant and then restore the state at a later point in time. A conversational chat assistant orchestration service 440 may coordinate operations of conversational chat assistants, including communication via the conversation platform 442. The conversation platform 442 may coordinate communication via various communication channels 446 via a channel integration service 444. Any of a variety of communication channels may be supported, including custom channels defined by customer organizations of the computing services environment 100. The conversation platform 442 may also support agent interactions with human agents 448 and/or computing programs 450 located outside of the agent platform 102.

According to various embodiments, information determined by the agents may be stored to an output store 452. Feedback regarding agent performance may be provided via a feedback service 454, and information analyzed via an analytics runtime 456 may be stored to one or more data sinks 458, such as the database system 420 and/or the data cloud 424.

Figure 5:
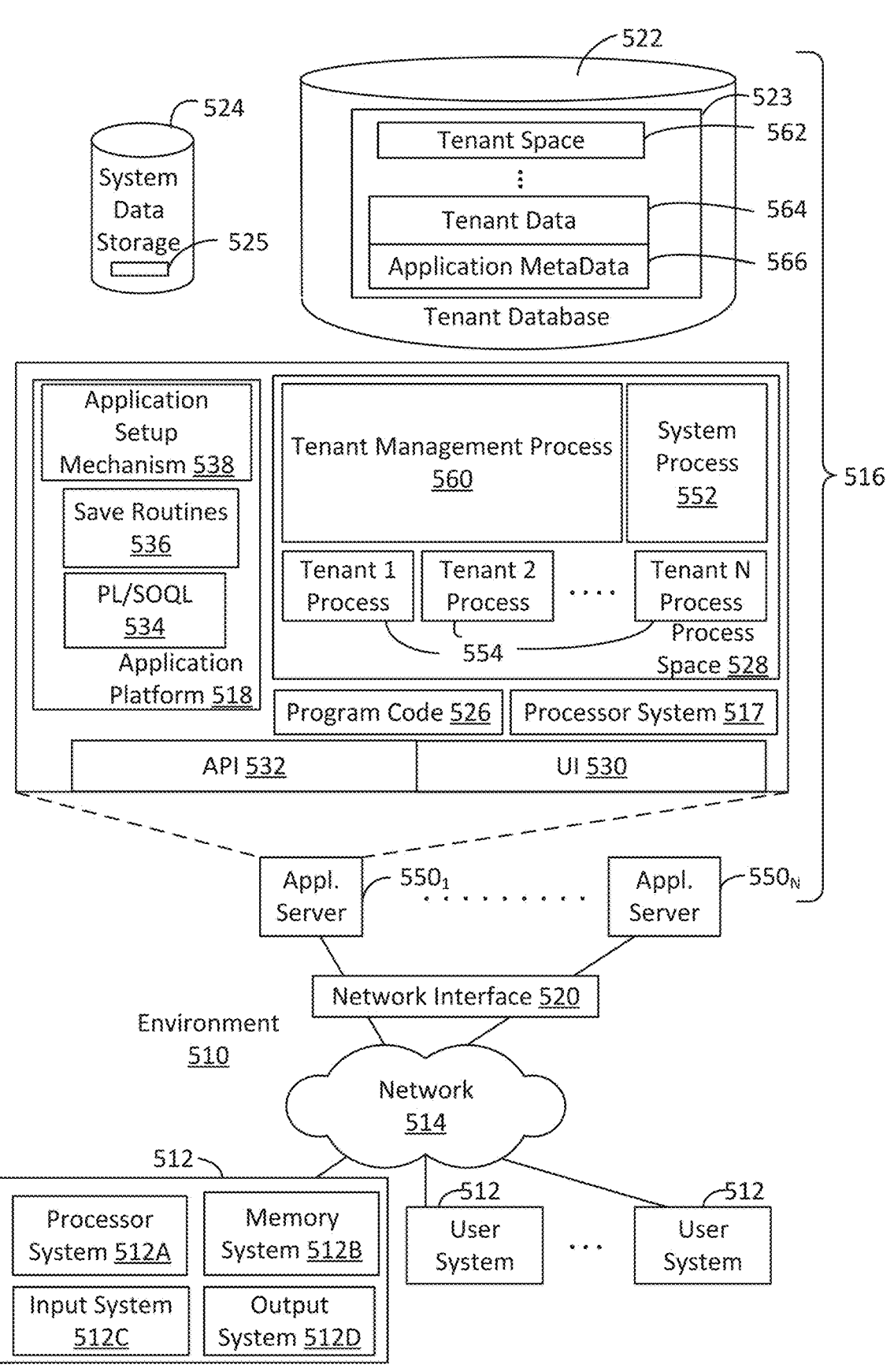
FIG. 5 shows a block diagram of an example of an environment that includes an on-demand database service configured in accordance with some implementations.

FIG. 5 shows a block diagram of an example of an environment 510 that includes an on-demand database service configured in accordance with some implementations. Environment 510 may include user systems 512, network 514, database system 516, processor system 517, application platform 518, network interface 520, tenant data storage 522, tenant data 523, system data storage 524, system data 525, program code 526, process space 528, User Interface (UI) 530, Application Program Interface (API) 532, PL/SOQL 534, save routines 536, application setup mechanism 538, application servers 550-1 through 550-N, system process space 552, tenant process spaces 554, tenant management process space 560, tenant storage space 562, user storage 564, and application metadata 566. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

According to various embodiments, the environment 510 may provide access to an agent platform. As shown in FIG. 5, the environment 510 may also include other elements beyond the agent platform, such as computing components used to provide other types of computing services. Agents accessible via the agent platform may interoperate with such computing services. For instance, agents may trigger, configure, be triggered by, and/or accessed via such computing services.

An on-demand database service, implemented using system 516, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 518 may be a framework that allows the creation, management, and execution of applications in system 516. Such applications may be developed by the database service provider or by users or third-party application developers accessing the service. Application platform 518 includes an application setup mechanism 538 that supports application developers' creation and management of applications, which may be saved as metadata into tenant data storage 522 by save routines 536 for execution by subscribers as one or more tenant process spaces 554 managed by tenant management process 560 for example. Invocations to such applications may be coded using PL/SOQL 534 that provides a programming language style interface extension to API 532. A detailed description of some PL/SOQL language implementations is discussed in commonly assigned U.S. Pat. No. 5,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 566 for a subscriber making such an invocation. Such system processes may also manage execution of application metadata 566 as an application in a virtual machine.

In some implementations, each application server 550 may handle requests for any user associated with any organization. A load balancing function (e.g., an F5 Big-IP load balancer) may distribute requests to the application servers 550 based on an algorithm such as least-connections, round robin, observed response time, etc. Each application server 550 may be configured to communicate with tenant data storage 522 and the tenant data 523 therein, and system data storage 524 and the system data 525 therein to serve requests of user systems 512. The tenant data 523 may be divided into individual tenant storage spaces 562, which can be either a physical arrangement and/or a logical arrangement of data. Within each tenant storage space 562, user storage 564 and application metadata 566 may be similarly allocated for each user. For example, a copy of a user's most recently used (MRU) items might be stored to user storage 564. Similarly, a copy of MRU items for an entire tenant organization may be stored to tenant storage space 562. A UI 530 provides a user interface and an API 532 provides an application programming interface to system 516 resident processes to users and/or developers at user systems 512.

System 516 may implement a web-based generative language model system. For example, in some implementations, system 516 may include application servers configured to implement and execute generative language model software applications. The application servers may be configured to provide related data, code, forms, web pages and other information to and from user systems 512. Additionally, the application servers may be configured to store information to, and retrieve information from a database system. Such information may include related data, objects, and/or Webpage content. With a multi-tenant system, data for multiple tenants may be stored in the same physical database object in tenant data storage 522, however, tenant data may be arranged in the storage medium(s) of tenant data storage 522 so that data of one tenant is kept logically separate from that of other tenants. In such a scheme, one tenant may not access another tenant's data, unless such data is expressly shared.

Several elements in the system shown in FIG. 5 include conventional, well-known elements that are explained only briefly here. For example, user system 512 may include processor system 512A, memory system 512B, input system 512C, and output system 512D. A user system 512 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 512 to access, process and view information, pages and applications available from system 516 over network 514. Network 514 may be any network or combination of networks of devices that communicate with one another, such as any one or any combination of a LAN (local area network), WAN (wide area network), wireless network, or other appropriate configuration.

The users of user systems 512 may differ in their respective capacities, and the capacity of a particular user system 512 to access information may be determined at least in part by "permissions" of the particular user system 512. As discussed herein, permissions generally govern access to computing resources such as data objects, components, and other entities of a computing system, such as a generative language model platform, a social networking system, and/or a CRM database system. "Permission sets" generally refer to groups of permissions that may be assigned to users of such a computing environment. For instance, the assignments of users and permission sets may be stored in one or more databases of System 516. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 516 may provide on-demand database service to user systems 512 using an MTS arrangement. By way of example, one tenant organization may be a company that employs a sales force where each salesperson uses system 516 to manage their sales process. Thus, a user in such an organization may maintain contact data, leads data, customer follow-up data, performance data, goals and progress data, etc., all applicable to that user's personal sales process (e.g., in tenant data storage 522). In this arrangement, a user may manage his or her sales efforts and cycles from a variety of devices, since relevant data and applications to interact with (e.g., access, view, modify, report, transmit, calculate, etc.) such data may be maintained and accessed by any user system 512 having network access.

When implemented in an MTS arrangement, system 516 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 516 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 516 may also maintain system-level data usable by multiple tenants or other data. Such system-level data may include industry reports, news, postings, and the like that are sharable between tenant organizations.

In some implementations, user systems 512 may be client systems communicating with application servers 550 to request and update system-level and tenant-level data from system 516. By way of example, user systems 512 may send one or more queries requesting data of a database maintained in tenant data storage 522 and/or system data storage 524. An application server 550 of system 516 may automatically generate one or more SQL statements (e.g., one or more SQL queries) that are designed to access the requested data. System data storage 524 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 5,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figures 6A, 6B:
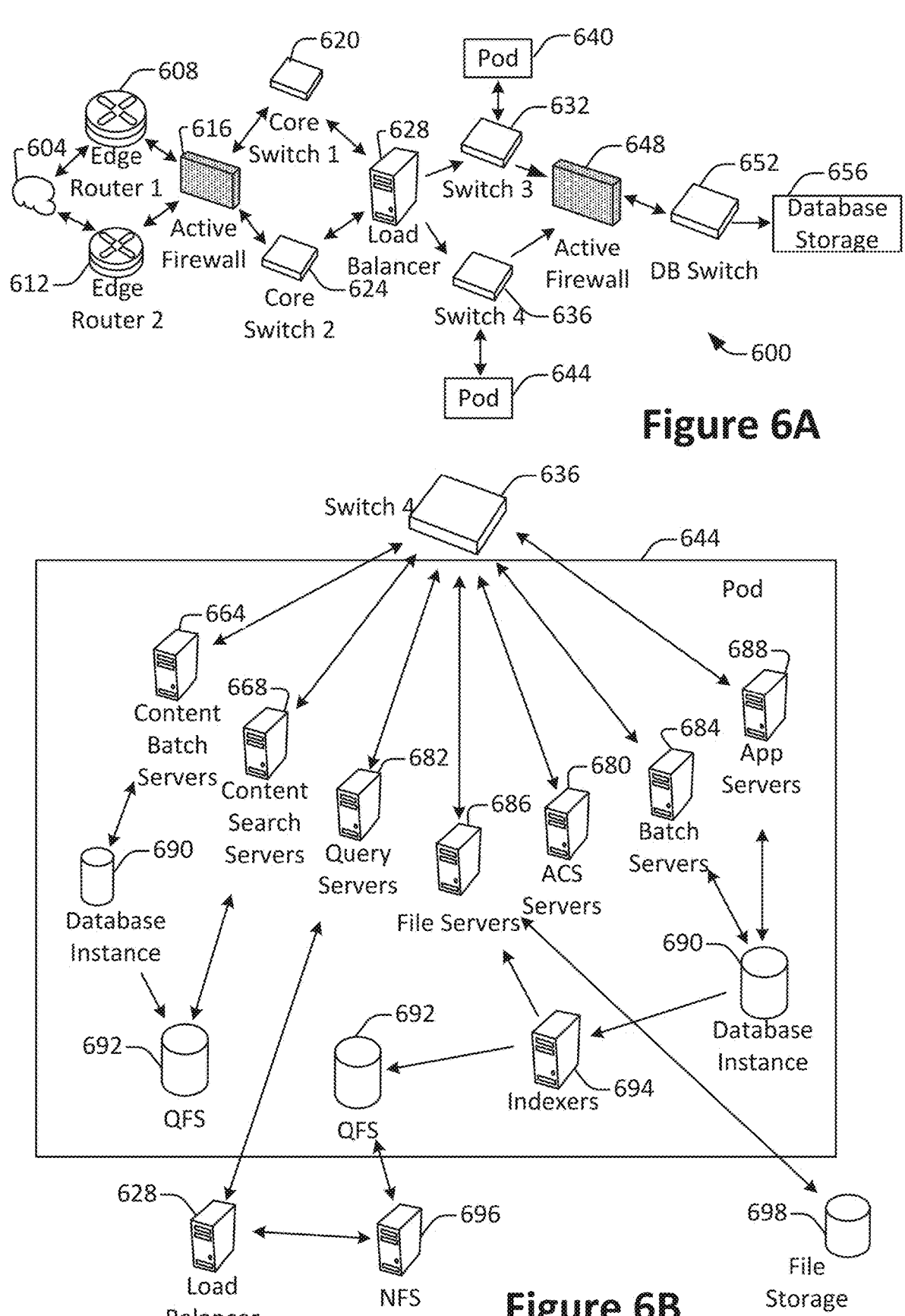
FIG. 6A shows a system diagram of an example of architectural components of an on-demand database service environment, configured in accordance with some implementations.
FIG. 6B shows a system diagram further illustrating an example of architectural components of an on-demand database service environment, in accordance with some implementations.

FIG. 6A shows a system diagram of an example of architectural components of an on-demand database service environment 600, configured in accordance with some implementations. A client machine located in the cloud 604 may communicate with the on-demand database service environment via one or more edge routers 608 and 612. A client machine may include any of the examples of user systems 512 described above. The edge routers 608 and 612 may communicate with one or more core switches 620 and 624 via firewall 616. The core switches may communicate with a load balancer 628, which may distribute server load over different pods, such as the pods 640 and 644 by communication via pod switches 632 and 636. The pods 640 and 644, which may each include one or more servers and/or other computing resources, may perform data processing and other operations used to provide on-demand services. Components of the environment may communicate with a database storage 656 via a database firewall 648 and a database switch 652.

Accessing an on-demand database service environment may involve communications transmitted among a variety of different components. The environment 600 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 6A and 6B.

The cloud 604 refers to any suitable data network or combination of data networks, which may include the Internet. Client machines located in the cloud 604 may communicate with the on-demand database service environment 600 to access services provided by the on-demand database service environment 600. By way of example, client machines may access the on-demand database service environment 600 to retrieve, store, edit, and/or process generative language model information.

In some implementations, the edge routers 608 and 612 route packets between the cloud 604 and other components of the on-demand database service environment 600. The edge routers 608 and 612 may employ the Border Gateway Protocol (BGP). The edge routers 608 and 612 may maintain a table of IP networks or 'prefixes', which designate network reachability among autonomous systems on the internet.

In one or more implementations, the firewall 616 may protect the inner components of the environment 600 from internet traffic. The firewall 616 may block, permit, or deny access to the inner components of the on-demand database service environment 600 based upon a set of rules and/or other criteria. The firewall 616 may act as one or more of a packet filter, an application gateway, a stateful filter, a proxy server, or any other type of firewall.

In some implementations, the core switches 620 and 624 may be high-capacity switches that transfer packets within the environment 600. The core switches 620 and 624 may be configured as network bridges that quickly route data between different components within the on-demand database service environment. The use of two or more core switches 620 and 624 may provide redundancy and/or reduced latency.

In some implementations, communication between the pods 640 and 644 may be conducted via the pod switches 632 and 636. The pod switches 632 and 636 may facilitate communication between the pods 640 and 644 and client machines, for example via core switches 620 and 624. Also or alternatively, the pod switches 632 and 636 may facilitate communication between the pods 640 and 644 and the database storage 656. The load balancer 628 may distribute workload between the pods, which may assist in improving the use of resources, increasing throughput, reducing response times, and/or reducing overhead. The load balancer 628 may include multilayer switches to analyze and forward traffic.

In some implementations, access to the database storage 656 may be guarded by a database firewall 648, which may act as a computer application firewall operating at the database application layer of a protocol stack. The database firewall 648 may protect the database storage 656 from application attacks such as structure query language (SQL) injection, database rootkits, and unauthorized information disclosure. The database firewall 648 may include a host using one or more forms of reverse proxy services to proxy traffic before passing it to a gateway router and/or may inspect the contents of database traffic and block certain content or database requests. The database firewall 648 may work on the SQL application level atop the TCP/IP stack, managing applications' connection to the database or SQL management interfaces as well as intercepting and enforcing packets traveling to or from a database network or application interface.

In some implementations, the database storage 656 may be an on-demand database system shared by many different organizations. The on-demand database service may employ a single-tenant approach, a multi-tenant approach, a virtualized approach, or any other type of database approach. Communication with the database storage 656 may be conducted via the database switch 652. The database storage 656 may include various software components for handling database queries. Accordingly, the database switch 652 may direct database queries transmitted by other components of the environment (e.g., the pods 640 and 644) to the correct components within the database storage 656.

FIG. 6B shows a system diagram further illustrating an example of architectural components of an on-demand database service environment, in accordance with some implementations. The pod 644 may be used to render services to user(s) of the on-demand database service environment 600. The pod 644 may include one or more content batch servers 664, content search servers 668, query servers 682, file servers 686, access control system (ACS) servers 680, batch servers 684, and app servers 688. Also, the pod 644 may include database instances 690, quick file systems (QFS) 692, and indexers 694. Some or all communication between the servers in the pod 644 may be transmitted via the switch 636.

In some implementations, the app servers 688 may include a framework dedicated to the execution of procedures (e.g., programs, routines, scripts) for supporting the construction of applications provided by the on-demand database service environment 600 via the pod 644. One or more instances of the app server 688 may be configured to execute all or a portion of the operations of the services described herein.

In some implementations, as discussed above, the pod 644 may include one or more database instances 690. A database instance 690 may be configured as an MTS in which different organizations share access to the same database, using the techniques described above. Database information may be transmitted to the indexer 694, which may provide an index of information available in the database 690 to file servers 686. The QFS 692 or other suitable filesystem may serve as a rapid-access file system for storing and accessing information available within the pod 644. The QFS 692 may support volume management capabilities, allowing many disks to be grouped together into a file system. The QFS 692 may communicate with the database instances 690, content search servers 668 and/or indexers 694 to identify, retrieve, move, and/or update data stored in the network file systems (NFS) 696 and/or other storage systems.

In some implementations, one or more query servers 682 may communicate with the NFS 696 to retrieve and/or update information stored outside of the pod 644. The NFS 696 may allow servers located in the pod 644 to access information over a network in a manner similar to how local storage is accessed. Queries from the query servers 622 may be transmitted to the NFS 696 via the load balancer 628, which may distribute resource requests over various resources available in the on-demand database service environment 600. The NFS 696 may also communicate with the QFS 692 to update the information stored on the NFS 696 and/or to provide information to the QFS 692 for use by servers located within the pod 644.

In some implementations, the content batch servers 664 may handle requests internal to the pod 644. These requests may be long-running and/or not tied to a particular customer, such as requests related to log mining, cleanup work, and maintenance tasks. The content search servers 668 may provide query and indexer functions such as functions allowing users to search through content stored in the on-demand database service environment 600. The file servers 686 may manage requests for information stored in the file storage 698, which may store information such as documents, images, basic large objects (BLOBs), etc. The query servers 682 may be used to retrieve information from one or more file systems. For example, the query system 682 may receive requests for information from the app servers 688 and then transmit information queries to the NFS 696 located outside the pod 644. The ACS servers 680 may control access to data, hardware resources, or software resources called upon to render services provided by the pod 644. The batch servers 684 may process batch jobs, which are used to run tasks at specified times. Thus, the batch servers 684 may transmit instructions to other servers, such as the app servers 688, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 7:
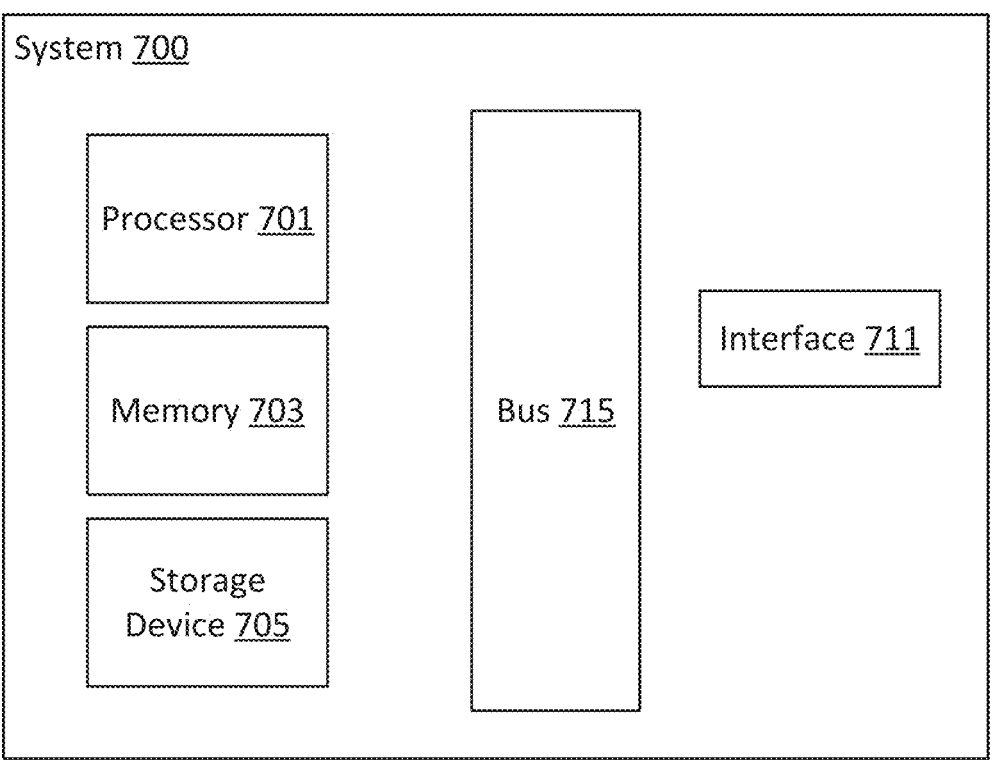
FIG. 7 illustrates one example of a computing device, configured in accordance with one or more embodiments.

FIG. 7 illustrates one example of a computing device. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

FIG. 8 illustrates a method 800 providing an overview of agent provisioning, performed in accordance with one or more embodiments. The method 800, which includes operations other than those related to agent provisioning, illustrates how provisioning an autonomous agent as an account within the user accounts system of the computing services environment 100 can facilitate the interoperation of agents and other elements of the computing services environment 100.

An autonomous agent is defined at 802 based on a set of metadata entries including a set of action definitions capable of being taken by the autonomous agent within the computing services environment. The definition of the autonomous agent in such a fashion may be performed as discussed with respect to operation 202 shown in FIG. 2, and as discussed in additional detail throughout the application, for instance in relation to FIG. 12 through FIG. 21.

The autonomous agent is associated with an agent account at 804. In some embodiments, the agent account may be a user account within the computing services environment 100. The agent account may be assigned to a user account permission set defining permissible actions for the autonomous agent.

An autonomous agent instance is instantiated within the computing services environment at 806. The autonomous agent instance is instantiated as a computing service associated with the agent account. In this way, agents taken by the autonomous agent may be defined, confined, coordinated, recorded, and/or logged based on the agent account. For example, the autonomous agent may be restricted from taking operations that are not specified as permitted based on the permissions assigned to the agent. Further, actions taken by the agent may be recorded and monitored, for instance in logging data.

An execution plan for the agent is determined at 808 by selecting a subset of the actions via a generative language model based on an operational context for the autonomous agent and the set of metadata entries for the actions. The actions are selected so as to comply with the permission set. The selection of actions may be performed as discussed with respect to the operation 206 shown in FIG. 2.

The subset of the actions is executed within the computing services environment at 810. The execution of the actions may include updating data stored in the database system. The execution of the actions may be performed as discussed with respect to the operation 208 shown in FIG. 2.

Logging data associating the execution of the subset of the actions with the agent account is stored at 812. In some embodiments, the logging data may indicate not only that an action was performed by the agent account, but may also identify contextual information used to determine and perform the action and/or output information produced by the action. In this way, the system may maintain a record of the actions of the autonomous agent, including potentially information that may be used to reproduce the autonomous agent's actions and/or refine the autonomous agent for future operation. Additional details regarding the provisioning of an autonomous agent are discussed with respect to FIG. 9, FIG. 10, and FIG. 11.

Figure 9:
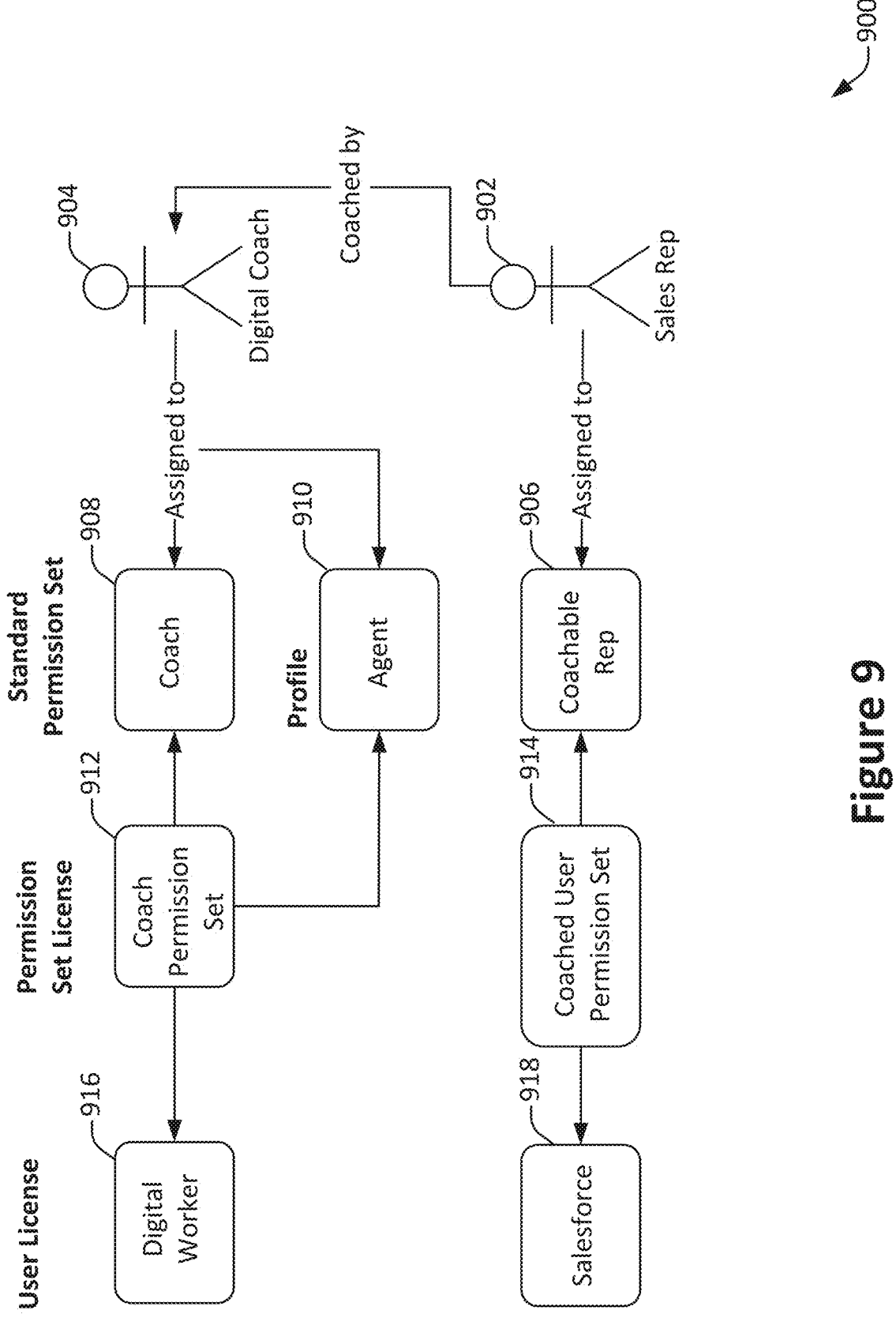
FIG. 9 illustrates an example of an agent configuration, provided in accordance with one or more embodiments.

FIG. 9 illustrates an example of an agent configuration 900, provided in accordance with one or more embodiments. The agent configuration 900 illustrates, at a high level, elements of relationships between agents, users, permission sets, and accounts. As discussed herein, for instance with respect to FIG. 5 through FIG. 6, user accounts in a computing services environment may be configured to support actions by a user within the computing services environment. For instance, a user may authenticate a client machine to a user account by providing information such as a username and password. Then, once authenticated, the client machine may be used to take actions and access data within the computing services environment according to the permissions afforded to the user account. User accounts are also referred to herein as database accounts or computing services environment accounts.

In some embodiments, a client organization may be associated with various user accounts. For example, a client organization may create user accounts for individuals such as employees, customers, third parties, and the like. Different accounts may be associated with different permission sets. For instance, some employees may be designated as administrators with relatively higher levels of permissions, while other employees may be designated as customer support representatives, with relatively lower levels of permissions.

In some embodiments, an agent may be associated with an independent user account. Such an account may be referred to herein as an agent account because the agent account is specific to an agent rather than to a human user. That is, in many contexts, the agent is treated as a user from the perspective of the computing services environment. For example, the agent account may be assigned permissions, may take actions in accordance with those permissions, may be associated with actions reflected in logging data, and may interact with the computing services environment in a variety of other ways.

In some embodiments, an agent type may be associated with a user account, instead of or in addition to the association between an individual agent and a user account. Depending on the configuration, the association between an agent and a user account may be a one-to-one or many-to-one relationship. Alternatively, or additionally, the association between agent and user account may be a one-to-one relationship.

As an example, FIG. 9 includes a sales representative user account 902 and a digital coach agent account 904. The sales representative user account 902 corresponds to a human user, while the digital coach agent account 904 corresponds to an autonomous agent.

In some embodiments, user accounts may be used to establish relationships between humans, relationships between humans and agents, and/or relationships between agents. For example, the user account 902 is coached by the autonomous agent corresponding to the digital coach autonomous agent account 904.

According to various embodiments, user accounts may be used to associate users and agents with permission sets. In this way, access control can be defined for an autonomous agent. For instance, a client organization can define classes of data accessible and/or inaccessible to the agent. Client organizations can also assign permissions that specify actions that may or may not be performed by agents. Further, audit and report capabilities for users may also apply to autonomous agents, for instance facilitating the identification of data that the agent creates or updates.

As an example, the sales representative user account 902 is assigned to a standard coachable rep permission set 906. The coachable rep permission set 906 may provide the individual associated with the sales representative user account 902 with permission to take various actions, specified by the coachable rep permission set 906, within the computing services environment 100.

As another example, the digital coach agent account 904 is assigned to a standard coach permission set 908 and a standard agent permission set 910. The digital coach agent account 904 may then take actions within the computing services environment when those actions are permitted by either the standard coach permission set 908 or the standard agent permission set 910.

In some embodiments, access to different permission sets and/or configuration of user accounts may be provided by licenses. For example, the coach permission set license 912 provides access to both the standard coach permission set 908 and the standard agent permission set 910. The coach permission set license 912 also provides a digital worker 916 license that permits the creation of the digital coach agent account 904. As another example, the coached user license 914 provides access to both the coachable rep permission set 906 and a standard computing services environment user license 918 that permits the configuration of the sales representative user account 902.

According to various embodiments, the various user accounts, relationships, permission sets, and licenses shown in FIG. 9 may be represented in a database system accessible via the computing services environment. For instance, the computing services environment may include a relational database that stores such information as relation database records within one or more tables.

Figure 10:
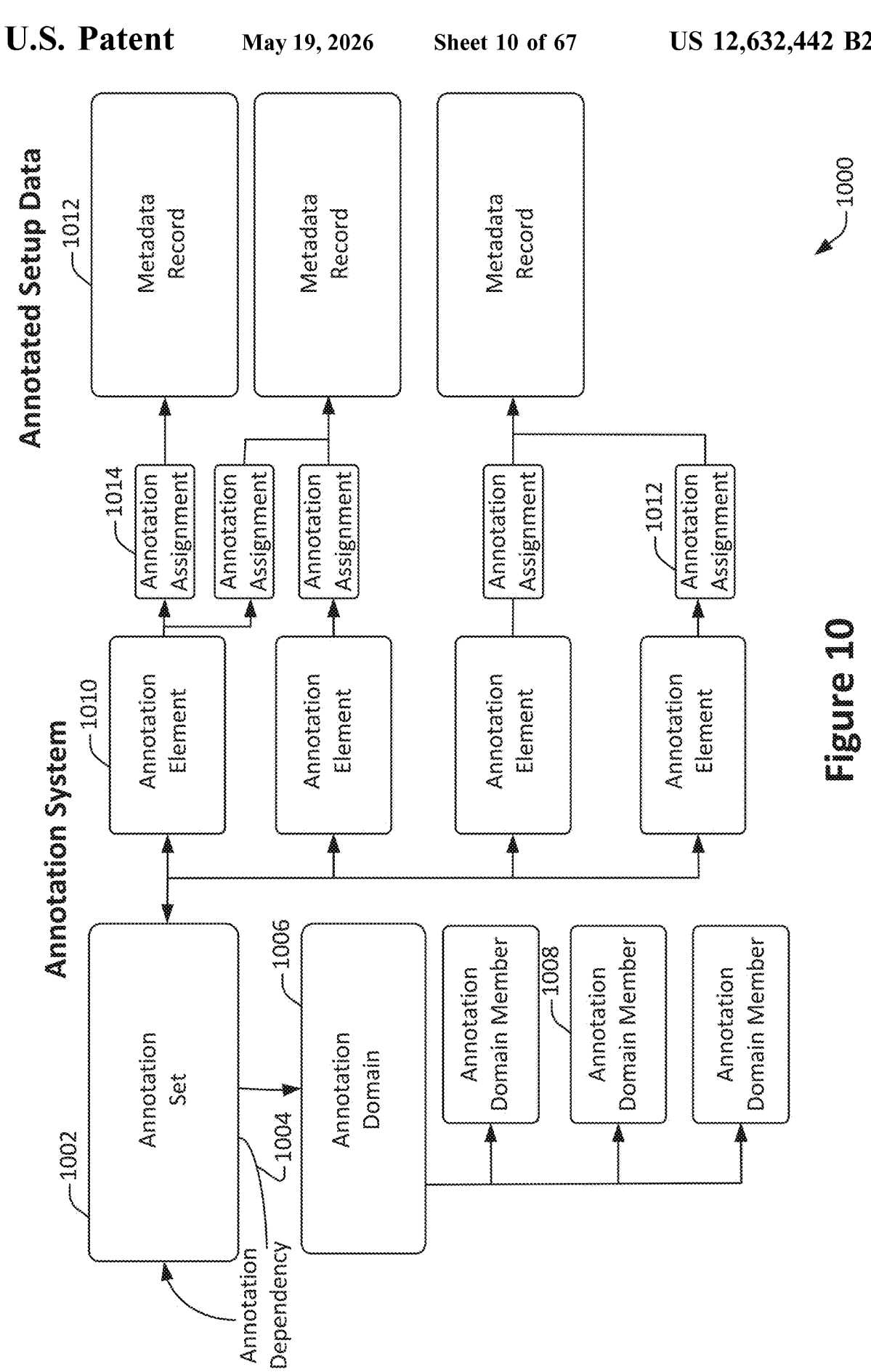
FIG. 10 illustrates an annotation system providing for metadata definitions and their linkages to annotation sets, generated in accordance with one or more embodiments.

FIG. 10 illustrates an annotation system 1000 providing for metadata definitions and their linkages to annotation sets, generated in accordance with one or more embodiments. Annotation sets provide logical containers for assembling resources for defining agents. In this way, individual components used to form agents may be logically separated from the agent definitions. The individual components may then be separately tested, defined, replaced, revised, and/or reused across agents.

In FIG. 10, an annotation set 1002 may be used to define a set of resources for creating an agent type and/or agent. A single agent type and/or agent may include more than one annotation set. For instance, the annotation set 1002 may include an annotation dependency 1004 that links to a different annotation set. In this way, the use of one annotation set may be configured to require the use of another annotation set.

The annotation set 1002 may be associated with an annotation domain 1006, which may include various annotation domain members such as the annotation domain member 1008. The annotation domain members may include elements such as agent templates, prompt templates, testing configurations, and other such building blocks.

The annotation set 1002 may also include one or more annotation elements, such as the annotation element 1010. An annotation element may correspond to, for example, a particular type of agent. For instance, the annotation element 1010 may correspond to a digital coach as shown in FIG. 9.

The annotation element 1010 may be defined at least in part based on metadata records, such as the metadata record 1012. A metadata record may be assigned to an annotation element via an annotation assignment record such as the annotation assignment record 1014. Different metadata records may correspond to elements such as different topics, actions, data retrievers, and other components that may be combined to create agents.

Figure 11:
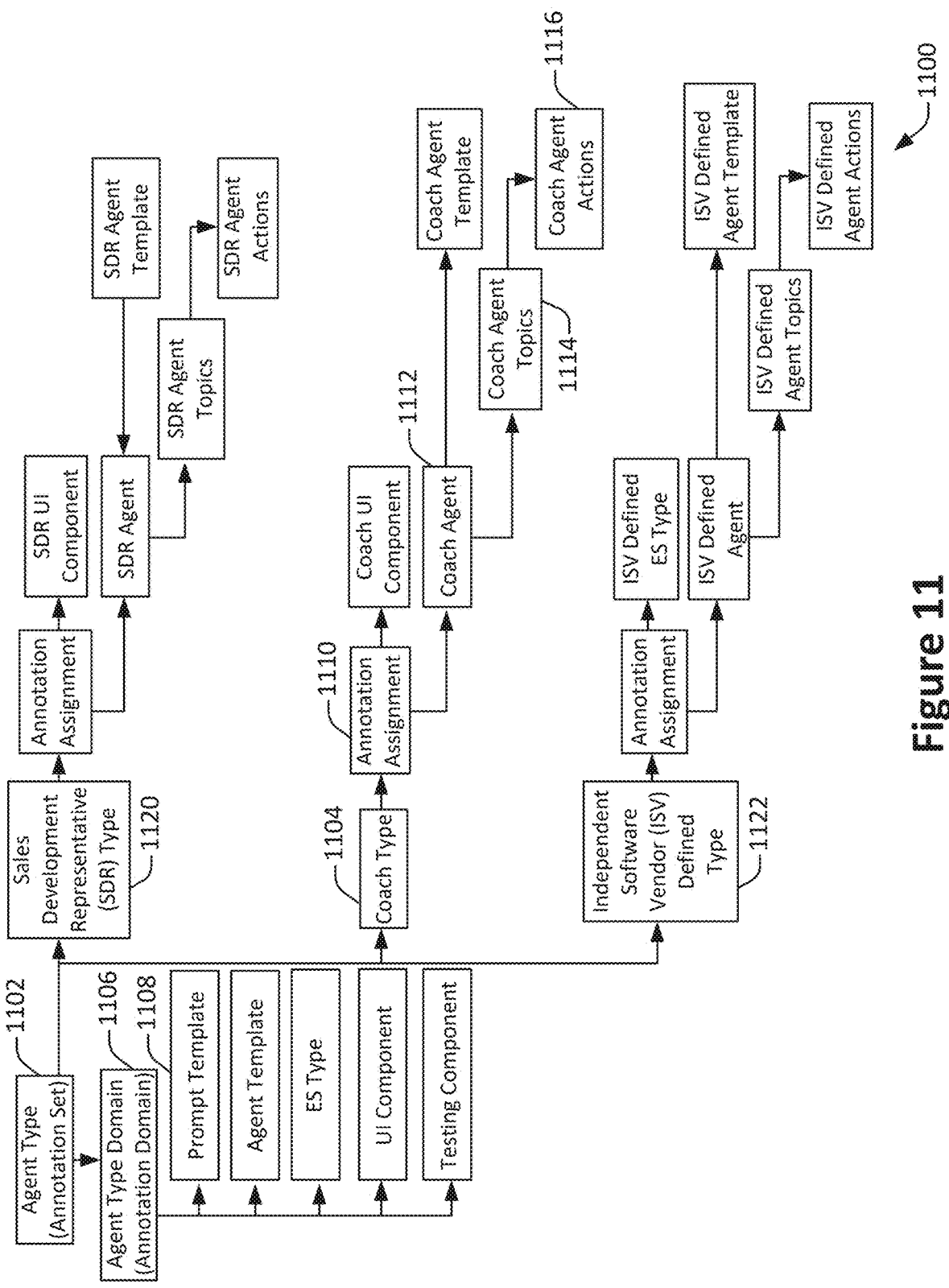
FIG. 11 illustrates an example of a particular annotation set for specifying agents and agent types, generated in accordance with one or more embodiments.

FIG. 11 illustrates an example of a particular annotation set configuration 1100 for specifying agents and agent types, generated in accordance with one or more embodiments. The annotation set 1102 corresponds to an agent account type. The agent account type annotation set 1102 may then be used to support the creation of multiple individual agent subtypes. For instance, an agent account type annotation set 1102 may provide a template or framework through which the sales development representative (SDR) agent type 1120, the coach agent type 1104, and the independent software vendor (ISV) defined agent type 1122 may be created. These different agent types may be composed of different actions specified at least in part by different annotation assignments.

At 1110, an annotation assignment links annotation elements to metadata records. For instance, an annotation assignment 1110 may be composed of one or more records in a junction table providing a many-to-many join from annotation elements to metadata records. For instance, an annotation assignment may link the coach agent 1112 with one or more coach agent topics 1114 and/or one or more coach agent actions 1116. Such topics and actions may be defined as metadata records, discussed in more detail in FIG. 12, FIG. 13, and FIG. 14.

An annotation domain may include one or more domain members. An annotation domain may be used to limit the creation of an annotation assignment to a valid metadata record. For instance, the agent type domain 1106 includes the prompt template domain member 1108, as well as others. The agent type annotation set 1102 may include agent types having various annotation sets, but those annotation sets may be limited to including annotation assignments corresponding to valid metadata entries corresponding to members of the agent type domain 1106, such as prompt templates, agent templates, and UI components.

Figure 12:
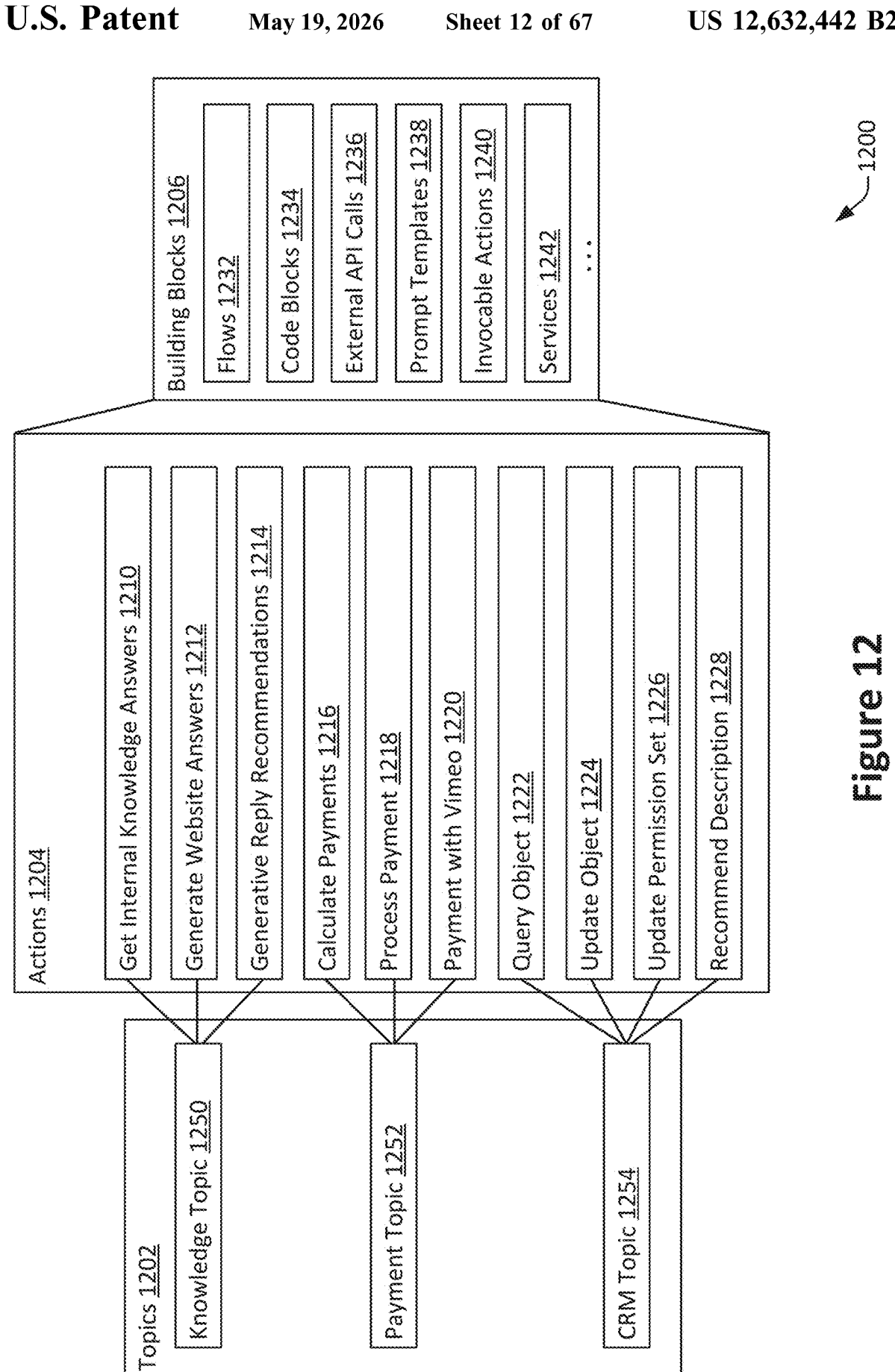
FIG. 12 shows a metadata diagram identifying relationships between elements for configuring actions, provided in accordance with one or more embodiments.

FIG. 12 shows a metadata diagram 1200 identifying relationships between elements for configuring actions, provided in accordance with one or more embodiments. The metadata diagram 1200 includes relationships between topics 1202, actions 1204, and building blocks 1206.

The building blocks 1206 include granular operations that may be performed within the computing services environment 120. Examples of building blocks 1206 include, but are not limited to, workflows 1232, code blocks 1234, external API calls 1236, prompts determined based on prompt templates 1238, other invocable actions 1240, and invocable services 1242.

Examples of actions are shown at 1204. As discussed herein, an action is a logical grouping of operations that optionally includes an input and/or output. Examples of actions include, but are not limited to, getting internal knowledge answers 1210, getting website answers 1212, generating reply recommendations 1214, calculating payments 1214, calculating payments 1216, processing payments 1218, making a payment with Vimeo 1220, querying a database object 1222, updating a database object 1224, updating a permission set 1226, and recommending a description 1228.

According to various embodiments, an action may be performed of one or more building blocks 1206. Different building blocks 1206 may be grouped together to form an action, examples of which are shown at 1204. As one example, the process payment action 1218 may include one or more inputs (e.g., the amount of payment received), one or more outputs (e.g., a summary of the payment processing operation performed), one or more flows 1232 for processing the payment, and one or more code blocks 1232 executable at different stages of the flow.

Although a few examples of actions are shown in FIG. 12, the set of configurable actions is much broader. For instance, any operation or group of operations capable of being performed within the computing services environment 100 may be configured as an action if supported by the agent framework.

A set of topics is shown at 1202. The topics 1202 include a knowledge topic 1250, a payment topic 1252, and a customer relations management topic 1254. In practice, the autonomous agent platform architecture 200 may include various numbers and types of topics, actions, and building blocks.

According to various embodiments, the topics 1202 may serve as logical groupings of actions. Such groupings may be used to identify a set of actions for which to include descriptions when communicating with a generative language model. For instance, when the user's intent as reflected in user input is to perform an operation related to payment, descriptions of actions associated with the payment topic 1252, such as the calculate payment action 1216, the process payment action 1218, and the payment with Vimeo action 1220, may be retrieved and incorporated into an input prompt sent to a generative language model. The generative language model may then complete the prompt by generating novel text that includes identifiers corresponding to one or more of the actions. The computing services environment 100 may then execute the actions corresponding to the identifiers to provide a response to the user.

For the purpose of simplicity, FIG. 12 shows each action as being included within a single topic. However, in some embodiments the same object may be included within different topics. Similarly, a building block included in the building blocks 1206 may in turn be included in more than one action.

Figure 13:
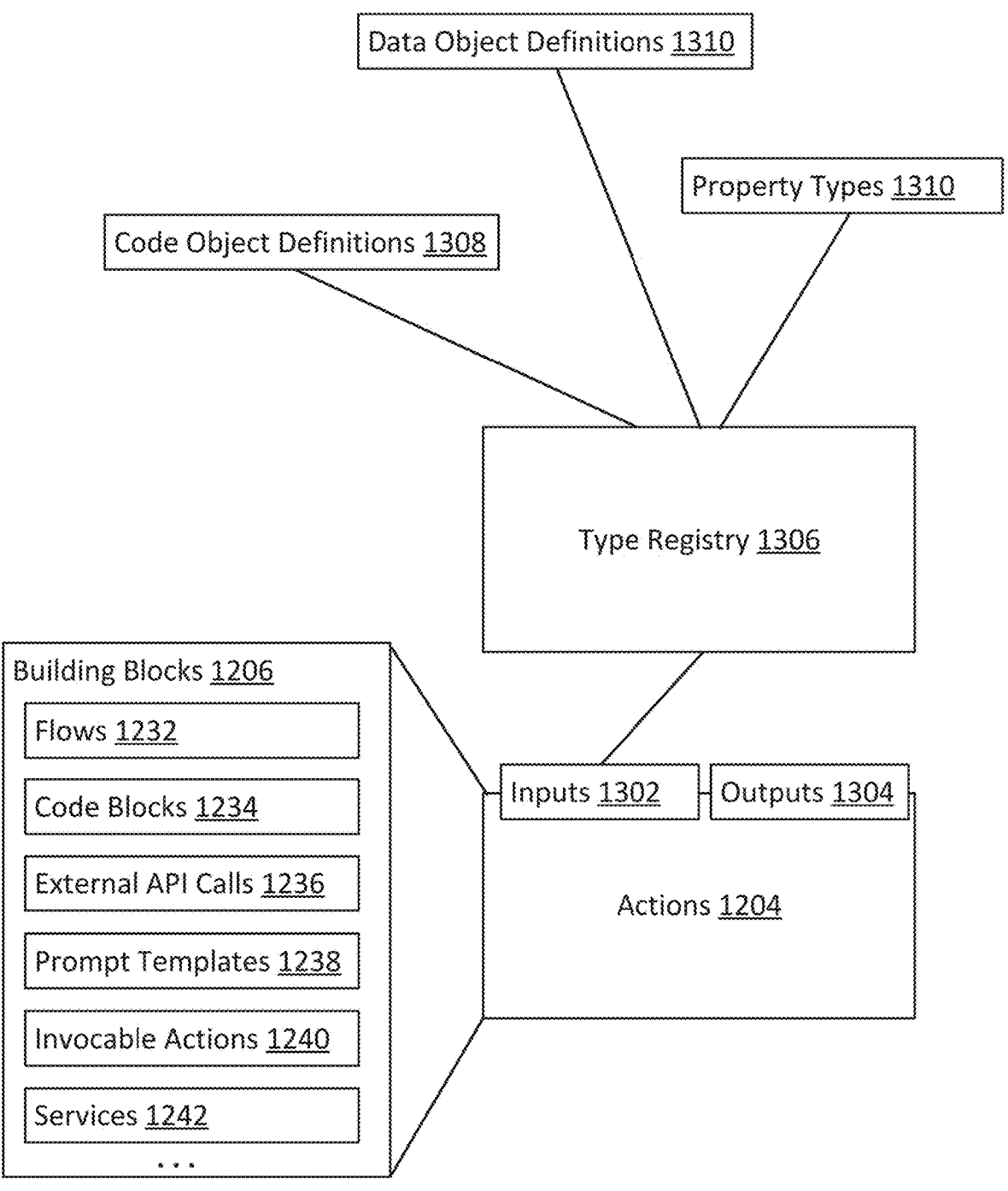
FIG. 13 illustrates a metadata diagram showing relationships between elements for configuring actions, provided in accordance with one or more embodiments.

FIG. 13 illustrates a metadata diagram 1300 showing relationships between elements for configuring actions, provided in accordance with one or more embodiments. The metadata diagram 1300 includes the actions 1204, the building blocks 1306, a type registry 1306, inputs 1302, outputs 1304, code object definitions 1308, data object definitions 1310, and property types 1310.

As shown in FIG. 12, an action may be composed of one or more building blocks. Additionally, an action may optionally include one or more inputs 1302 and outputs 1304. Inputs 1302 and outputs 1304 may be registered in the type registry 1306 to facilitate the integration of actions into the operation of the computing services environment 130.

In some embodiments, an input or output to an action may correspond to a code object definition 1308. A code object definition may be a variable, class, or other object defined in code executable via the computing services environment 100.

In some embodiments, an input or output to an action may correspond to a data object definition 1310. A data object definition may define a data object, such as a database object, accessible via the computing services environment 100.

In some embodiments, an input or output to an action may correspond to a property type 1310. A property type 1310 may be a primitive such as text or a number. Examples of markup code used to define actions, code objects, inputs, outputs, data objects, and the like are shown in FIG. 14.

Figure 14:
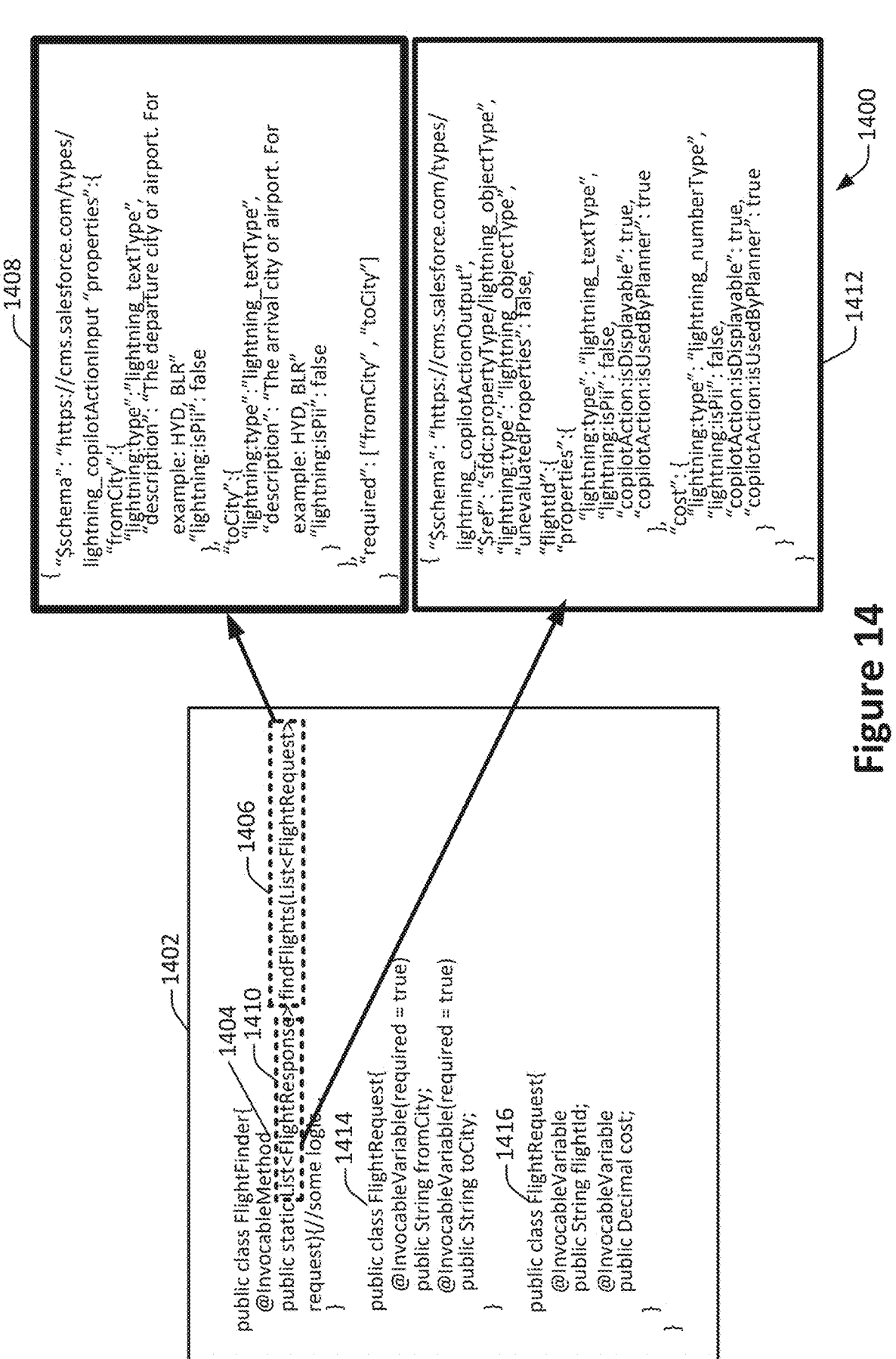
FIG. 14 illustrates an example of markup code corresponding to an action, configured in accordance with one or more embodiments.

FIG. 14 illustrates an example of markup code 1400 corresponding to an action, configured in accordance with one or more embodiments. Markup code such as the markup code 1400 may be used to define actions in terms of their relationships with other elements such as other actions, code blocks, data types, and the like.

For example, the class FlightFinder 1402 corresponds to an action for finding an airplane flight. The class FlightFinder 1402 includes FlightRequest 1414 and FlightResponse 1416 data values. The FlightFinder class 1402 also includes an invocable method findFlights 1404 that receives as input a FlightRequest object parameter 1406, which is a List. The FlightRequest object parameter 1406 corresponds to a FlightRequest object definition 1408.

The FlightRequest object definition 1408 is a schema that defines the types of information that may be included in a FlightRequest object. As shown at 1408, the information included in FlightRequest object includes a "fromCity" and a "toCity", which are not personally identifying information and which are both text data.

The invocable method findFlights 1404 returns as output a FlightResponse list 1410 which corresponds to a FlightResponse object definition 1412. The FlightResponse object definition 1412 includes a flight identifier and a flight cost. The flight identifier is a text field, while the flight cost is a number. Both are also identified as not including personally identifiable information. Both are identified as being displayable and as being used by the planner, for instance to determine the next action to perform in an orchestration.

According to various embodiments, default actions may be provided in the system, specified as shown in FIG. 14. Additionally, a customer or partner organization may provide additional actions that may be integrated into flows performed based on interactions with a conversational chat interface. That is, FIG. 14 is provided as an example of a way in which actions described herein may be configured in the system so that they may be selected by and then performed by agents.

According to various embodiments, the annotation system, elements, and examples shown in FIG. 9, FIG. 10, FIG. 11, FIG. 12, and FIG. 13 provide a conceptual view of metadata structuring for the creation of an agent. A specific agent template may be created using an agent template metadata entry. An example of an agent template metadata entry for a Custom Sales Agent is as follows:

```
Unset
- - -
# Namespace for the agent
namespace:Agent
# Agent Developer Name
name:Custom Sales Agent
# Description for the agent
description: Agent Templatefrom Scratch.
# Developer Name for Agent
developerName: Einstein Agent from Scratch
# Supported Bot Types include External Agent/Internal
   Agent
botType: InternalAgent
# Agent Type allows specifying kinds of Agent types such
   as eSDR, eCoach, customer-defined, ISV-defined, etc.
AgentType: SalesCustomAgent
# Planner Type (Currently supported are reACT and
   Sequential, Post MVP: If Planner
# type is set as null then the Agent will do topic classi-
   fication and return the active
# topic. If the topic has an action, then the single action
   will be executed
plannerType: AiAgent_ReAct
# Agent Primary Language
primaryLanguage: EN_US
# Agent Secondary Language (Optional)
```

```
secondaryLanguage: EN_UK
# Agent Tone
tone: Casual
# UI Icon for Agent (Optional)
iconUrl: /path/to/icon
# No of instances allowed for this Agent Type to be
    created, Default is 1 allowedInstances: 2
# Custom Variables and Context Variables defined for the
    Agent, used for topic filtering
# as variables defined here will be available for selection
    variables:
    variable1:
      name:
      description
      dataType:
      defaultValue: val1
      type: custom/context
# System Messages used in the Agent
systemMessages:
    message: Welcome message
      type: WELCOME
    message: Error handling message
      type: ERROR
    message: Escalation message
      type: ESCALATION
# Agent Level Actions, 3 types supported RAG,
    ErrorHandling, Escalation actions:
    name: EmployeeAgent_KnowledgeRAGAction
      type: RAG
      useAsContext: false
    name: AiAgent_DefaultErrorHanlding
      type: ErrorHandling
# Predefined Topics for the Agent for this template
topics:
# Name of the topic and is it required for this Agent,
    default is false
    name: EmployeeAgent_GeneralCRM
      isRequired: true
      isCustomizable: true
    name: OrderManagement
      isRequired: false
      isCustomizable: true
# Configuration steps that ISVs can inject in wizard UI
uiConfig:
    lwc/app/orderSetup.lwc
    lwc/test/orderSetup.lwc
# Instructions at the Agent Level, This could be special
    instructions instructions:
    Data Privacy: Avoid sharing or accessing any person-
      ally identifiable information (PII).
topicClassificationConfidencescore: 80
# Access rules applicable for the Agent access:
# Rule Expressions for Topic Evaluation ruleExpressions:
    Agent_customRuleExpression
customAgentMessageTriggers:
    outreachEmail.AgentMessageTriggerTemplate
```

As discussed herein, an agent may be associated with one or more topics. An example of a topic template metadata entry for an Order Management topic is as follows:

```
    Unset
    - - -
    namespace: Agent
    name: orderManagement
# Description of the topic, used for Topic Classification
description: This is a default topic for CRM.
# Developer Name for Agent
developerName: Order Management
```

```
# Job/Role of this topic
scope: This is an example scope.
# Actions within the topic
actions:
# Name of the action within this topic and is it required
    for this Agent, default is false
    name: EmployeeAgent_IdentifyObjectByName
      isRequired: true
    name: EmployeeAgent_SummarizeRecord
      isRequired: true
    name: EmployeeAgent_IdentifyRecordByName
      isRequired: true
    name: EmployeeAgent_QueryRecords
      isRequired: true
    name: EmployeeAgent_QueryRecordsWithAggregate
      isRequired: true
# Special Instructions for the Topic
instructions:
    name: Instruction1
      description: This is instruction1 description.
    name: Instruction2
      description: This is instruction2 description.
# Is Topic Customizable
isCustomizable:
# Constraints on the topic where all this Topic can be
    used. If not specified, topic can be
# used in all agents
allowedAgentTypes:
    SalesAgent
# A topic author can additionally disable global RAG
disableGlobalRagAction:false
```

As discussed herein, an agent may be associated with one or more triggers, for instance conditions that trigger the activation of the agent. Such triggers may correspond to natural language input provided by users, various states associated with data stored in the database system, various actions or workflows performed within the computing services environment 100, and/or other types of conditions. An example of an agent trigger message template metadata entry for an Order Management topic is as follows:

```
    namespace: Agent
    name: outreachEmail
    topic: 'orderManagement'
    variables:
      variable1
      variable2
# utterance or action
    utterance: Create an outreach email
    action: orderDetail
```

According to various embodiments, a platform for providing autonomous agents may be conceptualized as a toolbox. The platform provides pre-built components (such as retrieval augmented generation and customizations) that different personas such as org admins, clouds and independent software vendors (ISVs) can access to create, manage, and improve autonomous agents.

In some embodiments, an autonomous agent may interoperate with metadata available in the platform. For instance, an autonomous agent may integrate constructs of grouping of metadata such as flows, automated actions, cloud specific configuration information, and the like, as well as metadata from AI such as models, prompt templates and agent metadata.

FIG. 15 illustrates a method 1500 for creating an agent, performed in accordance with one or more embodiments. FIG. 15 is described partially in reference to FIG. 20 through FIG. 25, which illustrate user interfaces generated in accordance with one or more embodiments. The method 1500 may be performed at a computing services environment such as the computing services environment 100 shown in FIG. 1.

In some embodiments, an agent may be created from a workflow, such as a preconfigured bot designed to take specific actions when particular conditions are satisfied. Such workflows may include characteristics such as descriptions, inputs, outputs, actions, trigger conditions, and the like, which may be adapted to support the creation of the autonomous agent.

A request to create an agent is received at 1502. In some embodiments, such a request may be generated based on a button selection in a graphical user interface. An example is shown in the user interface 2000 shown in FIG. 20, which includes the button 2002 for generating a new agent. The user interface 2000 also shows different agents 2004 that have already been created.

In some embodiments, such a request may be generated automatically. For instance, an existing workflow may be automatically converted to an autonomous agent upon detection of a triggering condition.

Figure 21:
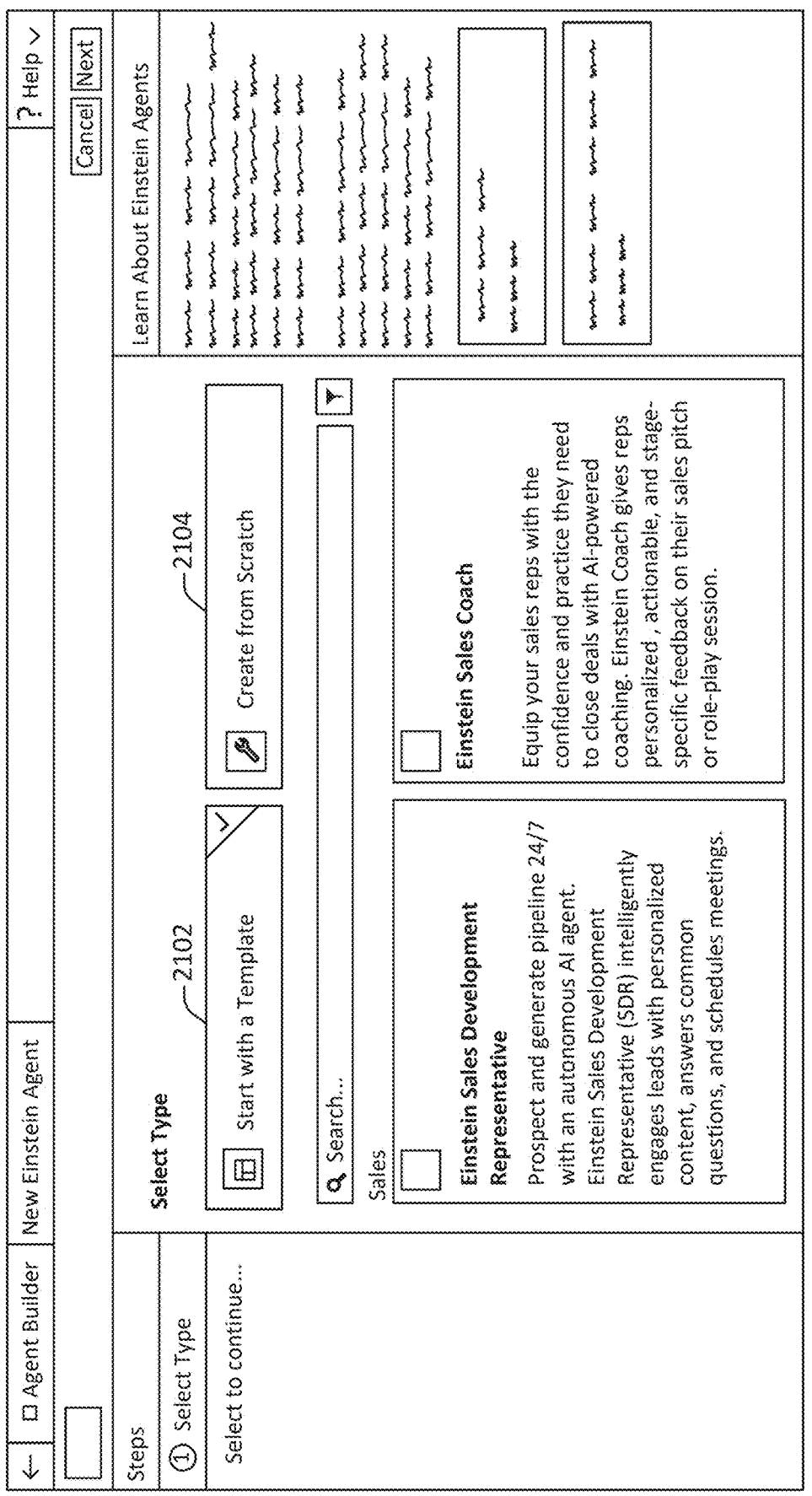

An agent type for the agent is determined at 1504. In some embodiments, the agent type may be determined based on user input. For example, FIG. 21 illustrates a user interface 2100 providing various options for determining an agent type. At 2102, an agent may be created from a predefined agent template. At 2104, an agent is created from scratch.

In some embodiments, the agent type may be determined automatically. For example, a particular type of workflow or bot used as the basis of an autonomous agent may correspond to a particular agent type. As another example, an autonomous agent may evaluate a workflow or bot to determine an appropriate agent type corresponding to the workflow or bot.

Figure 22:
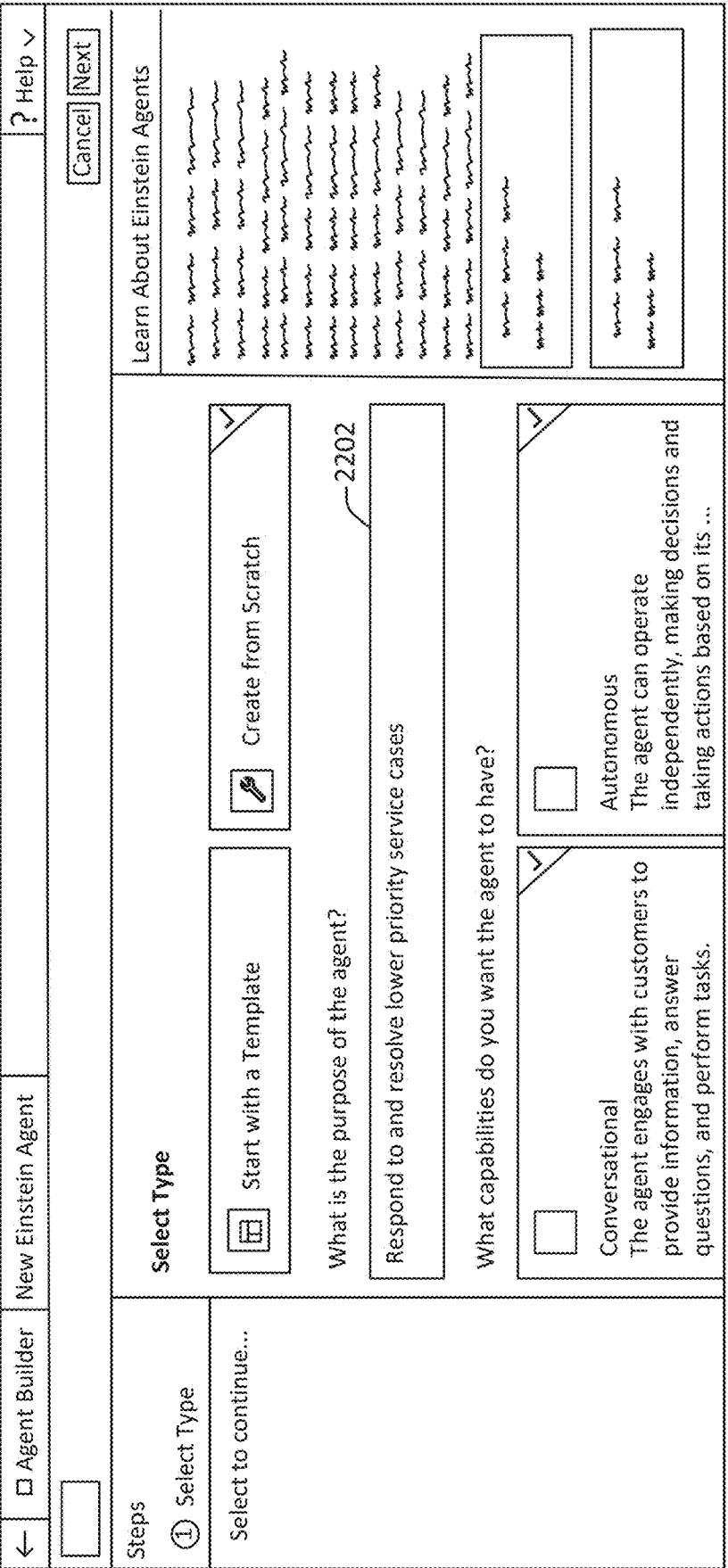

An agent purpose description for the autonomous agent is determined at 1506. In some implementations, the agent purpose description may be a textual description of the purpose of the agent. The agent purpose description may be provided via user input. For example, FIG. 22 illustrates a user interface 2200 providing an affordance 2202 for a user to specify the agent's purpose. In FIG. 22, the agent purpose description is to "respond to and resolve lower priority service cases."

In some embodiments, the agent purpose description may be determined automatically. For example, an autonomous agent may evaluate an existing workflow or bot to determine a textual description of the workflow or bot. As another example, an existing workflow or bot may be associated with a predetermined description.

One or more information retrievers for the autonomous agent are determined at 1506. In some embodiments, an information retriever serves as a connector for the agent to access information inside or outside of the computing services environment 100. For example, an information retriever may provide a mechanism through which one or more files can be uploaded, one or more external information sources can be accessed, and/or one or more database records can be retrieved.

In some embodiments, an information retriever may be determined automatically. For instance, an existing workflow or bot may be evaluated by an autonomous agent to identify a suitable information retriever for retrieving information needed to implement the functionality of the workflow or bot.

Figure 25:
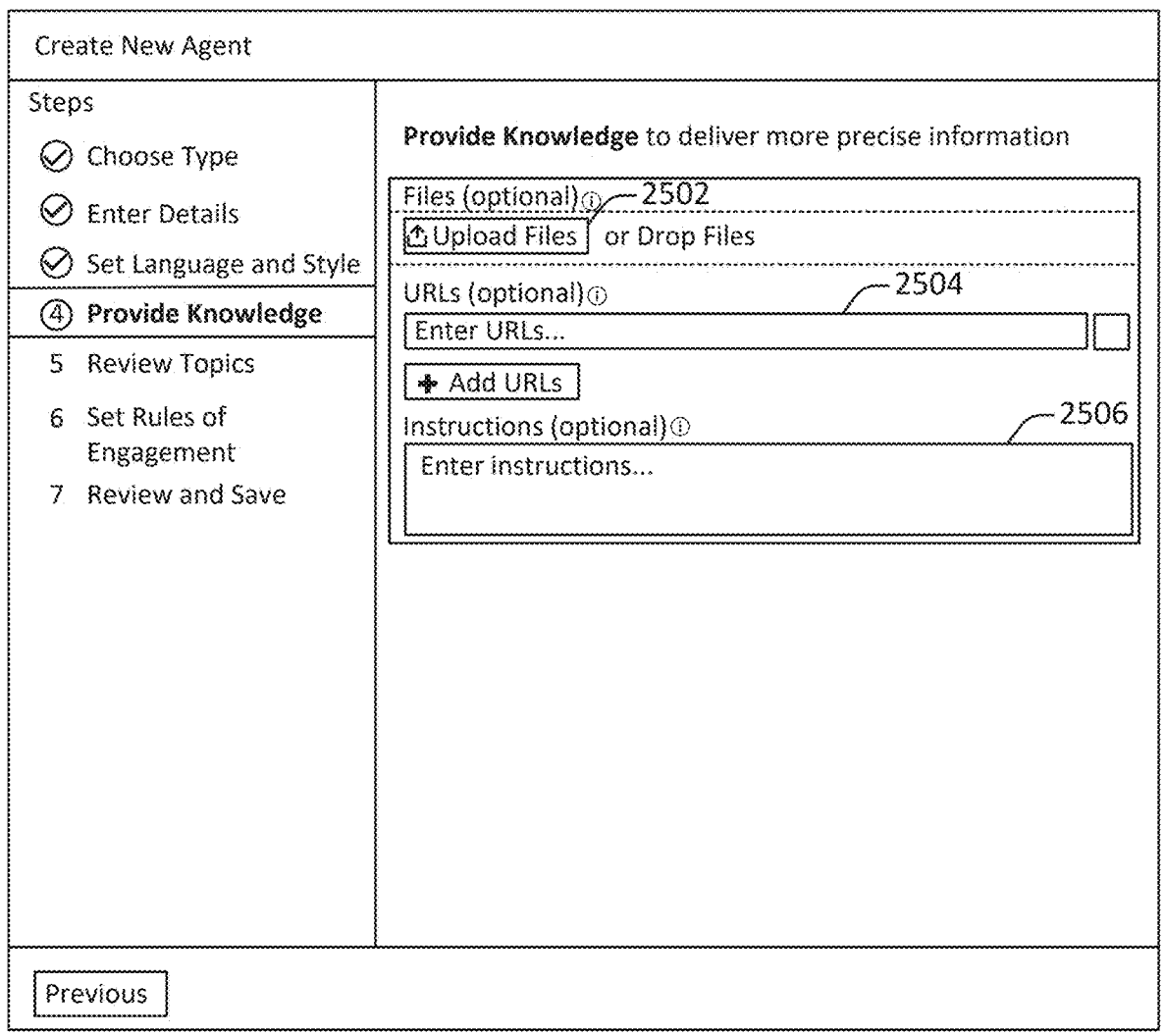

In some embodiments, an information retriever may be determined based on user input. As an example, FIG. 25 illustrates a user interface 2500 for defining an information retriever, configured in accordance with one or more embodiments. In FIG. 25, a user may specify one or more files 2502, URLS 2504, and/or instructions 2506 for retrieving data.

Figure 23:
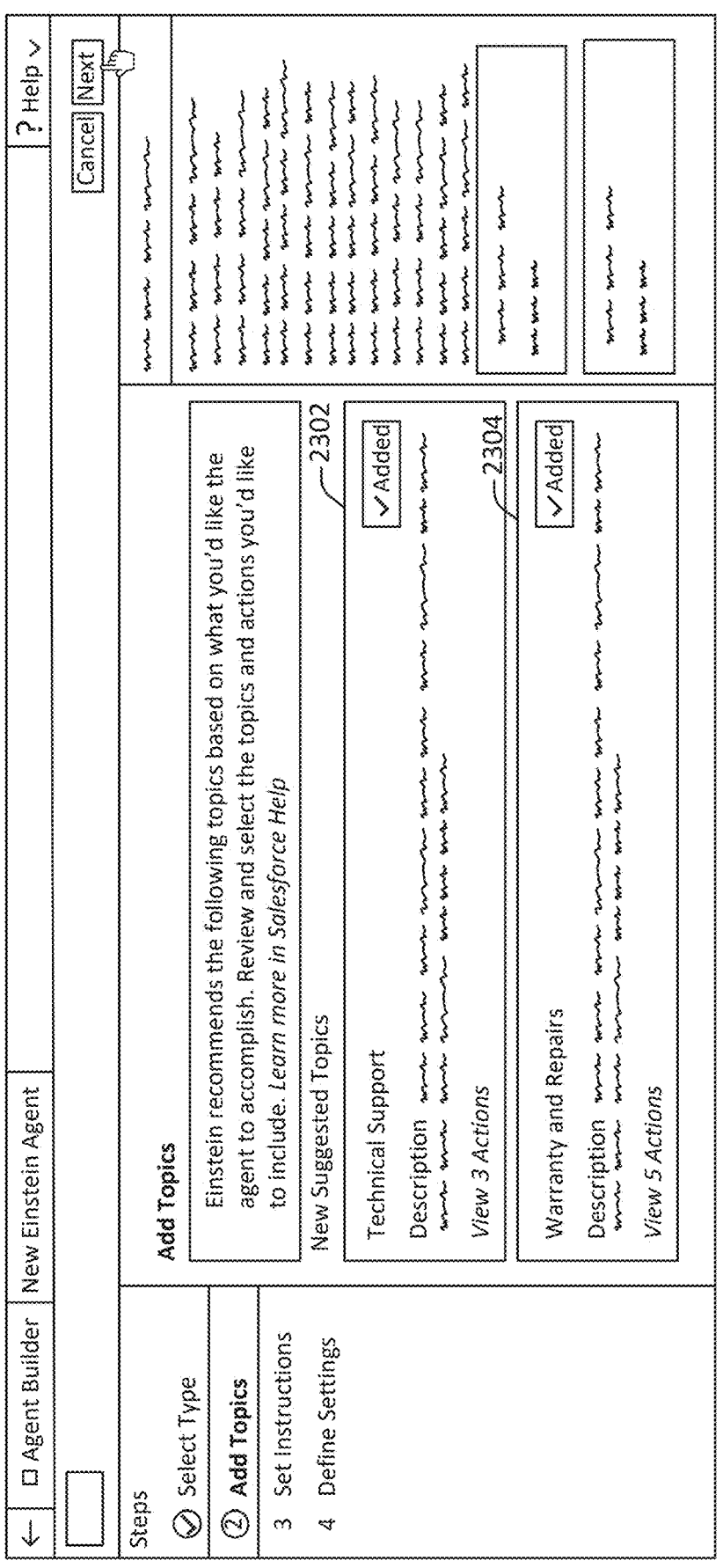

One or more topics are identified for the autonomous agent at 1508. In some embodiments, topics may be manually selected. Alternatively, or additionally, topics may be recommended by the system, for instance based on the agent type and/or purpose description. For example, FIG. 23 illustrates a user interface 2300 showing topics that the system has recommended based on the agent's purpose. In FIG. 23, the system has recommended a Technical Support topic 2302 and a Warranty and Repairs topic 2304. The topics may be recommended by asking a generative language model to select from a set of predetermined topics based on an analysis of the agent's purpose description and/or from one or more elements of an existing workflow or bot used as the basis of the autonomous agent.

One or more actions to be performed by the autonomous agent are identified at 1510. In some embodiments, a topic identified at 1510 may be associated with one or more actions. Alternatively, or additionally, one or more actions may be identified in a different way. For instance, an action may be suggested by the system, selected from a set of predefined actions via a user interface, or defined specifically for the autonomous agent being created.

In some embodiments, one or more existing operations performed by a workflow or bot may be automatically converted into an action. For instance, one or more code portions, function calls, and/or other operations may be encapsulated within and/or referred to by a metadata entry for a new action. The metadata entry may be used to incorporate the action into the operation of an autonomous agent, for instance by virtue of being included in a topic accessible to the autonomous agent.

Agent planner information for the planner is determined at 1514. In some embodiments, the agent planner information may include a selection of a default planner, a modification of a default planner, a custom planner hosted within the computing services environment 100, and/or an outside planner. Additional details regarding the configuration of planner information are discussed with respect to the method 5000 shown in FIG. 50.

In some embodiments, the agent planner information may include one or more instructions defining the operation of the autonomous agent. Such instructions may be determined based on user input. Alternatively, or additionally, such instructions may be determined automatically. For instance, an existing workflow or bot may be analyzed to identify one or more instructions for selecting actions to be performed by the autonomous agent.

One or more engagement rules for the autonomous agent are identified at 1514. According to various embodiments, the engagement rules may specify situations for activating or deactivating the agent. That is, engagement rules may include triggering conditions for initiating the agent. Alternatively, or additionally, engagement rules may include guidelines for agent operations.

In some embodiments, engagement rules may be provided via natural language text input via a user interface. For instance, FIG. 24 illustrates a user interface 2400 showing descriptions of engagement rules. As shown in FIG. 24, the engagement rules may specify when the autonomous agent should take an action at 2402, when the autonomous agent should escalate an interaction to a different party (e.g., a human agent) at 2404, and when the autonomous agent should conclude the interaction at 2406. Alternatively, or additionally, other types of engagement rules may be specified.

In some embodiments, one or more default engagement rules may be specified. For instance, an autonomous agent may be associated with one or more engagement rules related to bias, toxicity, factuality, and/or other such considerations. Such default engagement rules may be specified by the service provider of the computing services environment 100, by a client organization, by a user, or by another entity.

One or more metadata entries for the autonomous agent are generated and stored at 1516. According to various embodiments, the metadata entries may include any or all of the information determined and identified in the method 1500, as well as potentially other information. The metadata entries may situate the agent within a metadata framework configured as described herein and may render the agent accessible for invocation via the agent platform. For instance, the metadata entries may include one or more entries corresponding to agents, topics, guidelines, triggers, data retrievers, prompts, models, planners, and/or other elements of the computing services environment 100 and/ orthe agent platform.

As an example of a configuration process for an autonomous agent, consider a situation in which a customer organization would like to create an autonomous agent from scratch to generate an automated message in response to a new email that is added to a case. The method 1500 shown in FIG. 15 may be used to create such an autonomous agent.

In this example, the triggering condition within the engagement rules may be specified as a new email being added to a case. The autonomous agent may be associated with conditions that further limit the application of the autonomous agent. For instance, the autonomous agent may be triggered only when the Case Status is "Open" or "In Progress" and the Priority is "Low" or "Medium."

In this example, the flow actions may include: (1) extracting the body of the email for analysis, (2) retrieving case information such as subject, description, and previous correspondence, (3) calling the agent API to initiate the agent, and (4) performing one or more agent actions. Calling the agent API may involve operations such as constructing a prompt for the agent based on the extracted email and case information, such as "Generate a response to the following customer email, considering the case details: [email content] [case information]", and then sending the prompt to the agent API. In this example, executing the agent action may involve operations such as using the context and retrieval augmented generation (RAG) to search for relevant content as needed and generate email. If configured, executing the agent action may involve automatically sending the generated email.

In some embodiments, autonomous agents configured in accordance with FIG. 15 are self-directed systems capable of performing tasks based on their given context and permissions. Essentially, they can function like users interacting with an agent, utilizing the agent's capabilities but operating independently.

Figure 16:
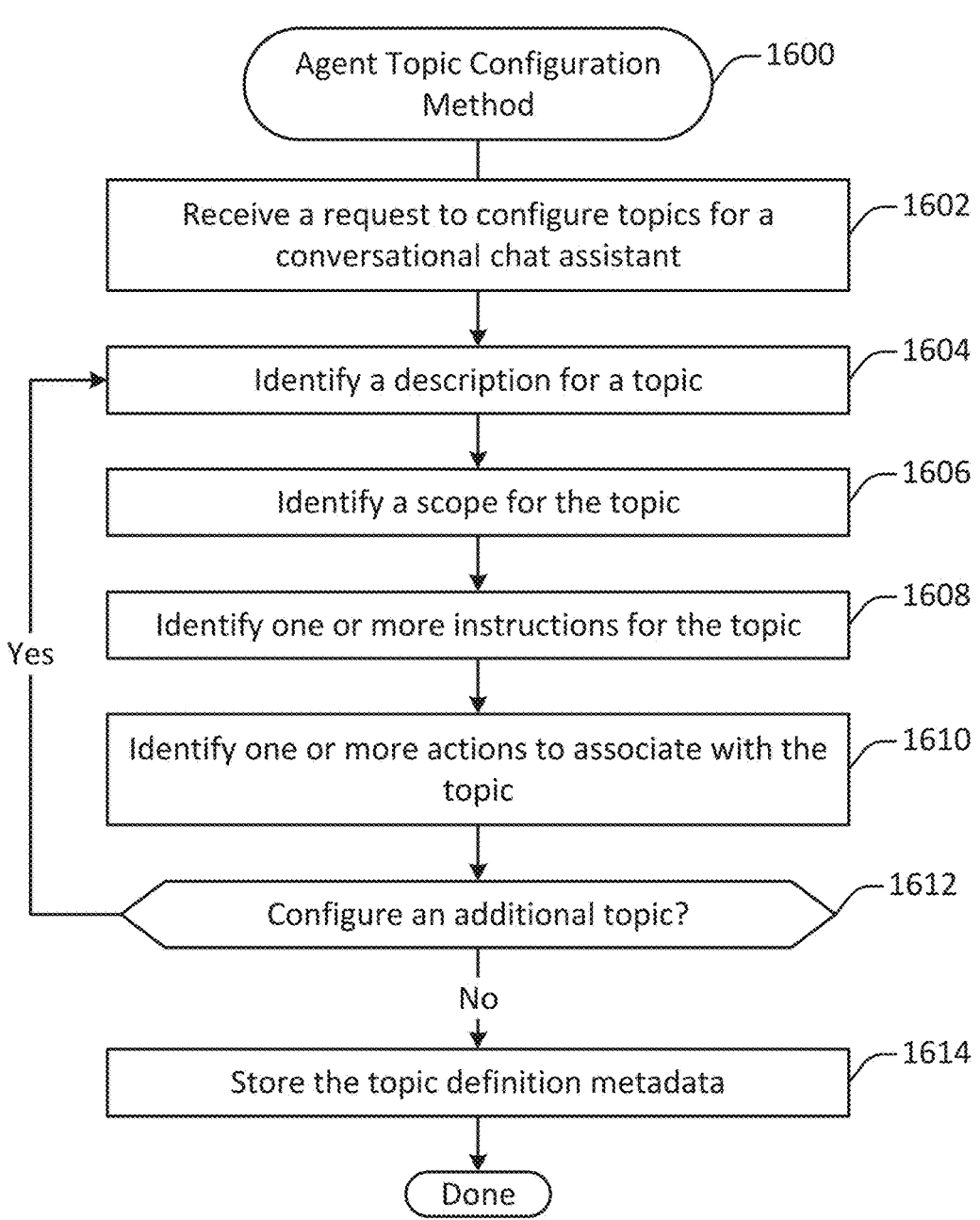
FIG. 16 illustrates a method of configuring a topic, performed in accordance with one or more embodiments.

FIG. 16 illustrates a method 1600 of configuring a topic, performed in accordance with one or more embodiments. The method 1600 may be used to define a topic based on one or more metadata entries. The method 1600 may be performed at a computing services environment such as the computing services environment 100 shown in FIG. 1.

A request to configure one or more topics for an autonomous agent is received at 1602. In some embodiments, the request may be received at a conversational chat studio such as the agent studio 112 shown in FIG. 2. For example, the request may be generated as discussed with respect to operation 1508 shown in FIG. 15. As another example, the request may be generated independently, outside of the agent creation process.

A description of a topic is identified at 1604. In some embodiments, the description of the topic may include information such as a name, a context, and/or any other characterization information. Some or all of the description information may be provided to a generative language model as part of an intent evaluation prompt completed by the generative language model to select a topic.

A scope for the topic is identified at 1606. In some embodiments, the scope may identify one or more products, services, customer organizations, industries, and/or other contexts in which the topic may be selected.

One or more instructions for the topic are identified at 1608. In some embodiments, the one or more instructions may include natural language provided to a generative language model for selecting and/or executing actions after a topic has been selected. For instance, the one or more instructions may be provided to the generative language model along with a set of actions that are selectable by the generative language model to fulfill the user's intent as reflected in natural language user input.

One or more actions to associate with the topic are identified at 1610. In some embodiments, the actions may be configured as discussed with respect to the method 1700 shown in FIG. 17, with respect to the metadata diagram 1200 shown in FIG. 12, and throughout the application.

According to various embodiments, some or all of the information identified as discussed with respect to the operations 1604-1610 may be identified based on user input. For instance, user input may be provided in text-based format or another format via the agent studio 112. Alternatively, or additionally, some or all of the information identified as discussed with respect to the operations 1604-1610 may be identified by a generative language model. For instance, a generative language model may determine such information in response to text input provided by a user.

A determination is made at 1612 as to whether to configure an additional topic. In some embodiments, the determination may be made based on user input. Upon determining not to configure an additional topic, the topic definition metadata is stored in the database system at 1614. The topic definition metadata may include any or all of the information discussed with respect to FIG. 17, as well as any other information included within a topic metadata entry.

Figure 17:
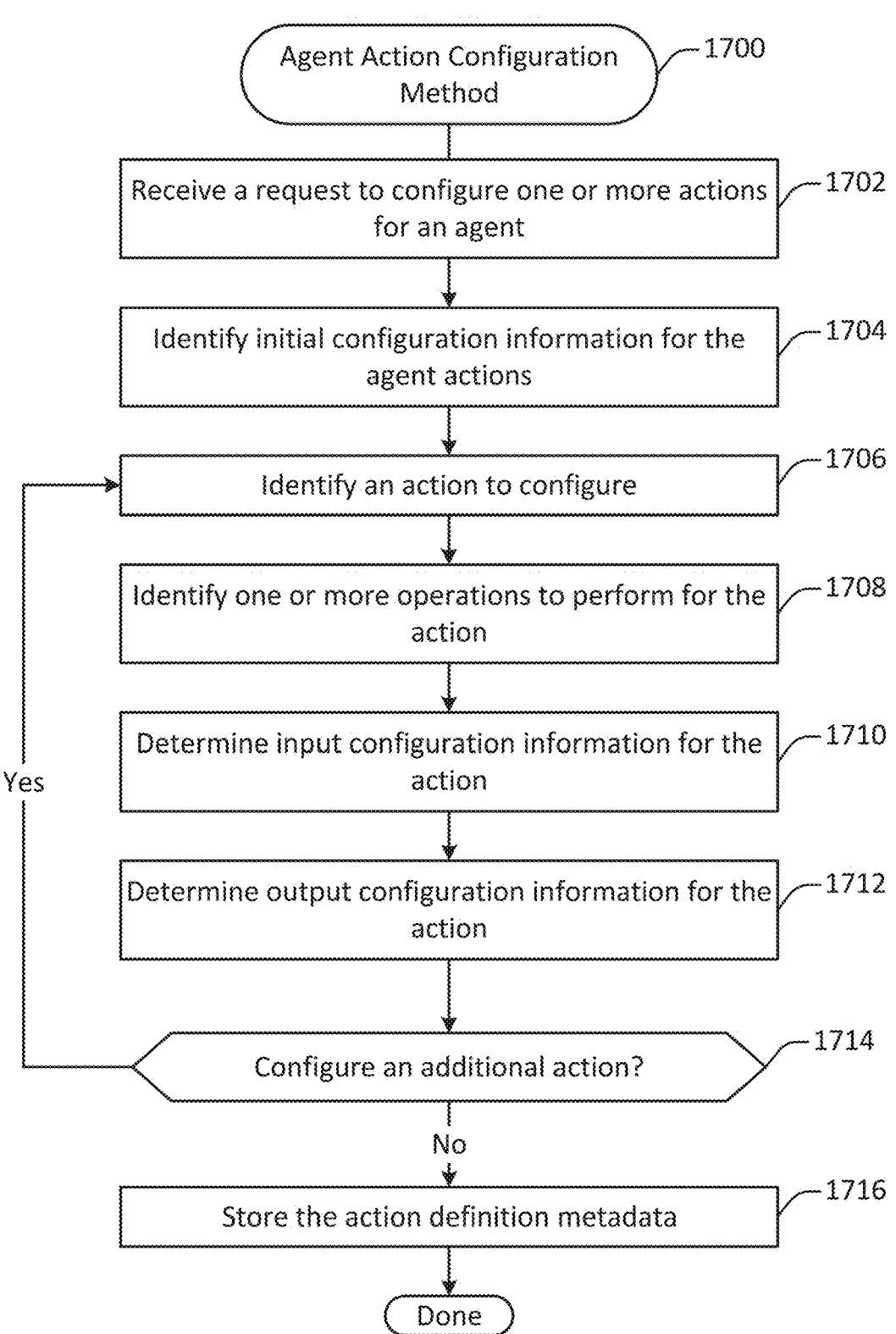
FIG. 17 illustrates a method for configuring actions for an agent, performed in accordance with one or more embodiments.

FIG. 17 illustrates a method 1700 for configuring actions for an agent, performed in accordance with one or more embodiments. The method 1700 may be performed at the computing services environment computing services environment 100 shown in FIG. 1. For instance, the method 1700 may be performed at the agent studio 112 in communication with a client machine.

A request to configure one or more actions for an autonomous agent is received at 1702. In some embodiments, the request may be received at a conversational chat studio such as the agent studio 112 shown in FIG. 2. For example, the request may be generated as discussed with respect to operation 1510 shown in FIG. 15. As another example, the request may be generated independently, outside of the agent creation process.

In some embodiments, the request may be received from a client machine in communication with the computing services environment 100. In some configurations, the autonomous agent may be configured for general use for different parties and contexts within the computing services environment. Alternatively, the autonomous agent may be configured for a particular customer organization, product offering, service offering, or other context.

Configuration information for the agent actions is identified at 1704. In some embodiments, the configuration information may be provided via the user interface. The configuration information may include information such as a name, description, context, and/or other metadata for the agent actions.

In some implementations, the configuration information may include one or more natural language instructions to be executed by a generative language model. For instance, the configuration information may include overarching natural language instructions governing the generation of novel text in conjunction with the autonomous agent. Such instructions may indicate to a generative language model that novel text is to be generated in a manner that is, for example, helpful, clear, professional, and respectful.

An action to configure is identified at 1706. In some embodiments, the action to configure may be identified based on selection by a user via a user interface. The user may identify an existing action to adapt for the autonomous agent and/or provide information for creating a new action.

One or more operations to perform for the action are identified at 1708. According to various embodiments, any of various types of operations may be performed when executing an action. For example, a prompt may be created from a prompt template and sent to a generative language model for completion. As another example, information may be retrieved from the database system or another data source. As yet another example, one or more records in a database system or other data source may be updated. As still another example, an API call may be sent via an internal or external API.

According to various embodiments, the operations to perform for the action may be specified in any of various ways. For example, operations may be specified via markup language, specified via source code, selected from a list, created by a generative language model based on natural language input, and/or specified in any other suitable way.

An input configuration for the action is determined at 1710, and an output configuration for the action is determined at 1712. In some embodiments, an input configuration and an output configuration may be specified in terms of one or more parameters provided to initiate the action and information returned by the completion of the action, respectively. Such information may be specified in accordance with a metadata-based type system. For instance, as shown in additional detail in FIG. 13 and FIG. 14, an input or output may be associated with an entry in a type registry that defines the input or output as a code object, a data object, a primitive, or another data type.

In some embodiments, the input or output configuration may be determined based on user input. Alternatively, or additionally, the input or output configuration information may be determined based on the one or more operations to perform at 1708. For example, particular types of actions may be linked with particular types of inputs or outputs. For instance, a call to a generative language model may take as input both a prompt template and a source for textual information used to determine a prompt from the prompt template.

A determination is made at 1714 as to whether to configure an additional action. In some embodiments, the determination may be made based on user input. For instance, the user may indicate that the user is finished configuring the actions for the agent, at which point definition metadata for the actions is stored in the database system at 1716.

According to various embodiments, the action definition metadata may include any or all of the information discussed with respect to FIG. 17, as well as any other information included within an action metadata entry.

According to various embodiments, as discussed with respect to the method 1500 shown in FIG. 15, various elements of an autonomous agent, including topics and actions, may be created based on a preexisting workflow or bot. For instance, operations performed in the course of executing a workflow or bot may be automatically converted to actions and grouped into topics, along with the creation of corresponding metadata entries within the metadata framework.

Figure 18:
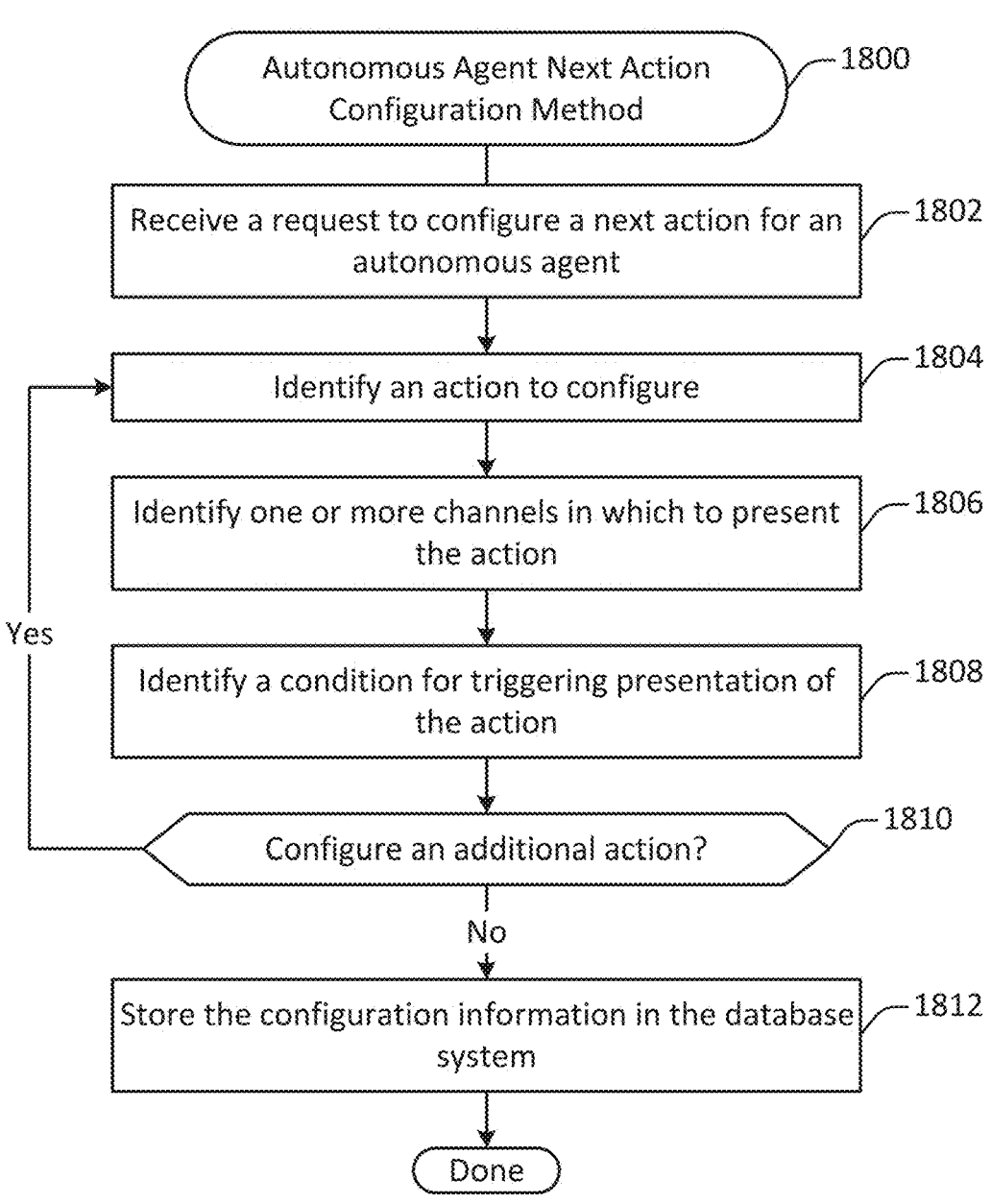
FIG. 18 illustrates a method for configuring a next action for an autonomous agent, performed in accordance with one or more embodiments.
Figure 20:
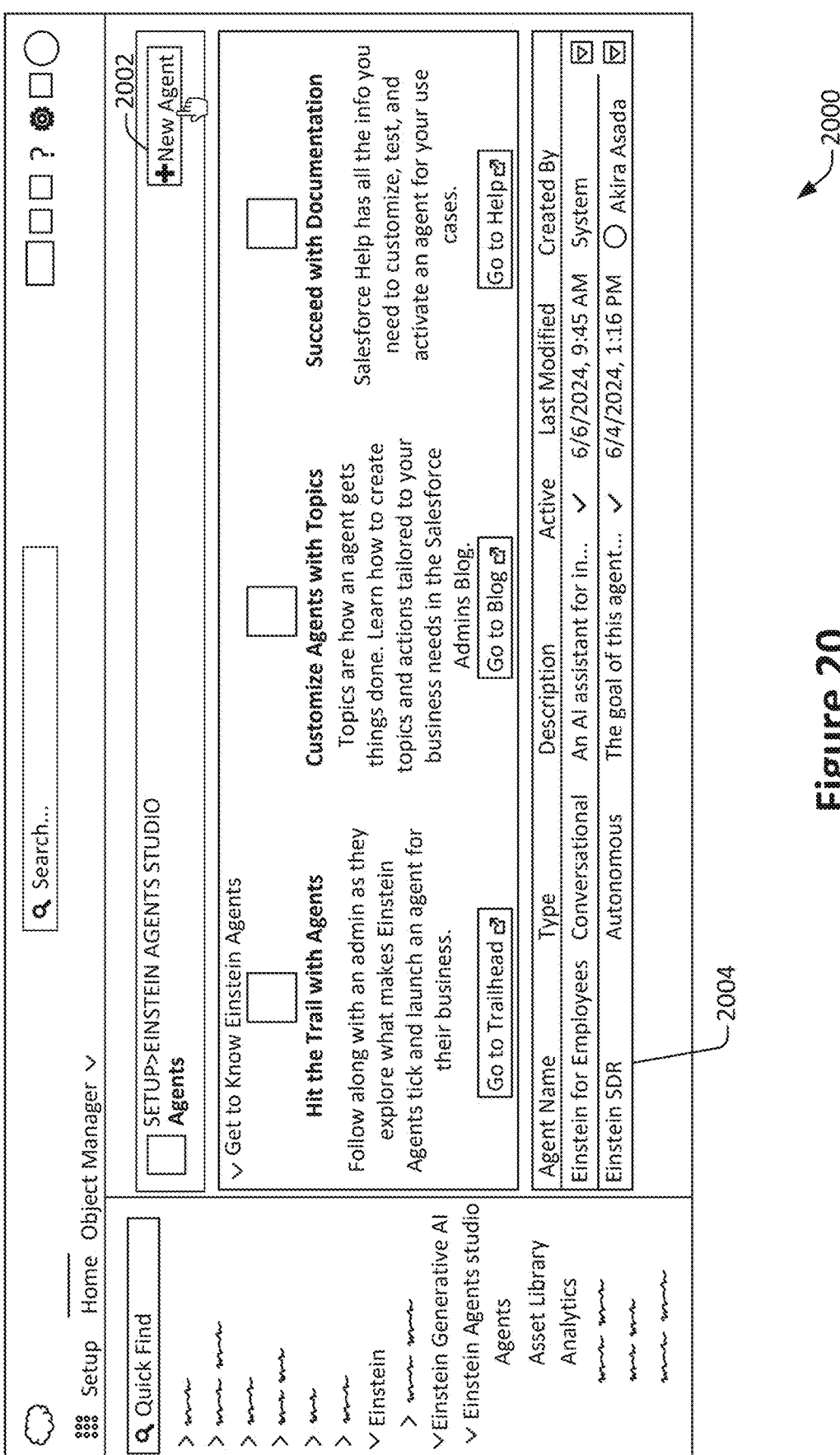

FIG. 18 illustrates a method 1800 for configuring a next action for an autonomous agent, performed in accordance with one or more embodiments. The method 1800 may be performed at the computing services environment 100 shown in FIG. 2. For instance, the method 1800 may be performed at an agent studio 112 in communication with a client machine.

According to various embodiments, the method 1800 may be used to configure an action for recommendation in a conversational chat interface. For instance, as shown in FIG. 19, the completion of an action to summarize a record at 1906 triggers the automatic recommendation of an action to summarize a contact associated with the record at 1904 and an action to draft an email at 2012. As another example, in a different context, the presentation of a top opportunity at 3704 in FIG. 37 leads to the recommendation at 3706 of an action to edit the record that was presented.

In some embodiments, the method 1800 may be used to adapt an autonomous agent for use in different contexts, such as by different users or organizations. For instance, one user or organization may prefer to receive a recommendation to email a contact when a record summary is generated, while another user or organization may prefer to receive a recommendation to edit the record when a record summary is generated.

A request to configure a next action for a communication channel is received at 1802. In some embodiments, the request may be received from a client machine. For instance, an administrator associated with a client organization may configure an autonomous agent to automatically present a next action within a conversational chat interface when a triggering condition is met.

An action to configure is identified at 1804. In some embodiments, the action may be selected from within the user interface. For instance, the action may be selected from within a studio for configuring a conversational assistant.

One or more channels in which to present the action are identified at 1806. In some embodiments, a subset of available channels in which to present the action may be identified. Alternatively, the action may be presented on all channels through which interactions with the autonomous agent are conducted.

A condition for triggering presentation of the action is identified at 1808. According to various embodiments, any of a variety of triggering conditions may be specified. For example, one action may be triggered when another action is performed. As one example, when an action updating a database object is performed, the autonomous agent may automatically provide a recommendation to generate a summary of the database object. As another example, an action may be triggered when a value associated with a database object reaches a designated threshold. For instance, in an interaction with an autonomous agent that focuses on an opportunity object, an action to generate an email to a contact for the opportunity may be recommended if the value of the opportunity exceeds a designated amount.

A determination is made at 1810 as to whether to configure an additional action. In some embodiments, the determination may be made based on user input. Upon determining not to configure an additional action, the configuration information is stored in the database system at 1812. The configuration information may be used to trigger recommendation of the configured actions or actions.

In some embodiments, one or more of the operations shown in FIG. 18 may be performed automatically or dynamically by the system itself. For instance, the system may observe that for a particular organization or user, or across the system, a particular action is often selected when a particular condition is met. The system may then infer that the action should be recommended as a next action when the condition is met.

FIG. 19 illustrates a method 1900 for configuring a conversational chat interface for an agent operating as a conversational chat assistant, performed in accordance with one or more embodiments. The method 1900 may be performed at the computing services environment 100 shown in FIG. 1.

According to various embodiments, the method 1900 may be used to differentially configure how input and output of a conversational chat interface is displayed for different actions and communication channels. For instance, by default the input or output may be displayed as text or rich text. However, the input or output may be configured to display as a card, as an image, as a video, as formatted text, and/or as any suitable format. The input or output may also be configured to display differently in a native application, a web interface, a Slack interface, and/or in some other communication channel.

According to various embodiments, the conversational chat assistant may be configured in a manner specific to a customer organization of a computing services environment. In this way, different customer organizations may separately configure one or more conversational chat assistants to reflect the needs of the various organizations.

At 1902, a request is received to configure output formatting for a conversational chat assistant. In some embodiments, the request may be received in the context of configuring a conversational chat assistant via the agent studio 112.

An object to configure is identified at 1904. In some embodiments, the object may be a representation of data that may be presented via the conversational chat interface. For instance, the object may be a database object, a list of database objects, a portion of text, or any other suitable type of information. The object may be identified by, for instance, user input.

A communication channel to configure is identified at 1906. In some embodiments, the communication channel may be selected by a user. The communication channel may be any communication channel through which communication with a user may be conducted. For instance, the communication channel may be a web application, an embedded chat interface, a messaging interface, a mobile application, or any other suitable channel.

Presentation configuration information for the object and the channel are determined at 1908. According to various embodiments, the presentation configuration information may include text formatting specific to the object and the channel. For instance, the presentation configuration information may include a representation of how a list of opportunity objects is to be presented in a mobile interface during interactions within the conversational chat assistant.

In some embodiments, the presentation configuration information may be determined based on user input. For instance, a user may select and/or provide presentation configuration information via the agent studio 112.

A determination is made at 1910 as to whether to configure an additional object and/or communication channel. In some embodiments, the determination may be made based on user input. For instance, the user may indicate when configuration has been completed.

The presentation configuration information is stored at 1912. The stored presentation configuration information may then be used to format the presentation of information output via a conversational chat interface. Examples of such formatting are shown throughout the application, for instance in FIG. 38A and FIG. 38B.

Figure 26:
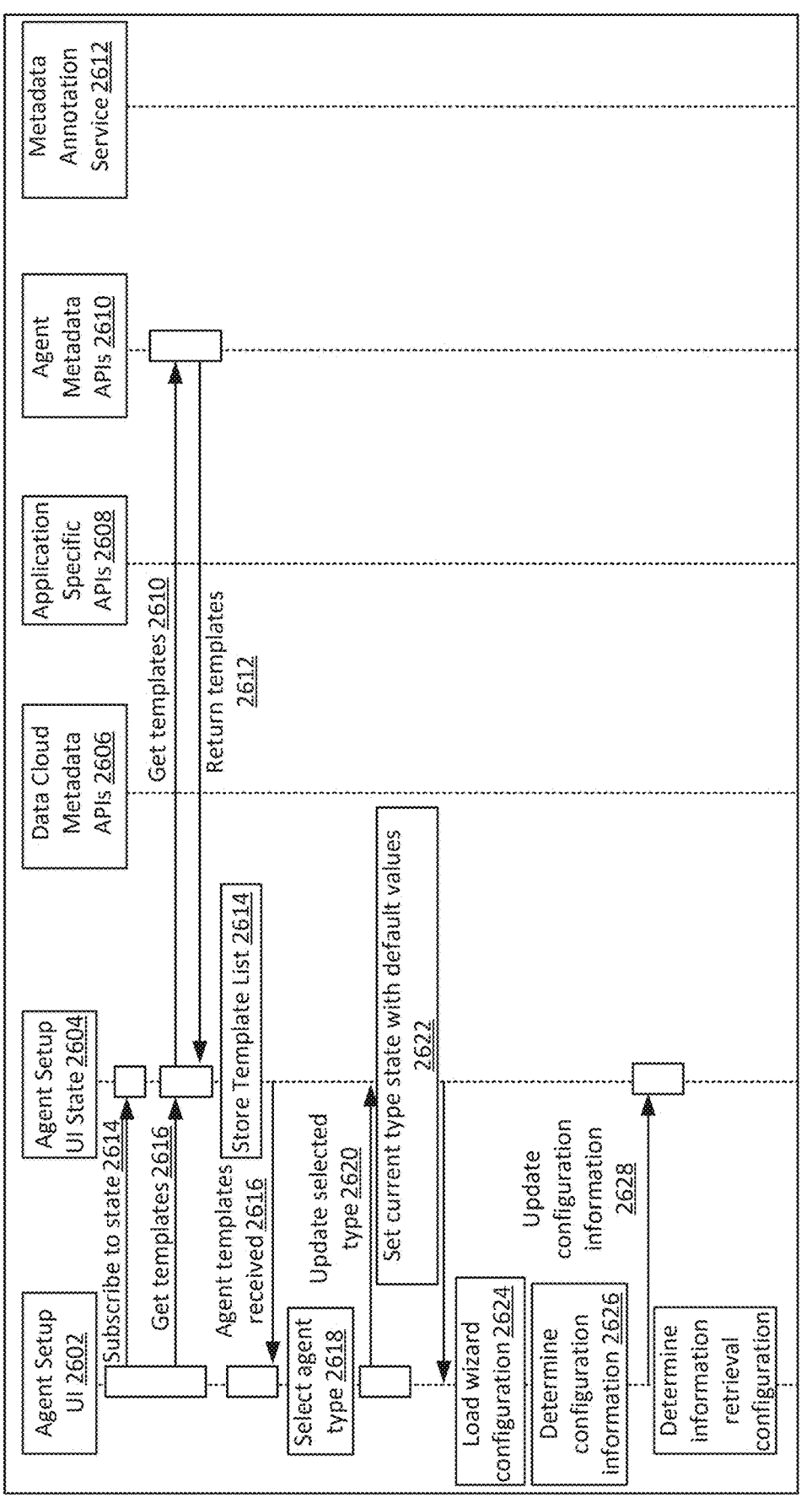
FIG. 26 and FIG. 27 illustrate a workflow performed in accordance with one or more embodiments.
Figure 27:
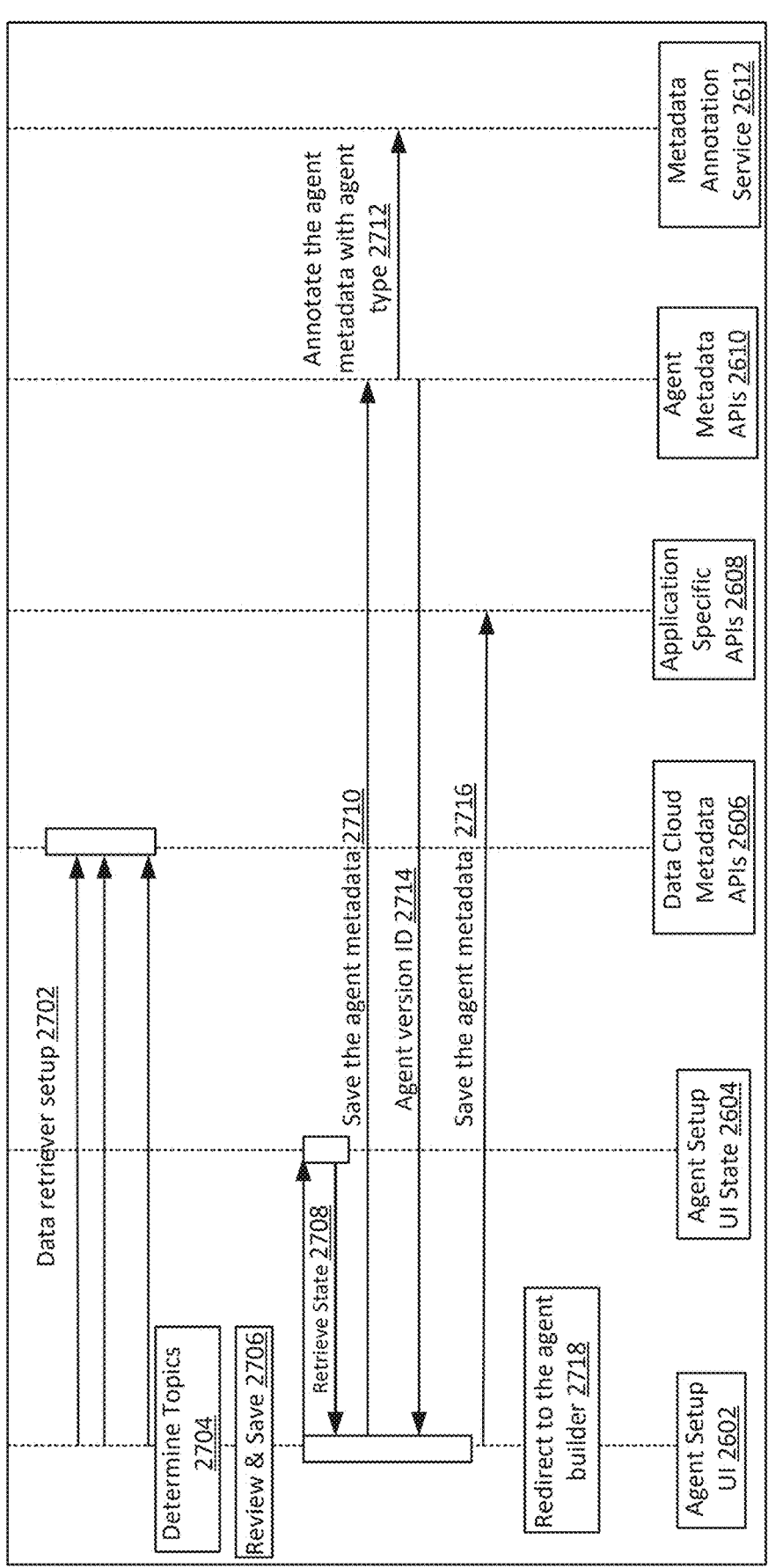

Additional details regarding the configuration of an autonomous agent are discussed with respect to FIG. 26 and FIG. 27, which together provide an example of a process flow for configuring an autonomous agent. These two figures illustrate interactions between an agent setup user interface 2602, an agent setup user interface state 2604, one or more data cloud metadata interfaces 2606, one or more application specific interfaces 2608, one or more conversational chat assistant metadata interfaces 2610, and a metadata annotation service 2612.

The agent setup user interface 2602 may be implemented at a client machine. At 2614, the agent setup user interface 2602 subscribes to the agent setup UI state 2604. At 2616, the agent setup user interface 2602 sends a request to retrieve templates for agents. Such templates are retrieved from agent metadata interfaces 2610 at 2618 and 2620 and then stored in the agent setup UI state 2604 at 2614. The agent setup UI 2602 is notified of the templates at 2616.

The agent type is selected at 2618 and updated in the agent setup UI state 2604 at 2620. At 2622, the agent setup UI state 2604 is set to the selected type state. Default values received from the template, such as name, description, language, tone, topic, and actions, are then set at 2622. At 2624, the wizard configuration is loaded from file based on the selected type. Alternatively, a default configuration is loaded, for instance if there is no configuration information for the selected type. Configuration information is determined at 2626. Examples of configuration information include the agent's purpose, language, tones, and other such details. Such information is updated in the agent setup UI state 2604 at 2628.

Information retrieval configuration is determined at 2630. According to various embodiments, information retrieval configuration may include static and/or dynamic information to guide the agent's reasoning and actions. Such retrieval configuration information is used to configure one or more data retrievers at 2702. Examples of such data retrievers may include, but are not limited to, search configuration, file uploads, CRM data connectors, data streams, and API access parameters.

One or more topics are determined at 2704. The agent configuration is then reviewed and saved at 2706. The agent state is retrieved at 2708. The agent metadata is then saved at 2710 via the one or more agent metadata interfaces 2610. The agent metadata interfaces 2610 communicate with the metadata annotation service 2612 at 2712 to annotate the agent metadata with the agent type. The agent metadata interfaces 2610 also return an agent version ID at 2714. The agent version ID is then used to save the agent metadata with application-specific interfaces 2608 at 2716. The agent configuration is completed at 2718, at which point the user interface returns to the agent builder.

Figure 28:
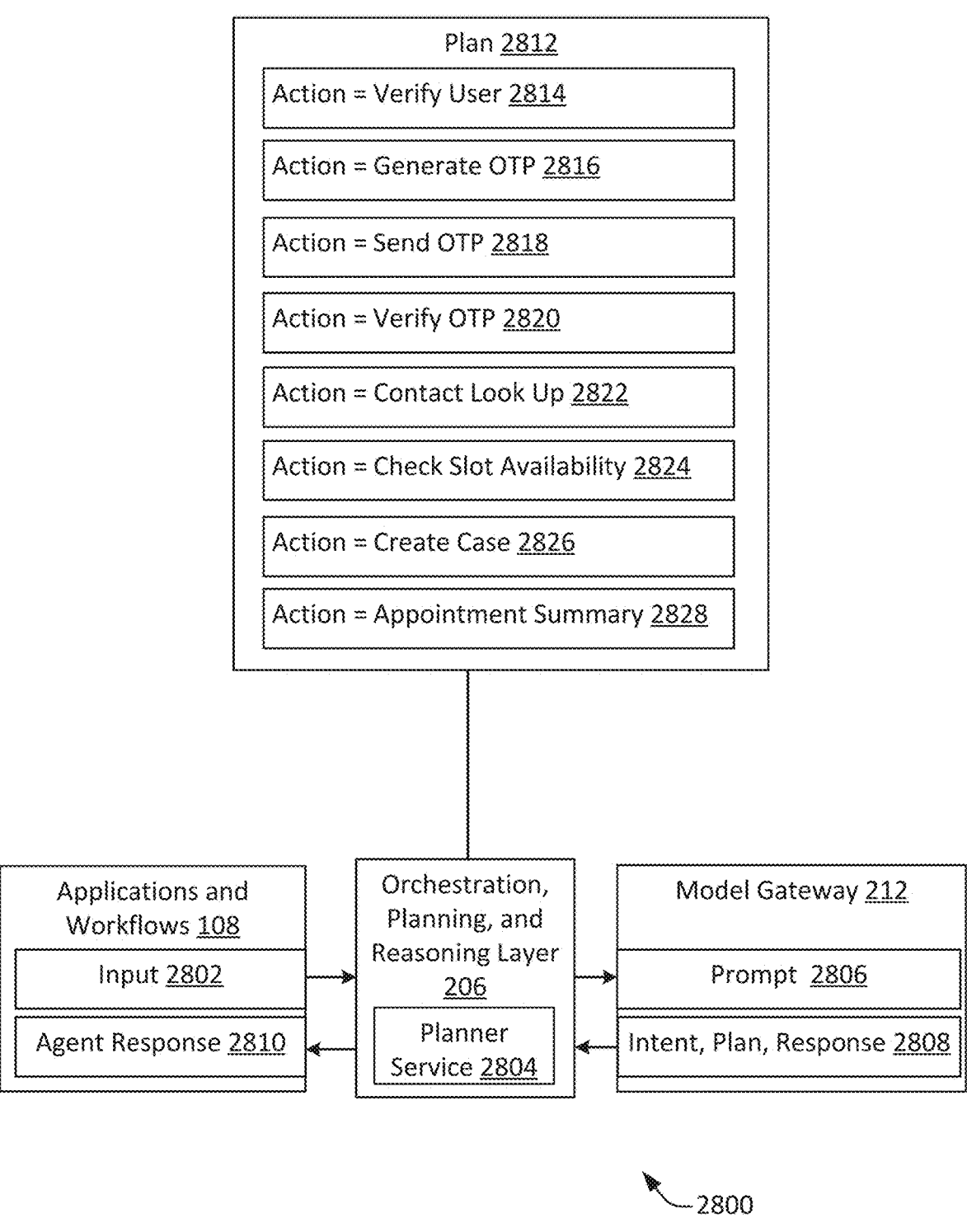
FIG. 28 illustrates an example of an agent execution flow, performed in accordance with one or more embodiments.

Agents may be instantiated, executed, and monitored in accordance with metadata entries created as discussed herein. FIG. 28 illustrates an example of an agent execution flow 2800, performed in accordance with one or more embodiments. The agent execution flow 2800 is presented to illustrate how interaction with an autonomous agent provided via the autonomous agent platform architecture 200 may be instantiated and executed.

Input 2802 is received via one or more of the applications and workflows 108. In the flow 2800 shown in FIG. 28, the input 2802 includes a request to book an appointment provided by a user as natural language input via a chat interface. However, different types of input may be provided in other flows. For example, the input may be a request to initiate a workflow within the computing services environment 100. As another example, the input may be generated by an application rather than a user. As yet another example, the input may be a request to interact with a database object within the computing services environment 100. As discussed herein, any of a variety of triggering conditions may trigger the instantiation and execution of an autonomous agent.

The input 2802 is received by a planner service in the orchestration, planning, and reasoning layer 206. The planner service may evaluate the input to determine one or more operations to perform. In the case of natural language input, the planner service 2804 may analyze the natural language input to determine an intent reflected in natural language. For instance, the planner service 2804 may determine and transmit an input prompt 2806 to a generative language model via the model gateway 212. The generative language model may then determine a prompt completion which is returned to the planner service 2804 as a response 2808.

In some embodiments, the response 2808 may identify one or more actions to perform within the computing services environment. Such actions may be identified by the generative language model by selecting from descriptions of actions included in the input prompt. For instance, the input prompt may include a menu of actions that may potentially be performed in the course of responding to the input 2802, and the generative language model may determine a selection of those actions to be performed.

In some embodiments, the initial response returned at 2808 may identify a topic. The planner service 2804 may use the topic to identify a subset of actions that potentially may be executed to fulfill the intent reflected in the input 2802. Descriptions of the subset of actions may then be provided to a generative language model along with the initial input. Based on the input and the descriptions of the subset of actions, the generative language model may select one or more of the subset of actions to formulate a plan. The plan may identify the selected actions, for instance via unique identifiers, for execution by the computing services environment 100.

In the example flow 2800 shown in FIG. 28, the actions to be performed to respond to the user request to book an appointment are shown in the plan 2812. These actions include verifying the user at 2814, generating a one-time password at 2816, sending the one-time password at 2818, verifying the one-time password at 2820, looking up a contact at 2822, checking for appointment slot availability at 2824, creating a case at 2826, and determining a summary of the appointment at 2828. However, other agents, or the same agent provided with different inputs, may determine and execute a different plan.

In some embodiments, executing one or more of the actions included in the plan 2812 may involve determining additional input prompts to transmit to the model gateway 212. For instance, determining an appointment summary at 2828 may involve creating an input prompt that includes a natural language instruction to determine a summary, as well as information about the appointment that a generative language model may use to create the summary.

In some embodiments, executing one or more of the actions included in the plan 2812 may involve actions taken by the computing services environment 100 that do not directly involve a generative language model or the model gateway 212. For instance, the computing services environment 100 may communicate with a client machine to send a one-time password at 2818, look up a contact for the user in a database at 2822, communicate with an external system to check for slot availability at 2824, and/or perform other such operations that do not necessarily involve generating novel text via a generative language model.

According to various embodiments, agents may be triggered in any of various ways. However, one way in which an agent may be instantiated and executed is via an interactive chat with a user via a communication channel. An interaction between a user and an autonomous agent may develop in any of various ways. Such complexity may facilitate a more organic, intuitive, natural experience for users, as opposed to an experience that feels to the user as if they are interacting with a computer.

Figure 29:
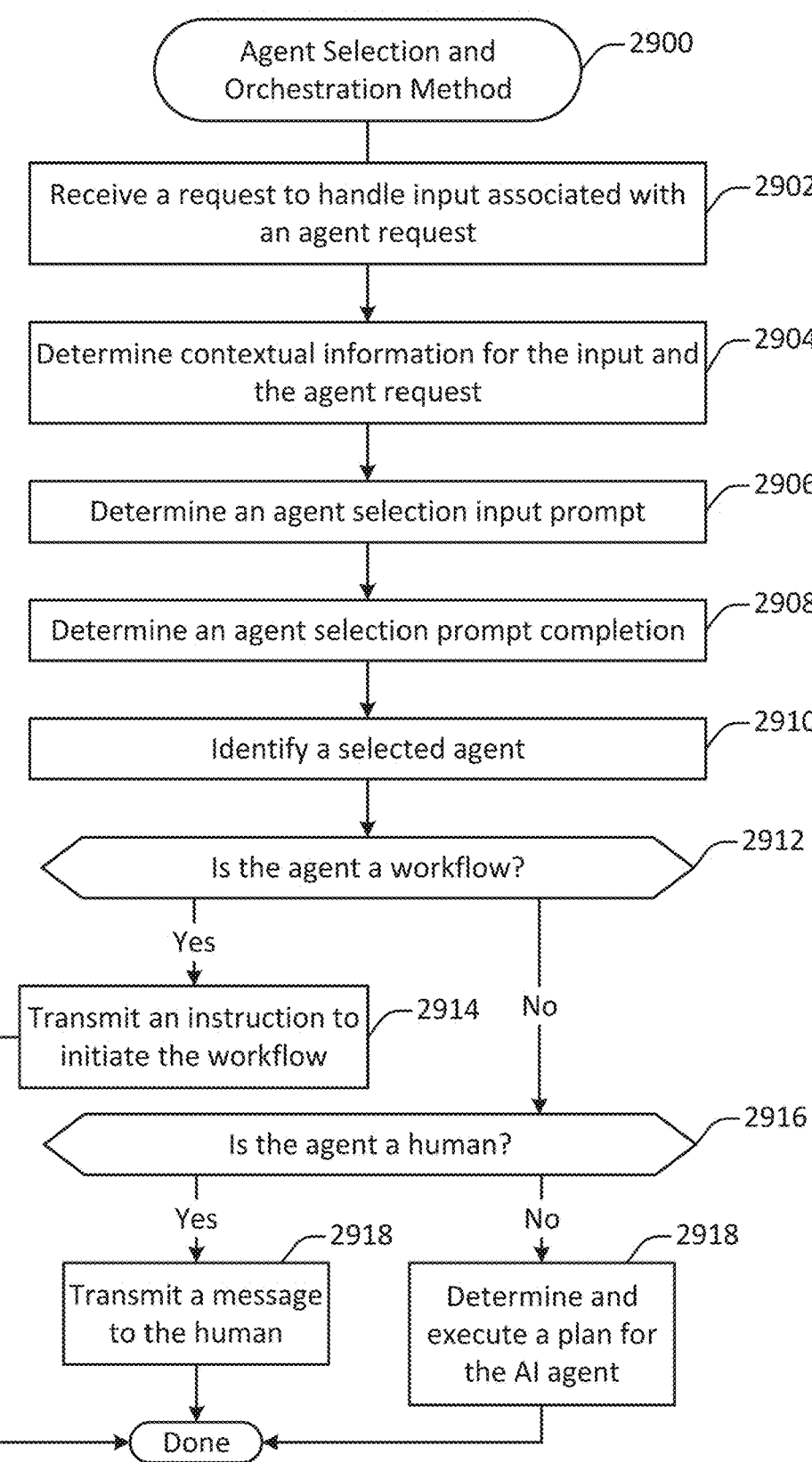
FIG. 29 illustrates a method of orchestrating a request across various types of agents, performed in accordance with one or more embodiments.

FIG. 29 illustrates a method 2900 of orchestrating a request across various types of agents, performed in accordance with one or more embodiments. The method 2900 may be performed by a computing services environment such as the computing services environment 100 shown in FIG. 1.

According to various embodiments, the method 2900 characterizes a process in which a particular agent is selected from a set of potential agents. That is, user input may be processed to support operations such as dynamic planner and/or agent selection, entity and/or entity type disambiguation based on additional user input, information enrichment, plan generation and clarification based on user input, and other such operations.

A request to handle input is received at 2902. In some embodiments, the input may be, user input, which may include may include natural language text, other types of media, a selection of an action to perform based on a button provided in a chat interface, and/or any other type of user input. Alternatively, the input may be automatically generated based on a triggering condition detected in the computing services environment, a request sent by an application or workflow, and/or any other suitable type of input.

In some embodiments, user input may be provided via a communication channel in the context of a conversational chat interface. The conversational chat interface may be exposed to a user at a client machine via any of a variety of communication channels. Such channels may include, but are not limited to, web applications, mobile applications, and messaging services (e.g., email, SMS, Slack, WhatsApp, etc.).

Contextual information for the input and the agent request is determined at 2904. According to various embodiments, the contextual information may include, for instance, a conversational chat session, an application accessible via the computing services environment, one or more database objects, and/or any other type of information. The context may therefore reflect past interactions between a user and the autonomous agent, information related to data stored in the computing services environment, the identity of a tenant associated with the autonomous agent, and/or any other suitable information.

According to various embodiments, the context may include any of a variety of types of information. For example, the context may include the text of any messages sent by a user to the autonomous agent or sent from the autonomous agent to the user. As another example, the context may include an indication of one or more actions that were performed in the course of the interaction.

According to various embodiments, the context for the conversational chat interface may include one or more of a variety of factors. For example, the context may identify a customer organization for which the conversational chat interface is generated. As another example, the context may include a communication channel (e.g., a web application, a native application, a Slack channel, etc.) for which the conversational chat interface is generated. As still another example, the context may include data related to the generation of the conversational chat interface. For instance, the context may identify a database record such as a contact or account for a customer organization.

In some embodiments, the context may be determined based on the nature of the request received at 2902. For instance, some or all of the context may be generated when a user loads a customer relations management web application to access a contact record for a customer organization. The context may then be identified as the combination of the customer organization, the web application, and the contact record.

An agent selection input prompt is determined at 2904. In some embodiments, the agent selection prompt may include natural language instructions executed by a generative language model to select an agent for carrying out the user's intent reflected in the user input. Additional details regarding the types of agents and planner services that may be selected via an agent selection input prompt are discussed with respect to FIG. 49.

According to various embodiments, to aid the generative language model in making this determination, the agent selection input prompt may include additional elements of information. For example, the agent selection input prompt may include the user input identified in the request received at operation 2902, the contextual information determined at 2904, and/or other supporting information.

In some embodiments, the agent selection input prompt may include metadata characterizing possible selections. For example, the agent selection input prompt may include metadata describing different agents, which may include information such as descriptions of the situations and/or types of user input a particular agent is or is not well suited to handle. As another example, an agent that includes an AI model may potentially be implemented via one or more planner services. Accordingly, information such as descriptions of the situations, types of user input, and/or agent suitable for use with particular planner services may be included in the agent selection input prompt.

An agent selection prompt completion is determined at 2908. In some embodiments, the agent selection prompt completion may be determined by sending the agent selection input prompt to a generative language model and receiving the agent selection prompt completion in a response message. The agent selection prompt completion may be the agent selection input prompt with the addition of novel text generated by a generative language model executing the natural language instructions included in the agent selection input prompt.

In some embodiments, agent metadata may include a description of a reasoning engine. The description may then be provided to a generative language model. The generative language model may then select an agent based on the agent metadata, the user input, the topic, and/or other information.

In some embodiments, a topic, application, tenant, and/or other contextual element for a communication session may be associated with metadata used to guide the selection of an agent. For example, a tenant may indicate that any requests associated with a particular topic or topics is to be analyzed with a particular reasoning engine.

A selected agent is identified at 2910. In some embodiments, the selected agent may be identified by parsing the agent selection prompt completion to determine an identifier selected by the generative language model that uniquely identifies the agent. In the event that the agent is an AI agent, a selected planner for the AI agent may be identified in addition to the AI agent itself.

A determination is made at 2912 as to whether the agent is a workflow. In some embodiments, the determination may be made by evaluating metadata for the agent selected at 2910.

Upon determining that the selected agent is a workflow, an instruction to initiate the workflow is transmitted at 2914. In some embodiments, transmitting the instruction may involve activating an interface within the computing services environment 100 associated with the workflow. For instance, a message may be sent to an application server or other computing component configured to perform the workflow. A response message to the user may be determined by a generative language model or by the workflow itself based on the execution of the workflow.

Upon determining instead that the selected agent is not a workflow, a determination is made at 2916 as to whether the agent is a human. In some embodiments, the determination may be made in a manner similar to that discussed with respect to operation 2910.

Upon determining that the agent is a human, a message is transmitted to the human. The message may be sent through a web application, a messaging interface, an email interface, or any other suitable communication mechanism. The human may determine a response message to the user, or a response message may be determined by a generative language model.

Upon determining instead that the agent is not a human, a plan for the AI agent is determined and executed at 2918. In some embodiments, the plan may be executed in accordance with the metadata for the AI agent and the selected planner for the AI agent. Additional details regarding the execution of the AI agent are discussed with respect to the method 3000 shown in FIG. 30.

Figure 30:
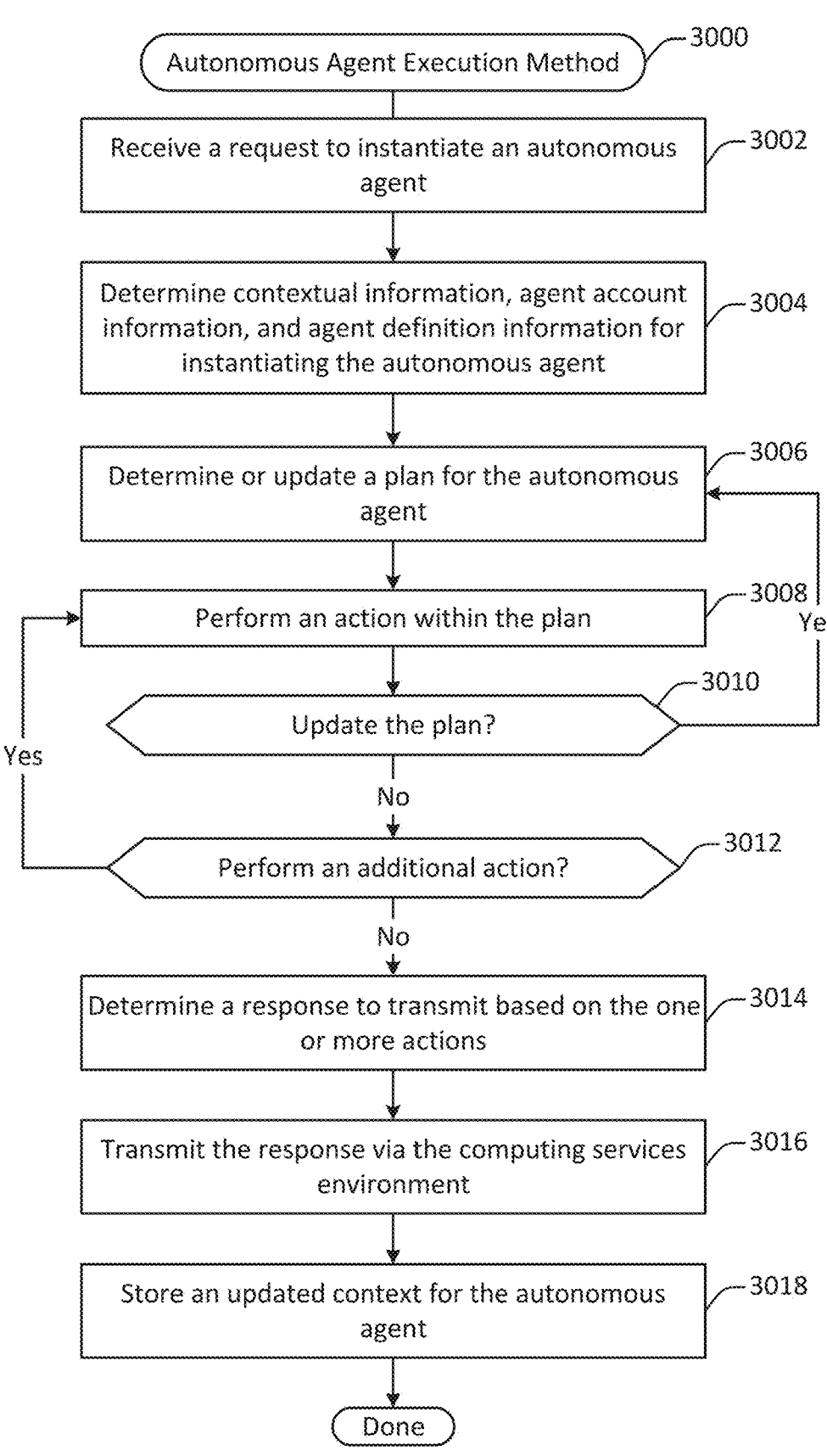
FIG. 30 illustrates an autonomous agent execution method, performed in accordance with one or more embodiments.

FIG. 30 illustrates an autonomous agent execution method 3000, performed in accordance with one or more embodiments. In some embodiments, the method 3000 may be performed to instantiate and execute an autonomous agent within the computing services environment 100 shown in FIG. 1.

A request to instantiate an autonomous agent is received at 3002. In some embodiments, the request may be generated based on natural language input received via a communication channel. Alternatively, or additionally, the input may include other types of information, such as a selection of an action to perform based on a button provided in a chat interface, a request sent by an application or workflow, or another such input indicator.

In some embodiments, the communication channel may be a conversational chat interface. For instance, a conversational chat interface may be provided via a web application, mobile application, or other such service. Alternatively, the communication channel may be a messaging service such as email, SMS, Slack, WhatsApp, or any other suitable service for sending and receiving messages.

In some embodiments, the request to instantiate the autonomous agent may be determined based on the detection of a triggering condition within the computing services environment 100. The triggering condition need not necessarily involve user input. For example, the autonomous agent may be instantiated when it is determined that a database record has been created, or when an existing database record has been updated to include a designated value for a designated field.

Contextual information, agent account information, and agent definition information for instantiating the autonomous agent is determined at 3004. Additional details regarding such state management operations are discussed with respect to the method 3100 shown in FIG. 31.

A plan to execute is determined at 3006. In some embodiments, the user input may include an explicit selection of a workflow, action, or other predefined operations. For instance, the input may include a selection of a button corresponding to an action and presented in a conversational chat interface. In such a situation, the action or actions to be performed may be selected from the predefined operations.

In some embodiments, the user input may be provided via natural language. In such a situation, the user's intent may be less clear and may be determined based on one or more interactions with a generative language model. For instance, natural language text included in the input may be used to determine an intent identification input prompt. The intent identification input prompt may include the input text, a natural language request executable by a generative language model, and/or other types of information. For instance, the intent identification input prompt may include a description of actions capable of being performed via the autonomous agent. The generative language model may then generate novel text that includes one or more identifiers corresponding with the actions to be performed based an analysis of the intent in the input text by the generative language model.

An action to perform to execute the plan is identified at 3008. Initially, the application to execute may be the first action in the plan. Subsequently, one or more additional actions may be performed, for instance as discussed with respect to the plan 3012 shown in FIG. 30.

The action is performed at 3008. According to various embodiments, performing the action may involve executing one or more operations such as sending a message, receiving a message, retrieving data, storing data, generating text via a generative language model, processing or evaluating text, executing an artificial intelligence model other than a generative language model, and/or performing any other suitable operations capable of being performed via the computing services environment 100.

A determination is made at 3010 as to whether to update the plan based on the performed action. In some embodiments, the output of an action may provide additional information, which may be used to determine an updated plan. The determination made at 3010 may depend in part upon the planner being used. For instance, a sequential planner may execute a sequence of actions irrespective of action outcomes, whereas a ReAct-based planner may update a plan after an action is performed.

A determination is made at 3012 as to whether to perform an additional action. According to various embodiments, actions may be performed in sequence or in parallel. Additional actions may continue to be performed until all actions identified as being indicated by the received input have been performed.

Upon determining not to perform additional actions, a response to transmit is determined at 3014 based on the one or more actions. The response is transmitted via at 3016. Transmitting a response may involve operations such as updating one or more records in the database system, transmitting a natural language response via a communication channel, and/or performing other such updating operations within the computing services environment 100.

In some embodiments, the response may include natural language output. For instance, the system may generate a textual summary of actions to be performed, a textual response to a query included in the input, a request for additional information, or the like.

In some embodiments, the response may include data. For instance, data responsive to a user query retrieved from the database system, determined by the computing services environment 100, or identified via some other method may be included.

In some embodiments, the response may include an instruction to an application or workflow. For example, the response may include an indication of suggested next action to be presented in a conversational chat interface for possible selection by a user via user input. As another example, the response may include an indication of an operation to be performed by the application or workflow.

An updated context for the autonomous agent is optionally stored at 3018. The updated context may include information such as conversation participants, messages exchanged as part of a conversation, information retrieved, and/or other such data and metadata. Such information may be stored so that an agent interaction may be resumed at a later point in time. Alternatively, or additionally, such information may be stored to support feedback, auditing, monitoring, and other such operations. Additional details regarding agent state management are discussed with respect to FIG. 31.

Figure 31:
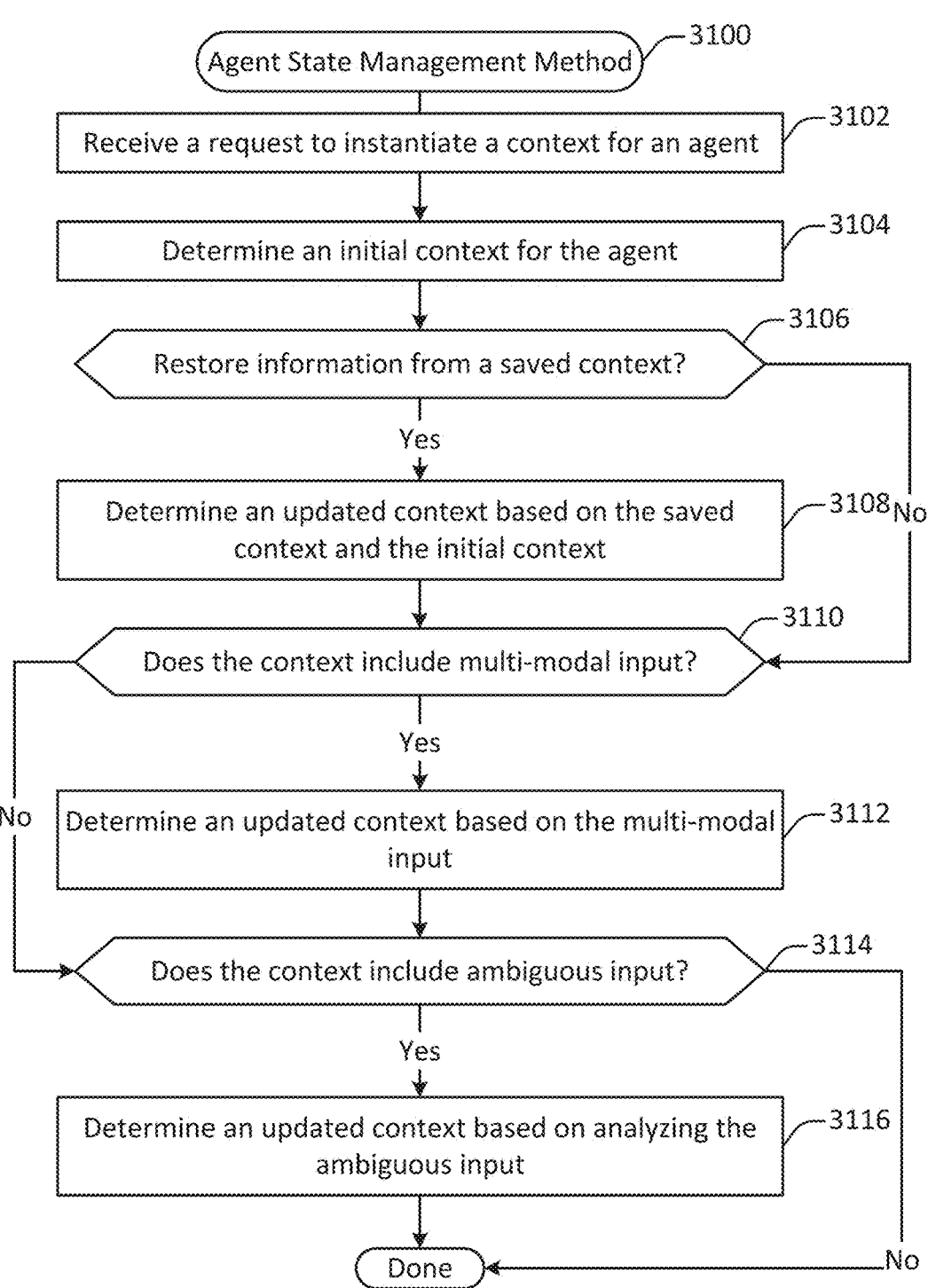
FIG. 31 illustrates a method for managing information state for an agent, performed in accordance with one or more embodiments.

FIG. 31 illustrates a method 3100 for managing information state for an agent, performed in accordance with one or more embodiments. The method 3100 may be performed within the computing services environment 100 in conjunction with the method 3000 to determine and maintain a state.

A request to instantiate a context for an agent is received at 3102. In some embodiments, the request may be generated as discussed with respect to the operation 3004 shown in FIG. 30. The term "context" is used herein in a manner interchangeable with the term "state" and refers generally to runtime information characterizing the operation of an instance of an agent. Thus, in general, the context of one instance of an autonomous agent may differ in various ways from the context of another instance of the same autonomous agent. That is, although the two agent instances are associated with the same definition, they nevertheless may be associated with different runtime data, which may lead to different actions and outputs by the two agent instances.

An initial context is determined for the agent at 3104. According to various embodiments, the context may include any or all of a variety of information. Such information may include, but is not limited to: previously provided user input, previously performed computing services environment actions, previously generated textual responses, one or more topics, information retrieved from a database or other data source, one or more actions performed, and/or other such information.

In some embodiments, the context for an autonomous agent may include the identity of a client organization, user account, or other such identifier associated with the instantiation of the autonomous agent. For instance, the autonomous agent may be instantiated based on a conversation between a human customer and a human agent related to a client organization employing the human agent. In this case, the context may include the identities of any or all of the parties involved.

In some embodiments, the context for the autonomous agent may identify an application or other element of the computing services environment 100 related to the instantiation of the autonomous agent. For instance, the autonomous agent may be instantiated to perform an operation related to a sales data portion of the computing services environment.

In some embodiments, the context for the autonomous agent may identify a topic or topics related to the autonomous agent. For instance, user input may be evaluated by a generative language model to select a topic from a set of available topics. The context may be updated to identify the topic, which may potentially change or be supplemented as an interaction evolves.

A determination is made at 3106 as to whether to restore information from a saved context. In some embodiments, some or all of the context of an autonomous agent may be saved in the database system, for instance when the agent is terminated. Saving the context in this way provides for a variety of types of operations. For example, an agent may be returned to a saved state when a conversation with a human is interrupted and then resumed. As another example, an agent may be restored to a saved state for the purpose of testing, auding, refining, and evaluation.

In some embodiments, the determination made at 3106 may be made based at least in part on the initial context determined at 3104. The initial context may include an explicit request to resume a previous session with an agent. Alternatively, or additionally, the initial context may include information, such as a user identifier, organization identifier, and the like, which collectively match a saved context for the agent.

Upon determining to restore information from a saved context, an updated context is determined at 3108 based on the initial context and the saved context. The updated context may entirely replace the initial context with the saved context, or may replace or supplement portions of the initial context with the saved context, depending on the configuration and contexts.

A determination is made at 3110 as to whether the context includes multi-modal input. In some embodiments, multi-modal input may include non-textual input such as images, videos, audio, or the like. Such information may be included in user input or may be retrieved from a data source.

Upon determining that the context includes multi-modal input, such input is processed and used to determine an updated context at 3112. Processing multi-modal input may involve summarizing such input so that it may be interpreted by the agent, for instance via a generative language model. For example, a summary of the multi-modal input may be added to the context. Additional details regarding the processing of multi-modal input are discussed with respect to the method 4700 shown in FIG. 47.

A determination is made at 3114 as to whether the context includes ambiguous user input. In some embodiments, ambiguous user input may include natural language input whose meaning is unclear. For example, the term "Buffalo" may refer to either a city or an animal. As another example, the term "Acme record" may potentially refer to two different database records, such as an "Acme opportunity" record and an "Acme contact" record.

According to various embodiments, when ambiguities are present in the context, they typically arise in the form of natural language user input received via a communication channel. Such ambiguities may be detected by applying a data retriever to the natural language input and receiving multiple responses, such as conflicting search results or multiple database records. Alternatively, or additionally, such ambiguities may be determined by a generative language model tasked with identifying potentially ambiguous language included in user input.

Upon determining that ambiguous input is present, an updated context is determined at 3116 based on analyzing the ambiguous input. Additional details regarding the analysis of ambiguous input are discussed with respect to the method 4700 shown in FIG. 47.

In some embodiments, one or more of the operations shown in FIG. 31 may be performed after the initial context is determined. For example, the agent's context may be updated after the performance of an action. For instance, an action may be performed to generate additional text to include in a communication session, or to retrieve information from a database system. Such information may then be used to update the agent's context, so that subsequent actions may be determined and performed based on the newly determined information. Updating the agent's context may involve operations such as resolving ambiguities and/or processing multi-modal input.

Figure 32:
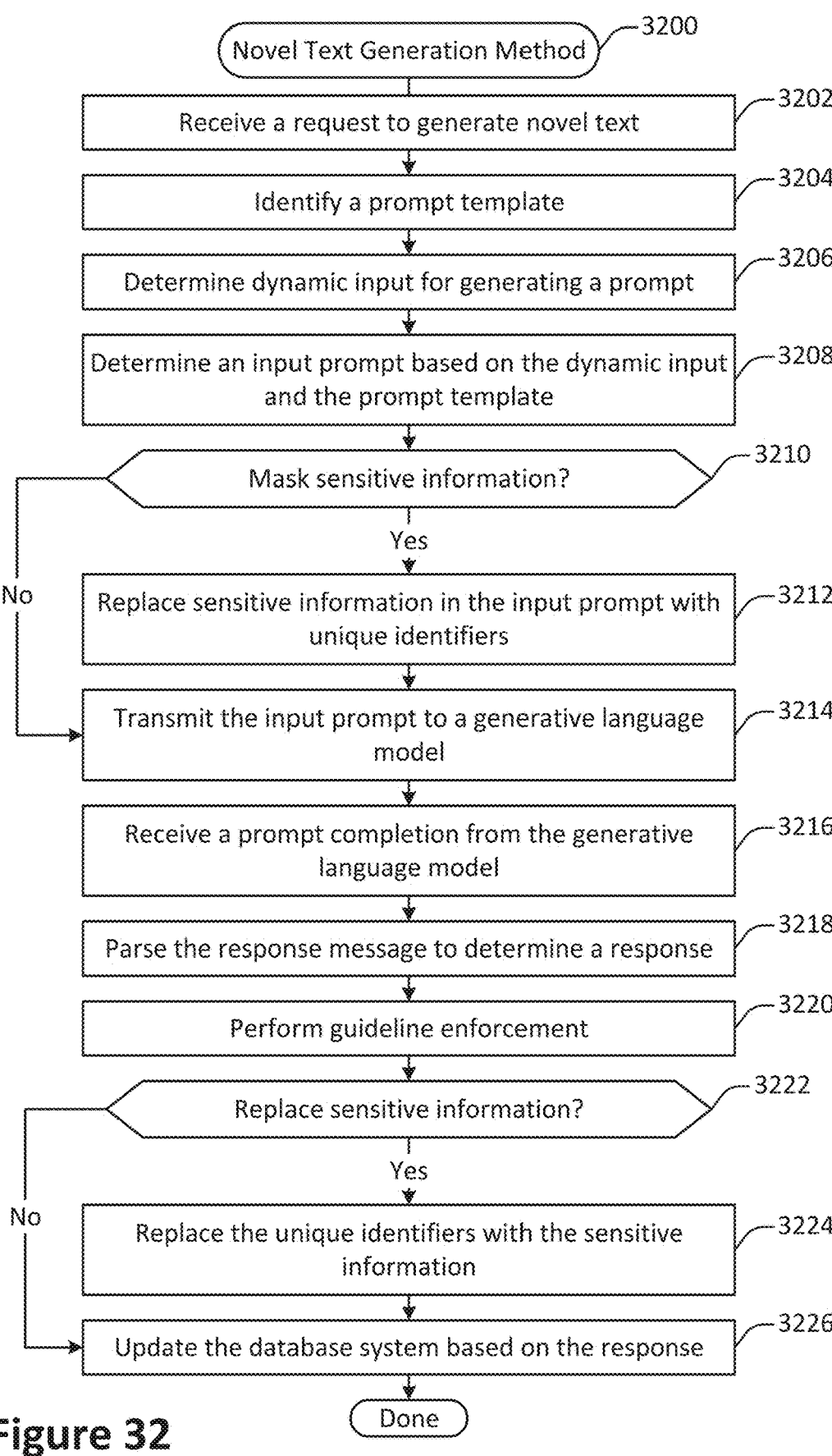
FIG. 32 illustrates a method for generating novel text, performed in accordance with one or more embodiments.

FIG. 32 illustrates a method 3200 for generating novel text, performed in accordance with one or more embodiments. The method 3200 may be performed at the computing services environment 100. The method 3200 may be performed in order to complete a prompt in the course of executing an orchestration plan such as a plan determined as discussed with respect to FIG. 28, FIG. 29, FIG. 30, and/or elsewhere in the application.

According to various embodiments, an orchestration plan may include one or more operations to perform to execute the intent. For example, a contact record summarization orchestration may include a first operation to perform a vector search of a database system to identify a contact record for Alexandra, and a second operation to determine and complete a generative language model prompt summarizing the information included in the contact record.

In particular embodiments, the method 3200 may be executed multiple times to determine a natural language response. For example, an initial natural language instruction to "Summarize Alexandra's record" may prompt a clarifying natural language response stating that: "Alexandra has both a contact and an account record. Would you like me to summarize Alexandra's contact record or Alexandra's account record?" The method 3200 may then be executed again to produce the summary based on a clarifying response provided by the user.

According to various embodiments, client organizations can specify the type of operations being performed. For example, an agent may implement a stepwise process in which a sequence of steps is executed in order, potentially with branches and/or dependencies. As another example, an agent may implement a set of operations performed in parallel or all at once. As still another example, an agent may implement a complex interrelated set of operations organized in a graph structure, the execution of which is interdependent. Standard orchestrations may be used, or a client organization can provide its own orchestrations. Further, an agent may trigger other agents or orchestrations, and/or be used to determine which of a set of orchestrations to execute.

In some embodiments, natural language may be used to generate prompts. For example, a client organization may specify the content of prompts to use in a prompt builder, either manually or by describing a prompt in natural language.

A request to execute a prompt is received at 3202. In some embodiments, the request may be generated by an autonomous agent. For example, the request may be generated in the course of executing an action included in a plan. For instance, the action may involve drafting an email, determining a summary of a record, or generating novel text in any of various types of situations.

A prompt template is identified at 3204. According to various embodiments, the particular prompt template identified at 3204 may depend in significant part on the context. For instance, the prompt template may be identified based on the request received at 3202, which may identify an action configured in accordance with techniques and mechanisms discussed herein. For example, an action to generate a summary of a database record may include as input a database record identifier and may be associated with a prompt template for summarizing the information. The prompt template for summarizing the database record may include fillable fields corresponding with fields associated with the database record, as well as natural language instructions to be executed by the generative language model to generate novel text summarizing the record.

Dynamic input for generating an input prompt is determined at 3206. In some embodiments, some or all of the dynamic input information may be retrieved from the database system. For instance, a record identifier may be used to query the database system to retrieve fields corresponding with a database object. Alternatively, or additionally, some or all of the dynamic input information may be retrieved from a different data source, such as via an external API.

In some embodiments, some or all of the dynamic input information may be determined based on an interaction with an autonomous agent. For instance, some or all of natural language input provided by an end user and/or natural language output generated in response by an autonomous agent may be identified for inclusion in the prompt. In this way, the generative language model may be provided with the natural language context associated with the request to generate novel natural language.

An input prompt is determined at 3208 based on the dynamic input and the prompt template. In some embodiments, determining the dynamic input may involve replacing one or more fillable portions of the prompt template with some or all of the dynamic input information determined as discussed with respect to the operation 3206.

A determination is made at 3210 as to whether to mask sensitive information. In some embodiments, the determination may be made at least in part based on configuration information. For example, some types of database fields, action inputs, or other information may be identified as including personally identifying information.

Upon determining to mask sensitive information, sensitive information in the prompt is identified and replaced with unique identifiers at 3212. In some embodiments, sensitive information may be identified as such by the database system, for instance when it is retrieved from the database. Alternatively, or additionally, sensitive information may be identified dynamically, for instance by analyzing the prompt to identify information such as names, addresses, identifiers, and other such information.

In some embodiments, the use of a unique identifier may allow sensitive information to be replaced when the completion is received from the generative language model. For example, a name may be replaced with an identifier such as "NAME OF PERSON 36324". As another example, an address may be replaced with a more general description of a place, such as "LOCATION ID 53342 CITY, STATE, COUNTRY", with the street and building number omitted. As yet another example, a database record identifier may be replaced with a substitute identifier.

The input prompt is transmitted to a generative language model for execution at 3214. In some embodiments, the input prompt may be sent to the generative language model via the model gateway 212. The particular generative language model to which the prompt is sent may be dynamically determined. For instance, different generative language models may have different characteristics. Accordingly, the input prompt may include elements tailored to the specific generative language model to which the input prompt is sent.

A prompt completion is received from the generative language model at 3216. According to various embodiments, the prompt completion may include novel text determined by the generative language model based on the raw prompt. The prompt completion may be received in a response message via the model gateway 212 shown in FIG. 2.

The response message is parsed at 3218 to determine a response. In some embodiments, parsing the response message may include extracting the novel text from the response message and optionally performing one or more post-processing operations on the novel text. For instance, the novel text may be placed within a response template or combined with information retrieved from the database system.

Guideline enforcement is performed at 3220 based on the response. In some embodiments, guideline enforcement may involve operations such as evaluating the response for toxicity, bias, factuality, and/or other such considerations. Additional details regarding guideline enforcement are discussed with respect to the method 3300 shown in FIG. 33.

In some embodiments, information about bias may be determined instead of, or in addition to, a toxicity score. Bias detection may involve evaluating generated text to determine, for instance, whether it favors a particular point of view.

A determination is made at 3222 as to whether to replace sensitive information in the completion. The determination may be made based on whether sensitive information was masked at operations 3210 and 3212. Upon determining to replace sensitive information, the unique identifiers added to the prompt at 3212 may be replaced with the corresponding sensitive information at 3224.

The database system is updated based on the response at 3226. According to various embodiments, updating the database system may involve storing, removing, or updating one or more records in the database system. For instance, the response may include novel text to include in a database system record. Alternatively, or additionally, updating the database system may involve transmitting a response to a client machine, an application server, or another recipient. The response may include some or all of the novel text. As still another possibility, updating the database system may involve sending an email or other such message including some or all of the novel text.

In some embodiments, updating the database system may involve storing and/or transmitting information related to guideline enforcement. For example, a toxicity score, bias score, factuality score, or other such evaluative information may be presented in a graphical user interface of a web application in which the novel text determined by the generative language model is shown.

In some embodiments, a prompt template may be associated with a prompt class. For example, a system prompt template may be configured and executed by the computing services environment provider. As another example, a user prompt template may be configured and executed by a user of the database system. As yet another example, an autonomous agent prompt template may be configured and executed in the context of a messaging interaction.

In some embodiments, some elements discussed with respect to the method 3200 shown in FIG. 32 may be determined based at least in part on a security level associated with a prompt template. For example, a system prompt template may have no need for checks related to injection attacks. However, protections against injection attacks may be required for an assistant prompt template or a user prompt template. For example, a system prompt template may have no need for checks related to toxicity, bias, and the like. However, protections against toxicity and bias may be optionally specified as configuration parameters for an assistant prompt template or a user prompt template.

In some embodiments, specific metadata instructions may be included at the agent template level for restricting the actions taken by autonomous agents. Such instructions can be customized by a person configuring the autonomous agent. For instance, such instructions may be specified in the course of performing operation 1512 and/or other operations shown in FIG. 15. An example of such instructions is as follows:

Objective: Provide accurate, helpful, and empathetic customer support while adhering to strict guidelines.

Guidelines:

Data Privacy: Avoid sharing or accessing any personally identifiable information (PII).

Product Knowledge: Respond accurately to product-related inquiries based on available information.

Problem-Solving: Focus on resolving customer issues efficiently and effectively.

Tone: Maintain a professional, empathetic, and patient tone throughout interactions.

Escalation: Clearly identify and escalate issues requiring human intervention.

Compliance: Adhere to company policies, legal regulations, and industry standards.

Avoidances: Refrain from making speculative statements, providing medical or legal advice, or engaging in personal conversations.

In some embodiments, a guideline process may be used to trigger an escalation from an autonomous agent to a human agent. For example, a topic classification confidence score may indicate a degree of confidence of the classification of a human utterance to a topic. This score, along with other trust metrics, may trigger the escalation if one or more confidence thresholds falls below a designated threshold. The other trust metrics may include, but are not limited to, bias, toxicity, and factuality.

Figure 33:
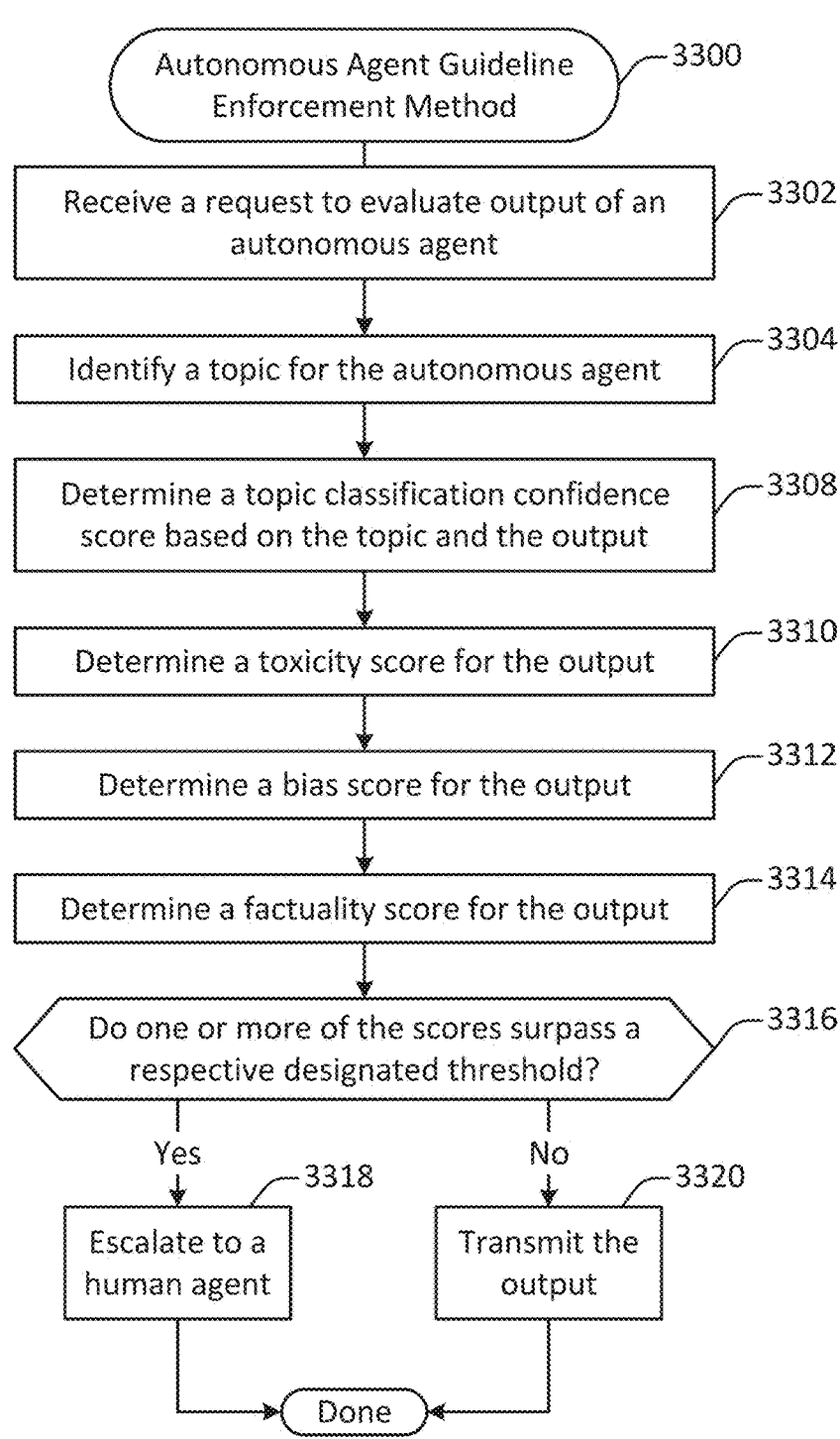
FIG. 33 illustrates a method for enforcing one or more agent guidelines, performed in accordance with one or more embodiments.

FIG. 33 illustrates a method 3300 for enforcing one or more agent guidelines, performed in accordance with one or more embodiments. The method 3300 may be performed at a computing services environment such as the computing services environment 100 shown in FIG. 1.

A request to evaluate output of an autonomous agent is received at 3302. The output may include novel text determined by a generative language model. The request may be received, for instance, in the course of providing output via a conversational chat interface, generating an email, or determining any other type of text. Such a request may be generated automatically, for instance via a trust layer when the autonomous agent generates novel text.

A topic is identified for the autonomous agent at 3304. In some embodiments, the topic may be stored within a state of the autonomous agent.

A topic classification confidence score is determined at 3308. In some embodiments, the topic classification confidence score may be determined by evaluating the output for relevance to the topic. A topic may be determined, as discussed herein, based on natural language user input received via a communication channel.

In some embodiments, a topic classification confidence score may be determined via a generative language model. For instance, a generative language model may be provided with a prompt that includes information such as natural language input, a topic into which the natural language input has been classified, and a description of the topic. Information about other topics into which the natural language input has not been classified may also be provided. The generative language model may also be provided with one or more natural language instructions to rate the topic classification on one or more dimensions characterizing the extent to which the natural language input reflects the topic. The generative language model may also be provided with one or more examples assigning example scores to example topic classifications for example user input.

A toxicity score is determined for the output at 3310. In some embodiments, the toxicity score may evaluate the novel text determined by the generative language model via a toxicity model configured to evaluate text toxicity. The toxicity model may identify text characteristics such as sentiment, negativity, hate speech, harmful information, and/or stridency, for instance based on the presence of inflammatory words or phrases, punctuation patterns, and other indicators.

In some embodiments, the generative language model may be provided with a prompt that includes information such as text and one or more natural language instructions to rate the text on one or more dimensions characterizing the extent to which the natural language input reflects characteristics associated with toxicity. The generative language model may also be provided with one or more examples assigning example scores to example text.

A bias score is determined for the output at 3312. In some embodiments, the bias score may evaluate the output based on bias based on factors such as race, sex, gender, nationality, age, and/or other characteristics.

A factuality score is determined for the output at 3314. In some embodiments, the factuality score may evaluate the output based on fidelity to facts, such as information included in the agent's context. According to various embodiments, such scores may be determined by appropriate text classification models.

In some embodiments, a factuality score may be determined via a generative language model. For instance, a generative language model may be provided with a prompt that includes information such as natural language input, natural language output, information retrieved via RAG, and/or other contextual information. The generative language model may also be provided with one or more natural language instructions to rate the natural language output on one or more dimensions characterizing the extent to which it is supported by and grounded in the natural language input, information retrieved via RAG, and/or other contextual information. The generative language model may also be provided with one or more examples assigning example scores to example sets of input and output.

According to various embodiments, the scores determined at 3310 through 3314 represent non-exhaustive examples of the types of scores that may be determined. The specific scores determined may depend in significant part on the context in which the autonomous agent is operating. For example, factuality may be of greater importance in some contexts, whereas bias may be of greater importance in other contexts.

A determination is made at 3316 as to whether one or more of the scores falls below a respective designated threshold. Upon determining that a threshold is not met, the system may escalate the interaction to a human agent at 3318 rather than proceeding with the output. Upon determining instead that the threshold is met, the system may transmit the output as planned at 3320.

Figure 34:
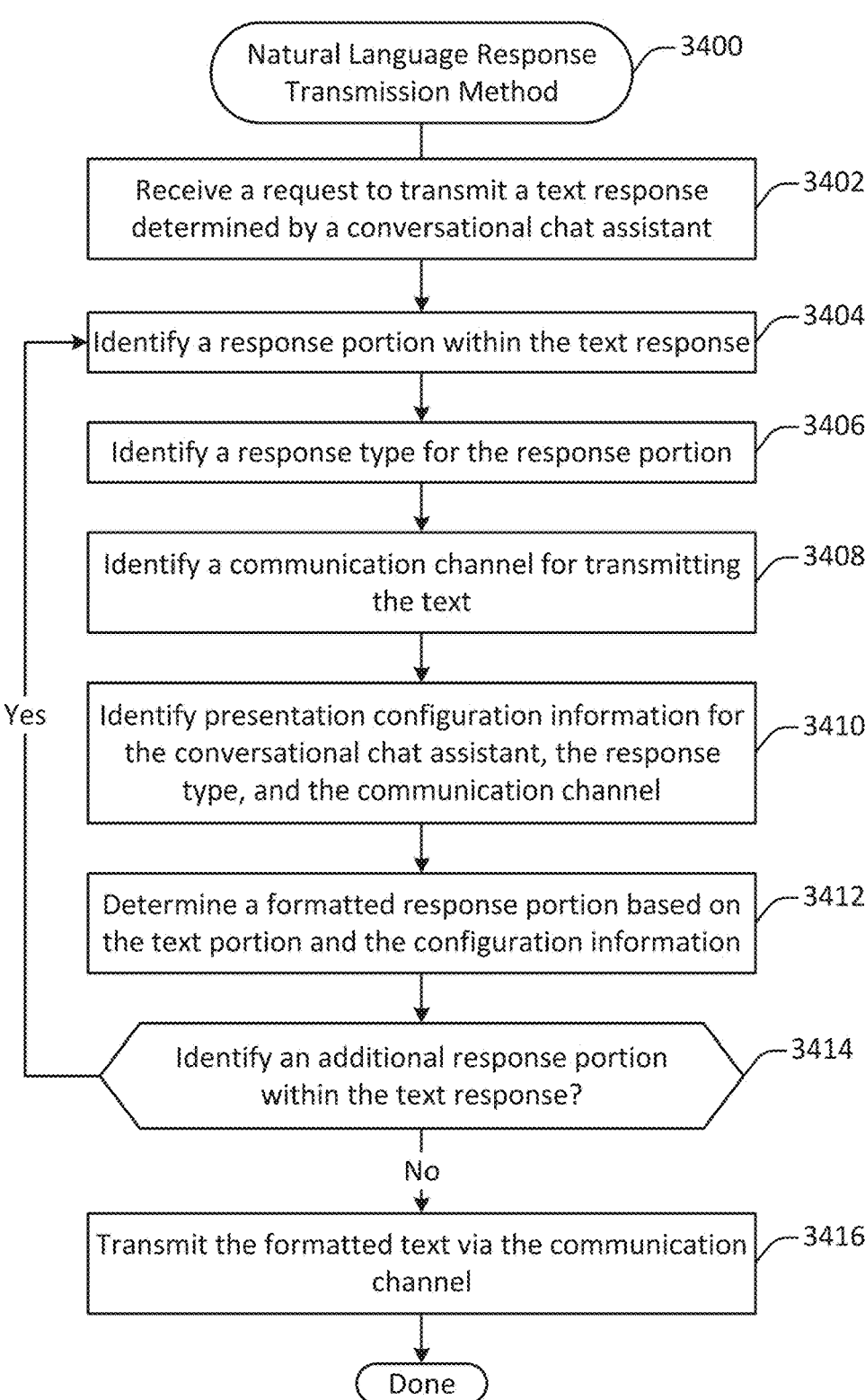
FIG. 34 illustrates a method for transmitting a natural language response generated by a conversational chat assistant, performed in accordance with one or more embodiments.

FIG. 34 illustrates a method 3400 for transmitting a natural language response generated by a conversational chat assistant, performed in accordance with one or more embodiments. The method 3400 may be performed at the computing services environment 100 shown in FIG. 1.

A request to transmit a text response determined by a conversational chat assistant is received at 3402. In some embodiments, the request may be received in the course of facilitating an interaction between an end user and the conversational chat assistant via a communication channel. For instance, the user may provide user input, in response to which the conversational chat assistant may generate a text response. The text response may be generated based on a prompt completion provided by a generative language model or may be generated in some other way, for instance via a predetermined text response template.

A response portion within the text response is identified at 3404. In some embodiments, a response portion may correspond to a type of output, such as information associated with a list of objects retrieved from a database system, a text message, a uniform resource locator, or any other type of information that can be transmitted via the communication channel.

The response type for the response portion is identified at 3406. In some embodiments, the response type may be specified via a tag or other indicator. For instance, a list may be identified via a tag such as "<list>".

According to various embodiments, any of various response types may be supported. For instance, different database object types may be associated with different formatting requirements.

A communication channel for transmitting the text is identified at 3408. In some embodiments, the communication channel may be determined based on the interaction between the client machine and the computing services environment 100. For example, as discussed herein, such interactions may be conducted via a conversational chat interface in a website, native application, web application, or the like. As another example, such interactions may be conducted via a messaging service such as email, SMS, Slack, or Microsoft Teams.

Configuration information for the conversational chat assistant, the response type, and the communication channel is identified at 3410. According to various embodiments, such information may be determined as based on configuration information associated with the autonomous agent configured as a conversational chat assistant.

A formatted response portion is determined at 3412 based on the configuration information and the response portion. In some embodiments, determining the formatted response portion may involve applying metadata to the response portion to support its presentation at the client machine. Such information may be determined in a manner specific to the communication channel. For instance, in some communication channels the text formatting may be applied via HTML markup. However, other approaches may be employed in other communication channels.

A determination is made at 3414 as to whether to identify an additional response portion within the text response. In some embodiments, the determination may be made based on whether the text response includes additional response portions associated with presentation configuration information. Upon determining not to identify an additional response portion, the formatted text is transmitted at 3416 via the communication channel.

Figure 35:
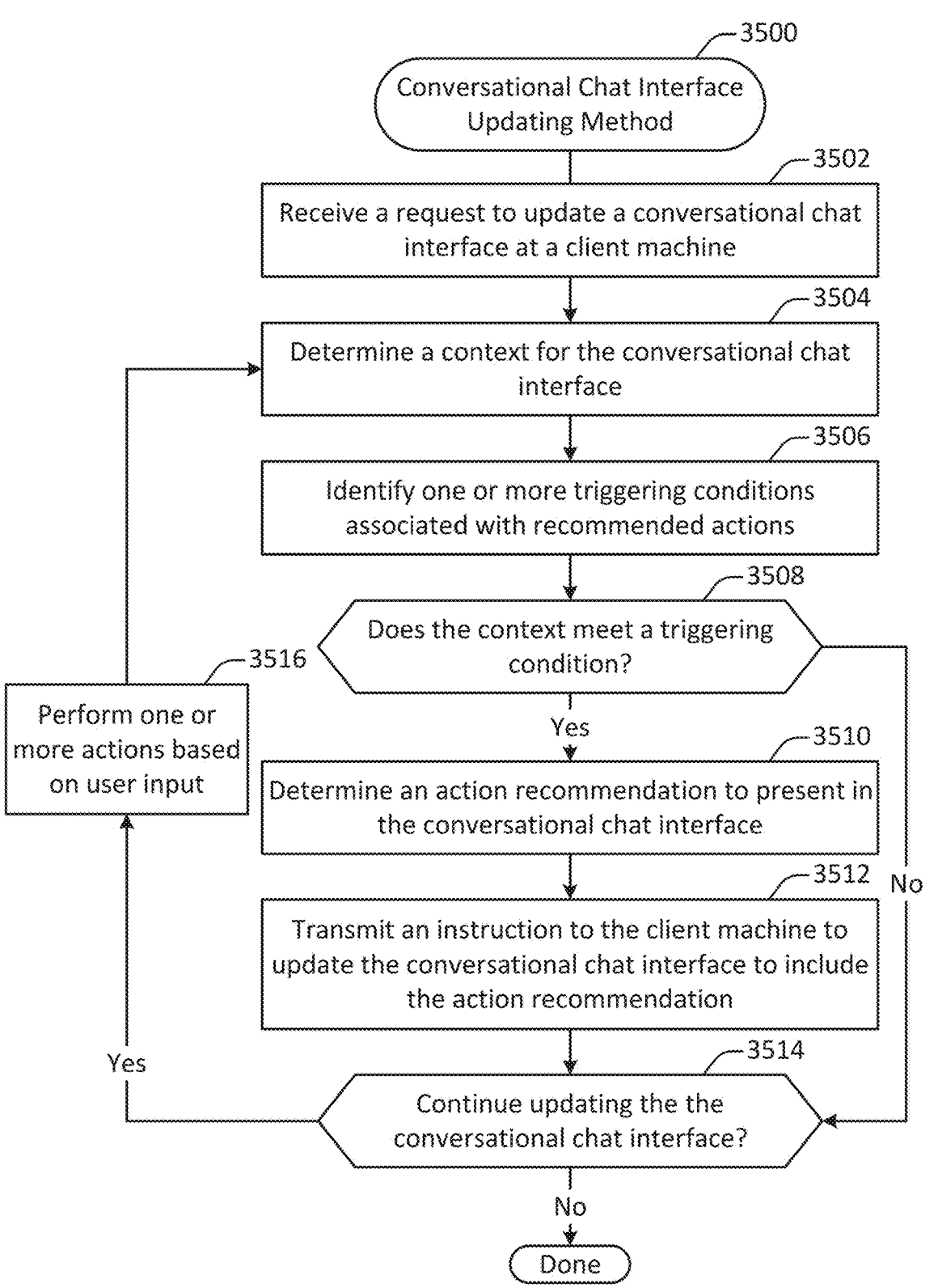
FIG. 35 illustrates a method for updating a conversational chat interface with a recommended action, performed in accordance with one or more embodiments.

FIG. 35 illustrates a method 3500 for updating a conversational chat interface, performed in accordance with one or more embodiments. The method 3500 may be used to provide a recommended next action. For instance, the recommended next action may be determined based at least in part on the configuration information determined as discussed with respect to the method 1900 shown in FIG. 19.

A request to update a conversational chat interface is received at 3502. According to various embodiments, the conversational chat interface may be provided in the course of conducting an interaction between an autonomous agent operating within the computing services environment 100 and a user of a client machine authenticated to a user account at the computing services environment 100.

In some embodiments, the request may be received at 3502 when, for instance, the autonomous agent has determined or is determining a response to provide to the user via the conversational chat interface. For instance, the request may be received when the system is reporting the result of performing an action, providing text generated based on an interaction with a generative language model, or sending some other output to the client machine for presentation in the conversational chat interface.

In some embodiments, the request may be received when a user interface is generated. For instance, a user interface may be generated in a web application, a native application, a mobile application, a web browser plugin, or another type of user interface.

In some embodiments, the request may be received in the course of providing a response to a user. For example, as shown in FIG. 37, a natural language user request at 3702 to identify a top opportunity may be addressed with a response at 3704 identifying an opportunity satisfying the request. As another example, as shown in FIG. 36, a user request to summarize a contact at 3602 may yield a response at 3606 summarizing the record.

A context for the conversational chat interface is determined at 3504. In some embodiments, the context may be determined substantially as discussed with respect to operation 2904.

One or more triggering conditions associated with recommended actions are identified at 3506. In some embodiments, the one or more triggering conditions may include any conditions associated with an action recommendation as discussed with respect to the operation 1808 shown in FIG. 18. Such information may be retrieved from the database system.

In some embodiments, a default action may be presented. The default action may be determined by the customer organization or by the computing services environment provider. For example, a web application for presenting a contact record may be associated with a default action to summarize the contact record.

In some embodiments, a deterministic action may be presented. The deterministic action may be determined based on one or more operations performed in the context of the conversational chat interface. For instance, performing an action such as summarizing a record may lead to the presentation of an action for drafting an email that includes the summary.

In some embodiments, a non-deterministic action may be presented. The non-deterministic action may be determined based on a response provided by an artificial intelligence model such as a generative language model. For instance, a generative language model may be provided with a prompt that includes information such as the context determined at 3104, 3108, 3112, 3116, and/or elsewhere, natural language input provided by the user, one or more prior actions performed by the user, and/or the identity of the user. As one example, the system may learn that one user typically requests to draft an email after summarizing a contact record, while another user typically asks to view opportunities related to the contact record. As another example, the system may learn that users would typically like to view opportunities related to the record when opportunities exist having a value above a designated threshold, while users would typically like to draft an email when no such opportunities exist.

A determination is made at 3508 as to whether the context determined at 3504 meets a triggering condition identified at 3506. Upon determining that the context meets a triggering condition, an action recommendation to present in the conversational chat interface is determined at 3510. In some embodiments, determining the action may involve identifying which action is associated with the triggering condition, such as the associated action identified at operation 1804 shown in FIG. 18.

An instruction to update the conversational chat interface to include the action recommendation is transmitted to the client machine at 3512. In some embodiments, the instruction may identify the action to present in the conversational chat interface. For instance, the action may be presented as a button, a drop-down menu, or another user interface affordance. The nature of the instruction may depend in significant part on the conversation channel in which the conversational chat interface is being presented.

A determination is made at 3514 as to whether to continue updating the conversational chat interface. In some embodiments, the determination may involve detecting one or more events generated by the client machine. Various types of user input may be received. For example, user input may include natural language text entered in the conversational chat interface. As another example, user input may include the detection of a button click corresponding with an action.

Upon determining to continue updating the conversational chat interface, one or more actions are performed at 3516 based on user input. In some embodiments, the conversational chat interface may continue to be updated so long as additional user input is received. Additional details regarding the types of user input that may be received and the types of actions that may be performed are discussed throughout the application. Additional actions may be performed as discussed with respect to the method 3000 shown in FIG. 30.

In some embodiments, the method 3500 may be used to perform metadata-driven contextual interactions. For example, a user may first select an action to generate a summary of a record, and may then provide input to generate an email based on the summary. The system may generate novel text for both the summary and the email, and may dynamically determine new actions to present in the user interface for future interactions. In this example, the system is determining two different types of outputs: (1) novel text to include in the conversational chat interface, summary, and email, and (2) dynamically determined action buttons for performing new actions via the conversational chat interface. These different types of outputs are dynamically determined based on four different types of inputs: (1) the natural language input provided by the user, (2) the context in which the user input is provided (e.g., a web application), (3) the data the user is interacting with, and (4) metadata associated with the context (e.g., configuration parameters specific to the customer organization). Thus, the system can generate text and action recommendations that are highly customized to the user's context. For instance, when the user issues a natural language instruction to "Add some of our products to it", the system can determine that "it" refers to the email that the system previously drafted, execute a workflow to determine product recommendations based on the content of the email, the user, the customer organization, and the records being accessed, and then call a generative language model to generate an updated email based on the retrieved product recommendations.

FIG. 36 illustrates a conversational chat interface 3600 provided in the context of a communication session with an autonomous agent, generated in accordance with one or more embodiments. The conversational chat interface 3600 may be provided in the context of an application used to access database objects stored in a database system accessible via the computing services environment 100. For instance, the conversational chat interface 3600 may be provided in the context of a web application provided via an application server.

User input is shown at 3602. The user input provided at 3602 is not natural language input, but rather indicates the selection of a recommended action 3604 provided via the conversational chat interface. Thus, as shown in FIG. 36, a conversational chat assistant may receive input via both natural language and via other mechanisms. Further, the conversational chat assistant may generate various kinds of output, such as text output and recommended, selectable actions. The conversational chat assistant can also take actions such as updating records in the database system.

The user input 3602 triggers the generation of a response at 3606, which includes a record summary at 3608. In some implementations, the record summary may be determined based on an interaction with a generative language model in a context-dependent manner. For instance, the conversational chat interface 3600 may be accessed in the context of a contact record corresponding with Prithvi Padmanabhan.

In some embodiments, to summarize the record, a record summarization input prompt may be sent to a generative language model. The record summarization input prompt may include information selected from the record. The generative language model may then generate the record summary presented at 3608 and formatted in a manner specific to the communication channel.

In some embodiments, a record summary may include one or more links, such as the link 3610. A link included in the output may link to, for instance, another record within a database system accessible via the computing services environment 100.

FIG. 37 illustrates a conversational chat interface 3700 provided in the context of a communication session with an autonomous agent, generated in accordance with one or more embodiments. The conversational chat interface 3700 illustrates a conversational interaction between a user and the autonomous agent.

At 3702, the user provides natural language input including a request to identify the top opportunity. This natural language input causes the autonomous agent to first identify the user's intent, then to retrieve the appropriate information for the corresponding opportunity from the database system, and finally to format the information for presentation at 3704.

Included with the initial output is a button 3706 for triggering an action to edit the record. In some embodiments, as discussed herein, the next action is not predetermined, but rather is dynamically determined based on context. For example, when a record is presented, a recommended next action may be to edit the presented record.

At 3708, the user provides natural language input stating "Can you tell me more about it?" This natural language input causes the autonomous agent to first identify the user's intent. From the context of the chat history, the conversational chat interface infers that "it" refers to the record that was recently returned. Further, a generative language model determines that the request indicates a desire to summarize the record, and indicates that a record summarization action should be performed. Next, the autonomous agent triggers the record summarization action to generate the summary at 3710, which is formatted for presentation in the conversational chat interface 3700 in accordance with one or more configuration parameters.

Figures 38A, 38B:
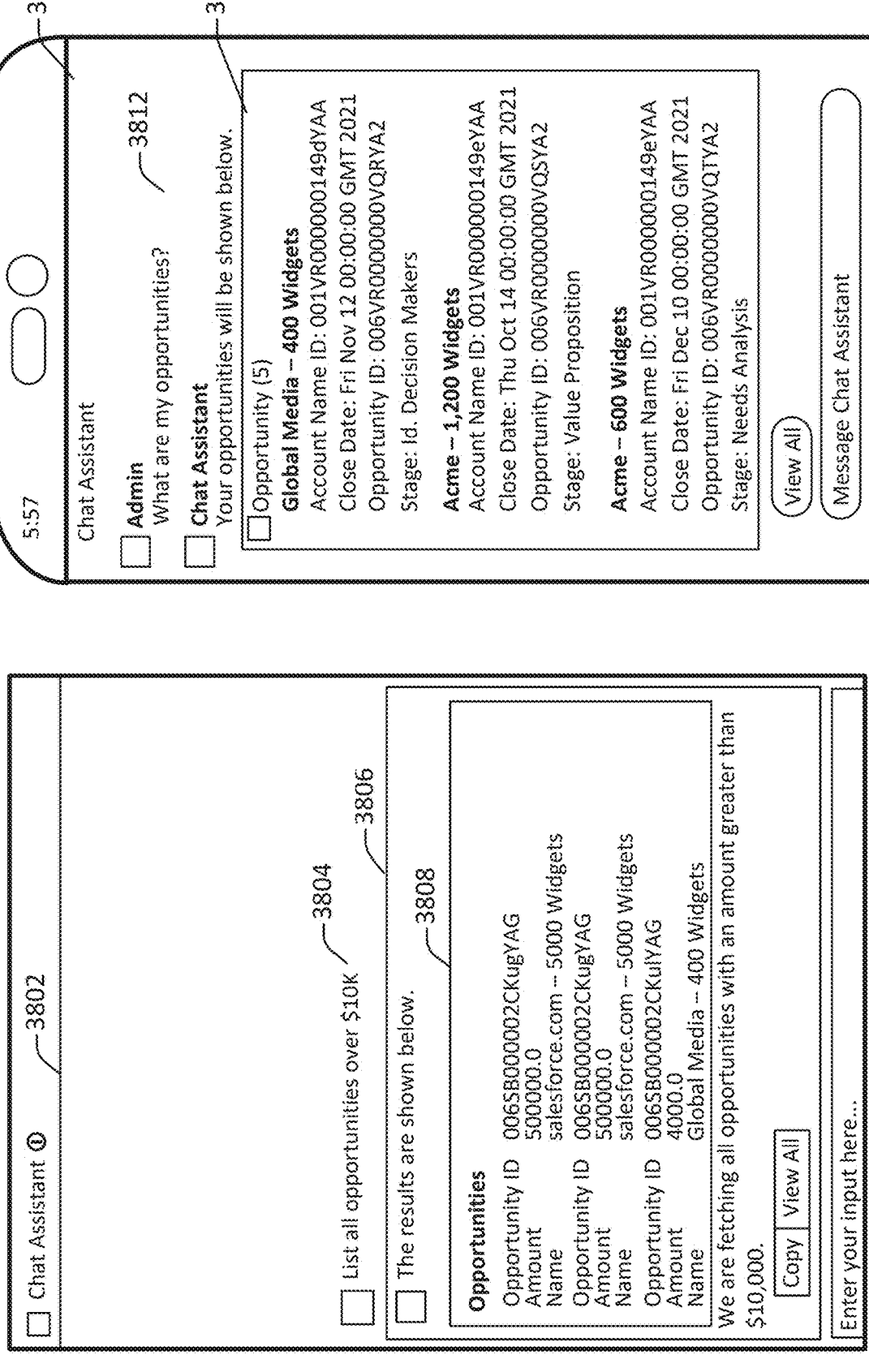
FIGS. 38A and 38B illustrate configurable user interfaces, provided in accordance with one or more embodiments.

FIGS. 38A and 38B illustrate configurable user interfaces, provided in accordance with one or more embodiments. As shown in FIG. 38A, a request in natural language at 3804 to "List all opportunities over $10K" triggers a response from the conversational chat assistant at 3806 listing information identifying database objects corresponding with those opportunities. The opportunities are listed in a user interface output portion 3808 in which each opportunity includes an identifier, an amount, and a name. The name may be selected to load a representation of the corresponding database object.

The interaction illustrated in FIG. 38A is conducted via a conversational chat interface presented in a web interface 3802. Accordingly, the user interface output portion 3808 is formatted in a manner specific to the communication channel. For instance, the opportunity name 3808 includes wide spacing between text elements and database objects.

As shown in FIG. 38B, a similar request in a different conversational chat interface may be handled differently. The interaction illustrated in FIG. 38B is conducted via a conversational chat interface presented in a mobile application 3810. A request received at 3812 to identify open opportunities triggers a response 3814 from the conversational chat assistant listing open opportunities. The open opportunities are formatted in a manner specific to the communication channel. For instance, the opportunities include close dates and stage information in addition to the other information included in FIG. 38A. Also, the opportunities are presented in a manner that includes different spacing and text formatting than shown in FIG. 38A.

According to various embodiments, Retrieval Augmented Generation (RAG) may be used to retrieve information needed by an agent to complete a task. RAG may be applied to data sources both inside and outside of the computing services environment. For example, RAG may be used to access uploaded files, scrap websites, and/or retrieve data from other external data sources. Such access may be performed via a data connector. For instance, a website with a sitemap may be scraped via a data connector such as one configured with Mulesoft. RAG may facilitate a variety of use cases including the uploading of relevant data files, accessing internal knowledge store articles, supplementing data sources with additional documentation, managing uploaded files, and citation of data sources in generated responses.

Figure 39:
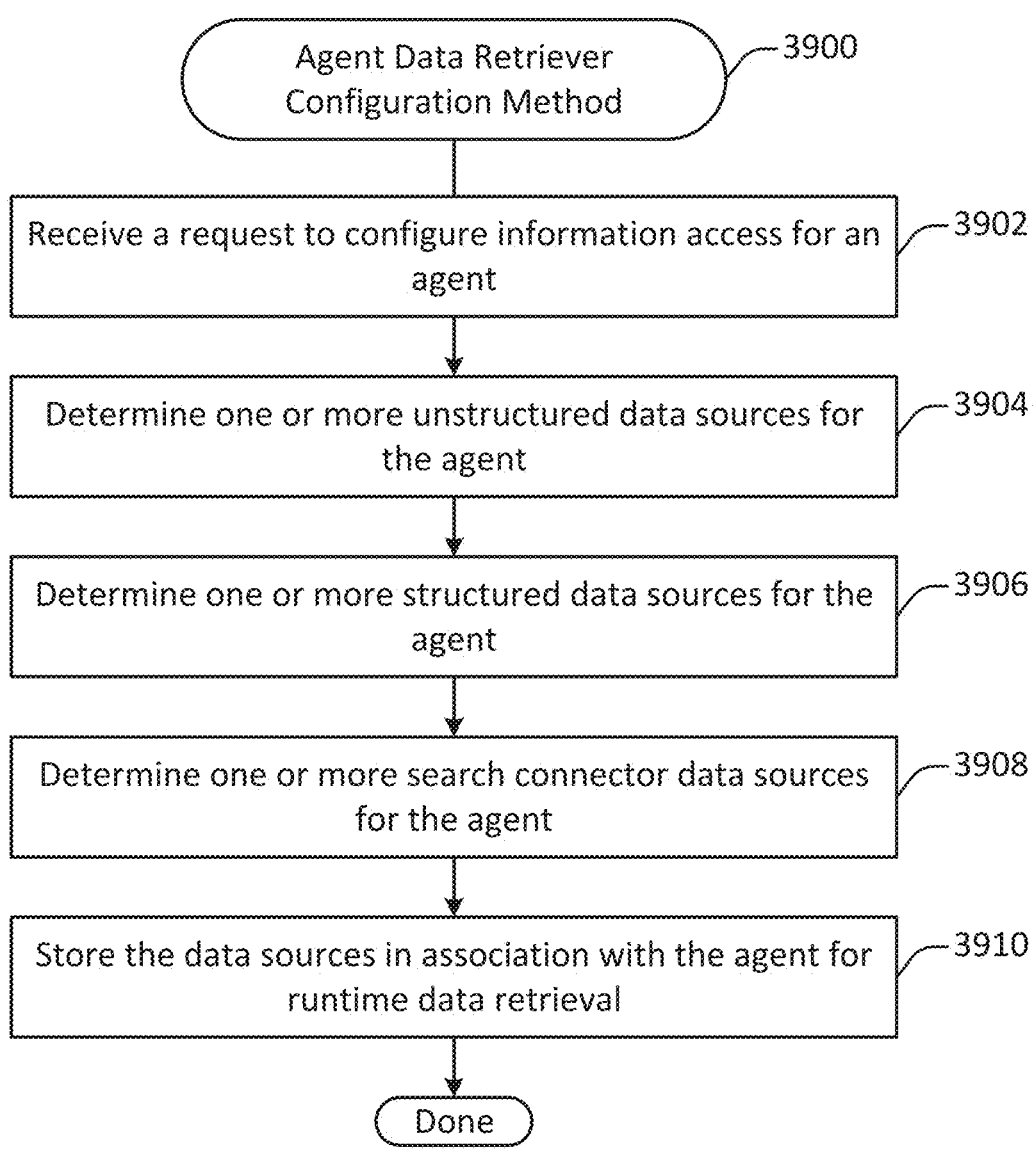
FIG. 39 illustrates an overview method for configuring real-time augmented generation (RAG) for autonomous agents, performed in accordance with one or more embodiments.

FIG. 39 illustrates an overview method 3900 for configuring real-time augmented generation (RAG) for autonomous agents, performed in accordance with one or more embodiments. The method 3800 may be performed at the computing services environment 100. A data model for providing data retrievers for retrieving data is provided in FIG. 40A, while architecture diagram for the configuration of RAG is provided in FIG. 41.

A request to configure information access for an agent is received at 3902. In some embodiments, the request may be received as part of the agent creation process. Alternatively, or additionally, data retrievers may be configured separately from agent retrieval. The request may be received via a user interface supporting agent configuration, such as the agent studio 112. Alternatively, the request may be received via an application procedure interface.

One or more unstructured data sources for the agent are determined at 3904. In some embodiments, unstructured data may include any of various file formats such as text-based formats (e.g., PDF, TXT, HTML, and plain text files), web content such as websites accessible through sitemaps, multimedia content such as images, audio, and video files, and/or any other unstructured content. Additional details for configuring a data retriever for unstructured data are discussed with respect to FIG. 42, FIG. 43, and FIG. 44.

One or more structured data sources for the agent are determined at 3406. According to various embodiments, structured data may include content organized within a relational database. Structured data may include, for instance, database records such as accounts and cases in a CRM database, custom data objects, and the like. Structured data may also include textual data stored in a structured manner, such as knowledge articles in a knowledge store. Additional details for configuring a data retriever for structured data are discussed with respect to FIG. 44.

One or more search connector data sources are configured for the agent at 3908. Search interfaces provide for open-ended knowledge retrieval based on search queries. Additional details for configuring a data retriever for a search interface are discussed with respect to FIG. 44.

The sources are stored in association with the agent for runtime data retrieval at 3910. Additional details regarding runtime retrieval augmented generation are discussed with respect to the method 4500 shown in FIG. 45.

FIG. 40A illustrates a portion of an autonomous agent data retriever data model 4000, configured in accordance with one or more embodiments. According to various embodiments, a knowledge source for an agent may be represented as a retriever, which may be defined as an Agent Action type (i.e., Retriever) and associated with a Planner.

The Retriever-side data model provides settings (e.g., for semantic search, citation, etc.) to enable RAG functionalities at the Agent level.

In FIG. 40A, an action definition 4002 may point to a retriever 4004 for retrieving data needed to execute the action. The same retriever may be employed by potentially many different action definitions. Similarly, the same action definition may employ many different retrievers. The action definition may also point to one or more planner action junctions 4006, which may provide a connection for a planner definition 4008 to access the action definition 4002. That is, the planner action junction 4006 may support a many-to-many relationship between planner definitions and action definitions.

Figure 41:
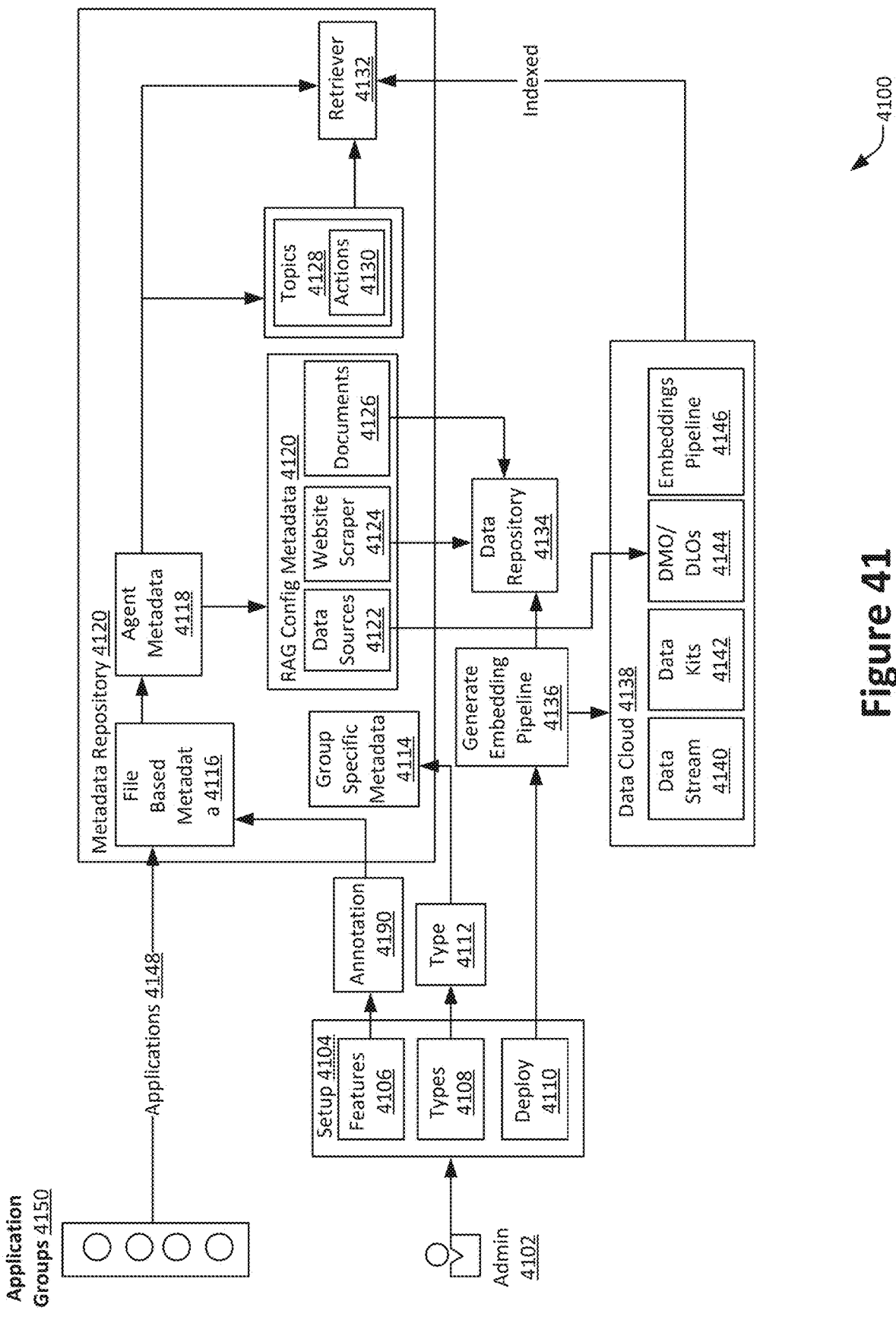
FIG. 41 illustrates an architecture diagram for supporting RAG within an autonomous agent, configured in accordance with one or more embodiments.

FIG. 41 illustrates an architecture diagram 4100 for supporting RAG within an autonomous agent, configured in accordance with one or more embodiments. An administrator 4102 may interact with a setup interface 4104 to setup elements of an agent, including features 4106, types 4108, and deployments 4110.

In some embodiments, a retriever type 4112 may be specified within application group specific metadata 4114. Retrievers may be deployed at 4110, which may involve generating an embedding pipeline at 4136. The embedding pipeline 4146 may be represented in the data repository 4134.

In some implementations, features may be reflected in an annotation 4190 for the agent, which may be stored in a file-based metadata repository 4116. The annotation may be accessed by 4148 within the application groups 4150 to instantiate the agent.

In some embodiments, the agent may be represented based on agent metadata 4118 represented in the annotation 4190. The agent metadata 4118 may be reference the RAG configuration metadata 4120, one or more topics 4128 including one or more actions 4130 for the agent, and one or more retrievers 4132. A retriever 4132 may be a type of action 4130 and may be used to access indexed data from the data cloud 4138.

According to various embodiments, the data cloud 4138 may provide access to various types of data, including one or more data streams 4140, one or more data kits 4142, one or more data management objects (DMOs) and/or data lake objects (DLOs) 4144, and one or more embedding pipelines 4146.

FIG. 40B illustrates a data model diagram 4050 for providing access to unstructured data, configured in accordance with one or more embodiments. In some embodiments, unstructured data may be uploaded to a data lake or other file repository. Unstructured data may be represented and accessed via one or more pairs of unstructured data lake objects and unstructured data model objects configured at the organization level and accessible to agents and agent instances within that organization.

A unified data management object 4052 including information such as a file path, a resolved file path, a content type, a size, and more may be linked with a companion data management object 4054. The companion data management object 4054 may be used to link the unified data management object 4052 with a particular agent via a prefilter field 4056. The prefilter field 4056 provides for initial filtering to be applied to the data source before any data is returned.

Figure 42:
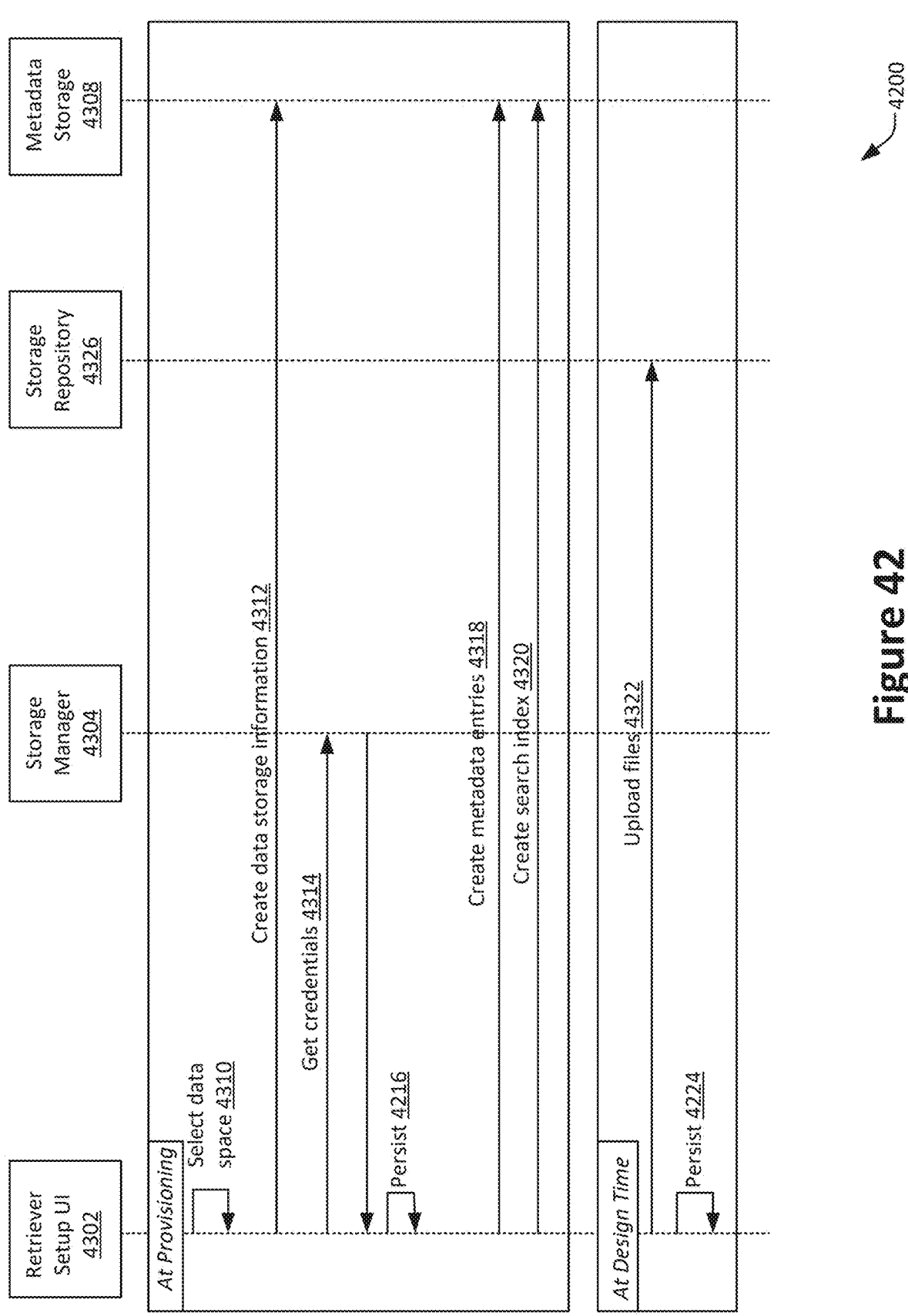
FIG. 42 illustrates a process flow for configuring unstructured data, arranged in accordance with one or more embodiments.
Figure 43:
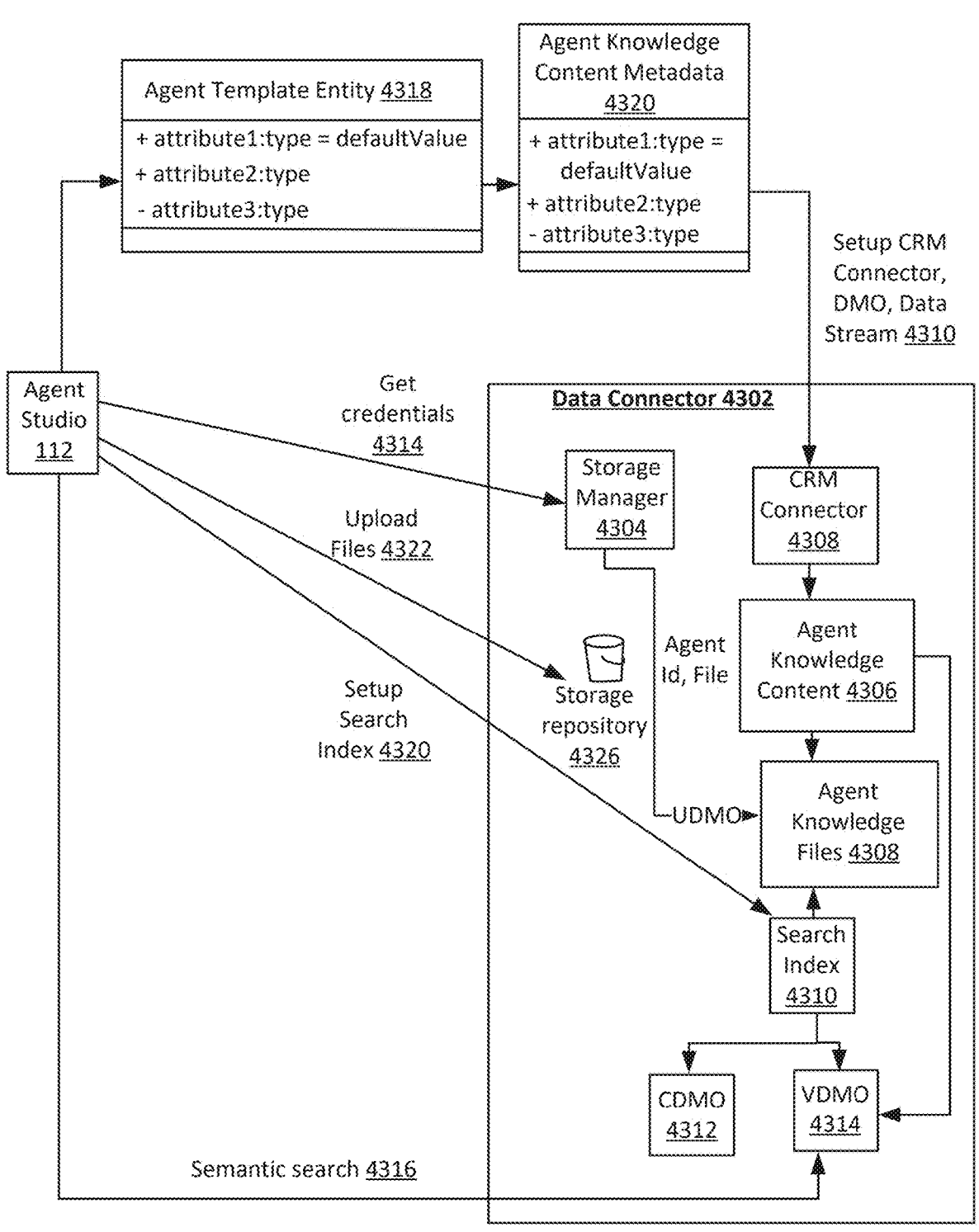
FIG. 43 illustrates an architecture for configuring unstructured data, arranged in accordance with one or more embodiments.

FIG. 42 and FIG. 43 illustrate an architecture 4300 and associated process flow 4200 for configuring unstructured data, arranged in accordance with one or more embodiments. In particular the process flow 4200 illustrates a set of interactions between a user interface 4202 for setting up a retriever, a storage repository 4226 at which files are stored, a storage manager 4204 for managing the files, and a metadata repository 4208 for defining the data retriever. The architecture 4200 and process flow 4300 may be implemented at the computing services environment 100.

In some implementations, when a data retriever is provisioned, a data space for the agent may be selected at 4210 at the retriever setup UI 4202. The data space may define a location at which the data is to be stored. Data storage information is then created at 4208 based on communication between the retriever setup user interface and the metadata storage repository 4208. The data storage information may include information such as a companion BPO specifying a file path and agent identifier, a CRM connector, a data stream, and/or a DMO.

In some embodiments, temporary credentials are retrieved from the storage manager 4204 at 4214. The temporary credentials may also include information such as a storage location for the unstructured data. The credentials are persisted at 4216 at the retriever setup user interface 4202.

According to various embodiments, one or more metadata entries are created at 4218. Examples of the metadata entries that may be created include a UDLO and a DMO relationship. A search index is created at 4220.

In some embodiments, at design time, one or more files are uploaded at 4222 to the storage repository 4226. Metadata for those files is persisted at 4222. For instance, the metadata may be written to the BPO. The metadata may include information such as an agent identifier and a file path.

FIG. 43 provides an architectural overview that illustrates an alternative view of the operations shown in FIG. 42, organized around a data connector 4302. In the data connector, a CRM connector 4308 may provide access to agent knowledge content 4306, which may be implemented as one or more data manipulation language statements defining ways to insert, update, merge, delete, and/or restore data. To access the CRM connector 4308, an agent template entity 4218 may link to one or more agent knowledge content metadata entries 4220. The agent knowledge content 4306 may be used to access files via the agent knowledge files data manipulation language information 4308. The files may be indexed by the search index 4310, which may be accessed via the vector data module object (VDMO) 4314 and/or the data storage model object (DSMO) 4312. In particular, the VDMO 4314 may provide for semantic search 4316, for instance using the agent identifier as a prefilter.

Initially, a tenant (i.e. client) organization may be provisioned with a data object model a data object library at 4210 along with a search index at 4310. When files are uploaded, the agent authenticates a connection to file storage at 4226 and uploads the files at 4222. After uploading, the associated data entity may be marked with the information, after which the information is processed, vectorized, and used to create a search index. Then, a data retriever is configured at 4316, with the search index and a filter pointing to the content library, for retrieving the data. Newly uploaded files may be processed by marking the associated entity, which may be automatically synchronized with the data cloud 4302 to index the new files.

Figure 44:
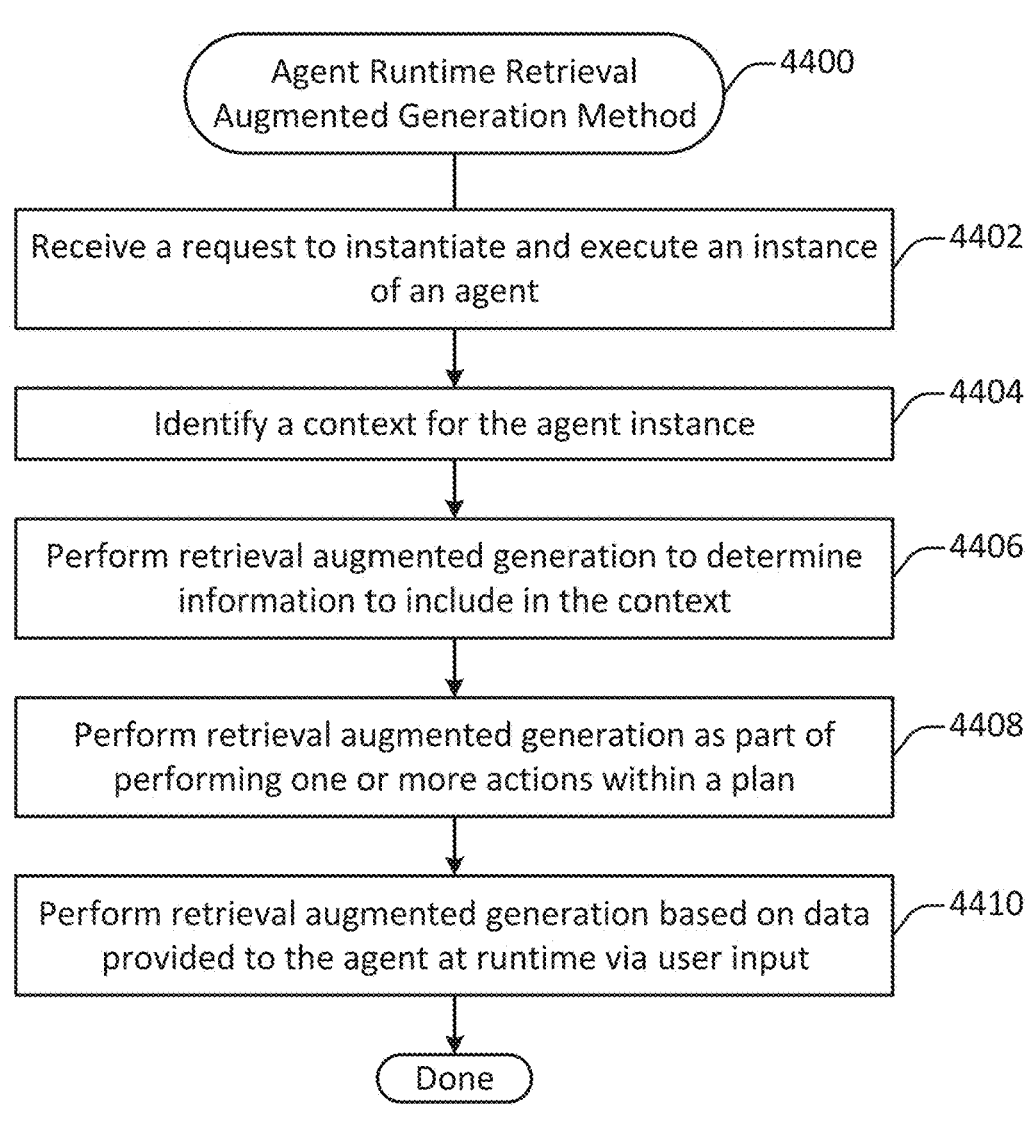
FIG. 44 illustrates a method for retrieval augmented generation at runtime, performed in accordance with one or more embodiments.

FIG. 44 illustrates a method 4400 for retrieval augmented generation at runtime in the context of a conversational chat assistant, performed in accordance with one or more embodiments. The method 4400 is described partially in reference to FIG. 46, which illustrates an architecture configuration 4600 supporting runtime retrieval augmented generation.

A request to in instantiate and execute an instance of an agent is received at 4402. A context for the agent instance is identified at 4404. In some embodiments, the performance of operations 4402 and 4404 may be completed as discussed with respect to the operations 3002 and 3004 shown in FIG. 30.

Retrieval-augmented generation is performed at 4406 to determine information to include in the agent's context. In some embodiments, agent RAG may be integrated into an agent at runtime as part of the prompt context. Such a configuration may provide additional information to a generative language model. To achieve this configuration, relevant data can be included in a prompt when the agent generates a response. For example, a user may ask specific product questions that may be addressed using a vector search. Some or all of the result of the vector search may then be included within the planner prompt for addressing the user's questions. Thus, prompt context RAG provides predetermined information for inclusion in a prompt and/or in other agent actions.

Such contextual information may be performed to retrieve information that may be available to an agent across potentially multiple actions. For instance, the information retrieved at 4406 may be included in a topic selection input prompt, a plan determination input prompt, an agent selection input prompt, a text generation prompt associated with the performance of an action, and/or any other action performed or prompt completed in association with the agent instance.

Retrieval augmented generation is performed at 4408 as part of performing one or more actions within a plan. In some embodiments, agent RAG may be integrated into an agent at runtime as part of an action within a topic. Such a configuration may enhance the agent's ability to access and process information dynamically. To achieve this configuration, the agent can invoke a RAG action to retrieve information during a conversation. For example, suppose that a user asks for the latest news about a company. In this situation, the agent can trigger a RAG action to search news articles and then incorporate the findings into its response. Thus, action-based RAG is a dynamic approach where information is retrieved on-demand during a conversation or other plan being executed by the agent.

Retrieval-augmented generation is performed at 4410 based on data provided to the agent at runtime via user input. In some embodiments, real-time RAG may support the uploading of documents by agent users and the querying of the documents' content through conversational interactions. In such a configuration, a chat session can serve as a container for the uploaded data. Just-In-Time (JIT) indexing may be used to rapidly process uploaded files and enable efficient semantic search. To enhance user experience, chat sessions can be resumed later, which involves persistent storage and retrieval of the indexed data, for instance as discussed with respect to the state management method 3100 shown in FIG. 31.

In some embodiments, RAG at runtime may involve RAG based on input provided via a conversational chat interface. Additional details regarding such operations based on natural language user input are discussed with respect to the method 4500 shown in FIG. 45. As another example, in FIG. 46, an autonomous agent 4602 supports uploading files to a drive 4604.

Figure 46:
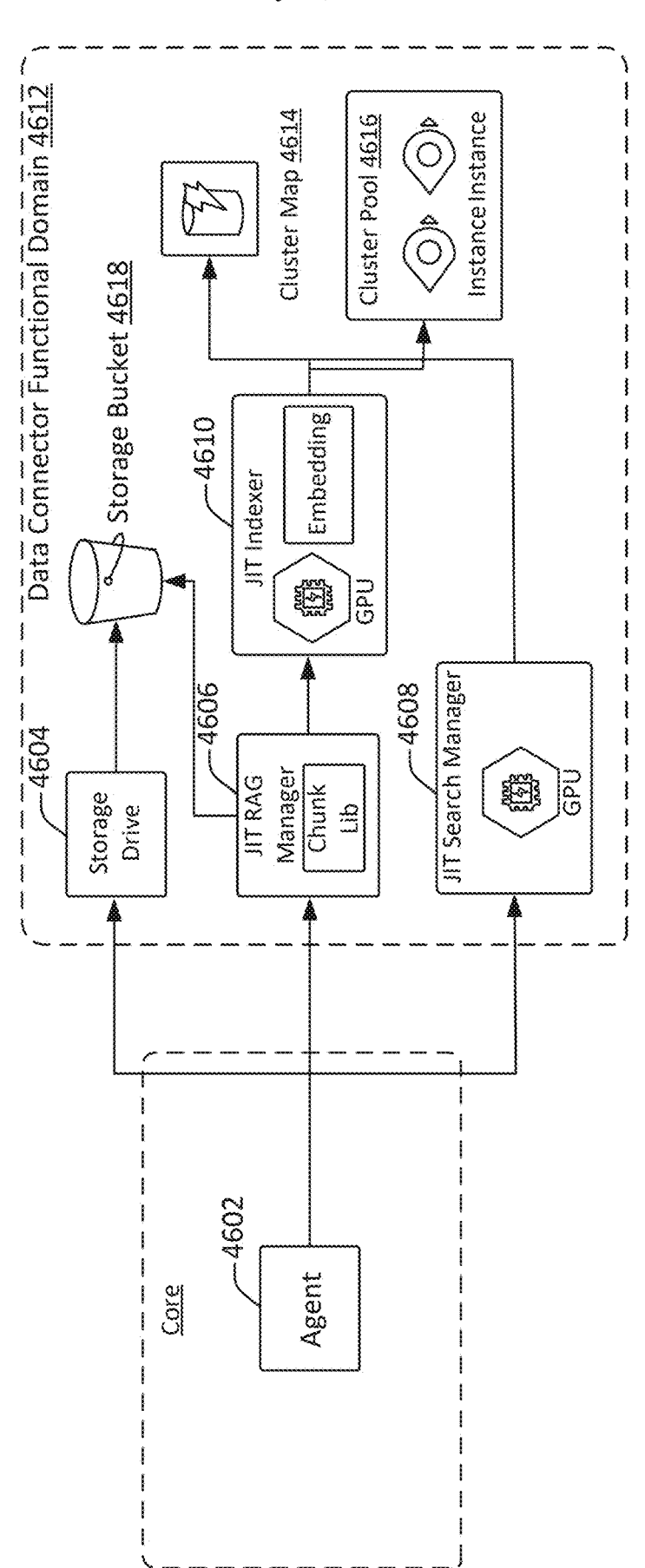
FIG. 46 illustrates an architecture configuration supporting runtime retrieval augmented generation, provided in accordance with one or more embodiments.

In some embodiments, as shown in FIG. 46, the just-in-time RAG manager 4606 may support indexing of the files via the just-in-time indexer 4610. The indexed files may be stored in a storage location such as the storage bucket 4618 accessible via the storage drive 4604. The just-in-time search manager 4608 may support searching of the indexed information by the autonomous agent 4602. Such components may be located within a data connector functional domain 4612.

In some embodiments, the just-in-time indexer 4610 may produce an embedding, which may be used to support searching via a cluster map 4614 and/or a cluster pool 4614. For instance, the cluster pool 4614 may be a pool of Milvus instances.

According to various embodiments, any of the RAG operations discussed with respect to the method 4200 may involve the retrieval of structured and/or unstructured data. Data may be retrieved via a data retriever configured as discussed with respect to FIG. 39 through FIG. 44.

In some embodiments, ensemble RAG may combine different RAG models to enhance the overall performance and accuracy of a system, for instance when dealing with both structured and unstructured data. For example, different data retrievers may be used on specific data types (structured or unstructured) or domains. The system may then intelligently combine the outputs of these retrievers based on the nature of the query and the available RAG configuration. The outputs from different RAG models may be integrated to provide a comprehensive and informative response.

In some embodiments, a combination of a content library and a prompt template may be defined. In this way, retrievers from different content libraries may be used, with their outputs being combined via the corresponding prompt template. These pairings of action definitions and type input configuration may be stored in the metadata repository.

According to various embodiments, retrieval-augmented generation may be performed at various points in time within the agent lifecycle, and may be performed in various ways. For instance, RAG may be performed when an agent is configured, when an agent is instantiated, and/or when an action is performed. The particular timing of retrieval augmented generation for an agent may depend on factors such as the agent configuration and agent instance context. Thus, the method 4400 may be performed in conjunction with other methods described herein, such as the method 3000 in FIG. 30. For instance, one or more of the operations shown in FIG. 44 may be interleaved with the operations shown in other methods such as the method 3000. Additionally, one or more of the operations shown in FIG. 44 may be omitted, repeated, and/or performed in a different order than that shown.

Figure 45:
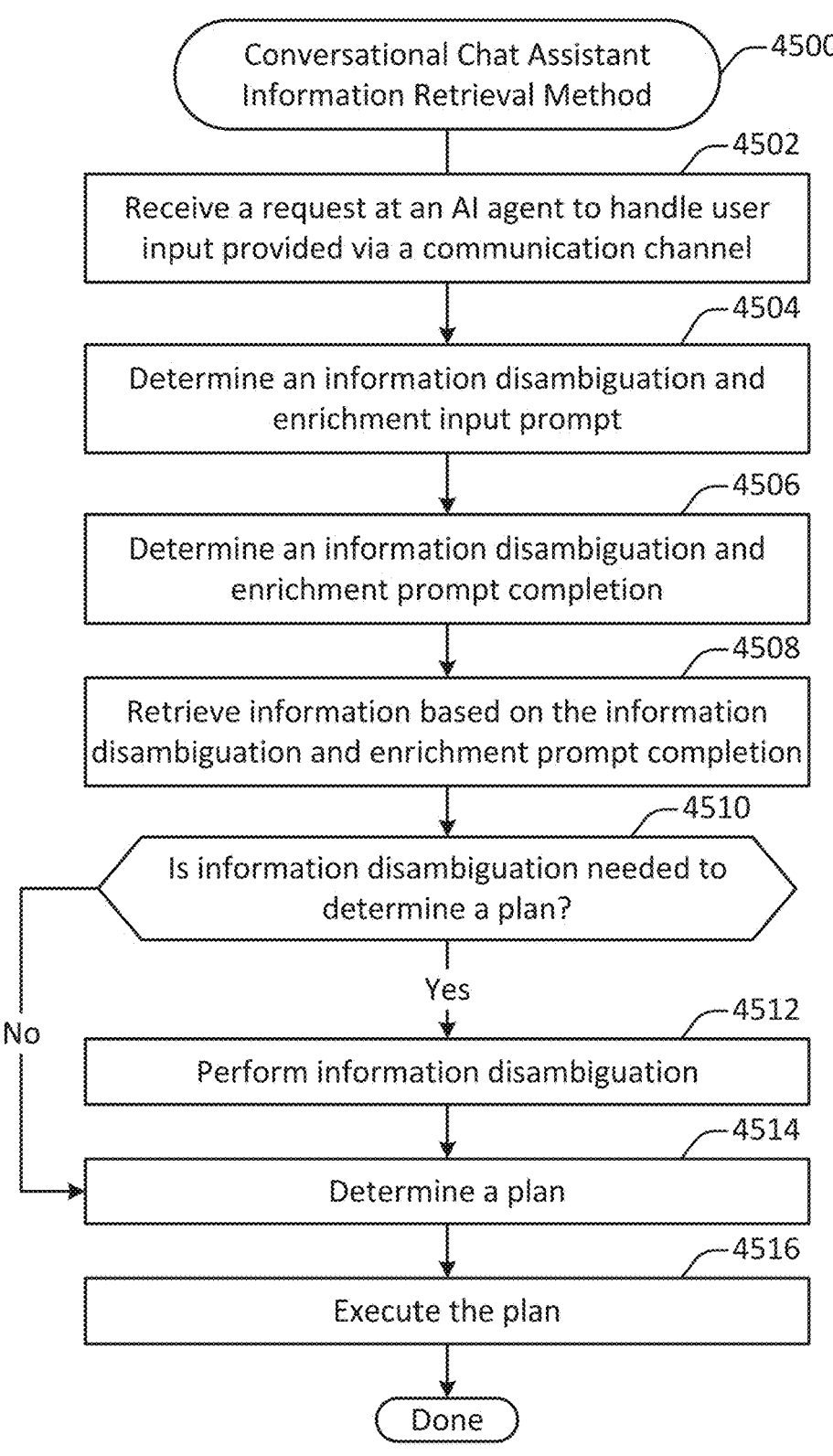
FIG. 45 illustrates a method for retrieval augmented generation at runtime in the context of a conversational chat assistant, performed in accordance with one or more embodiments.

FIG. 45 illustrates a method 4500 of retrieving information at a conversational chat assistant, performed in accordance with one or more embodiments. In some embodiments, the method 4500 may be performed at the computing services environment 150 shown in FIG. 1.

A request is received to handle, at an AI agent, user input provided via a communication channel. The operations shown in FIG. 45 provide an example of the types of operations that may performed within a specific AI agent configured as a conversational chat assistant.

An information disambiguation and enrichment input prompt is determined at 4504. In some embodiments, the information disambiguation and enrichment input prompt may include the user input received at 4502. The information disambiguation and enrichment input prompt may also include one or more natural language instructions to a generative language model to perform data enrichment and/or entity disambiguation. A non-exhaustive list of examples of such instructions are provided in the following paragraphs.

In some embodiments, the generative language model may be instructed to generate a query to identify one or more database types for database records mentioned in the user input. For example, the user input may include statements such as "Draft an email to the main contact for Acme". In this example, the natural language instructions may instruct the generative language model to identify "Acme" in this text as a reference to an object stored in the database. However, the type of database object of which Acme is a member may be unclear. For instance, Acme may be an Opportunity object or an Account object. Thus, the natural language instructions may instruct the generative language model to construct a database query to search for various types of objects named "Acme."

In some embodiments, the generative language model may be instructed to generate a query to identify one or more database records for database records mentioned in the user input. For example, the user input may include statements such as "What is the Acme opportunity worth?" In this example, the natural language instructions may instruct the generative language model to identify "Acme" in this text as a reference to an Opportunity object stored in the database. The natural language instructions may instruct the generative language model to construct a database query to search for an Opportunity object named Acme and return its value.

some embodiments, the generative language model may be instructed to generate a query to determine a query for retrieving data from one or more external sources. For example, the user input may include statements such as "Draft an email to the Acme contact that mentions the rising costs to companies of environmental changes such as global warming. Include statistics." In this example, the natural language instructions may instruct the generative language model to identify statistics related to the rising costs to companies of environmental changes such as global warming as information that would need to be retrieved in order to draft the email. The natural language instructions may instruct the generative language model to determine one or more search queries to identify such information.

In some embodiments, the information disambiguation and enrichment input prompt may include natural language instructions executed by the generative language model to determine whether entity and/or record disambiguation is needed. For example, the information disambiguation and enrichment input prompt may include natural language instructions to indicate whether the determination of a plan depends on identifying an entity and/or a database record that is not clear from and/or included in the plan identification input prompt. As another example, the information disambiguation and enrichment input prompt may include natural language instructions to generate text for transmission to a client machine to elicit clarification regarding the identity of one or more entities and/or database records.

In some embodiments, the information disambiguation and enrichment input prompt may include natural language instructions executed by the generative language model to determine whether updated data is needed. For example, the information disambiguation and enrichment input prompt may include natural language instructions to indicate whether the determination of a plan depends on data that is not clear from and/or included in the information disambiguation and enrichment input prompt. As another example, the information disambiguation and enrichment input prompt may include natural language instructions to generate a search query, text to provide to a user, and/or other output for identifying the data that is needed.

According to various embodiments, a search query generated by the generative language model may be formulated for execution against an Internet search engine, a database, or another source of information. For instance, the search query may be executed against any data source accessible via the flow and vector search interface 334 shown in FIG. 3.

In some embodiments, a query determined as discussed with respect to operation 4506 may include one or more parameters limiting the query to a particular context. For example, a query may be limited to a tenant associated with a user account that provided the user input. As another example, a query may be limited to returning data objects to which the user account has permission to access. Any suitable limitations and preferences may be reflected in the query.

In some embodiments, the information disambiguation and enrichment input prompt determined at 4504 may be incorporated into a prompt for determining a topic or a plan. Alternatively, the information disambiguation and enrichment input prompt may be determined and completed separately.

An information disambiguation and enrichment prompt completion is determined at 4506. According to various embodiments, the determination of the information disambiguation prompt input prompt and the information disambiguation and enrichment prompt completion may be performed by combining the context with the user input and a template to create the input prompt, which may then be provided to a generative language model for completion.

Information is retrieved at 4508 based on the information disambiguation prompt completion. In some embodiments, the information may be retrieved by executing one or more queries determined by the generative language model in response to the information disambiguation input prompt. For example, as discussed with respect to operation 4504, the information disambiguation input prompt may include natural language instructions to determine queries to retrieve information from inside and/or outside of the database system. Such queries may then be extracted from the information disambiguation and enrichment prompt completion and used to retrieve the information at 4508.

In some embodiments, retrieving information may involve executing a database query. For instance, a query may be used to identify and retrieve information from one or more database records referenced in the user input. Alternatively, or additionally, retrieving information may involve accessing a data interface from retrieving information from another source, such as the Internet or a public or private data source residing outside of the database system.

A determination is made at 4510 as to whether information disambiguation is needed to determine a plan. In some embodiments, the determination may be made based on the information disambiguation and enrichment prompt completion determined at 4506. completion. For example, the information disambiguation and enrichment prompt completion may include one or more indicators as to whether information disambiguation is needed. The determination may be made based on the information retrieved at 4508.

In some embodiments, one or more database queries executed at 4508 may include an ambiguous result. For example, a database query executed against the database system may return both an Opportunity object and an Account object for Acme, rendering the user input ambiguous as to the user's intent. As another example, a database query executed against the database system may return two opportunity objects for Acme, an "Acme Inc." and an "Acme Resources Ltd", again rendering the user input ambiguous.

In some embodiments, one or more other data retrieval queries executed at 4508 may include an ambiguous result. For instance, an Internet search to retrieve information identifying "the capital of Georgia", which is needed to draft a message based on user input, may reveal that "Georgia" may refer to a state in the United States or a country in Europe and Asia, again rendering the user input ambiguous and triggering the system to activate a process to resolve the ambiguity.

Upon determining that information disambiguation is needed, information disambiguation is performed at 4512. Additional details regarding a method to facilitate the disambiguation of information such as an entity and/or record are discussed with respect to the method 4800 shown in FIG. 48.

Upon performing information disambiguation, or if no such disambiguation is needed, a plan is determined at 4514. According to various embodiments, the plan may include one or more actions to be performed within the computing services environment. The plan is then executed at 4516.

Figure 47:
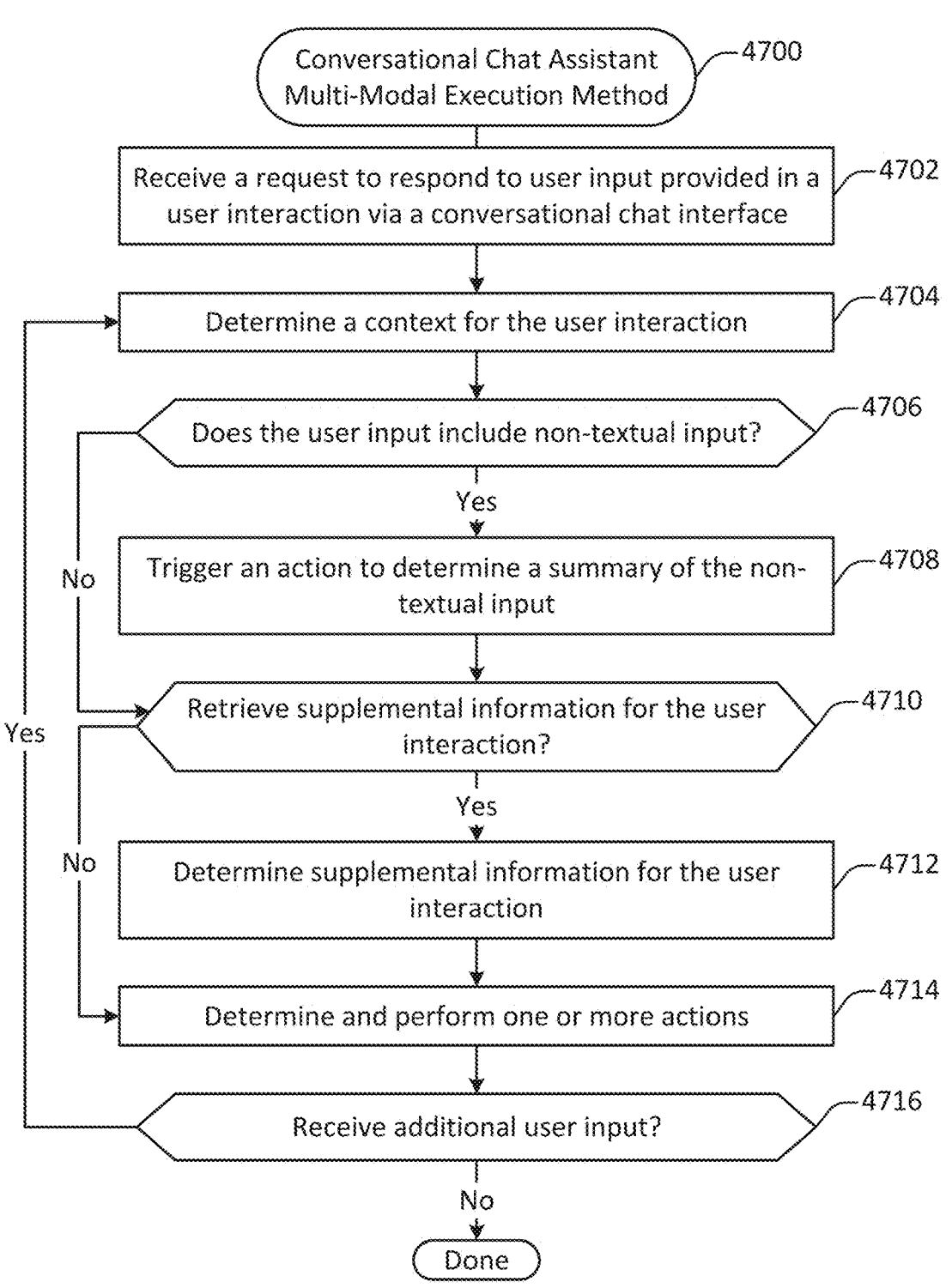
FIG. 47 illustrates a method for processing multimodal input to an agent, configured in accordance with one or more embodiments.

FIG. 47 illustrates a method 4700 for processing multi-modal input to an agent, configured in accordance with one or more embodiments. The method 4700 may be performed at the computing services environment 100 shown in FIG. 1.

A request to respond to user input provided in a user interaction via a conversational chat interface at 4702. A context for the user interaction is determined at 4704. According to various embodiments, as discussed herein, contextual information for a user interaction may include characteristics such as previously provided user input, previously performed computing services environment actions, previously generated textual responses, one or more topics, one or more actions performed, and/or other such information.

A determination is made at 4706 as to whether the user input includes non-textual input. According to various embodiments, non-textual input may include audio data, image data, video data, other types of non-textual data, or a combination thereof. Such information may be referenced in a file (e.g., via an upload process or a URL) or may be provided directly in the conversational chat interface.

Upon determining that non-textual input is present, an action to determine a summary of the non-textual input is triggered at 4708. In some embodiments, the type of action that is triggered may depend on the type of non-textual input. Further, some actions may be associated with flows that involve the triggering of different models and/or the performance of different processing operations.

In some embodiments, for example in the context of an image or video, a flow may include object recognition. For instance, an object recognition model may be executed. The object recognition model may produce a textual description of one or more objects represented in the image or video. For example, a user may provide a picture of a modem. The object recognition model may then analyze the picture to produce a description such as "A picture of a black modem. The modem is connected to a coaxial cable and an ethernet cable. One red light and one green light on the modem are illuminated."

In some embodiments, for example in the context of an image or video, a flow may include text recognition. For instance, in the example of the user providing the picture of the modem, the text recognition model may be used to identify information such as a brand, a serial number, and a model number shown on the modem.

In some embodiments, for example in the context of a video or audio file, a speech-to-text model may be triggered. For instance, a user may provide a video of a modem along with associated audio. The audio may be translated as "My internet doesn't work. I think the modem is broken."

Figure 48:
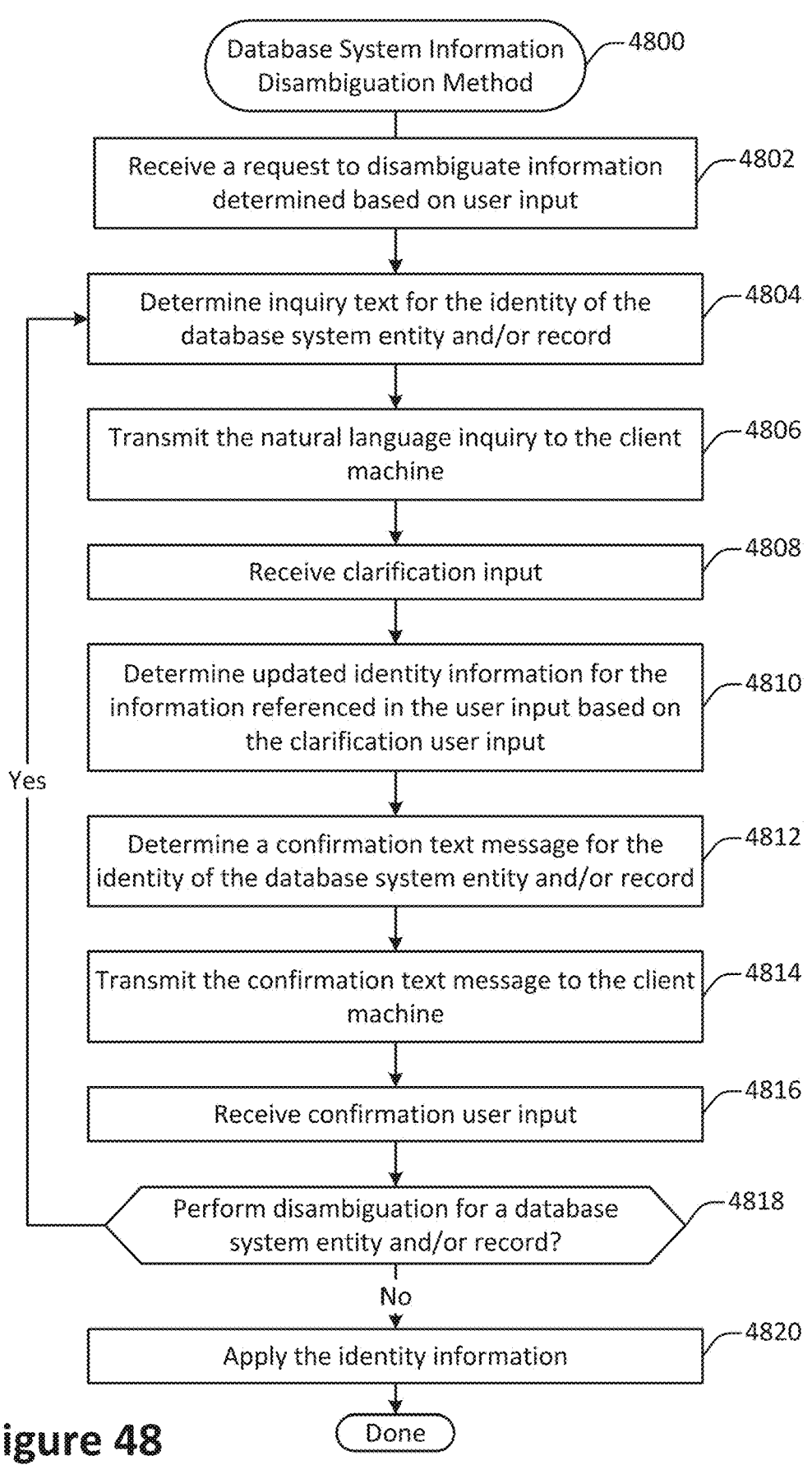
FIG. 48 illustrates a method for disambiguating any of various types of information, performed in accordance with one or more embodiments.

In some embodiments, a flow may include one or more clarification operations, some examples of which are discussed in additional detail with respect to the method 4800 shown in FIG. 48. Such clarification operations may be directed to a user, to an agent, and/or to one or more actions or models executed by the agent. For example, in the example of a user providing the picture of the modem, the object recognition model may be instructed to generate a more detailed summary that characterizes the relative locations of the red and green lights. As another example, in the example of a user providing the picture of the modem, the user may be asked to provide an updated picture of the back of the model to better capture data such as the modem's serial number or model number.

A determination is made at 4710 as to whether to retrieve supplemental information for the user interaction. Upon determining that supplemental information is to be retrieved, the supplemental information for the user interaction is determined at 4712. In some embodiments, the determination may be made on the context and/or a summary determined at 4708. For instance, the user may provide textual input asking about a microwave error code and provide as input an image of a microwave displaying an error code. When the summary determined at 4708 includes a description of the microwave and the error code as converted to text, the agent may determine that a digital manual for the microwave should be consulted to determine the cause of the error code. Such information may be retrieved via a data retriever.

In some embodiments, a flow may include one or more retrieval-augmented generation actions. For example, a modem brand and serial number determined via a text recognition model may be used to identify a database record corresponding to the modem. As another example, natural language text determined based on one or more of natural language user input, text-to-speech model output, and/or image text recognition output may be analyzed by a generative language model to identify one or more search parameters for a search query transmitted via a search interface.

One or more actions are determined and performed at 4714. According to various embodiments, the type of action to be performed may depend on the context, the summary optionally determined at 4708, and/or the supplemental information optionally determined at 4712. Any of a variety of actions may be performed, depending on the context. For example, novel text providing an answer to a user's query may be generated. As another example, novel text requesting additional information, such as textual and/or non-textual user input, may be generated. As yet another example, one or more database records may be updated. As still another example, one or more operations such as scheduling a service appointment may be initiated. In some situations, multiple actions may be generated. For instance, a service appointment may be scheduled along with generating and providing a textual response to the user input.

A determination is made at 4716 as to whether additional user input has been received. In some embodiments, the determination at 4716 may wait for additional user input, for instance if a response including text requesting additional information has been sent to the user. Upon determining that additional user input has been received, a context for the user interaction is determined at 4704.

In some embodiments, information determined in the course of multi-modal input evaluation may be incorporated into an agent's context. For instance, a summary of multi-modal input may be included in a chat transcript evaluated by a generative language model to determine a response to a user and/or to determine another type of action.

In some embodiments, multi-modal input may be used to initiate a user interaction. For instance, a user may provide an image of a malfunctioning device in a chat interface. The autonomous agent acting as a conversational chat assistant may then analyze the image via multi-modal input analysis and generate novel text to inquire about the nature of the problem.

In some embodiments, multi-modal input may be used in the course of conducting an existing user interaction. For instance, in the course of a conversation between a user and an autonomous agent acting as a conversational chat assistant, the autonomous agent may generate novel text asking the user to provide an image or video of the malfunctioning device.

FIG. 48 illustrates a method 4800 for disambiguating any of various types of information, performed in accordance with one or more embodiments. The method 4800 may be performed by a computing services environment such as the computing services environment 100 shown in FIG. 1.

A request to disambiguate information such as one or more database system object types and/or records is received at 4802. In some embodiments, the request may be generated as discussed with respect to the operation 2512 shown in FIG. 25. The request may be generated by the computing services environment 100, and in some configurations may be based on a message received from the generative language model indicating that the information is ambiguous and/or the result of executing a query that returns ambiguous information.

According to various embodiments, the term database system entity refers to a database system object or other object represented within the metadata system. For example, a user may provide user input asking to "Update the Acme record to $25,000". In such a situation, it may be unclear as to which type of database record the user would like to update. As another example, a user may provide user input asking to "Draft a message to Acme". In such a situation, it may be unclear as to whether to draft an email or some other type of correspondence. As yet another example, a user may provide user input asking to "Update the Acme opportunity record to $25,000". In such a situation, it may be unclear as to which record the user intends, for instance if the database system includes multiple opportunity records for Acme.

Inquiry text for disambiguating the entity is determined at 4804. In some embodiments, the text may include a natural language message inquiring as to the ambiguous information. The text may include additional information, such as a list of possible options and/or a selection affordance that permits a user to select between various options.

In some embodiments, the inquiry text may be determined at least in part by a generative language model. For example, a query result may be provided to a generative language model in an information clarification input prompt. The information clarification input prompt may include some or all of the information returned by executing the query. The information clarification input prompt may also include one or more natural language instructions executed by the generative language model to first determine whether the information is ambiguous and then, if the information is ambiguous, to formulate a natural language message requesting clarification from a user.

In some embodiments, the inquiry text may be determined at least in part by a template at the computing services environment 100. For example, if a database query returns two different records, a template may be used to formulate a message asking the user which of the two database records the user means.

In some embodiments, the inquiry text may include one or more elements other than text. For instance, the inquiry text may include one or more drop down menus, buttons, or other affordances for specifying information. In this way, the user may provide a response more quickly and without the system needing to process the response as text. Such an approach may also reduce the likelihood that the user's clarification response is itself ambiguous.

The natural language inquiry is transmitted to the client machine at 4806. In some embodiments, the natural language inquiry may be transmitted via any suitable communication channel. For instance, the natural language inquiry may be transmitted in the context of an existing communication session with the client machine, via any of a mobile application interface, a web interface, or a messaging interface.

Clarification input is received at 4808. In some embodiments, clarification input may be provided by a user. The clarification user input may include natural language text, an indication of a button click or other activation of a user interface affordance, or any other suitable type of input. Depending on the communication channel, the clarification user input may be provided via a mobile application interface, a web interface, or a messaging interface.

In some embodiments, clarification input may be provided by a model. For instance, a disambiguation model may be provided with a set of alternatives (e.g., database objects, word definitions, etc.), as well as contextual information. The contextual information may include, for instance, the identity of a user, one or more chat interaction records, and other such information. The disambiguation model may then be tasked with selecting the most likely object, definition, or other ambiguous element based on the contextual information.

In some embodiments, multiple rounds of clarification may be employed. For instance, a clarification model may produce a confidence score. If the clarification model is able to identify an option with a confidence level above a designated threshold, then the agent may proceed on the assumption that the ambiguity has been resolved. If instead the clarification model is unable to identify an option with a confidence level above the designated threshold, then additional input may be solicited, for instance from a human user. In this way, the autonomous agent may be capable of resolving many ambiguous situations without unnecessarily requesting user input.

Updated identity information for the database entity and/or record is determined at 4810 based on the user input. According to various embodiments, the updated identity information may be determined in various ways. For example, the clarification user input received at 4810 may include an indicator of a button press corresponding with a particular database entity and/or record. As another example, the clarification user input may include natural language text, which may be evaluated by a generative language model to determine information used to identify the database entity or the database record from within the computing services environment 100.

According to various embodiments, some or all of the updated identity information may involve executing a query as discussed with respect to the operation 2508 shown in FIG. 25. For example, an updated database query may be executed once an entity type (e.g., a database object type) is determined. As another example, an updated query may be sent to an external data source once ambiguity about the information being requested is resolved by the computing services environment.

A confirmation text message to confirm the identity of the information is optionally determined at 4812. In some embodiments, the confirmation text may be determined by a generative language model. For instance, the generative language model may determine updated identity information at 4810 and, along with that information, determine confirmation text to transmit to a client machine.

In some embodiments, the confirmation text may be determined by the computing services environment. For instance, the computing services environment 100 may determine the confirmation text based on a confirmation text template that may be filled with an indication of the updated identity information determined at 4810.

The confirmation text message is optionally transmitted to the client machine at 4814. According to various embodiments, the confirmation text message may be transmitted via any suitable communication channel, for instance as discussed with respect to operation 4806.

Confirmation user input is optionally received at 4816. According to various embodiments, the confirmation user input may include an indication as to whether the disambiguation was correct. That is, the confirmation user input may indicate whether the updated identity information determined at 4810 accurately reflected the user's intent.

In some embodiments, the confirmation user input may include natural language. For instance, the user may provide text or speech input stating that the information is correct or incorrect. Alternatively, or additionally, the confirmation user input may include an indication of activation of a user interface affordance, such as a button click. For instance, the user may press a "thumbs up" or "thumbs down" button to indicate whether the information is correct.

A determination is made at 4818 as to whether to perform additional information disambiguation. In some embodiments, the determination may be made at least in part based on the confirmation received at 4816. For instance, if the information is correct, then additional disambiguation may not be needed.

In some embodiments, multiple rounds of disambiguation may be needed even if the information determined at 4810 is deemed accurate. For example, the system may need to disambiguate multiple entities and/or records. As another example, the system may first disambiguate a database entity and then disambiguate a database record corresponding with the database entity. Various complex situations are possible. For instance, once the identity of a database record is confirmed, information selected from the database record may then be used to query an external data source. The information returned by executing the query may in turn be ambiguous and need to be disambiguated.

Upon determining to perform disambiguation again, inquiry text is determined at 4804. Upon determining instead not to perform additional disambiguation, the identity information is applied at 4820. According to various embodiments, applying the identity information may involve, for instance, incorporating the identity information into an action or prompt. In some configurations, additional operations may be performed before the identity information is applied.

According to various embodiments, a platform supporting agents may be modular and extensible due to its metadata-driven architecture. Using this metadata, customer organizations can create a diverse range of virtual agents tailored to their needs. Various platform elements may support such functionality. Lifecycle event customization may provide the ability to modify agent behavior by overriding key lifecycle events. The ability to define an agent graph may allow for the reuse of pre-built components, such as agent graphs, to streamline development to create an agent with a planner. The ability to define a customer planner provides for customization of the reasoning logic for agents.

In some embodiments, a simplified interface may facilitate the creation of agents on-the-fly. Developers may test agents with mock actions, reducing or eliminating the need for upfront metadata definitions for topics and actions. Complex customer interactions involving collaboration between multiple agents may be defined. For instance, criteria for handing off tasks between different agents may be specified. As one example, a virtual assistant may start a conversation and then seamlessly transfer the customer to a specialized agent for technical support, all within a smooth, unified experience.

In some embodiments, creating an agent may involve specifying one or more metadata elements, as discussed herein. An agent can then be customized in any number of ways, as discussed below.

In some embodiments, lifecycle event customization may be used to modify agent behavior by overriding specific events. Such an agent may use an existing planner, but its behavior may be customized by modifying its lifecycle events to incorporate specific context.

In some embodiments, an agent graph may be defined. An agent graph may support the use of pre-built components like topic classification and action execution by defining agent graphs. Such graphs can act as blueprints, orchestrating component interactions using prompt templates.

In some embodiments, a custom planner definition may be used to exercise full control over a custom agent by defining its planning, reasoning, and orchestration logic through the planner interface. In this way, a customer organization can create agents tailored to their specific needs.

In some embodiments, a custom planner may be located inside the computing services environment. For instance, the customer organization may define operations to create the custom planner. Alternatively, a custom planner may be located outside the computing services environment. For instance, an external custom planner may be called from within the computing services environment.

Figure 49:
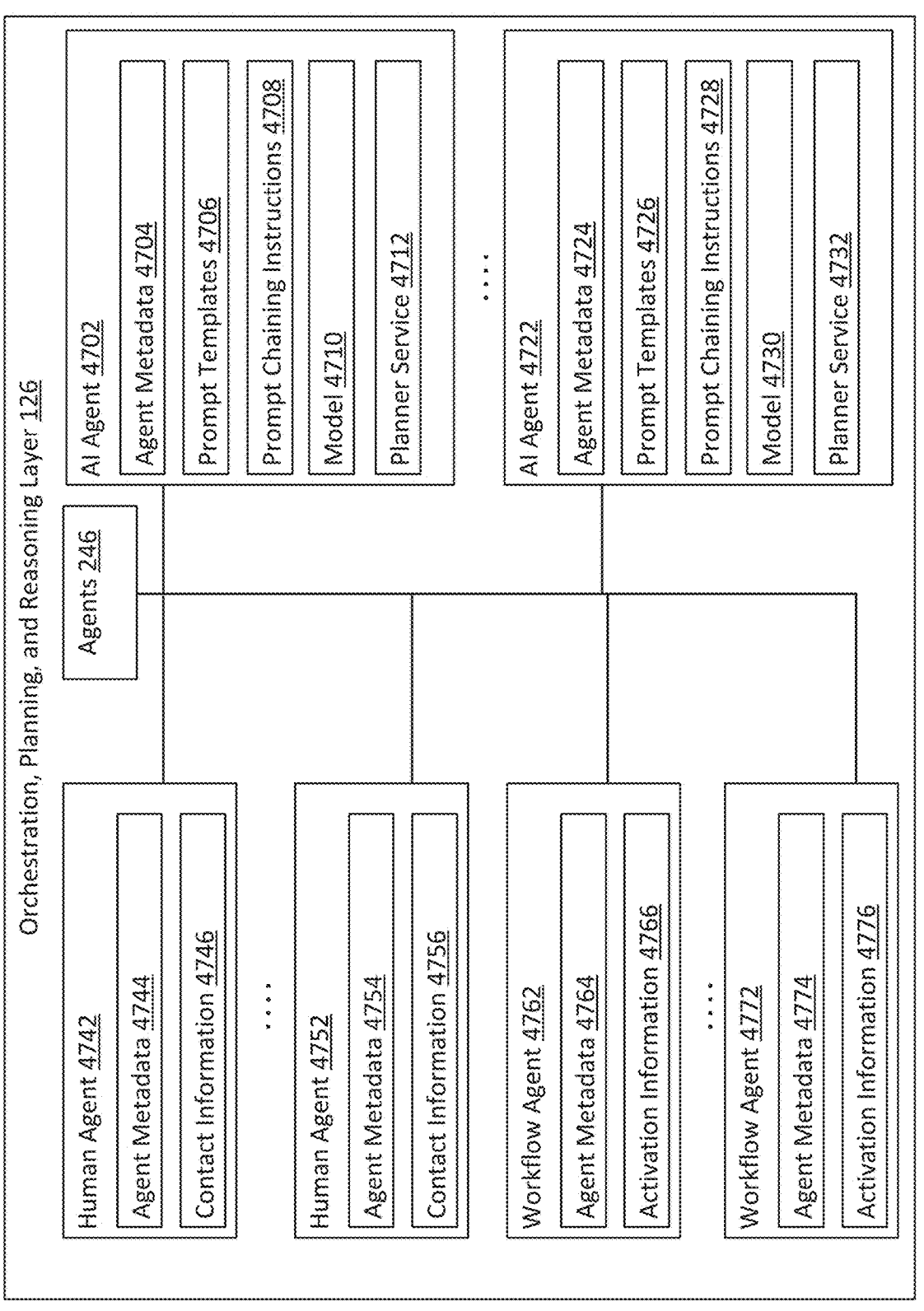
FIG. 49 illustrates a more detailed view of a portion of the orchestration, planning, and reasoning layer, configured in accordance with one or more embodiments.

FIG. 49 illustrates a more detailed view of a portion of the orchestration, planning, and reasoning layer 206, configured in accordance with one or more embodiments. In FIG. 49, the planner service has access to various reasoning agents 246, including the agents 4902 through 4922, 4942 through 4952, and 4962 through 4972.

According to various embodiments, an agent includes metadata such as the agent metadata 4904, 4924, 4944, 4954, 4964, and 4974. The agent metadata includes information characterizing the agent. For instance, the agent metadata may include a textual description describing situations in which the agent may or may not be useful. The agent metadata may also include an identifier that uniquely identifies the agent. In this way, a generative language model may review the metadata in light of the context and user input included in a conversation session and generate text that includes the unique identifier of the agent that the generative language model has selected to fulfill the user's intent.

In some embodiments, a human agent may be associated with contact information such as the contact information 4946 and 4956. The contact information may provide a mechanism for transmitting a message to the human agent letting the human agent know that the human agent has been selected for responding to the user input. For example, the contact information may include one or more computing services environment accounts, email addresses, messaging system accounts, communication channel addresses, or the like.

In some embodiments, a workflow agent may be a workflow executed within the computing services environment or activated from the computing services environment to fulfill the user's intent. A workflow agent may be associated with activation information such as the activation information 4966 through 4976.

According to various embodiments, the activation information may provide a mechanism for activating the workflow. For example, the activation information may include an interface to invoke, a network destination for sending a message, one or more invocation parameters, or the like. Such information may be used by the orchestration, planning, and reasoning layer 206 to invoke the workflow.

According to various embodiments, an AI agent represents a collection of resources for executing a logical plan of steps for accomplishing a goal. For example, an AI agent may include agent metadata, one or more prompt templates 4906 through 4926, one or more prompt chaining instructions 4908 through 4928, a model 4910 through 4930, and an indication of a planner service 4912 through 4932.

According to various embodiments, the model may include one or more of any suitable generative model, predictive model, classification model, or other type of AI model. The model may be executed within the computing services environment or may be located outside the computing services environment. For instance, the model may be a version of ChatGPT provided by OpenAI, GoogleBard provided by Google, or any other type of network-accessible AI model.

According to various embodiments, a planner service represents an approach to generating a prompt when determining and executing a logical plan of steps for accomplishing a goal. Various planner services may be used.

In some embodiments, a planner service may represent a Chain-of-Thought (CoT) approach, which is also referred to as a sequential planner. Chain-of-Thought mimics human-style decision making by instructing an LLM to break down a complex problem in a sequence of steps. Chain-of-Thought reasoning can accomplish various commonsense reasoning tasks that a human can solve with language. Chain-of-Thought reasoning instructs the LLM to identify the sequence of steps in a manner that is explainable to a human, allowing the chain of reasoning to be corrected if an incorrect chain of reasoning is recommended.

In some embodiments, a planner service may represent a Tree of Thoughts (ToT) approach. A Tree-of-Thought can generate multiple "thoughts" at an intermediate step. Instead of picking just one reasoning path, it can explore and evaluate the current status of the environment with each step to actively look ahead or backtrack to make more deliberate decisions. Such an approach may be particularly attractive for complex tasks such as more complex math and creative writing exercises. Tree-of-Thought reasoning mimics a human decision-making paradigm that explores multiple options, weighs pros and cons, and then picks the best one.

In some embodiments, a planner service may represent a Reasoning and Acting (ReAct) approach. ReAct allows for accessing real-world information for reasoning in addition to data that the LLM has been trained on or that is included in the prompt. ReAct-based reasoning can provide a human-like task solving ability that involves interactive decision-making and verbal reasoning, potentially leading to better error handling and lower hallucination rates. It synergizes reasoning and action through user action, which increases interpretability and trustworthiness of responses. This strategy is also referred to as a "stepwise planner" because it approaches problem-solving in a step-by-step manner and can also seek user feedback at potentially every step.

In some embodiments, a planner service may represent a Reasoning via Planning (RAP) approach. This strategy uses LLMs as both the reasoning engine and world model to predict the state of the environment and simulate the long-term impact of actions. It integrates multiple concepts, such as exploration of alternative reasoning paths, anticipating future states and rewards, and iteratively refining existing reasoning steps to achieve better reasoning performance. RAP may be particularly applicable for tasks that involve planning, math reasoning, and logical inference.

Figure 50:
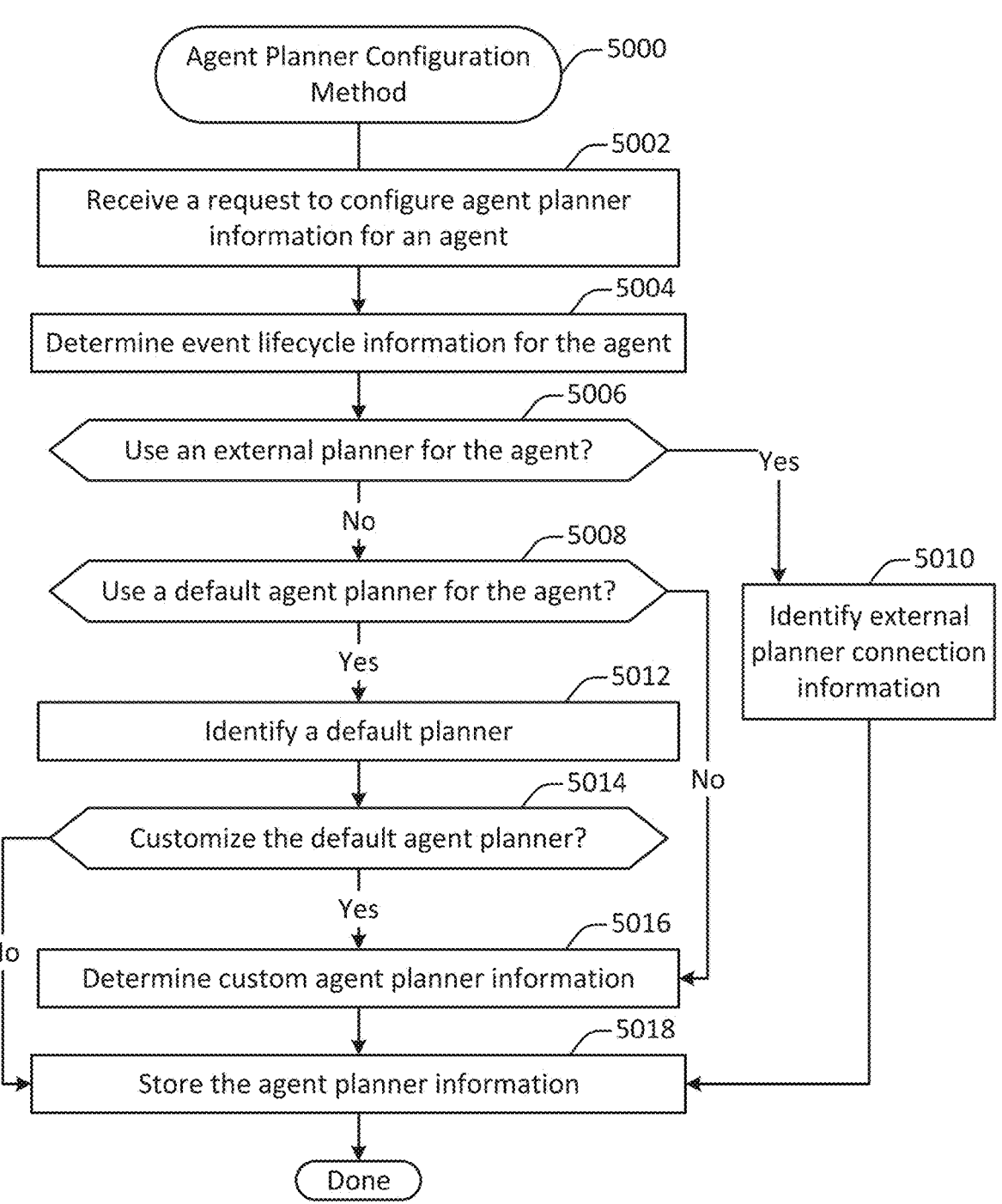
FIG. 50 illustrates a method of configuring an agent planner, performed in accordance with one or more embodiments.

FIG. 50 illustrates a method 5000 of configuring an agent planner, performed in accordance with one or more embodiments. The method 5000 may be performed via the computing services environment 100, for instance via the agent studio 112.

A request to configure agent planner information for an agent is received at 5002. In some embodiments, the request may be generated as discussed with respect to operation 1514 shown in FIG. 15.

In some embodiments, some or all of the agent planner information may be provided via a graphical user interface. Alternatively, or additionally, some or all of the agent planner information may be specified via one or more metadata files and/or provided via an application procedure interface.

Lifecycle information for the agent is determined at 5004. According to various embodiments, agent lifecycle events include sequential stages that govern an agent's interactions with the environment, user, and data. Examples of such events include: (1) Initialization (e.g., setting up the agent's initial state and configuration), (2) Input Handling (e.g., processing user inputs and extracting relevant information), (3) Context Management (e.g., maintaining and updating the agent's understanding of the conversation), (4) Action Execution (e.g., performing tasks or invoking external services), (5) Response Generation (e.g., crafting appropriate responses based on the context and input), (6) Termination (e.g., handling the end of the interaction or session).

In some embodiments, to customize agent behavior, developers may override specific context, input handling, or response generation logic. Such customization may be achieved in part by modifying the agent's lifecycle events. Even with standard planners, developers can tailor their agents without creating entirely new ones.

In some embodiments, developers can modify agent behavior by specifying overrides for lifecycle events within the agent's metadata template. For example, the agent's metadata template may include elements such as the following, and allow such elements to be modified by the developer.

INIT: Initialization step for the planner/agent when the session starts.

LLM_REQUEST: Involves interacting with a Large Language Model (LLM) for tasks like generating text or understanding prompts.

USER_INPUT: Used for any additional context to be added based on the user input.

USER_CONFIRMATION: Asks the user to confirm a specific action or decision.

ACTION_REQUEST: Executes a particular action or task.

ERROR: Handles errors or exceptions that occur during the planning process.

ESCALATION: Potentially escalates a problem to a higher level or a different team.

SESSION_END: Called at the end of the session.

In some embodiments, an interface such as the following interface may be used to override lifecycle events. In the following interface, "PlannerStepProcessor<S extends PlannerLifecycleStep>" defines a generic processor that can handle various types of PlannerLifecycleStep. The "preprocess" method takes a step and the current session context as input and returns the pre-processed step. Such a method can be implemented to perform transformations or validations before executing the step. The "postprocess" method takes the executed step, the session context, and the result of the step execution as input. It can be implemented to perform any post-processing tasks, such as logging, updating the session context, or triggering subsequent actions and returning a planner message result.

```java
Java
public interface PlannerStepProcessor<S extends PlannerLifecycleStep>{
    /**
     *Pre-processing logic to be applied before executing the step.
     *
     *@param step The step to be pre-processed.
     *@param sessionContext The current session context.
     *@return The pre-processed step.
     */
    Mono<S> preProcess(S step, PlannerTypeSessionContextView sessionContext);
    /**
     *Post-processing logic to be applied after executing the step and returns an PlannerMessage result.
     *
     *@param step The step that has been executed.
     *@param sessionContext The current session context.
     *@param result The result of the step execution.
     */
    Mono<PlannerMessage> postProcess(S step,
        PlannerTypeSessionContextView sessionContext,
        PlannerMessage result);
}
```

An example implementation of such a template is as follows:

```java
Java
public class CustomLifeCycleEventHandler implements PlannerStepProcessor<PlannerSteps>{
    @Override
    public Mono<PlannerStep> preProcess(PlannerStep step,
        PlannerTypeSessionContextView sessionContext) {
        //Implement pre-processing logic here
```

```java
    //For example, you could validate input parameters or add context-specific
    information return Mono.just(step);
    }
    @Override
    public Mono<PlannerMessage> postProcess(PlannerStep step,
        PlannerTypeSessionContextView sessionContext,
        PlannerMessage result) {
        //Implement post-processing logic here. For example, you could log the
        result, update the session context, or trigger subsequent actions
        return Mono.just(result);
    }
}
```

After it is created, the lifecycle event interface may be added to the agent metadata template with a custom life cycle event handler entry such as the following:

```
Unset
# Namespacefor the planner
namespace:AiAgent
# Lifecycle Event Handler Developer Name
name:CustomLifeCycleEventHandler
# Lifecycle Event Handler Developer Description
description:Custom Life Cycle Event Handler
# Lifecycle Event Handler Implementation
implementation:    CustomLifeCycleEventHandler.apex
    lifeCycleEventsType:
[PreUserInput, PostUserInput . . . ] type: apex/gRPC/java/
    http
```

A determination is made at 5006 as to whether to use an external planner for the agent. In some embodiments, the determination may be made based on user input. Upon determining to use an external planner for the agent, external planner connection information is identified at 5010. The external planner connection information may include, for instance, address information, authentication information, application procedure interface information, and/or other such information for connecting to the external planner.

Upon determining instead to use an internal planner for the agent, a determination is made at 5008 as to whether to use a default planner for the agent. In some embodiments, the determination may be made based on user input.

Figure 52:
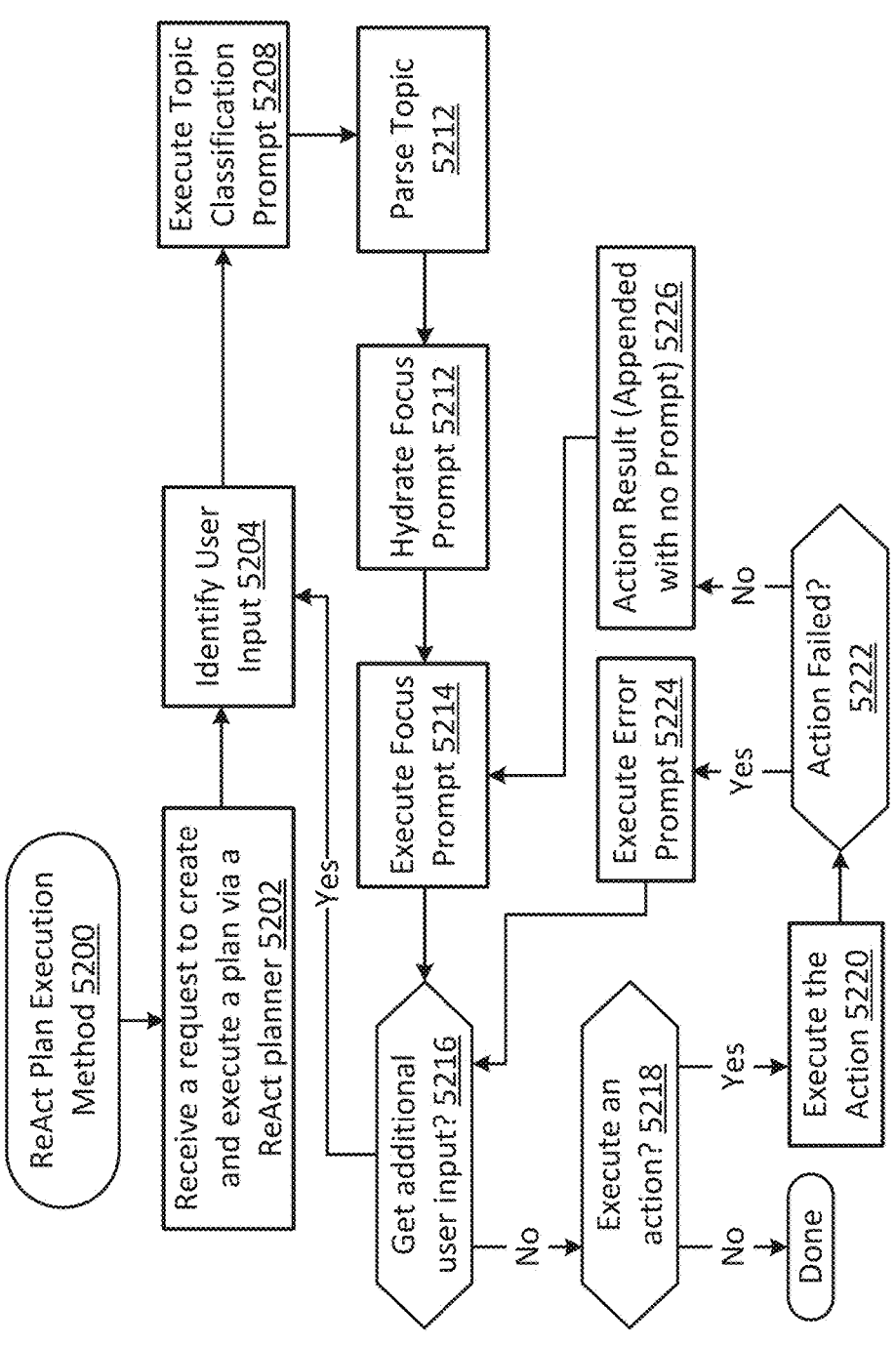
FIG. 52 illustrates a method for determining and executing a plan via a ReAct planner, performed in accordance with one or more embodiments.
Figure 53:
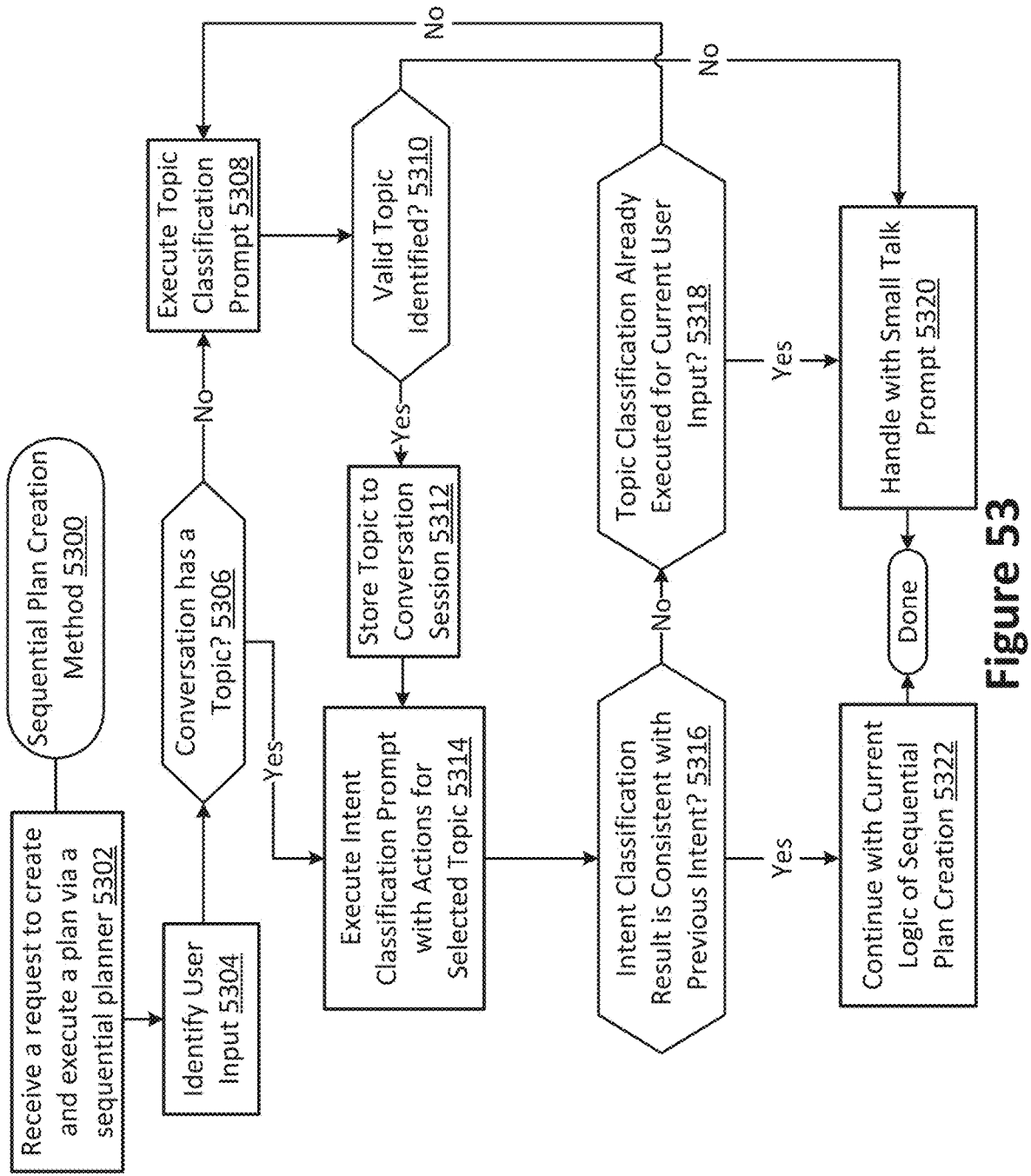
FIG. 53 illustrates a method for creating and executing a plan via a sequential planner, performed in accordance with one or more embodiments.

Upon determining to use a default planner, a default planner is identified at 5012. The default planner may be identified by, for instance, selection from a list of available default planners based on user input. Examples of default planners are shown in FIG. 51, FIG. 52, and FIG. 53. Upon identifying a default planner, a determination is made at 5014 as to whether to customize the default agent planner.

Upon determining to use a custom planner at 5008 or to customize the default agent planner at 5014, custom agent planner information is determined at 5016.

In some embodiments, the developer can further change or extend by providing their own planner and reasoning implementation. The following interface is an example of what a developer may complete to define a custom agent with a planner and reasoning implementation.

```java
Java
public interface PlannerTypeMessageHandler<S extends
    PlannerStep>{Mono<S> init(PlannerTypeSessionContextView sessionContext);
Mono<S>    onClientMessage(PlannerTypeSessionContextView sessionContext, UserTextinput userTextinput);
```

```
Mono<S>    onLLMResponse(PlannerTypeSessionCon-
    textView  sessionContext,  LLMCompletionResponse
    llmCompletionResponse);
Mono<S>    onPlanTemplateMessage(PlannerTypeSes-
    sionContextView  sessionContext,  PlanTemplateMes-
    sage planTemplateMessage);
Mono<S> onUserConfirmationRequired(PlannerTypeS-
    essionContextView  sessionContext,  UserConfirma-
    tionRequired userConfirmationRequired);
Mono<S>    onUserCancel(PlannerTypeSessionContext-
    View sessionContext, UserCancel userCancel);
Mono<S>    onActionSuccess(PlannerTypeSessionCon-
    textView   sessionContext,   ActionSuccessResponse
    actionSuccessResponse);
Mono<S>    onActionError(PlannerTypeSessionContext-
    View sessionContext, ActionErrorResponse actionEr-
    rorResponse);
Mono<S> onPlannerError(PlannerTypeSessionContext-
    View sessionContext, PlannerErrorMessage plannerEr-
    rorMessages);
Mono<S> onSystem Error(PlannerTypeSessionContext-
    View sessionContext, SystemErrorMessage systemEr-
    rorMessage);
Mono<S> onRestoreMessage(PlannerTypeSessionCon-
    textView sessionContext, PlannerMessage<?> planner-
    Message);
Mono<S> onSession End(PlannerTypeSessionContext-
    View sessionContext);
}
```

In some embodiments, such a custom planner may then be added to a custom agent with a metadata entry such as the following. Based on such information, the agent service will automatically orchestrate the methods as defined in the agent graph and the methods implemented by the custom planner.

```
Unset
# Namespace for the planner
namespace:AiAgent
# Agent Developer Name name:CustomReACT
# Planner Developer Description description:Custom
    reACT Planner
# Planner Implementation implementation: CustomRe-
    ACTImpl.apex type:
apex/gRPC/java/http
```

Figure 55:
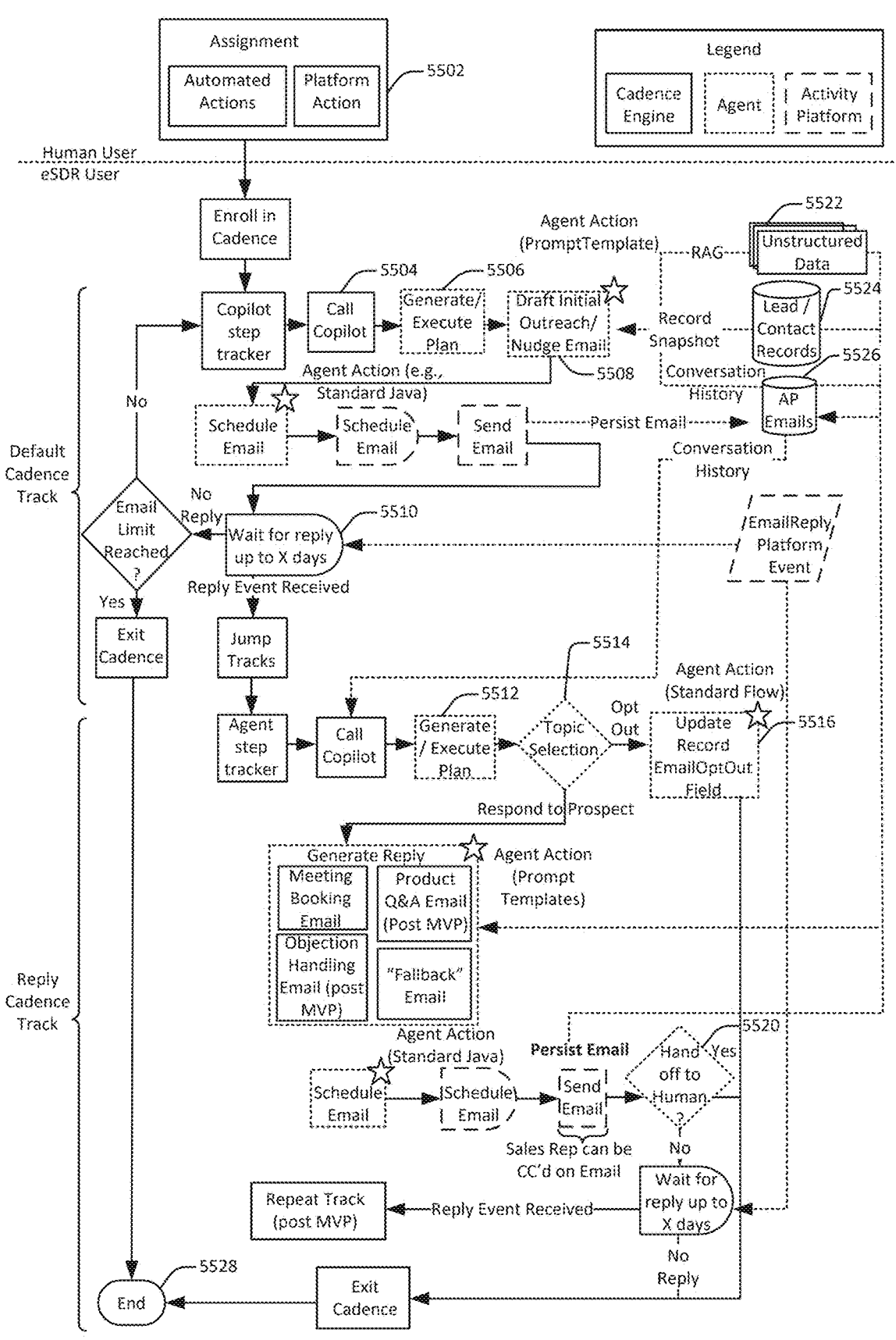
FIG. 55 illustrates an example of a representation of a custom graph, configured in accordance with one or more embodiments.

In some embodiments, customers can define a custom graph to provide for custom planning. An example of such a graph is shown in FIG. 55. A custom graph may provide for various types of customization. For example, a graph and/or custom planner may avoid topic classification for an interaction, since the action may be limited to a context where the topic is known. As another example, a graph and/or custom planner may identify but not execute an action to be performed. As yet another example, a graph and/or custom planner may be configured so as to generate a textual answer only if a user utterance indicates that the system's previous answer is insufficient. As still another example, a graph and/or custom planner may be configured to re-use parts of another agent. A process for creating such a graph is shown in FIG. 54.

FIG. 51 illustrates an example flow for dynamically filtering topic options, performed in accordance with one or more embodiments. FIG. 52 illustrates a method 5200 for determining and executing a plan via a ReAct planner, performed in accordance with one or more embodiments. FIG. 53 illustrates a method 5300 for creating and executing a plan via a sequential planner, performed in accordance with one or more embodiments. FIG. 51, FIG. 52, and FIG. 53 illustrate examples of the type of planner that may be customized and configured as discussed with respect to the method 3900 shown in FIG. 39. These figures includes various operations that overlap with operations shown in other methods described herein. However, the operations shown in these figures are emphasized so as to highlight how the logic flow of some planners may, in some configurations, differ from the logic flow for other types of planners and agents. Thus, these figures represent a particular configuration of operations, prompt chaining instructions, and the like. However, in practice the execution of an autonomous agent may include additional, fewer, or different operations, and/or operations may be performed in an order different from that shown.

Returning to FIG. 51, a user utterance is received via a communication channel at 5102. The user utterance is then evaluated at 4604 using topic filtering with a rule engine. In some embodiments, rule expressions may be used to allow agents and applications to dynamically filter topics based on their specific context. Such filtering may be helpful for agents such as Sales Development Representative and Coach, which may benefit from context-dependent topic selection. For example, an expression language may be used to dynamically filter topic options. Expressions that evaluate to True may then yield a specific set of filtered topics. An example of a rule expression template metadata entry for an Order Management topic is as follows:

```
Unset
namespace: Agent
name: customRuleExpression
expression:              'AND(appName="Service",
    pageType="ALL", entityName="ALL")'
results:
    topics:
        Agent_orderManagement
```

The topic filtering process may select a set of topics that may be related to the user utterance 5102 by applying a set of rules. Such a filtering process may be used to select a reduced number of topics for further analysis.

A topic classification prompt is executed at 4606 using only filtered topics for classification. At 4610, a determination is made as to whether the topic classification identified a valid topic.

Upon determining at 4610 that the topic classification result yields a valid topic, the topic is updated in the planner state at 4612, and the action determination and execution continues at 4614. Upon determining instead that a valid topic has not been identified, the utterance may be treated as off topic at 5116. Off topic utterances may be addressed with a custom generative language model prompt designed to generate novel text to provide a small talk response and/or to direct the user back to the topic at hand.

Returning to FIG. 52, a request to create and execute a plan via a ReAct planner is received at 5202. In some embodiments, the request may be generated as discussed with respect to the operations shown in the method 5200.

User input is identified at 5204. In some embodiments, the user input may include text, context, activation of user interface elements, and/or other such operations. A topic classification prompt is determined and executed at 5208. The completed topic classification prompt is parsed to determine a topic at 5212.

The topic is used to hydrate a focus prompt at 5214. The focus prompt is executed at 5216 to determine a focus prompt completion that includes novel text identifying an initial action to complete. A determination is then made at

5216 as to whether to solicit additional user input. Upon determining to solicit additional user input, such user input is solicited at 5202.

Upon determining instead not to solicit additional user input, a determination is made at 5218 as to whether to execute an action. In some embodiments, actions may continue to be executed as long as the plan remains uncompleted.

Upon determining to execute an action, the action is executed at 5220. According to various embodiments, any of a variety of actions may be performed, as discussed in detail throughout the application. Such actions may include determining and sending one or more prompts to a generative language model for completion, performing one or more operations within a database system, executing a workflow within the computing services environment, communicating with one or more external computing devices, querying one or more data sources, or any other type of action executable within the computing services environment.

A determination is made at 5222 as to whether a failure has occurred. In some embodiments, the system may identify the presence of a failure if an action does not complete, completes with an error condition, fails to produce useful information, or the like.

Upon determining that a failure has occurred, an error prompt is determined and executed at 5224 to evaluate the error. In some embodiments, the error prompt may be used to prompt the generative language model to evaluate the error to determine corrective action. The corrective action may involve soliciting additional user input, determining a different action (e.g., a different database query or search query), or another course of action.

Upon determining instead that the action has succeeded, the action result is appended to the focus prompt at 5226. In some embodiments, the focus prompt may include a chain of thoughts and actions generated by the large language model and performed by the computing services environment. Such an approach may provide for more complex reasoning, in which previously generated thoughts and previously executed actions guide the generation of subsequent thoughts and the selection of subsequent actions. For example, the generative language model may be provided with a record of the conversation between the user and the autonomous agent, a set of actions that may be performed, and a chain of thoughts and actions determined by previous interactions with the generative language model. In this way, the generative language model may execute the user's intent by successively determining thoughts and corresponding actions, with subsequent thoughts and actions being dependent on previous thoughts and actions.

Returning to FIG. 53, a request to create and execute a plan via a sequential planner is received at 5302. User input is identified at 5304. In some embodiments, the user input may be identified as discussed with respect to the operation 5202 shown in FIG. 52.

A determination is made at 5306 as to whether the communication session has a topic. In some embodiments, a communication may be assigned a topic when it is created based on initial user input. Upon determining that communication session lacks a topic, for instance if the user input is not the first in a communication session, then at 5308 a topic classification prompt is determined and executed to determine a topic. The topic may be determined as discussed with respect to the operation 5110 shown in FIG. 51.

According to various embodiments, upon parsing the topic classification prompt to determine a topic, the topic is evaluated at 5310 to determine whether the topic corresponds to a valid topic identified in the system. Upon determining that a valid topic has not been identified, a natural language response is determined via a small talk prompt at 5320. Upon determining instead that a valid topic has been determined, the topic is stored to the conversation session at 5312. In this way, the topic may be made available for access in processing subsequently received user input in the same communication session.

According to various embodiments, upon determining that a communication session is associated with a valid topic, an intent classification prompt with actions for the selected topic is executed at 5314. The intent classification prompt may include a list of actions that may be selected to determine a plan. The list of actions may be determined based on the topic identified at 5308.

In some embodiments, metadata for such actions, such as descriptions of the actions and unique identifiers for the actions, may be incorporated into an intent classification prompt. The generative language model may then select from among the actions to determine a plan that includes one or more of the actions.

In some embodiments, the intent classification prompt may involve any of several operations. For example, the intent classification prompt may determine a topic based on the user's intent. As another example, the intent classification prompt may identify one or more operations to perform to execute the user's intent.

Upon executing the intent classification prompt, a determination is made at 5316 as to whether the intent classification result is different from the existing topic. In some embodiments, if the intent classification result is not different, then the system continues with the current logic of sequential plan creation at 5322. For instance, the system may identify a sequence of actions to include in a plan to realize an intent reflected in the natural language user input.

If instead a new intent is determined, then a determination is made at 5318 as to whether topic classification was already performed for the current utterance. If topic classification has not yet been executed for the user input, then the user input is evaluated at 5306 to determine a topic.

Upon determining instead that topic classification has already been executed for the current user input, then the user input is treated as off topic and handled with a small talk prompt at 5320. According to various embodiments, the small talk prompt may be used to interact with a user in a way that does not require a complex plan. For example, a user may be provided with textual information about the autonomous agent, may be assisted with textual responses to simple queries, or may receive other types of interactions from the autonomous agent.

FIG. 54 illustrates a method 5400 for defining an agent planner graph, performed in accordance with one or more embodiments. The method 5400 may be performed at the computing services environment 100, for instance via the agent studio 112.

In some embodiments, an agent graph provides a tool for modeling and visualizing complex systems such as AI agents and their workflows. In some embodiments, In some embodiments, an agent graph may include nodes and edges. Nodes may represent the different steps or components in a graph. For example, a graph may have nodes for user input, LLM interaction, task execution, and response generation. Edges may represent the connections between nodes, indicating the flow of data or control. These can be directed or undirected, depending on the nature of the connection.

A request to configure an agent planner graph for an agent is received at 5402. In some embodiments, the request may be generated as discussed with respect to the operation 5016 shown in FIG. 50.

A node type for a node is identified at 5404. According to various embodiments, node properties may be used to define characteristics of steps or components in a graph. For example, node type may define the type of node (e.g., "input", "output", "action", "decision"). The node type may specify the functioning of the node within the planner. For instance, an input node may be associated with a data retriever, whereas an output node may be associated with one or more operations to format of output for transmission. An action node may link to an action definition within the metadata framework. A decision node may be associated with a rule for making a decision based on available information. Alternatively, or additionally, a decision node may be associated with a prompt template for use in determining an input prompt, which may be completed by a generative language model to produce a decision.

A node label for the node is identified at 5406. In some embodiments, a node label may provide a descriptive label for the node. A node may also be associated with a node description that provides a more detailed explanation of the node's function.

One or more node parameters for the node are identified at 5408. In some implementations, node parameters may be used to specify any required or optional parameters for the node. The specific parameters that are specified may depend on characteristics such as the type of node and the node's functions. For instance, a decision node may specify a decision-making rule and/or a prompt template for determining an input prompt to be completed by a generative language model for making the decision.

One or more node conditions are identified at 5410. In some embodiments, node conditions may define conditions that must be met for the node to be executed. For instance, a node associated with an action to perform the generation and transmission of an email message may be associated with a condition that the email cannot be sent until three days have passed since an initial email was sent.

A determination is made at 5412 as to whether to create an additional node. In some embodiments, the determination made at 5412, as well as the information identified in operations 5404 through 5412, may be made based on user input. For instance, information may be provided via a graphical user interface. Alternatively, or additionally, some or all of the information may be identified in a different way, for instance being provided directly in text specified via a markup language.

Upon determining not to identify an additional node, a relationship between nodes is identified at 5414. In some embodiments, the identification of a relationship may involve the identification of an edge label, which provides a descriptive label for the edge. The identification of the relationship may also involve the identification of a source (i.e. first) node in a relationship and a sink (i.e. second) node in a relationship. That is, the first and second nodes may be defined as "from" and "to" nodes to illustrate the directional nature of the flow through the graph.

A relationship type for the relationship is identified at 5416. In some embodiments, a relationship type (also referred to herein as an edge property) may be used to define characteristics of linkages between nodes. For example, edge type may indicate the type of connection, such as "sequential", "parallel", or "conditional". For a sequential relationship type, the sink (i.e., second) node may be executed once the source (i.e. first) node has been completed. For a parallel relationship type, the sink (i.e. second) node may be executed in parallel with the source (i.e. first) node. For a conditional relationship type, the sink (i.e. second) node may be executed only if indicated based on the execution of the source (i.e. first) node.

One or more edge conditions are identified at 5418. As yet another example, edge conditions may define conditions that must be met for the edge to be traversed. For instance, a "reply event received" edge linking a node in which a message is sent to a node in which a reply is processed may only be traversed when a reply to the message is received by the computing services environment 100.

A determination is made at 5420 as to whether to create an additional relationship. In some embodiments, the determination made at 5420, as well as the information identified in operations 5414 through 5420, may be made based on user input. For instance, information may be provided via a graphical user interface. Alternatively, or additionally, some or all of the information may be identified in a different way, for instance being provided directly in text specified via a markup language.

Upon determining not to identify an additional relationship, flow information for the agent planner graph is identified at 5422. In some embodiments, flow information may be used to define the process represented by the graph nodes and edges. For example, a flow name may uniquely name the flow. As another example, a flow description may provide a brief overview of the flow's purpose. As yet another example, flow start node may specify the node that serves as the starting point of the flow, while flow end node may specify the node that marks the end of the flow. As still another example, global variables may define variables that can be accessed by multiple nodes within the flow.

A metadata representation of the agent planner graph is determined at 5424. In some embodiments, the metadata representation may be provided directly by an end user. Alternatively, or additionally, all or portions of the metadata representation may be produced by the computing services environment 100 after receiving input, for instance via a graphical user interface, from a client machine authenticated to a user account.

According to various embodiments, an example of an agent graph metadata definition is as follows:
Unset
flow:
   name: Customer Support Flow
   description: Handles customer inquiries and provides assistance. start_node:
   user input
   end_node: response generation
nodes:
   type: input label: User Input
   type: action
   label: Classify Intent parameters:
   model: intent_classification model
   type: decision
   label: Is Intent Supported?
   type: action
   label: Execute Task parameters:
   task: resolve_issue
   type: output
   label: Generate Response
edges:
   type: sequential
   from: user input
   to: classify intent \# . . . other edges . . . .

FIG. 55 illustrates an example of a representation of a custom graph 5500, configured in accordance with one or more embodiments. The custom graph 5500 may be produced as discussed with respect to the method 5400 shown in FIG. 54.

The custom graph 5500 illustrates an example of an interaction between a human agent and a sales development representative agent. At 5502, a human user assigns one or more automated actions and/or platform actions to the agent. The assignment leads to the initiation of the agent at 5504. The agent generates and executes a plan of action at 5506. The plan of action executed at 5508 includes drafting an email, scheduling an email, and sending an email. The agent then waits for a reply at 5510. If a reply is received, then a new plan is generated and executed at 5512. The new plan may involve topic selection at 5514. Topic selection may lead to an opt out process at 5516 if the recipient has opted out of further communication, or the generation of a reply at 5516 if the user has responded to the prospect. Generating a reply may involve sending an email and then making a determination at 5520 as to whether to hand off the interaction to a human. At 5522, RAG may be used to inform email generation based on unstructured data. Structured data may be used for a similar purpose at 5524. Conversation history may be stored and retrieved at 5526. The process may terminate when an email limit is reached, when a recipient opts out of further communication, or when a determination is made to hand off the interaction to a human.

In some embodiments, as shown in FIG. 55, one or more elements may be executed by a cadence engine configured to implement operations with a designated cadence.

Figure 56:
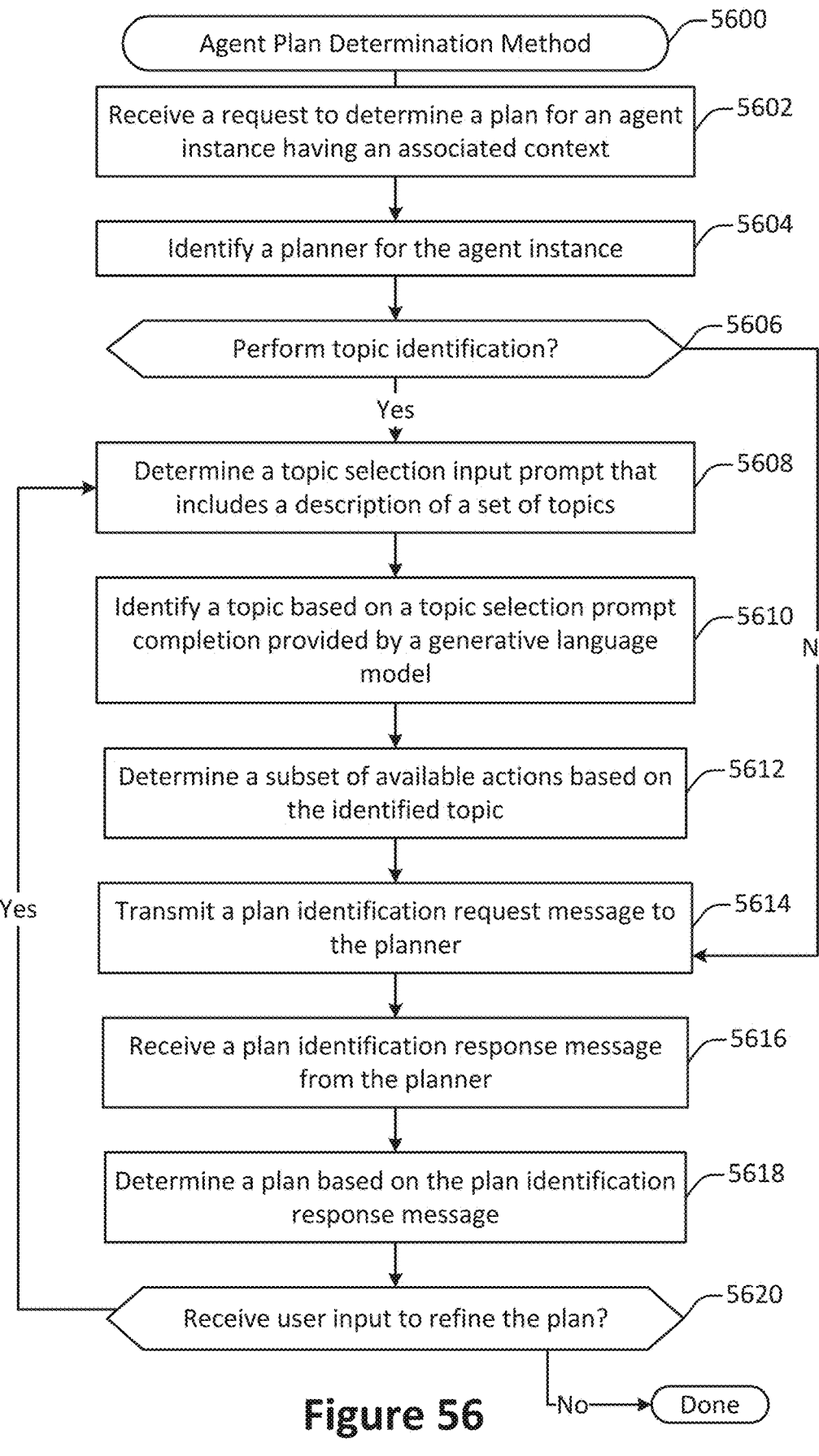
FIG. 56 illustrates a method for determining a plan, performed in accordance with one or more embodiments.

FIG. 56 illustrates a method 5600 for determining a plan, performed in accordance with one or more embodiments. The method 5600 may be performed at the computing services environment 100 shown in FIG. 1.

A request to determine a plan for an agent instance having an associated context is received at 5602. In some embodiments, the request may be generated as discussed with respect to the operation 3006 shown in FIG. 30.

In some embodiments, the request may be generated based on user input received via a conversational chat assistant. For instance, the request may be generated based on natural language input such as "Update the opportunity to be $70,000", "Book an appointment for me," "Find the contact for Acme", or any other type of input. Such information may be included in the agent's context. Such user input may be received in association with an account at the database system. The account may be associated with an individual user. Alternatively, or additionally, the account may be associated with an organization such as an organization accessing computing services via the computing services environment.

In some embodiments, the context may include any or all of a variety of information. For example, the context may include one or more identifiers for a user account, an organization account, or any other account within the computing services environment 100. As another example, the context may include one or more previous natural language inputs or other inputs provided by the user. As another example, the context may include one or more natural language outputs or other operations performed by the computing services environment 100 in the course of the interaction. As yet another example, the context may include metadata characterizing the end user, the organization with which the user is interacting, and/or other suitable characteristics. As still another example, the context may include situational data such as a user location, a database record being accessed, a date and time, the weather in a particular location, or any other type of information potentially relevant to the interaction.

In some embodiments, information included and/or determined based on the context may be used to guide the determination of the plan. For instance, a user account may be provided with access only to particular database objects, actions, topics, and/or other elements of the computing services environment 100. Such information may be used, for instance, to guide the determination of the subset of available actions, the determination of a topic, and/or the identification of a plan.

A planner for the agent instance is determined at 5606. In some embodiments, the planner for the agent instance may be identified based on configuration information reflected in one or more metadata entries determined as discussed with respect to the method 5000 shown in FIG. 50.

A determination is made at 5606 as to whether to perform topic identification. In some embodiments, topic identification may be used in some planners, such as default planners, to filter the set of actions for plan selection. However, other planners, such as some external planners or some custom planners, may be applied to a predetermined set of actions such that topic identification need not be performed.

Upon determining to perform topic selection, a topic selection input prompt including a description of a set of topics is determined at 5608. The topic selection input prompt includes some or all of the natural language user input and a description of a set of topics. The topic selection input prompt may instruct the generative language model to select from the set of topics for the purpose of identifying prospective actions to perform to fulfill the intent reflected in the user's input.

According to various embodiments, the particular topics that may be selectable may depend upon the context. For example, the computing services environment 100 may provide a set of default topics, such as database system interaction, service-related operations, sales-related operations, and the like. As another example, one or more topics may be tailored to specific industries, organizations, individuals, or other contexts.

A topic is then identified at 5610 based on a topic selection prompt completion provided by a generative language model. For instance, the generative language model may generate novel text that includes an identifier corresponding to the topic that the generative language model identifies as being most closely related to the user's intent. The identifier may be extracted from the topic selection prompt completion by the computing services environment 100.

In some embodiments, the generative language model may identify more than one topic. For instance, the generative language model may identify the user's intent as being related to sales operations and payment processing topics.

A subset of available topics is determined at 5612 based on the identified topic. In some embodiments, an action may be any operation or combination of operations capable of being performed via the computing services environment 100. For instance, an action may include a prompt completed by a generative language model, one or more database operations, an API request, the instantiation of another agent instance, an invocation of an artificial intelligence or machine learning model, or another type of operation. The subset of actions identified may be those linked to the identified topic, as shown in FIG. 12.

A plan identification request message is transmitted to the planner at 5614. In the event that the planner is an external planner, the message may be sent to a computing device located outside of the computing services environment 100, for instance via connection information specified as discussed with respect to the method 5000 shown in FIG. 50. Alternatively, in the event that the planner is an internal default or customer planner, a plan identification prompt may be sent to a generative language model for completion in accordance with the planner.

In some embodiments, the plan identification prompt may list the subset of available actions for selection by the generative language model as part of generating a plan to execute the user's intent. One or more of the subset of available actions may be predetermined, for instance based on the planner definition. Alternatively, or additionally, one or more of the subset of available actions may be determined based on the subset selected at operation 5612.

An example of a prompt template that may be used to determine an intent and/or an orchestration plan as discussed with respect to operation 5614 and elsewhere herein is as follows. In the following prompt template, portions such as "{{$history}}" represent fillable portions that can be dynamically replaced with relevant content at runtime to determine an input prompt from the prompt template. For example, "[HISTORY]" may be replaced with natural language input and/or output included in a chat interface. As another example, {{$available_junctions}} may include a list of operations that may be performed in response to the input.

In the following prompt template, examples and counter-examples are provided so as to better guide the generative language model to generate a plan in accordance with a specified plan definition. For instance, the generative language model is instructed to "DO NOT DO THIS, THE PARAMETER VALUE IS ATTEMPTING TO USE A CONTEXT VARIABLE AS AN ARRAY/OBJECT".

<message role="System"><![CDATA[
Create an XML plan utilizing the [AVAILABLE FUNCTIONS] based on the user's latest goal as stated in the [HISTORY]. Ensure that the USER GOAL is clearly understood from the last exchange in the [HISTORY]. Use the context provided by the [HISTORY] to discern the intent behind previous assistant responses before formulating the plan.

As part of creating the plan also make sure you also include identifying the user's intent as expressed in the USER GOAL. Examine the [HISTORY] carefully to understand the conversation flow and the intent behind the assistant's responses.

Review the [AVAILABLE FUNCTIONS] thoroughly. Your ability to engage in conversation is constrained to these functions. Use this information to generate a valid plan as well as both the category and the intent.

[INTENT INSTRUCTIONS]

Determine the USER INPUT and classify it into one of the following categories:

- - - new: If the user introduces a new subject that aligns with the [AVAILABLE FUNCTIONS], create a DISTINCT RELEVANT and SIGNIFICANT 3-word intent label for the USER INPUT previous: If the USER INPUT is a continuation of or a response to a prior ASSISTANT message in the chat history, apply the same intent that was used previously.

smallTalk: If the user is attempting to engage in casual conversation unrelated to the [AVAILABLE FUNCTIONS], classify the USER INPUT as smallTalk and skip the planning step.

For each intent category, use the 'type' input to indicate the type of intent (choosing from new, previous, smallTalk) and the 'name' input to provide appropriate details and represent it under <intent/>.

If the category is small talk, then there is no need to create a plan and skip the function sequence step.

[END INTENT INSTRUCTIONS]
[SYSTEM FUNCTIONS]
- - - completeAssignment: "Run this command in the end when the Assignment is completed using AVAILABLE FUNCTIONS below."
inputs:
properties:
answer: The answer or result of the assigned task. Please provide user-friendly result with insights.
type: string
required:
answer
askUser: "Run when assistant need to get input from the user. This function can accept only one input from the user."
inputs:
properties:
question: The question to the user.
type: string
required:
question
[END SYSTEM FUNCTIONS]
[AVAILABLE FUNCTIONS]
{{$available_functions}}
[END AVAILABLE FUNCTIONS]
[TYPE DEFINITION]
{{$type definitions}}
[END TYPE DEFINITION]
Today is: {{$today}}
[LOCALE]
{{$locale}}
[END LOCALE]
[FUNCTION POLICIES]
1. For Copilot v1.EmployeeCopilot_IdentifyRecordByName function you are allowed to use Salesforce Object Api Names from this given list ONLY: {{$object_api_names}}.
Skip Object API Name when you are not confident.
[END FUNCTION POLICIES]
[FUNCTION INSTRUCTIONS]
CRUCIAL:
To call a function, follow these steps:
1. A function has one or more named parameters and a single 'output' which are all strings. Parameter values should be xml escaped.
2. To save an 'output' from a <function>, to pass into a future <function>, use <fn.{FullyQualifiedFunctionName} . . . output="<UNIQUE_VARIABLE_KEY>"/>

3. To save an 'output' from a <function>, to return as part of a plan result, use <fn.{FullyQualifiedFunction-Name} . . . result="<UNIQUE_RESULT_KEY>"/>

4. Use a '$' to reference a context variable in a parameter, e.g. when 'INPUT='world'' the parameter 'Hello $INPUT' will evaluate to 'Hello world'.

5. Functions do not have access to the context variables of other functions. Do not attempt to use context variables as arrays or objects. Instead, use available functions to extract specific elements or properties from context variables.

6. Make sure that all REQUIRED parameters for function are populated from previous function output or history or user input.

DO NOT DO THIS, THE PARAMETER VALUE IS NOT XML ESCAPED:

<fn.Name4 input="$SOME PREVIOUS_OUTPUT" parameter_name="some value with a <!—'comment' in it—>"/>

DO NOT DO THIS, THE PARAMETER VALUE IS ATTEMPTING TO USE A CONTEXT VARIABLE AS AN ARRAY/OBJECT:

<fn.CallFunction input="$OTHER_OUTPUT[1]"/>

Here is a valid example of how to call a function "_Function_.Name" with a single input and save its output:

<fn._Function_.Name input="this is my input" output="SOME_KEY"/>

Here is a valid example of how to call a function "FunctionName2" with a single input and return its output as part of the plan result:

<fn.FunctionName2 input="Hello $INPUT" result="FINAL ANSWER"/>

Here is a valid example of how to call a function "Name3" with multiple inputs:

<fn.Name3 input="$SOME PREVIOUS_OUTPUT" parameter_name="some value with a <!—'comment' in it—>"/>

[END FUNCTION INSTRUCTIONS]

[PLAN INSTRUCTIONS]

CRUCIAL:

To create a plan, follow these steps:

0. The plan should be as short as possible.

1. From a USER GOAL create a <plan> as a series of functions.

2. Use [HISTORY] to get the context for <goal>. [HISTORY] is conversation history between you and the user. User might have provided information as part of the history.

Use that when creating <plan>.

3. If present, use [EXISTING PLAN] as reference when creating a new plan. Update the existing plan as appropriate based on [HISTORY]

4. If [PLAN ERROR] has errors it means that you previously generated an incorrect plan, and you are NOW being asked to RECREATE the plan by FIXING the errors specified in the [PLAN ERROR].

5. A plan has 'INPUT' available in context variables by default.

6. Before using any function in a plan, check that it is present in the [AVAILABLE FUNCTIONS] list. If it is not, do not use it.

7. Only use functions that are required for the given USER GOAL.

8. Append an "END" XML comment at the end of the plan after the final closing </plan> tag.

9. Always output valid XML that can be parsed by an XML parser.

10. Always use at least one AVAILABLE FUNCTION.

11. If a plan cannot be created with the [AVAILABLE FUNCTIONS], return <plan />.

12. Use the [TYPE DEFINITION] section to get the type definitions for the [AVAILABLE FUNCTIONS] input and output properties. All references to the output of the function MUST be referenced as $<UNIQUE_VARIABLE_KEY>.<property_name> where 'property_name' represents the fully qualified name of the function property. For eg if the function output with a property named 'output', then the reference to that property will be $<UNIQUE_VARIABLE_KEY>.output.

13. Use the [FUNCTION POLICIES] section to enforce any prerequisites.

[END PLAN INSTRUCTIONS]

CRUCIAL:

When generating the output, you must evaluate the outcome of the execution in relation to the provided [HISTORY] and the USER GOAL. It is imperative that you follow all guidelines outlined in the [INTENT INSTRUCTIONS], [PLAN INSTRUCTIONS], and [FUNCTION INSTRUCTIONS].

Your output must be formatted exclusively in the XML structure shown below. Do not include any additional text or elements outside of this structure. Do not provide [INTENT] and [PLAN] only xml should be provided.

```
```xml
<intent type="Specify one: new, previous, smallTalk" name="Provide a concise intent label according to the requirements for the chosen category"/>
<plan>
<fn.{FullyQualifiedFunctionName} . . . />
<fn.{FullyQualifiedFunctionName} . . . />
<fn.{FullyQualifiedFunctionName} . . . />
<!—Continue to add function calls as necessary—>
</plan>
```
```

Remember, the output must contain only the <plan> XML element and its contents as specified. No other text or elements should be included in the output.

Begin!

]]></message>

<message role="User"><![CDATA[

[HISTORY]

{{$history}} role: USER message:

text: {{$input}}

[END HISTORY]

[EXISTING PLAN]

{{$existing plan}}

[END EXISTING PLAN]

[PLAN ERROR]

{{$plan_error}}

[END PLAN ERROR]

]]></message>

A plan identification response message is received from the planner at 5616. A plan is determined at 5618 based on the plan identification response message. In some embodiments, the plan identification response message may include one or more identifiers corresponding to actions to perform. For instance, a generative language model may return novel text such as a set of identifiers corresponding to the actions selected for inclusion in the plan. The response may then be used by the orchestration and planning engine to identify a plan, for instance by extracting the identifiers from the plan identification response message.

According to various embodiments, the plan may include a set of actions to perform within the computing services environment 100. In some embodiments, the selected one or more actions may be arranged in a linear fashion. For instance, the selected one or more actions may be identified in a sequence for execution by the computing services environment 100 to execute the user's intent. Alternatively, as discussed herein, the selected one or more actions may be arranged in a branching, parallel, or otherwise non-linear fashion. For example, the outcome of one action may influence which of two or more possible subsequent actions are performed. As another example, multiple actions may be performed at the same time or in any suitable order.

Optionally, a determination is made at 5620 as to whether to receive user input to refine the plan. In some embodiments, the determination made at 5620 may be made in the context of a conversational chat assistant where the agent has been instantiated based on user input. For example, the agent may provide a human-readable description of the plan provided by the generative language model for human review. As another example, the agent may determine that the plan is incomplete or the user's intent is ambiguous.

As an example of when additional user input may be indicated, consider a situation in which a user provides natural language input stating "Update the opportunity to be $70,000". In response to this input, the computing services environment 100 may identify "database interaction" as a suitable topic. However, in response to a request to determine a plan to execute the user's intent, the generative language model may observe that the action to update an opportunity object requires as input an identifier for an opportunity object but that the opportunity object to update is not apparent. In such a situation, the generative language model may return a clarification question rather than a plan for execution. For instance, the generative language model may return natural language input such as "Which opportunity object would you like me to update?".

Upon receiving user input refining the plan, the plan may be revised. Revising the plan may involve re-implementing one or more of the operations 5608 through 5620 based on the user input.

Techniques and mechanisms described herein relate to the integration of generative and predictive ML applications into a single framework with multi agent orchestration. This integration facilitates the development of highly personalized, intelligent, and targeted applications that utilize the platform and metadata in a workflow through multimodal, multi-agent orchestration.

According to various embodiments, a multi-agent/agentic framework is a system architecture that involves multiple independent agents interacting with each other to achieve a common goal. When integrated with Large Language Models (LLMs), a type of generative language model, it becomes a powerful tool for creating complex, intelligent systems.

In some embodiments, agents are independent entities, such as humans, agents, or AI models, or even orchestration flows, capable of taking actions and responding to stimuli. LLMs provide language understanding and generation capabilities, allowing actors to communicate and collaborate effectively. Actors operate under a shared context including rules, constraints, and resources.

According to various embodiments, blended AI refers to the synergy between different AI techniques and human expertise. Generative language models can analyze vast amounts of data (e.g., text data, video data, image data, audio data, etc.) to generate responses, translate languages, write different kinds of creative content, and answer questions in an informative way. Prediction models analyze historical data to anticipate future trends and customer behavior, enabling proactive engagement. Deterministic workflows include pre-defined rules and processes that automate routine tasks within the CRM. Non-deterministic workflows leverage generative LLMs and other AI tools to dynamically adapt responses and tasks based on the unique characteristics of each customer interaction. Even with AI, human oversight and decision-making often remain crucial, especially for complex situations or escalating needs. Blended AI refers to the creation of a collaborative environment where AI handles some tasks, such as data analysis and response generation, while humans perform other tasks, such as providing guidance, make critical decisions, and ensure a positive customer experience.

AI applications may include user-defined extensions to a conversational chat interface and may be targeted to specific use cases within a user's workflow. Such applications can use metadata that leverage blended AI as well as in some cases deterministic flows to automate tasks or provide contextual assistance. Users can define an application's functionality through a simplified interface, potentially using pre-built actions that can blend generative and predictive models. An application may be customized to target a specific task or workflow step, enhancing user efficiency. An application may be configured in a channel-agnostic manner, and hence deployed across various communication channels like Slack, LWC, WhatsApp, or even integrated as quick actions within computing services environment applications.

In some embodiments, users can define an application through a setup interface or metadata. Such a process might involve specifying triggers (e.g., keywords, user actions) and/or desired actions (e.g., data retrieval, information formatting, sending messages). An autonomous agent or other agent may execute the defined actions by performing operations such as accessing data sources, generating text, or interacting with other applications. An application may be deployed on one or more chosen UIs and/or channels (e.g., Slack, LWC, etc.) or embedded within computing services environment applications (e.g., as a quick action button).

As one example of a blended AI application, consider a personalized customer journey assistant. In some embodiments, such an application may use a generative LLM to analyze customer interactions (text, chat, emails) and predict their needs, then offers personalized recommendations for products, services, and support options. It may integrate with a virtual assistant that can answer questions through text or voice interactions and/or may present relevant knowledge base articles and FAQs using text and potentially short video summaries. Such an application may include a deterministic workflow leveraging pre-defined decision trees for basic inquiries and a non-deterministic workflow that users the LLM to dynamically generate responses and curate content based on the customer's specific situation.

As another example of a blended AI application, consider an application for smart lead scoring and qualification. In some embodiments, such an application may analyze incoming lead data (text forms, social media profiles, voice messages) through text and audio recognition and use a generative LLM to identify keywords, sentiment, and potential buying signals. It may then score leads based on the analysis, predicting their likelihood to convert, and offer visual representations of lead data (e.g., sentiment charts) for easy comprehension. Such an application may employe a deterministic workflow to assign a base score based on pre-defined criteria (e.g., industry, demographics) and a non-deterministic workflow that includes an LLM to dynamically adjust the score based on its analysis of the lead's unique data.

As another example of a blended AI application, consider an AI-powered customer support agent. In some embodiments, such an application may include a chatbot interface that accepts text, image, and potentially voice inputs for issue descriptions. It may analyze the input with image recognition and speech-to-text to understand the customer's problem, and use a generative LLM to generate trouble-shooting guides, FAQs, and potential solutions. It may also offer options for escalation to a human agent if needed. Such an application may include a deterministic workflow that provides pre-defined solutions for common issues based on keywords and a non-deterministic workflow in which an LLM tailors solutions based on the specific details gleaned from text, image, or audio input.

As another example of a blended AI application, consider a competitive intelligence and market research agent. In some embodiments, such an application may monitor competitor websites, social media, and marketing materials for text, images, and potentially audio (e.g., podcasts), uses a generative LLM to analyze and summarize competitor strategies, product offerings, and customer sentiment, and/or generate reports with visualizations (charts, graphs) to highlight key trends and insights. Such an application may include a deterministic workflow that gathers and organizes data based on pre-defined parameters (e.g., keywords, competitor URLs) and a non-deterministic workflow in which an LLM analyzes and interprets the data to uncover hidden patterns and potential threats or opportunities.

As another example of a blended AI application, consider a generative canvas agent. In some embodiments, such an application may allow a user to have a conversation with data to see what matters most. Information may be presented intuitively, tailored to a user's specific needs. For instance, a user may describe a goal or ask a question. The agent may then understand the user's intent and analyze the data accordingly. It may automatically generate a customized view that shows only the relevant information.

FIG. 57 illustrates a method 5700 for configuring a multi-agent and/or blended AI orchestration, performed in accordance with one or more embodiments. In some embodiments, a distributed agent architecture may leverage multiple agents to collaboratively solve complex problems.

A request to configure a multi-agent orchestration is received at 5702. In some embodiments, the request may be generated as discussed with respect to the operation 5002 shown in FIG. 50. However, instead of configuring only a single agent, multiple agents may be configured.

A central orchestrator agent for the multi-agent orchestration is identified at 5704. In some embodiments, a central orchestrator agent may serve as the command center for a multi-agent orchestration. The central orchestrator agent may be configured as discussed with respect to the method 5000 shown in FIG. 50.

A planner for the central orchestrator agent is identified at 5706. In some embodiments, the central orchestrator agent may be based on the ReACT framework. Using such an approach, individual agents may be created and then attached to an employee agent as an agent action. Alternatively, a different planner may be used. The planner may be identified as discussed with respect to the method 5000 shown in FIG. 50.

One or more state elements to include in the multi-agent orchestration are identified at 5708. In some embodiments, the one or more state elements include data objects or values that persist across multiple agents. The state elements may be used to provide for a shared context for multi-agent operations.

One or more employee agents are identified for the central orchestrator agent at 5710. In some embodiments, employee agents may be explicitly specified. Alternatively, or additionally, the central orchestrator agent may dynamically select employee agents at run time.

Flow control information for the multi-agent orchestration is determined at 5712. In some embodiments, the flow control information may be determined by specifying one or more elements in a planner graph. Alternatively, or additionally, the flow control information may be provided in a more descriptive fashion. For instance, natural language text characterizing when employee agents are to be invoked may be provided.

One or more metadata entries for providing a composite agent invocable action are determined and stored at 5714. According to various embodiments, a composite agent invocable action is a single function that bundles together multiple actions or API calls. Such a configuration may streamline agent orchestration and support headless use cases. This action can be easily integrated into flows or code, facilitating event-driven and trigger-based interactions. For instance, a composite agent invocable action may be used to define a multi-agent orchestration.

In some embodiments, a composite agent invocable action may allow multiple actions to be combined into a single, manageable unit. A streamlined interface may be provided for invoking complex processes. The sequence and dependencies of internal actions may be managed by the central orchestrator agent, facilitating orchestration within and among agents. Context may be maintained and propagated across multiple steps and potentially across multiple agents. The composite agent invocable action may also provide a unified approach to handling exceptions and retries.

In some embodiments, a composite agent invocable action simplifies complex processes by providing a unified interface to execute a sequence of steps as a single operation. For example, in order to invoke an Agent API, a calling process may need to orchestrate multiple calls including, for instance: (1) starting a session, (2) setting a set of variables, and (3) calling the Agent to perform the task. A composite agent invocable action may unify such operations into a single call.

FIG. 58 illustrates a multi-agent/blended agent platform 5800, configured in accordance with one or more embodiments. The multi-agent/blended agent platform 5800 includes a data layer 5802, a model and analytics layer 5804 including a predictive model builder 5806, a generative language model layer 5808 including a prompt builder 5810, a workflow and orchestration layer 5812 including a flow builder 5814, a multi-agent layer 5816 including a dialogue management engine 5818, and a delivery and channel layer 5820 including a user interface component engine 5822.

In some implementations, various elements of the multi-agent/blended agent platform 5800 may overlap with other components shown herein. Further, providing the multi-agent/blended agent platform 5800 may involve many other components not shown in FIG. 58. However, FIG. 58 presents various components of the multi-agent/blended agent platform 5800 together so as to more clearly illustrate their interrelated operation and configuration.

In some embodiments, the data layer 5802 may store customer data, historical interactions, and other relevant information and/or may integrate with one or more external data sources to store and/or retrieve outside information. The model and analytics layer 5804 provides access to non-generative predictive models and analytics workflows for producing analytics information. The predictive model builder 5806 may be used to create custom predictive models for lead scoring, churn analysis, and other use cases.

In some embodiments, the generative language model layer 5808 may provide an interface for accessing generative language models to process text, image, audio, video, and/or other types of data for tasks like sentiment analysis, content generation, and question answering. The prompt builder 5810 may be used to build prompts for such models.

Figure 61:
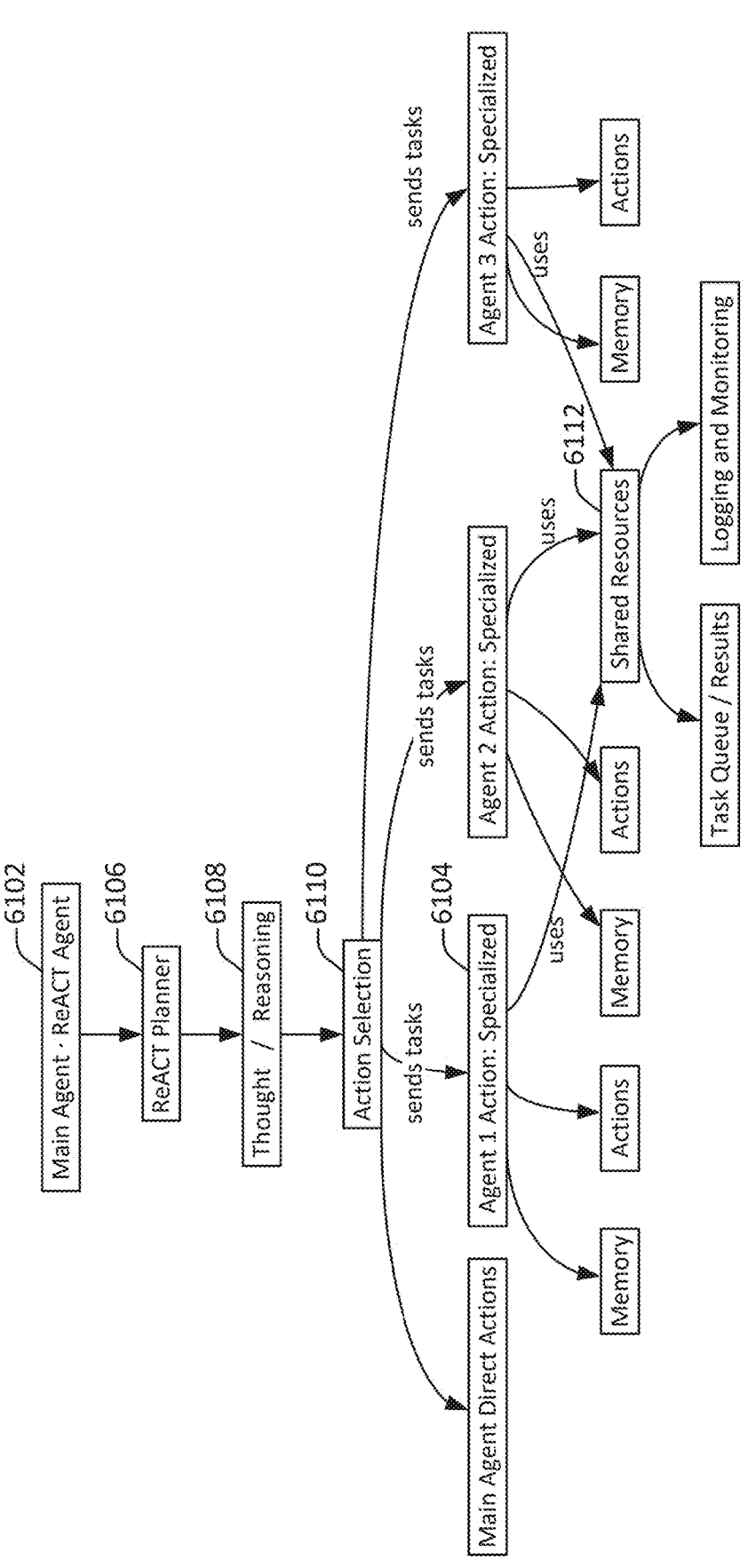
FIG. 61 shows an example of a flow involving multi-agent orchestration, performed in accordance with one or more embodiments.

In some embodiments, the workflow and orchestration layer 5812 facilitates the definition of flows, which can trigger actions based on events, user interactions, or predictions from the AI models. An autonomous agent may act as an interface for user interaction. It can leverage the LLM to understand user intent and trigger flows or actions based on context. The flow builder 5814 facilitates defining the logic and execution steps for blended AI applications. For instance, the flow builder 5814 may be used to construct a graph as shown in FIG. 61.

In some embodiments, the multi-agent layer 5816 facilitates interactions between different agents. For instance, the dialogue management engine 5818 manages the conversation flow, routing requests to the appropriate agent (human or AI) based factors such as complexity, domain expertise, and availability. In this way, one or more human agents can collaborate with AI to provide personalized service.

In some embodiments, the delivery and channel layer 5820 coordinates interaction between agents and communication channels. The UI component engine 5822 provides reusable UI components for building custom application interfaces within the computing services environment. The connector composer 5824 facilitates integration with external communication channels such as Slack and SMS for delivering AI-powered interactions outside of the computing services environment. The tools generation component 5826 facilitates deployment and management of applications across various channels (e.g., native computing services environment, Slack, etc.).

FIG. 59 illustrates a method 5900 for configuring an employee agent in a multi-agent orchestration, performed in accordance with one or more embodiments. The method 5900 may be performed at the computing services environment 100 shown in FIG. 1.

A request to configure an employee agent for a multi-agent orchestration is received at 5902. In some embodiments, the request may be generated as discussed with respect to the operation 5710 shown in FIG. 57.

Configuration information for the employee agent is identified at 5904. In some embodiments, the configuration information may be determined as discussed with respect to the method 1500 shown in FIG. 15.

Input and output information for the employee agent is determined at 5906. In some embodiments, the input information may include information selected from the context of the central orchestration agent for the multi-agent orchestration. Such information may be used to instantiate a shared context in the case of an employee agent being an independent agent. In the case of the employee agent being a model, workflow, or other such action, the information may be used to determine one or more input parameters.

Invocation information for the employee agent is determined at 5908. In some embodiments, the invocation information may indicate when and under what conditions the employee agent is to be invoked in the multi-agent orchestration. The invocation information may include one or more rules, conditions, and/or natural language descriptions of situations in which the employee agent is to be invoked and/or actions that the employee agent is to perform.

One or more metadata entries for the employee agent are stored at 5910. According to various embodiments, the one or more metadata entries may include metadata references configured in accordance with the metadata framework described herein that reference or include the information determined as discussed with respect to the method 5900 shown in FIG. 59. Using such an approach, individual agents may be created and then attached to an employee agent as an agent action. Individual agents may be associated with agent metadata such as the name, description, and tasks that the agent will perform. The orchestration engine may consult a generative language model to determine which agent to select to perform a task.

FIG. 60 illustrates a method 6000 of executing a multi-agent and/or blended AI orchestration, performed in accordance with one or more embodiments. The method 6000 may be performed at the computing services environment 100 shown in FIG. 1.

A request to conduct a multi-agent orchestration is received at 6002. In some embodiments, the request may be generated as discussed with respect to the operation 3008 shown in FIG. 30. That is, the request may be generated based on the invocation of a composite agent invocable action.

A central orchestration agent for the multi-agent orchestration is instantiated at 6004. According to various embodiments, the central orchestration agent may be instantiated based on the configuration information specified as discussed with respect to the method 5800 shown in FIG. 58.

A central context for the central orchestration agent is determined at 6006. In some embodiments, the central context may be determined substantially as discussed with respect to the operation 3004 shown in FIG. 30.

A plan for the multi-agent orchestration is determined at 6008. In some embodiments, the plan may be determined substantially as discussed with respect to the method 5600 shown in FIG. 56.

An action to perform is selected at 6010. In some embodiments, the action may be selected from the plan. The actions may be performed in sequence or in parallel, depending on factors such as dependencies between actions.

An employee agent to perform the action is identified at 6012. In some embodiments, the central orchestration agent may handle some actions, such as simple actions, itself. However, the central orchestration agent may select other agents to perform other tasks.

In some embodiments, the central orchestration agent may coordinate with a generative language model to select an appropriate agent for a task. For instance, the generative language model may be provided with a prompt that includes descriptions of available agents and a natural language instruction to select an agent based on a description of the task to perform.

In some embodiments, the central orchestration agent may determine an employee agent based on the planner for the multi-agent orchestration. For instance, the planner may specify that particular agents are to be instantiated for particular tasks.

An employee agent context for the employee agent is determined at 6014. In some embodiments, the employee agent context may include any information from the central context to be shared with the employee agent for executing the employee agent. Such information may be selected based on the configuration operations discussed with respect to the method 5900 shown in FIG. 59.

The action is performed via the employee agent at 6016. In some embodiments, performing the action may involve instantiating an employee agent. Alternatively, or additionally, an action or model may be called. That is, although the actions are described in FIG. 60 as being performed by an employee agent, in practice performing the action may involve invoking an action directly from the central orchestration agent, initiating a predetermined workflow, activating a generative or non-generative AI/ML model directly from the central orchestration agent, or performing other such operations.

The central context is updated at 6018. In some embodiments, updating the central context may involve adding, removing, or altering values based on the performance of the action at 6016. For instance, the execution of a model may produce a score, which may then be used to guide the determination, selection, and execution of subsequent actions by the central orchestration agent.

A determination is made at 6020 as to whether to perform an additional action. In some embodiments, the determination may be made by the central orchestration agent. For instance, the central orchestration agent may evaluate the plan to determine if additional actions remain uncompleted. In some configurations, the central orchestration agent may then update the plan at 6008 to determine one or more different actions. Alternatively, predetermined actions from the previously determined plan may instead be selected at 6010.

FIG. 61 shows an example of a flow involving multi-agent orchestration, performed in accordance with one or more embodiments. In some embodiments, a set of operations may be performed to execute a complex task or query. First, the orchestrator receives a complex task or query. Then, the orchestrator breaks down the task into sub-tasks. Next, suitable agents are identified and assigned to handle specific sub-tasks. After that, the assigned agents execute their respective tasks. The orchestrator then collects results from agents. Finally, the orchestrator combines results to form a final response.

In some embodiments, the orchestrator ReACT agent 6102 receives a high-level task or query. Then, the ReACT planner 6106 processes the task. For example, the thought/reasoning module 6106 analyzes the task requirements to select actions at 6110. Then, The ReACT Planner 6106 communicates with the appropriate specialized agents through a task queue. The specialized agents perform the tasks and return results to the shared resources 6112. The ReACT agent 6102 can monitor progress, collect results, and potentially iterate through multiple thought-action cycles to complete a complex task.

At 6102, an orchestrator agent employs a ReACT paradigm of reasoning, acting, and critiquing. The orchestrator agent oversees operations such as decomposition, agent assignment, and result aggregation. The orchestrator agent also manages communication and coordination between agents.

At 6104, a specialized agent performs a task. According to various embodiments, different specialized agents may be designed for specific tasks or domains and may execute actions delegated by the orchestrator. A specialized agent can involve a call to a generative language model, a call to another type of ML model, and/or a call to one or more other tools. A specialized agent may also delegate tasks to other agents.

In some embodiments, an agent may be represented as an action, for instance via a connector based on the predefined contract. Thus, the ReAct Planner 6106 can identify a set of agents to perform the various subtasks and can call those agents as actions.

In some embodiments, a communication channel facilitates information exchange between the agents. Such a channel may be implemented via a shared memory, message queue, and/or API-based communication.

This architecture allows for more dynamic and intelligent task management, where the Control Plane Agent can adapt its strategy based on the task complexity and the current state of the system. It can handle simple tasks directly and orchestrate more complex tasks by leveraging the specialized capabilities of other agents.

In some embodiments, the creation of blended AI applications may be entirely or partially automated. For example, a continuous integration/continuous delivery (CI/CD) pipeline may automate the building, testing, and deployment of blended AI applications in accordance with the techniques and mechanisms shown in FIG. 57 through FIG. 61. Additionally, UI components may be automatically generated based on pre-defined configurations, reducing manual coding and expediting development cycles.

Consider the example of a blended AI application for lead qualification with sentiment analysis, provided in accordance with one or more embodiments. Suppose that a potential customer submits a lead form on the company website. A blended AI application then automatically analyzes the lead data via a predictive model and triggers actions based on the information and sentiment. Such an application may be defined based on a blended AI platform, which can determine the right tools to use and automatically generate metadata based on the customer need and workflow.

In some embodiments, a workflow for such an application may include a data intake phase in which the lead form submission triggers an appropriate flow via a central orchestrator agent. The central orchestrator agent may then trigger a data retriever action that captures data from the website form and transmits it to a cloud storage location.

In some embodiments, the central orchestrator agent may trigger a data platform action to harmonize the data and map the engagement history to create a data graph for that lead. The central orchestrator agent may also activate an AI processing component, in which the flow utilizes a pre-built model from the predictive model builder 5806 to score the lead based on criteria like industry, demographics, and previous interactions.

In some embodiments, the central orchestrator agent may trigger a generative language model to analyze the text content from the lead form (e.g., job title, description of needs). The generative language model may perform sentiment analysis to understand the customer's tone and urgency. The central orchestrator agent can then call a generative AI prompt builder to generate an email to the lead.

In some embodiments, the central orchestrator agent may trigger a decision making and action component. Based on the combined score (predictive model+sentiment analysis), the central orchestrator agent may take one or more actions.

High Score & Positive Sentiment: The lead is automatically assigned to a sales rep for immediate follow-up and copilot automatically schedules a meeting. A notification is sent to the rep via a messaging service, including key information and a pre-populated email draft generated by the LLM.

High Score & Negative Sentiment: The lead is flagged for further review. The autonomous agent proactively engages the lead through a chat window on the website, attempting to address their concerns with LLM-powered responses. If the issue is unresolved, the conversation is routed to a human agent.

Low Score: The lead is nurtured with automated marketing campaigns based on pre-defined segments.

In some embodiments, the central orchestrator agent for such an application may also include a multi-agent collaboration component. Human agents can access the lead interaction history, sentiment analysis results, and suggested responses from the LLM to provide personalized follow-up.

In some embodiments, the central orchestrator agent for such an application may also include a delivery and channel layer 5820 component. UI components (potentially autogenerated) display relevant lead information and AI insights within the user interface. Additionally, messaging notifications may push lead updates and pre-populated email drafts to human sales representatives' mobile devices.

According to various embodiments, the computing services environment may support sophisticated testing of agents. Testing may be used to accomplish one or more of a variety of tasks. For example, response quality and cost of different models may be compared to find the most effective and economical option among generative language models. As another example, prompts may be evaluated to ensure they elicit desired responses from a generative language model, thus improving user interactions. As yet another example, A/B testing may be used to compare the real-world performance of different models and prompt combinations. As still another example, models and agents may be monitored to detect performance drops and take corrective actions. As still another example, a fine-tuned model may be evaluated on new and/or original tasks to evaluate its effectiveness. As still another example, agent actions may be tested to ensure that they function as intended and to evaluate the state of the agent. As still another example, the performance of tests prompts, custom models, and RAG may be evaluated.

Figure 62:
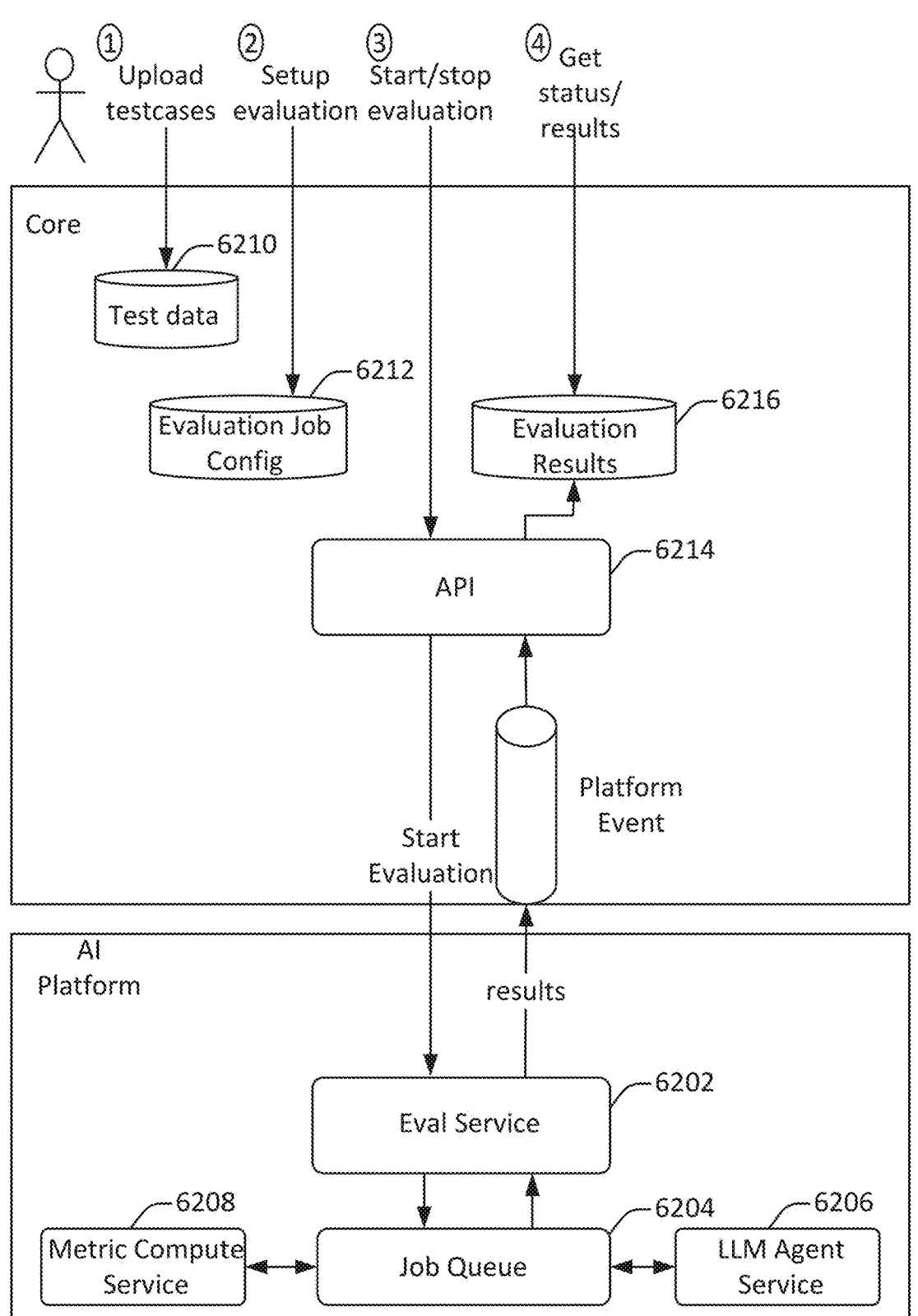
FIG. 62 illustrates a diagram of a configuration for testing, configured in accordance with one or more embodiments.

FIG. 62 illustrates a diagram of a configuration for testing, configured in accordance with one or more embodiments. In some embodiments, testcases may be uploaded to a test data repository 6210. Then, jobs to evaluate one or more models, agents, actions, or the like may be created at 6212. Such jobs may reference the test data stored in the test data repository 6210. Evaluation of the jobs may be triggered via a testing interface 6214, which may communicate with an evaluation service 6202 tasked with performing the evaluations. The evaluation service 6202 may perform testing as a set of offline jobs sent to an offline job queue 6204. The offline job queue may communicate with an agent service 6206 and a metric compute service 6208 to execute tasks to perform the offline testing jobs. Results may be returned to the testing interface 6214 and may be stored as evaluation results 6216 linked to the evaluation job configuration information 6212. Results may then be retrieved upon request.

According to various embodiments, the evaluation service 6202 may measure various metrics. For example, such as alignment metrics, quality metrics, and/or one or more custom metrics. Alignment metrics measure how well responses match human-written references, for instance using BLEU (fluency) and ROUGE (recall) scores. Quality metrics assess intrinsic qualities such as safety (e.g., detecting toxicity, bias, etc.), conciseness (e.g., clear, to-the-point communication), and coherence (e.g., the logical flow of ideas). Custom Metrics allow end users to define and train reward models for specific needs (e.g., helpfulness, factual accuracy) using labeled data (positive/negative examples, thumbs up/down feedback).

According to various embodiments, the evaluation service 6202 may provide various kinds of testing functionality. For example, the evaluation service 6202 may simplify testing by supporting tests that include multiple user-defined operations in a single call, which may allow batching various actions such as sending messages and evaluating responses. As another example, the evaluation service 6202 may provide assurances that testing operations are performed in the specified order to ensure clear test results. As yet another example, the evaluation service 6202 may perform rate limiting, for instance by limiting testing operations not a maximum number of steps per request to avoid overwhelming the system. As still another example, the evaluation service 6202 may perform error handling by halting test execution if a step fails, preventing unnecessary processing. As still another example, the evaluation service 6202 may provide state management by supporting initial state definition, with subsequent steps using the previous step's output for chained testing.

In some embodiments, test cases may be configured via a test case structure. The test case structure may optionally define initial steps that are common to test cases, such as setting a starting state. Then, a dictionary may map unique test case names to their corresponding step sequences. The test case sequences may be composed of steps, with a step identifying an action performed to execute the test.

In some embodiments, test cases may incorporate RAG to more fully test the elements of agents. For example, a Contextual Relevance metric may evaluate a retrieved context against a query and may employ data such as an LLM Prompt (Query), a RAG Query, and a RAG Retrieved Context. As another example, a Groundedness or Faithfulness metric (also referred to herein as a factuality score) may evaluate a response against the context to check if the response is correctly grounded to the context and may employ data such as an LLM Prompt (Query) and a RAG Retrieved Context. As yet another example, an Answer Relevance metric may examine how well the response aligns with the user's input (query) and may employ data such as an LLM Prompt (Query), a RAG Query, an LLM response, and a RAG Retrieved Context.

Figure 63:
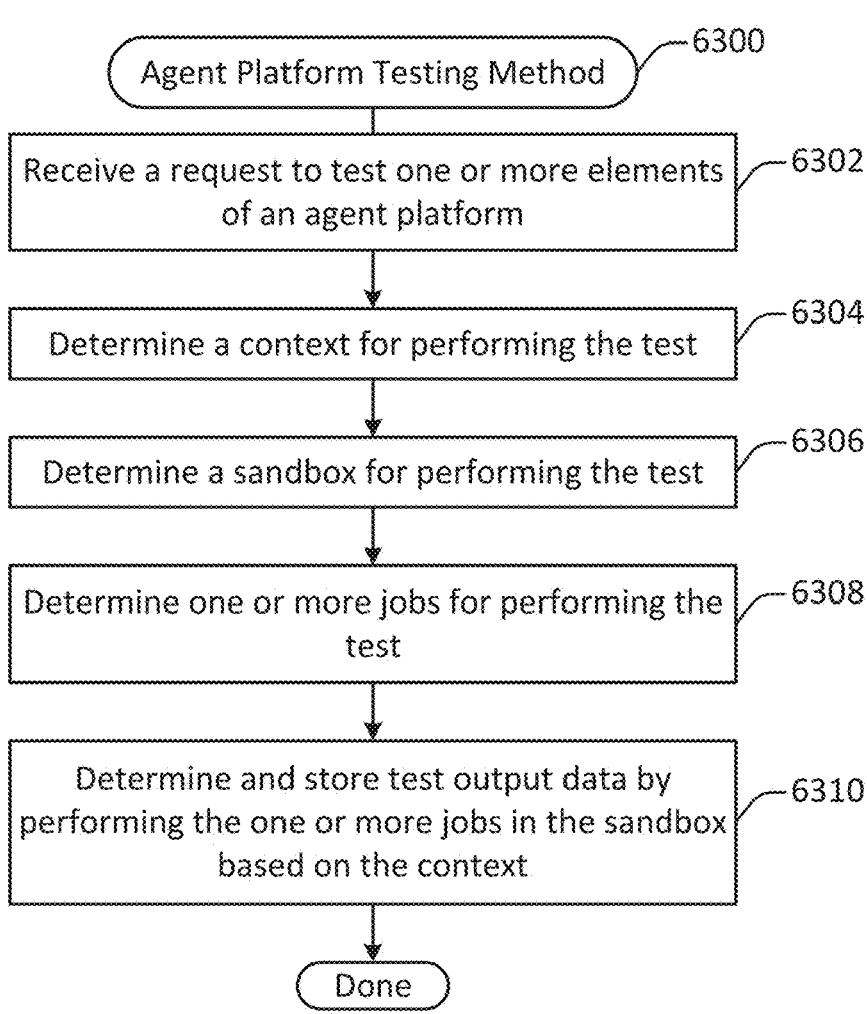
FIG. 63 illustrates an agent platform testing method, performed in accordance with one or more embodiments.

FIG. 63 illustrates an agent platform testing method 6300, performed in accordance with one or more embodiments. The agent platform testing method 6300 may be performed at the computing services environment 100 shown in FIG. 1.

A request to test one or more elements of an agent platform is received at 6302. According to various embodiments, any of various elements of an agent platform may be tested. Such elements may include, but are not limited to: agents, combinations of agents, planners, actions, graphs, data retrievers, other types of elements, and combinations thereof.

A context for performing the test is determined at 6302. In some embodiments, elements of the context may be specified manually. Alternatively, or additionally, elements of the context may be retrieved from a storage location. For instance, a context may be saved as discussed with respect to the method 6300 shown in FIG. 63.

A sandbox for performing the test is determined at 6306. In some embodiments, a sandbox may include one or more storage locations for updating during the test. For example, information ostensibly written to a database during the test may instead be written to the sandbox. Then, if a database query ostensibly retrieves such information from the database, the information may be retrieved from the sandbox instead. The sandbox may be used for information stored to a database system, to a storage drive, to an external service, and/or any other location. Additional details regarding the configuration and use of a sandbox are discussed with respect to FIG. 64 and FIG. 65.

One or more jobs for performing the test are determined at 6308. In some embodiments, a job may be specified based on a test case script. An example of a test case script is provided below. Test output data is determined and stored at 6310 by performing the one or more jobs in the sandbox based on the context.

An example test case script configuration is provided below. This example includes two test cases. The test case "eval_test_case_1" checks response latency after specific messages. The test case "prompt_test_case_2" evaluates if the response contains a specific letter. In this example, special symbols reference planner service outputs for assertions (e.g., $.latency for response time). The step "FunctionStep" represents actions like sending messages (e.g., "agent.sendMessage"), while the step "EvaluationStep:" Used for assertions against response data (e.g., "assert" with operators like "equals" or "less_than"). Such a structure facilitates efficient and flexible testing of Agent and prompt behavior.

```
{
    //Initial steps for all test cases.
    "setup": {
        "initial_state": None,
        'steps': [{
            "type": "FunctionStep",
            "target": "agent.sendMessage",
            "parameters": {
            "message": "hello, I'm a system admin. Please
            help me."
            }
        }]
    }, //End of setup
    //Multiple test cases
    "tests": {
        //Test Case name→test case scripts.
        "eval_test_case_1": [{
            "type": "FunctionStep",
            "target": "agent.sendMessage",
            "input": {
            "message": "list acme account opportunities"
            }
        },
        {
            "type": "EvaluationStep",
            "target": "assert",
            "parameters": {
            "actual": "$.latency",
            "operator": "less_than",
            "expected": 200,
            }
        }
    ],
    //Test Case name→test case scripts.
```

```
        'prompt_test_case_2': [{
            "type": "FunctionStep",
            "target": "agent.sendMessage",
            "input": {
            "message": "list all my acme account opportu-
            nities"
            }
        },
        {
            "type": "FunctionStep",
            "target": "prompt",
            "parameters": {
            "prompt": "Does the last message contain the
            letter 'F', Bot Response: $.response message",
            },
            "output": "$.customize.prompt_eval_result"
        },
        {
            "type": "EvaluationStep",
            "target": "assert",
            "parameters": {
            "actual": "$.customize.prompt_eval_result"
            "operator": "equals",
            "expected": "No",
            }
        }
    ]
    }
}
```

In some embodiments, the evaluation service 5902 may be integrated into and/or interoperate with a framework for testing functional code. Such integration may provide for enhanced testing capabilities. An example definition function for performing such integration is as follows.

```
public class AgentMessageTest {
    //Method to simulate any actions
    //Test setup method
    private static void setup( ) {
    //Initial setup if any
    }
    @isTest
    static void testEvalTestCase1( ) {
        //Create an acme account and opportunities
        Agent.setup( );
        //Step 1: Agent sends a message
        AgentTest.start( );
        Agent.Response response=Agent.sendMessage("list
            acme account opportunities");
        AgentTest.stop( );
        //Step 2: Evaluate the response (mocking latency
            check here)
        Long latency=150; //Mock latency value for testing
            purpose
        //Assertions
        System.assert(latency<response.latency, 'Latency is
            not less than 200 ms');
    }
    @isTest
    static void testPromptTestCase2( ) {
        Agent.setup( );
        //Step 1: Agent sends a message
        Agent.Response     response=Agent.sendMessage
            ("list all my acme account opportunities");
        //Mock the prompt evaluation step
        Boolean    promptEvalResult=response2.contains
            ('F')?false: true;
        //Assertions
```

```
System.assertEquals(false,        promptEvalResult,
    'The prompt evaluation result did not match the
    expected value');
    }
}
}
```

Figure 64:
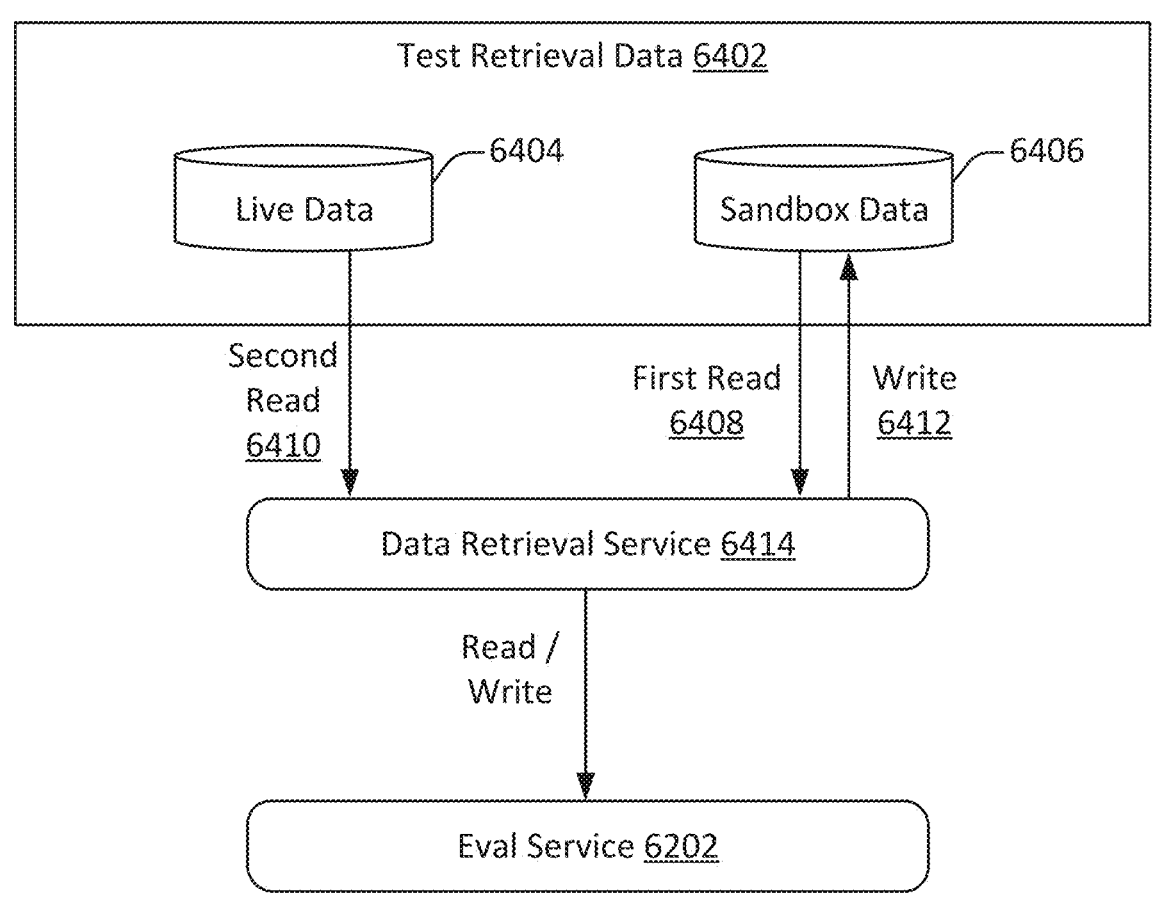
FIG. 64 illustrates a testing data architecture diagram, configured in accordance with one or more embodiments.

FIG. 64 illustrates a testing data architecture diagram 6400, configured in accordance with one or more embodiments. The testing data architecture diagram 6400 illustrates the configuration of data used in the course of testing an autonomous agent. Such testing data is different from the test data 6210 shown in FIG. 62 in that the test data 6210 defines configuration information such as test cases that include user input, whereas the testing data referred to in FIG. 64 includes data retrieved in the course of testing an autonomous agent.

According to various embodiments, such testing data presents a challenge since the data accessed by an autonomous agent in the course of execution is difficult to predict. For instance, the data accessed and written may depend on the input data included in a test case, and may be impossible to predict without executing the test case via the autonomous agent. Accordingly, retrieving such data in advance may be effectively impossible.

Another challenge associated with testing data is that an autonomous agent may write data in the course of its execution. Because the execution of the test case is for testing purposes only, writing such data to a live data repository would corrupt the live data repository. Even if the live data repository were created for the purpose of testing, writing to the live data repository would mean that repeating the same test may result in different results since the previous test iteration would have already written data to the live data repository. In some embodiments, the testing data architecture diagram 6400 shown in FIG. 64 addresses these challenges by providing for data storage and retrieval via a sandbox.

According to various embodiments, the evaluation service 6202 may read and write testing data via a data retrieval service 6414. The data retrieval service 6414 may write testing data to a sandbox data repository 6406 via a write request 6412. When the data retrieval service 6414 receives a request to read data, the data retrieval service 6414 may first attempt to read the data from the sandbox data repository 6406 via the read request 6408. If the data exists in the sandbox data repository 6406, the retrieved data is returned to the eval service 6202. If instead the requested data does not exist in the sandbox data 6406, then the data retrieval service 6414 attempts to retrieve the data from the live data 6404.

In this way, the live data may be used to support the execution of the testing job. Further, the autonomous agent being tested may actively write to storage in the same way that it would normally write were it being executed in a live, rather than testing, fashion. However, the data retrieval service 6414 would write such data to the sandbox data repository 6406 instead of the live data repository 6404. Moreover, the autonomous agent being tested could retrieve data that it had written, since the data retrieval service 6414 would first attempt to retrieve such data from the sandbox data repository 6406 before accessing the live data repository 6404.

Figure 65:
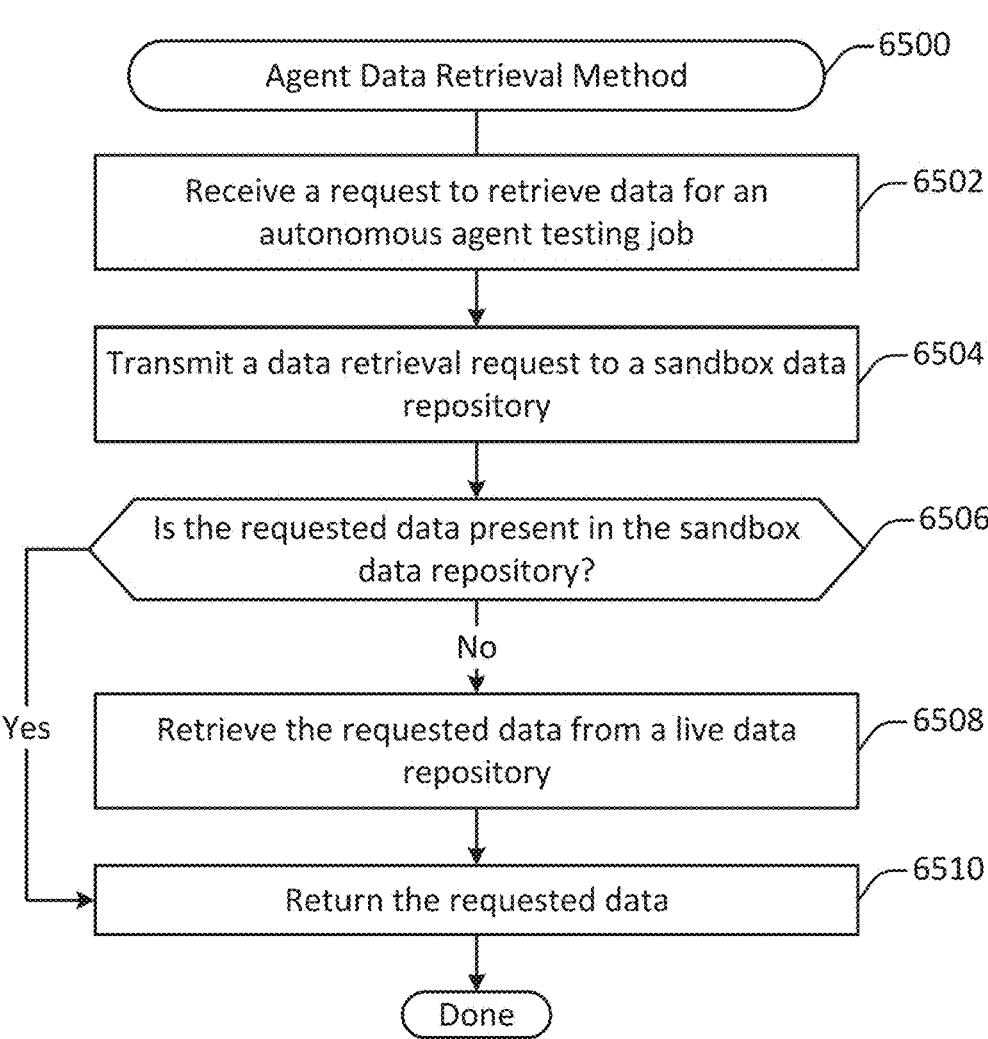
FIG. 65 illustrates a testing data retrieval method, performed in accordance with one or more embodiments.

FIG. 65 illustrates a testing data retrieval method 6500, performed in accordance with one or more embodiments. The method 6500 may be performed by the computing services environment 100 shown in FIG. 1.

A request to retrieve data for an autonomous agent testing job is received at 6502. In some embodiments, the request may be generated as discussed with respect to the operation 6310 shown in FIG. 63. For instance, in the course of instantiating and testing an autonomous agent, the autonomous agent being executed may perform an action in which data is retrieved from the database system or another data source.

A data retrieval request is transmitted to a sandbox data repository at 6502. According to various embodiments, the sandbox data repository may store any of a variety of types of data, including structured data, unstructured data, and semi-structured data. In this way, the sandbox data repository may be used to store any of various types of data potentially written by autonomous agent in the course of testing.

At 6506, a determination is made as to whether the requested data is present in the sandbox data repository. In some embodiments, the request may be made based on actually transmitting a data retrieval request at 6504. For instance, the data retrieval request at 6504 may fail or return an appropriate response if the data is not present in the sandbox data repository. Alternatively, the determination may be made without transmitting such a request. For instance, in the event that the data is being requested from a read-only source, such as an external and non-writable source, the determination may be made at 6506 without actually transmitting a request at 6504.

Upon determining that the requested data is present in the sandbox data repository, the requested data is returned to the autonomous agent instance being tested at 6510. Upon determining instead that the requested data is not present in the sandbox data repository, the requested data is retrieved from a live data repository at 6508. For instance, the data may be retrieved via an appropriate data retriever configured as discussed herein.

Figure 66:
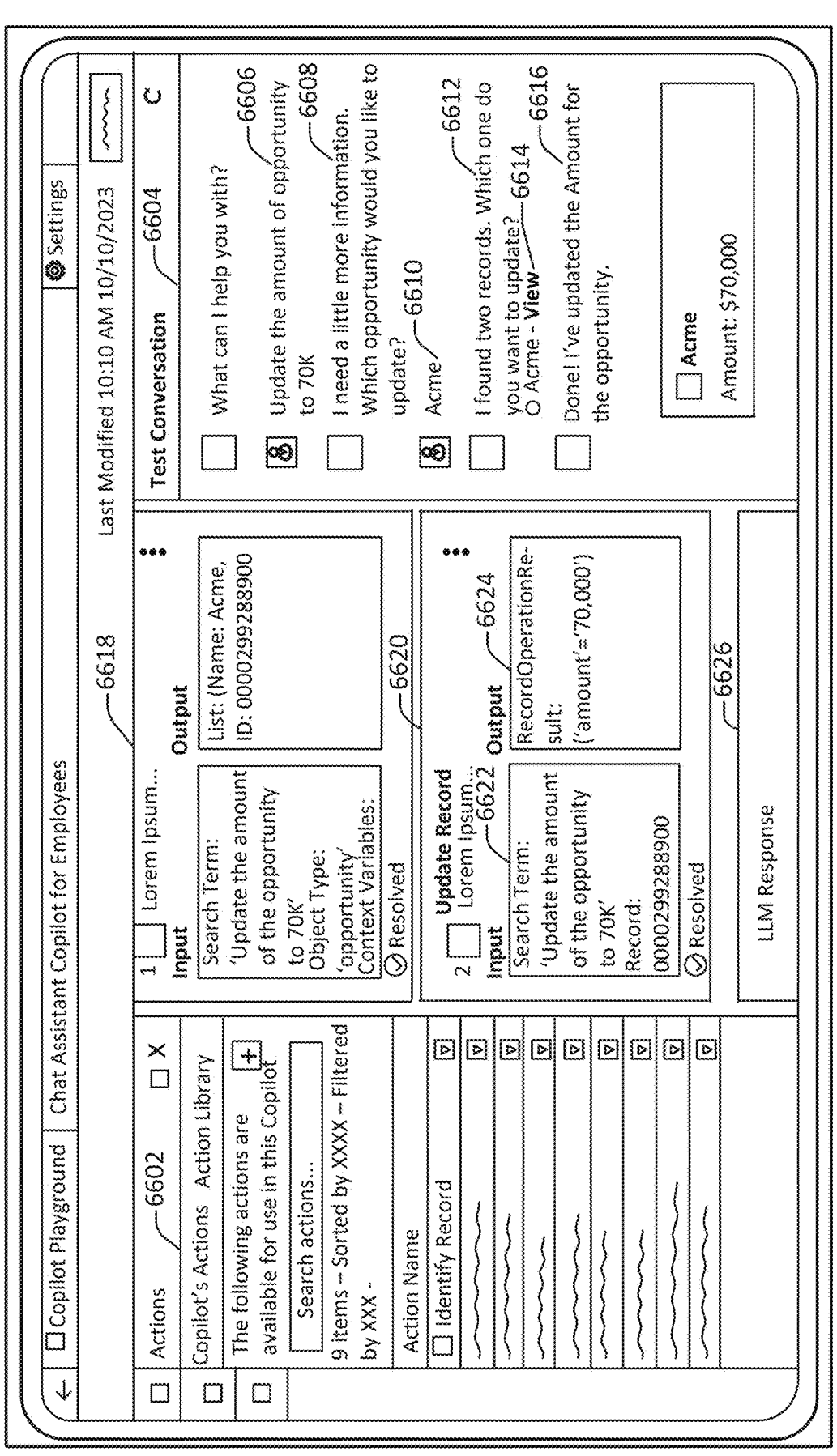

FIG. 66 and FIG. 67 illustrate examples of user interfaces 6600 and 6700 for configuring and testing various elements of an autonomous agent, generated in accordance with one or more embodiments. For example, the user interfaces 6600 and 6700 may be generated in the course of providing access to the conversational chat studio 672 shown in FIG. 2. For instance, an administrator may use the user interfaces 6600 and 6700 to configure and test an autonomous agent by identifying the specific actions triggered based on test conversation provided via a test conversational chat interface.

At 6602, the user interface 6600 allows for the selection and creation of actions for an autonomous agent. The plan tracer 6604 illustrates the output of a test interaction with the autonomous agent. For instance, the conversational test interface 6604 includes a text element 6606 in which a user requested to "Update the amount of the opportunity to 70K". The autonomous agent asks the user to clarify the record to update at 6608 by generating novel text via a generative language model. When the user specifies "Acme", the autonomous agent notes that Acme corresponds to two different records and provides a selectable option at 6614. After the user specifies the record to update at 6614, the autonomous agent updates the record and provides a confirmation response at 6616.

The action implementation interface 6608 illustrates the actions performed by the autonomous agent in the course of the interaction. For instance, at 6620, the chat assistant executes an "Update Record" action that takes as input 6622 the text input provided by the user and returns output 6624 indicating the result of performing a database system update based on the input in which the amount of the opportunity record that is the focus of the conversation is updated to 70,000. At 6626, the next action generates the confirmation response based on an interaction with a large language model.

A similar flow is shown in the user interface 6700. A set of actions available for the autonomous agent is shown at 6702. A test conversation 6716 illustrates an interaction in which the autonomous agent has generated a draft email message 6718 based on natural language input received via the chat interface and information retrieved from the database system. The draft email message 6718 includes links 6720 to products based on one or more database records.

The plan tracer 6704 shows the actions performed as part of generating the interaction. As one example, the inventory check action 6704 may be used to call an external system to track the progress to view inventory levels at different warehouses. Each action may be associated with one or more inputs and one or more outputs. For example, the inventory check action 6704 is associated with inputs that include a list of product recommendations, one or more parameters, and one or more context variables. The parameters include a location name associated with the warehouses. The context variables include an account identifier that uniquely identifies the account for which inventory levels are sought. The outputs include a list of inventory check results. The different input and output values may be defined further based on markup, for instance markup that specifies additional characteristics of an input or output value.

As another example, the send email action 6706 may be used to send a pre-created email to a customer with data integrated from the customer relations management data stored in the database for the customer organization and/or data from one or more external sources. The send email action 6706 includes as an input a list of product recommendations, which may be determined based on an internal workflow. The send email action 6706 also includes a template identifying one or more member product recommendations which may be used to retrieve one or more product recommendations dynamically determined based on user input. The context variables include an account identifier that uniquely identifies the account for which the email is being created. The outputs include an email generated by executing the action.

In some embodiments, testing may involve mocking the result of actions. For example, an agent may be created with one or more actions that are described but are not yet implemented. In such a situation, a generative language model may be provided with an action mocking input prompt that describes the action and includes a natural language instruction to determine novel text representing an example of the action were the action implemented and actually performed on input data. For example, a request to identify the top three companies by cash value may result in a list such as "Acme", "Globex", and "Umbrella" corporation rather than actual company names if the search functionality associated with the requested data had not yet been implemented. An example of such output is shown at 6720 in FIG. 67.

CONCLUSION

In various implementations, the models and/or modules described herein may be classification, predictive, generative, conversational, or another form of artificial intelligence (AI) technology, such as AI model(s), agents, etc., implementing one or more forms of machine learning, a neural network, statistical modeling, deep learning, automation, natural language processing, or other similar technology. The AI technology may be included as part of a network or system comprising a hardware- or software-based framework for training, processing, fine-tuning, or performing any other implementation steps. Furthermore, the AI technology may include a hardware- or software-based framework that performs one or more functions, such as retrieving, generating, accessing, transmitting, etc. The AI technology may be implemented by a computer including a register coupled with a processor or a central processing unit (CPU).

Moreover, the AI technology may be trained or fine-tuned using supervised, unsupervised, or other AI training techniques. In various implementations, the AI technology may be trained or fine-tuned using a set of general datasets or a set of datasets directed to a particular field or task. Additionally or alternatively, the AI technology may be intermittently updated at a set interval or in real time based on resulting output or additional data to further train the AI technology. The AI technology may offer a variety of capabilities including text, audio, image, and other content generation, translation, summarization, classification, prediction, recommendation, time-series forecasting, searching, matching, pairing, and more. These capabilities may be provided in the form of output produced by the AI technology in response to a particular prompt or other input. Furthermore, the AI technology may implement Retrieval-Augmented Generation (RAG) or other techniques after training or fine-tuning by accessing a set of documents or knowledge base directed to a particular field or website other than the training or fine-tuning data to influence the AI technology's output with the set of documents or knowledge base.

To further guide and train output of the AI technology, a plurality of input prompts may be provided to the AI technology for the purpose of eliciting particular responses. In various implementations, the plurality of input prompts may correspond to the particular field or task to which the AI technology is trained. Additionally, the AI technology may be implemented along with a plurality of additional AI technologies. For example, a first AI model may produce a first output, which is used as input for a second AI model to produce a second output. These AI technologies may be used in succession of one another, in parallel with another, or a combination of both. Furthermore, the AI technologies may be merged in a variety of implementations, for example, by bagging, boosting, stacking, etc. the AI technologies.

The invention claimed is:

1. A computing services environment, comprising:

a database system storing a plurality of metadata entries in accordance with a metadata framework, the metadata entries including a plurality of action definitions defining actions capable of being taken within the computing services environment;

a configuration layer operable to create an autonomous agent definition based on input received from a client machine, the autonomous agent definition referencing a subset of the plurality of action definitions;

an agent platform configured to instantiate an autonomous agent instance in accordance with the autonomous agent definition, the autonomous agent instance being associated with a runtime context including information accessible to the autonomous agent instance;

an orchestration engine configured to autonomously determine an execution plan for the autonomous agent instance by selecting one or more of the subset of the plurality of action definitions based on the runtime context and the plurality of metadata entries via a generative language model;

one or more application servers configured to autonomously execute a plurality of actions corresponding to the one or more action definitions, the plurality of actions including a designated action updating one or more database records stored in the database system; and a conversation platform facilitating communication between the computing services environment and a plurality of client machines via a plurality of communication channels, the one or more actions including a communication action, executing the communication action including transmitting novel communication text determined via the generative language model to a designated client machine of the plurality of client machines, the novel communication text being transmitted via a communication channel of the plurality of communication channels, wherein the autonomous agent instance is configured as a conversational chat assistant, the conversational chat assistant being configured to generate the novel communication text in response to natural language input received from the client machine via the communication channel.

2. The computing services environment recited in claim 1, wherein the autonomous agent definition is created based on a predetermined workflow within the computing services environment, the predetermined workflow defining a set of operations to be performed in the runtime context of providing computing services via the one or more application servers, the subset of action definitions corresponding at least in part to the set of operations.

3. The computing services environment recited in claim 2, wherein creating the autonomous agent definition comprises autonomously creating some or all of the subset of action definitions based on the predetermined workflow.

4. The computing services environment recited in claim 1, wherein the configuration layer includes a configuration studio providing a graphical user interface for presentation at the client machine, the input being received via the graphical user interface.

5. The computing services environment recited in claim 1, the autonomous agent definition including a purpose description characterizing in natural language one or more functions of autonomous agent instances created based on the autonomous agent definition.

6. The computing services environment recited in claim 1, the autonomous agent definition referencing a data retriever metadata entry specifying an action to retrieve data at runtime for use by the autonomous agent instance in determining and executing the one or more action definitions.

7. The computing services environment recited in claim 1, the autonomous agent definition referencing a plurality of topics, a topic of the plurality of topics including the subset of the plurality of action definitions, the topic being associated with a topic description characterizing the topic in natural language, wherein selecting the one or more action definitions comprising selecting the topic from the plurality of topics based on user input received at runtime.

8. The computing services environment recited in claim 1, wherein the autonomous agent definition including one or more engagement rules identifying one or more trigger conditions for instantiating or terminating autonomous agent instances based on the autonomous agent definition, wherein the autonomous agent instance is instantiated upon detection of an instantiation trigger condition of the one or more trigger conditions by the computing services environment.

9. The computing services environment recited in claim 8, wherein the autonomous agent instance is terminated upon detection by the computing services environment of a termination trigger condition of the one or more trigger conditions.

10. The computing services environment recited in claim 8, wherein further execution of the autonomous agent instance is halted and a message is sent to a human supervisor upon detection by the computing services environment of an escalation trigger condition of the one or more trigger conditions.

11. The computing services environment recited in claim 1, wherein the autonomous agent definition includes configuration information for communicating via the communication channel.

12. The computing services environment recited in claim 1, wherein the configuration information includes object-specific formatting information specifying how to present data associated with data objects retrieved from the database system within the communication channel.

13. A method implemented in a computing services environment, the method comprising:

storing a plurality of metadata entries in a database system in accordance with a metadata framework, the metadata entries including a plurality of action definitions defining actions capable of being taken within the computing services environment;

creating an autonomous agent definition via configuration layer based on input received from a client machine, the autonomous agent definition referencing a subset of the plurality of action definitions;

instantiating an autonomous agent instance in an agent platform in accordance with the autonomous agent definition, the autonomous agent instance being associated with a runtime context including information accessible to the autonomous agent instance;

autonomously determining an execution plan for the autonomous agent instance in an orchestration engine by selecting one or more of the subset of the plurality of action definitions based on the runtime context and the plurality of metadata entries via a generative language model; and autonomously executing a plurality of actions corresponding to the one or more action definitions via one or more application servers, the plurality of actions including a designated action updating one or more database records stored in the database system, the computing services environment include a conversation platform facilitating communication between the computing services environment and a plurality of client machines via a plurality of communication channels, the one or more actions including a communication action, executing the communication action including transmitting novel communication text determined via the generative language model to a designated client machine of the plurality of client machines, the novel communication text being transmitted via a communication channel of the plurality of communication channels, wherein the autonomous agent instance is configured as a conversational chat assistant, the conversational chat assistant being configured to generate the novel communication text in response to natural language input received from the client machine via the communication channel.

14. The method recited in claim 13, wherein the autonomous agent definition is created based on a predetermined workflow within the computing services environment, the predetermined workflow defining a set of operations to be performed in the runtime context of providing computing services via the one or more application servers, the subset of action definitions corresponding at least in part to the set of operations, wherein creating the autonomous agent definition comprises autonomously creating some or all of the subset of action definitions based on the predetermined workflow.

15. The method recited in claim 13, wherein the configuration layer includes a configuration studio providing a graphical user interface for presentation at the client machine, the input being received via the graphical user interface.

16. The method recited in claim 13, wherein the autonomous agent definition includes a purpose description characterizing in natural language one or more functions of autonomous agent instances created based on the autonomous agent definition.

17. The method recited in claim 13, wherein the autonomous agent definition includes one or more engagement rules identifying one or more trigger conditions for instantiating or terminating autonomous agent instances based on the autonomous agent definition, wherein the autonomous agent instance is instantiated upon detection of an instantiation trigger condition of the one or more trigger conditions by the computing services environment.

18. The method recited in claim 13, further comprising: a conversation platform facilitating communication between the computing services environment and a plurality of client machines via a plurality of communication channels, the one or more actions including a communication action, executing the communication action including transmitting novel communication text determined via the generative language model to a client machine of the plurality of client machines, the novel communication text being transmitted via a communication channel of the plurality of communication channels, wherein the autonomous agent instance is configured as a conversational chat assistant, the conversational chat assistant being configured to generate the novel communication text in response to natural language input received from the client machine via the communication channel, wherein the autonomous agent definition includes configuration information for communicating via the communication channel, wherein the configuration information includes object-specific formatting information specifying how to present data associated with data objects retrieved from the database system within the communication channel.

19. A method implemented in a computing services environment, the method comprising:

storing a plurality of metadata entries in a database system in accordance with a metadata framework, the metadata entries including a plurality of action definitions defining actions capable of being taken within the computing services environment;

creating an autonomous agent definition via configuration layer based on input received from a client machine, the autonomous agent definition referencing a subset of the plurality of action definitions;

instantiating an autonomous agent instance in an agent platform in accordance with the autonomous agent definition, the autonomous agent instance being associated with a runtime context including information accessible to the autonomous agent instance;

autonomously determining an execution plan for the autonomous agent instance in an orchestration engine by selecting one or more of the subset of the plurality of action definitions based on the runtime context and the plurality of metadata entries via a generative language model; and autonomously executing a plurality of actions corresponding to the one or more action definitions via one or more application servers, the plurality of actions including a designated action updating one or more database records stored in the database system, the computing services environment include a conversation platform facilitating communication between the computing services environment and a plurality of client machines via a plurality of communication channels, the one or more actions including a communication action, executing the communication action including transmitting novel communication text determined via the generative language model to a designated client machine of the plurality of client machines, the novel communication text being transmitted via a communication channel of the plurality of communication channels, wherein the autonomous agent instance is configured as a conversational chat assistant, the conversational chat assistant being configured to generate the novel communication text in response to natural language input received from the client machine via the communication channel.

* * * * *